(12) United States Patent
Trans et al.

(10) Patent No.: US 6,904,110 B2
(45) Date of Patent: Jun. 7, 2005

(54) CHANNEL EQUALIZATION SYSTEM AND METHOD

(76) Inventors: Francois Trans, 1504 Clay Dr., Los Altos, CA (US) 94024; Tho Le-Ngoc, 8221 Du Mail, Anjou, Quebec (CA), H1K 1Z5

(*) Notice: Subject to any disclaimer, the term of this patent is extended or adjusted under 35 U.S.C. 154(b) by 452 days.

(21) Appl. No.: 09/847,097

(22) Filed: May 1, 2001

(65) Prior Publication Data

US 2003/0016770 A1 Jan. 23, 2003

Related U.S. Application Data

(60) Division of application No. 09/550,395, filed on Apr. 14, 2000, now abandoned, and a continuation-in-part of application No. PCT/US00/06842, filed on Mar. 15, 2000, and a continuation-in-part of application No. 09/444,077, filed on Nov. 19, 1999, now abandoned, which is a continuation-in-part of application No. 09/417,528, filed on Oct. 13, 1999, now Pat. No. 6,553,085, and a continuation-in-part of application No. 09/127,383, filed on Jul. 31, 1998, now Pat. No. 6,377,640.

(60) Provisional application No. 60/170,455, filed on Dec. 13, 1999, provisional application No. 60/129,314, filed on Apr. 14, 1999, provisional application No. 60/109,340, filed on Nov. 20, 1998, provisional application No. 60/104,316, filed on Oct. 13, 1998, provisional application No. 60/089,526, filed on Jun. 15, 1998, provisional application No. 60/085,605, filed on May 15, 1998, provisional application No. 60/054,415, filed on Jul. 31, 1997, and provisional application No. 60/054,406, filed on Jul. 31, 1997.

(51) Int. Cl.[7] .............................. H04B 1/10; H03H 7/30
(52) U.S. Cl. ........................................ 375/350; 375/229
(58) Field of Search .................. 375/229–234, 375/285, 346, 350; 708/300.301, 322, 323, 319, 300, 301; 333/18, 28 R

(56) References Cited

U.S. PATENT DOCUMENTS 4,412,341 A    10/1983    Gersho et al.
4,630,217 A    12/1986    Smith et al.
4,648,060 A     3/1987    Allen et al.
4,905,282 A     2/1990    McGlynn et al.
5,111,208 A     5/1992    Lopez
5,162,723 A    11/1992    Marzalek et al.
5,181,228 A     1/1993    Takatori
5,293,402 A *   3/1994    Crespo et al. .............. 375/233
5,541,955 A     7/1996    Jacobsmeyer
5,550,810 A     8/1996    Monogiousdis et al.
5,625,651 A     4/1997    Cioffi
5,675,612 A    10/1997    Solve et al.
5,680,451 A    10/1997    Betts et al.
5,754,352 A     5/1998    Behrens et al.
5,787,363 A     7/1998    Scott et al.
5,812,594 A     9/1998    Rakib
5,841,667 A    11/1998    Martin
5,864,545 A     1/1999    Gonikberg et al.
5,930,267 A     7/1999    Daneshrad et al.
6,144,697 A *  11/2000    Gelfand et al. ............. 375/233
6,236,645 B1    5/2001    Agazzi
6,377,640 B2    4/2002    Trans
6,538,986 B2    3/2003    Isaksson et al.
6,553,085 B1    4/2003    Trans

OTHER PUBLICATIONS

Per Lindgren; A Multi–Channel Network Architecture Based on Fast circuit Switching; May 1996; Kungel Teknisha Hogskolan Royal Institute of Technology; pp. I–180.

* cited by examiner

Primary Examiner—Tesfaldet Bocure
(74) Attorney, Agent, or Firm—Fenwick & West LLP

(57) ABSTRACT

A system and method for delivering increases speed, security, and intelligence to wireline and wireless systems. The present invention increases channel capacity by using a parallel or multi-channel structure in such wireless and wireline at the edge or the core of. This new architecture of the present invention uses parallel bitstreams in a flexible way and distributed switching/routing technique, is not only to avoid the potential bottlenet of centralized switches, but also to increase speed with intelligence that is seamlessly integrating into the Fiber Optic Backbone such as WDM and SONET of the MAN/WAN network with a Real-time guarantees, different types of traffic (such as Stringent synchronous, isochronous, and asynchronous data messages) with different demands, and privacy & security of multi access and integrated services environment.

12 Claims, 97 Drawing Sheets

Proposed Detailed 100Mb/s 1553+ Transceiver Structure using DPIC

Universal Intelligence Network (UniNet™)

Private UniNet™ Networks

UniNet nodes interconnected in a mesh structure

Typical Near End and Far End Cross-talks Noise Environment

TDM Transmit and Receive Flow cycles

A UniNet Multicast Group

UniNet Network over Plain Old Telephone Systems (POTS)

Typical Parallel Channels for ECHO, NEXT and FEXT Cancellations

UniNet Hierarchical Synchronization

Gigabit Ethernet over 4 pairs of UTP cables

Worst-case Insertion Loss of 100m, cat-5 Cable

Overall Return Loss of Different Cable Channel

Worst Case Return Loss Relative to Main Signal

NEXT loss between pairs of cat-5 cables

FEXT Loss Characteristics

System Modeling

Received (desired) pulse response

Echo Pulse Response

NEXT Pulse Responses

NEXT Pulse Responses

Receiver Structure Using Interference Cancellers Prior to Equalizers

Receiver Using Interference Cancellers After FFE

Receiver using cascaded FSLE/DFE for
both interference suppression and equalization SNR versus Sampling Phase of different FFE/DFE configurations SNR versus Sampling Phase for various FSLE/DFE configurations SNR vs Sampling Phase Currently Proposed Structure Margin Offered by Different Schemes Improved-Performance Receiver Structure Receiver Structure using DPIC without NEXT cancellers Margin Offered by Various Schemes Existing SHDSL Transceiver Structure Proposed Transceiver Structure using DPIC SNR Measurement Points (A,B) (Proposed Transceiver Structure using DPIC)

HDSL2 Front-End (Converter & Sampler & Equalizers)

SAE Developed De Long Network

SAE Developed De Long Network Impulse Response

Next Generation 1553 System Modeling

Current 1553 Architecture and Data Coding Scheme

Data Coding Scheme of Current 1553 Data Transmissions

Example of Current 1553 Bus Cabling Architecture (Redundant)

Before and After Fractional Space Equalizer for Precursor ISI

Intersymbol Interference (ISI) at High
Transmission Rate Over MIL-C17 Cable

Decision Feedback Equalization to Remove Postcursor ISI

Proposed High Level 1553+ Transceiver Structure High Level

Proposed Medium Level 100Mb/s1553+ Transceiver Structure High Level

Proposed Detailed 100Mb/s 1553+ Transceiver Structure using DPIC

Channelization/Timer Division Multiplex Access (TDMA/TDD)

Com2000™ PAM-5 Partial Response Signaling Overview

UniNet Internet Communication Processor

Com2000™ Clock Transfer Subsystem Block Diagram

Discipline Signal Generator

Oscillator Reference Clock Generator

Precision Reference Clock Generator

Measurement Source Selector

Corrected Output Generator

Com REF Clock Generator

Com 2000™ Clock Transfer Control Logic

Com2000™ LMS Adaptive Equalizer

Com 2000™ State Transition Diagram

High Level UnitNet System Block Diagram

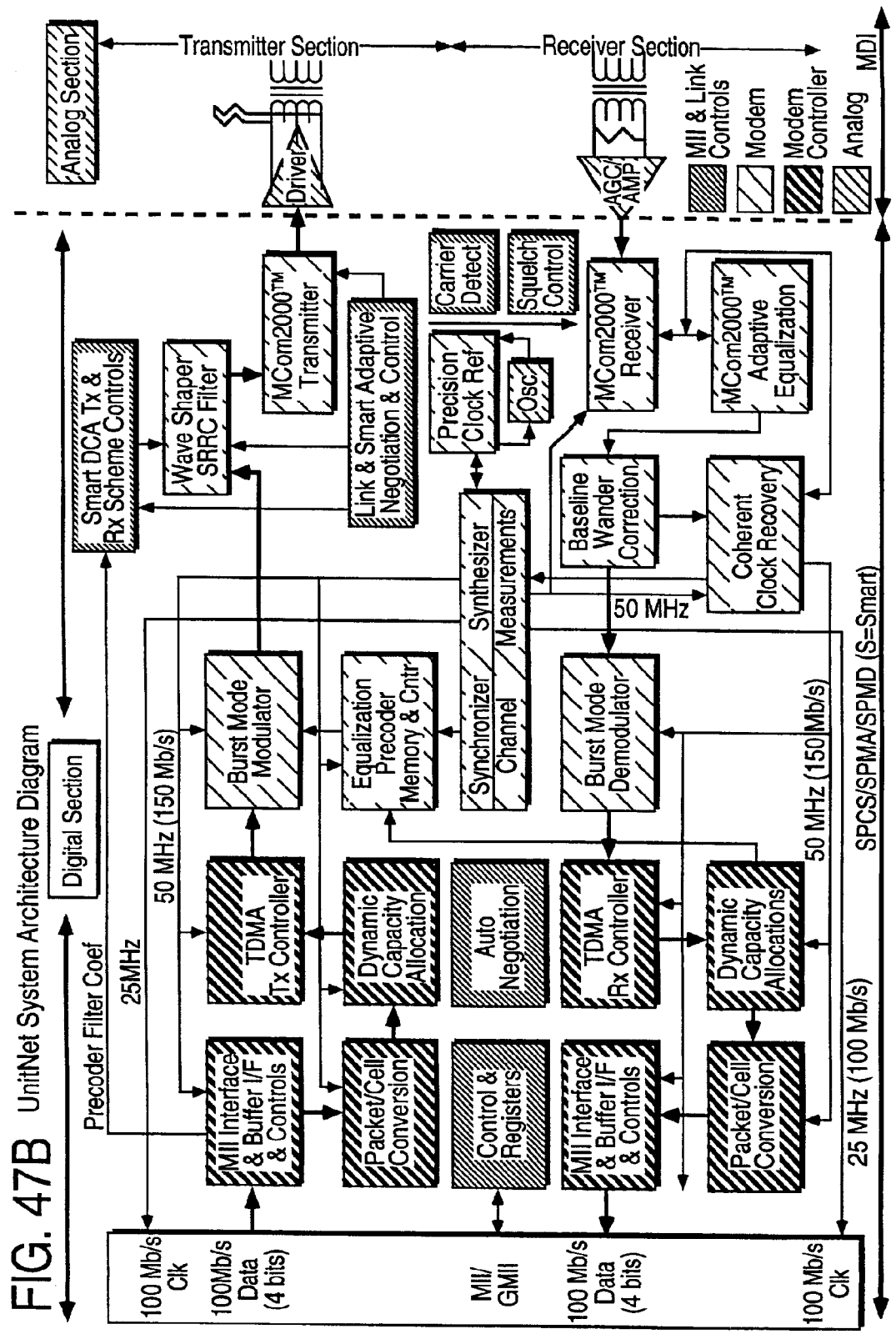
FIG. 47B UnitNet System Architecture Diagram

Generic Tuning Algorithm

The ISI Definitions

Conventional Forward and Decision Feedback Equalisers (FFE/DFE)

Phase Dependent Convergence of a FFE/DFE Filter

Performance of 51.84 Mb/s 16-CAP transceiver over 100 m category 3 cable with one cyclostationary NEXT interferes TIA/EIA NEXTR model     $a = 1.2$     $1/T = 12.96$ Mbauch     $P_2 = 10^{-10*}$

| $\phi_1$ (i T/δ) | $SNR_j$ (dB) | $SNR_1$ (dB) | $SNR_n$ (dB) | Margin (dB) |
|---|---|---|---|---|
| $\phi_0$ | 12.5 | 13.0 | 54.9 | 31.65 |
| $\phi_1$ | 12.5 | 14.8 | 58.1 | 43.85 |
| $\phi_2$ | 12.5 | 18.3 | 61.3 | 38.05 |
| $\phi_3$ | 12.5 | 18.4 | 61.9 | 38.65 |
| $\phi_4$ | 12.5 | 14.8 | 60.5 | 37.35 |
| $\phi_5$ | 12.5 | 13.0 | 57.1 | 33.85 |

*Margins are with respect to $P_2 = 10^{-10}$ for which $SNR_{0,mf} = 23.23$ dB

FIG. 51B

Phase Dependent Convergence of FFE/DFE Filter - SNR

The Eye Open Diagram of Biphase Manchester, MLT3 and PAM5

The Signal Spectrum and Eye Open Diagram of SPAM5

The ECHO and NEXT Canceller Filter Performance

Precision Phase Angle Controls

Time, Phase, Frequency Division Multiple Access Signal Coding Scheme

The Gigabit Com2000™ PHY Functional System Block Diagram

Coherent Carrier Recover PLL Loop for UniNet Receiver

General Frame Structures

Downstream and Upstream Sections

Simplified Burst and Cell Structures

Time Relationship between various Frame Markers

Tx Frame Gating Signal

Rx Formatter

IP Packet Network Processing Functions

Distributed Packet Switching Architecture

UniNet Application over Existing Ethernet IP Networks

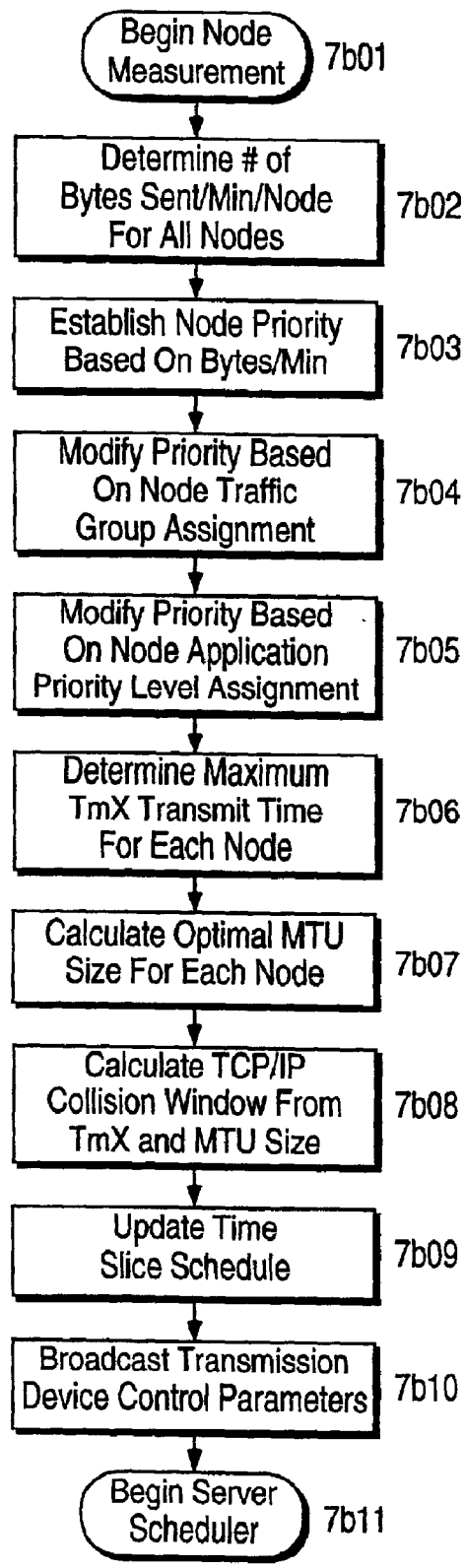
FIG. 67A/B

DIPA/TDDA Algorithm

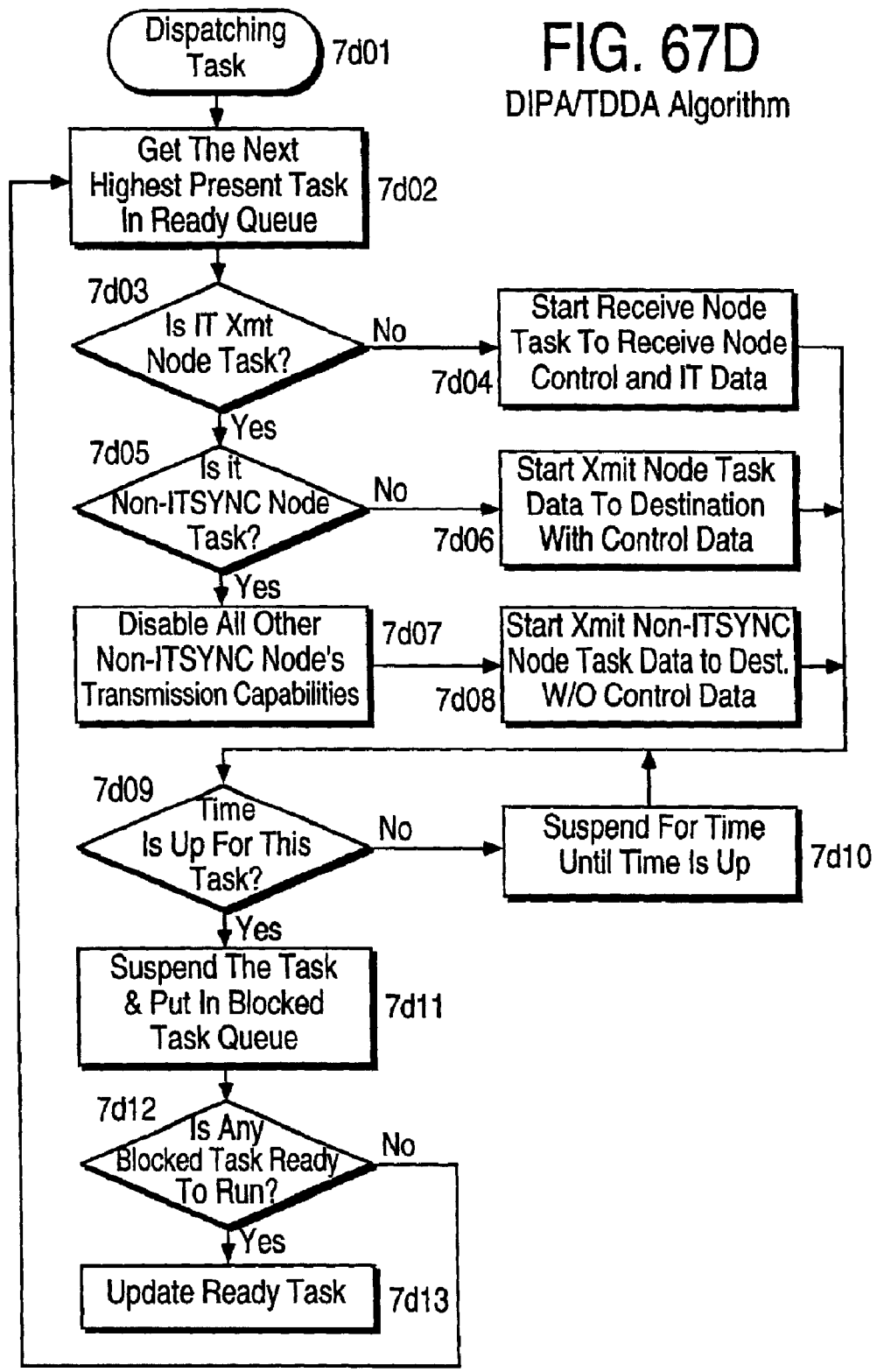

TDDA Algorithm

TDPA Algorithm

CSOA Algorithm

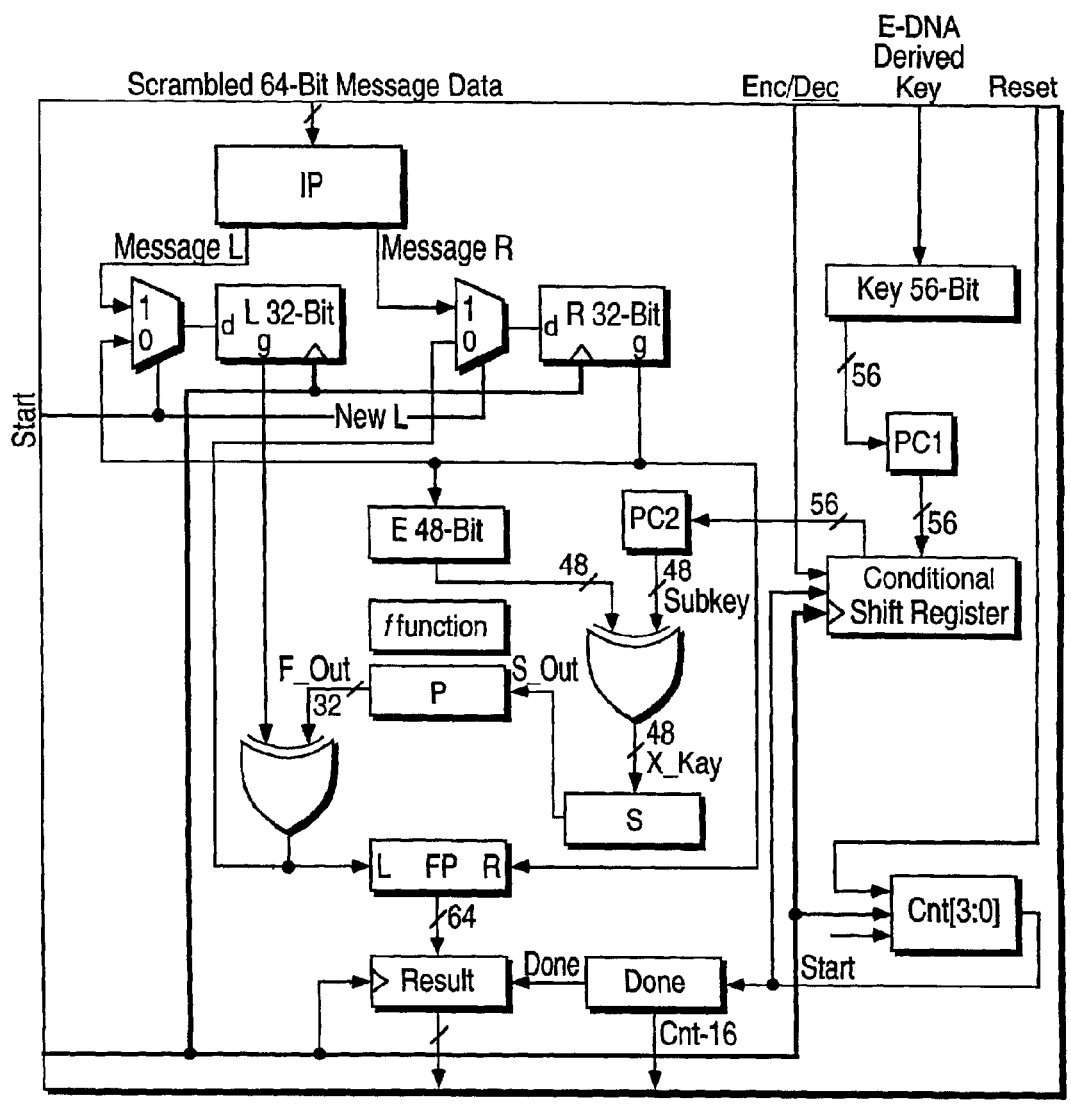
FIG. 67H/I
E-DNA Derived Key with 56 bits DES and Scrambled 64 Data bits

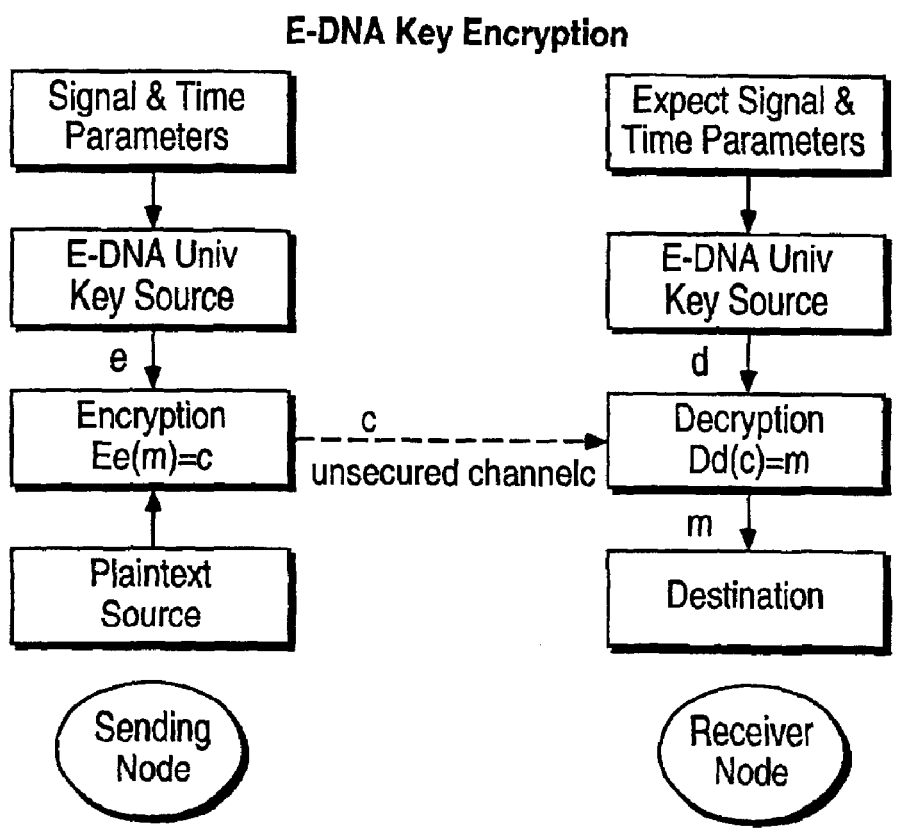
FIG. 67J/K
Expected Receiving Parameters Dependent DES Key Generation Outline of the compression function of RIPEMD-160.
Inputs are a 16 word message block Xi and a 5-word chaining variable h0h1h2h3h4, output is a new value of the chaining variable UniNet Communication Processor
System Block Diagram Baseband Converter and Sampler
(Receiver Only View for Wireless)

Baseband Processor

PoR Prototype System for Applications using POTS as Communications Media

Block Diagram of the Prototype

Ethernet Interface and Buffer Management

DCA Block & Interface Diagram

DCA Assignment Processes

Packetizer Block Diagram

Multi-Frame Format

Frame Format

Burst Format

TDMA Controller Interface

TDMA Controller Interface

Rx Framer Block Diagram

Flow Chart of The Receive Frame Synchronizer

TX Framer Block Diagram

TX Framer Controller

Burst-Mode Modern Block Diagram

Block Diagram of Burst-Mode MOD

Block Diagram of Equalizer

Block Diagram of Burst-Mode DEMOD

Synchronizer Block & Interface Diagram

Analog Front-End Block Diagram

CHANNEL EQUALIZATION SYSTEM AND METHOD

RELATED APPLICATIONS

This application is a divisional of U.S. patent application Ser. No. 09/550,395, filed on Apr. 14, 2000, now abandoned, which is a continuation-in-part of U.S. provisional application Ser. No. 60/170,455, filed on Dec. 13, 1999.

This application is also a continuation-in-part of U.S. patent application Ser. No. 09/444,007, filed on Nov. 19, 1999, now abandoned; which is a continuation-in-part of U.S. patent application Ser. No. 09/417,528, filed on Oct. 13, 1999, now issued as U.S. Pat. No. 6,553,085 on Apr. 22, 2003; which is a continuation-in-part of U.S. provisional application Ser. No. 60/104,316, filed on Oct. 13, 1998, and which is a continuation-in-part of U.S. provisional application No. 60/109,340, filed on Nov. 20, 1998.

This application is also a continuation-in-part of U.S. patent provisional No. 60/129,314, filed on Apr. 14, 1999. This application is also a continuation-in-part of PCT application number PCT/US00/06842, filed Mar. 15, 2000.

This application is also a continuation-in-part of U.S. patent application Ser. No. 09/127,383, filed on Jul. 31, 1998, now U.S. Pat. No. 6,377,640, which is a continuation-in-part of U.S. provisional application No. 60/089,526, filed on Jun. 15, 1998; and which is also a continuation-in-part of U.S. provisional application No. 60/085,605, filed on May 15, 1998; and which is also a continuation-in-part of U.S. provisional application No. 60/054,415, filed on Jul. 31, 1997; and which is also a continuation-in-part of U.S. provisional application No. 60/054,406, filed on Jul. 31, 1997.

This application is related to all of the above applications and herein incorporates by reference all of these applications in their entirety.

BACKGROUND OF THE INVENTION

Throughout history, people to people communication delivery system is a most challenging subject and countless new technologies were invented and strive to resolve. The people to people communication, perceptions and all five of the senses need to be extended into the global distance. Video, Voice, Data delivery systems are the current mechanism of extending the human perceptions or Tele-senses. Each of the communication means have made many independently advances in the past decade. Still, the voids are still there and hence there is a need to invent new technology for striving and enabling the human Tele-senses in a global scale. New application types drive new demands on the communication infrastructure as to integrate all of the existing technologies to a seamless manner for delivering the human Tele-senses.

The industries that in any of particular technology sector such as Television, Radio systems, Voice Phone systems, Data Enterprise Networking, Wireless, . . . etc are all currently and independently handle the problems. Each of the technology sector have devised a new way of delivering the information and communication in the global scale. In the Data Networking sector, new Local and Wide Area Networking such as IEEE 802.3x, IEEE-802.5 and ATM standards are formulated to deliver a means of interoperable data communication delivery system. In the television technology sector, the TV data and signals are currently deployed by Wireless Satellite receivers and transmitters such as DSS and DirectTV data delivery system. In the Voice technology sector, the integrated analog data modem and voice technology are currently deployed by Phone Carrier such as AT&T to carry either data or voice.

With all of the above technologies, the interoperable and integration of these technologies is difficulty since there is no "Unified" or common architecture that the mentioned communication means can seamlessly be integrated with. The communications industry has continuously pushed the bandwidth and capacity envelope, to the edge of the network, by developing and beginning the deployment of a number of higher bandwidth technologies.

These include 10/100/1000 Mb/s Ethernet within the enterprise, T1/E1, HDSL2, ADSL Modem applications for small business and homes, and high speed satellite modems for personal and business data communication use. These technologies promise to provide end users with the higher level of bandwidth required for today's applications.

The capacity of the backbone and edge network links has been the main bottleneck in a data and telecommunication system. As an example, the evolution of high speed data transfer at the telecommunication edge changes this situation; with the large amount of data capacity offered by ATM/SONET backbone networks, the bottleneck is moving towards the processing and buffering in switch-points and end-points. The same also applies to the wireless as well as for data communication with 10/100/1000 Mb/s Ethernet edge communication devices. Each of these communication methods have their own unique services, protocols and centralized processing architecture.

The impact of these technical changes imposed on end-to-end network architecture with the new integrated services demand new network requirements of different network architectures, such as unified telecommunication wireline & wireless and data communication high speed networking to support these different service requirements.

The current circuit-switched networks for existing wireline Telecommunication backbone and edge have many attractive properties in terms of providing real-time services from end-equipment to end-equipment. Traditionally, circuit-switched networks which are only available for the telecommunication infrastructure, have been too inflexible to provide a data service that is suitable for a wireline data communication and wireless data communication integrated services network. A "Unified" new generation of information delivery system, UniNet, illustrated in FIG. 01, that has the infrastructure support for integrated services in wireline and wireless telecommunication and data communication architecture that is needed.

The Com2000 Technologies described below supports a new data communication architecture. The new architecture is the Unified Communication System—Fast Circuit Switch (packet/circuit) communication processors which enables a new Internet Exchange Networking Processor Architecture. The Com2000™ Technologies set out to increase speeds over any communication channels, synchronizing, enabling, improving, controlling and securing all of the data transmission of web applications over existing wireline and wireless infrastructure while providing seamless integration to the legacy telecom & data corn backbone, is illustrated in FIG. 02.

SUMMARY OF THE INVENTION

The Com2000™ Technologies increase speeds over any communication channel, synchronizing, enabling, improving, controlling and securing all of the data transmission of Web OS enabled applications over existing wireline and wireless infrastructure while providing seamless integration to the legacy telecom & data corn backbone. The Com2000™ Technology addresses all of the challenges for the new unified architecture of packet/circuit processors of internet networking processor, which includes the increased speed and delivery of a highly integrated services and solutions of the convergence nature of Security and Intelligence limitations over existing wireline and wireless data communication and telecommunication infrastructures. The breakthrough Com2000™ Speed, Security and Intelligent solutions enabling increase speed and robust transport schemes, over existing copper wire line and wireless infrastructures, illustrated in FIG. 03.

Com2000™ technologies represents a collection of state-of-the-art schemes in multi-channel signal modulation/coding, advance adaptive equalization, precision synchronization, reconfigurable DSP structures to increase speed and to deliver real-time, robust and deterministic multiple-access, and intelligence transport protocols which can be used for mapping of legacy protocols. It reflects the concept of reconfigurable and remote computing internet networking processor applied to future communications so-called software radio/wireless/wireline or web transceiver/internet processor.

Speed

Com2000™ Speed technology addresses the current wireless and wireline capacity limitation and challenges with a highly integrated solution that will enhance any data and telecommunications where noise is a problem. This technology, as an example, can be applied and deployed in numerous major market segments such as Standard Compliance High Speed Networking 1000BaseT Copper Gigabit (802.3ab) Single & Quad, or Broadband Access (HDSL2 focus) and other high-speed wireless and wireline networking. This technology can be applied and deployed in numerous new major market segments such as Next Generation High Speed Networking 2000BaseT (2 G/s) Copper Gigabit (802.3ab+) Single & Quad, 10 Gigabit Networking over Copper, Next Generation Fiber Channel SAN over copper, Next Generation Broadband Access (HDSL3 w/3 Mb/s), Next Generation 100 Mb/s Home Networking over POTs and other next generation high-speed wireless and wireline networking applications.

The Com2000™ Speed technology represents the collection of state-of-the-art FIR filtering schemes in multi-channel signal coding (advance adaptive equalization) that enhance the channel Inter-symbol Interference (ISI) and Cross Talk noise suppression for wireline and Multipath Noise and Fading Suppression for wireless applications, as illustrated in FIG. 04.

To demonstrate the Com2000™ Speed technology, techniques and analysis in this application, the initial wireline applications for the technology are Copper Gigabit Ethernet and HDSL2.

Through detailed analysis, the present invention has shown dramatic improvements in signal to noise ratio (SNR) in both Copper Gigabit and HDSL2. Analysis shows an improvement of the SNR by 8 dB over Copper Gigabit with respect to the 802.3ab IEEE Standard suggested 10 dB receiver designs. It further shows a >5 dB SNR improvement over the current HDSL2 suggested front-end designs of T1/E1 on the downstream and >3 dB upstream for crosstalk models represent the 1% worst-case coupling scenario for all the packings of N disturbers into a 50-pair binder group.

With this higher SNR margins, the present invention can be used to increase the higher performance and data rate capacity of the channel or to reduce the cost of the channel. For example, increasing the SNR results in simpler Forward Error Correction (FEC) and filtering schemes that reduce the design complexity which leads to power savings and die size reduction. This can be used in higher performance applications such as higher speeds or longer distance. In the higher data rate applications, the enhanced SNR coupled with the multi-channel signal coding can be used to deliver the increased bandwidth. As an example in longer distance or higher speeds for 1000BaseT application, with Com2000™ Speed technology, the new transceiver can deliver 1000 Mb/s over 200 meters vs. 100 meter 802.3ab standard for longer distance applications or 2000 Mb/s vs. 1000 Mb/s standard for higher speed applications respectively. As an example for HDSL2 application, the new transceiver can deliver 1.5 Mb/s over 18 Kft vs. 12 Kft HDSL2 T1/E1 standard for longer distance applications or 3 Mb/s vs. 1.5 Mb/s standard for higher speed applications.

Intellegence (Physical Layer)

Com2000™ Intelligence—Modem technology, in general, utilizes a combination of the frequency division, phase division and time division duplex techniques in signal coding and latency controls to provide new and integrated solutions for next generation universal synchronous networking communications. It supports legacy modulations and also as an integrated platform for 2-dimensional CDMA (Phase), TDMA (Time) and FDM (Frequency) multi-access scheme's. Each of these legacy schemes in each of the transmitting domain will be further exploited for higher data rate transfers with the help of 3-dimensional multi-access scheme and controls. However, in contrast to conventional systems, when all of the domain are exercised for the most optimal data transfer mechanism, along with all 3-dimensional multi-access scheme's precision controls, data transfers will be further increased as the results of orthogonal signal parameters are characterized, as illustrated in FIG. 05.

A new Com2000™ data delivery architecture for wireline and wireless is the shared or non-shared medium access with multi-channel networks with the support of synchronous and controlled environment. To support the precision controls in bits, symbol, subsymbol, frame, sampling, carrier and phase timing of synchronous transceivers, the Com2000™ Intelligent (Modem)—Precision Clock Transfer technology is used to enable the synchronous data communication networks. The precision clock transfer and control technology relates to stringent applications such as ITU global and local synchronization level service of SONET and telecom synchronization, as illustrated in FIG. 02.

In any type of communication channel, there is distortion that can cause errors in data signaling thereby reducing effective throughput. When data is transmitted over a communication channel at a particular signal parameter and characteristics, the signal's characteristics often changes as the signal propagates along the channel. The imperfections in the communication channel tend to reduce the resolution of the data bandwidth of the signal being transmitted across the channel. Furthermore, the data may not be interpreted correctly at the receiving end of the channel if the transmitted signal's characteristics are outside of a defined signal's parameter range. Com2000™ Intelligence (Modem)—Channel Measurement and Calibration Control Technology measures and calibrates the communication channel to determine the highest possible data capacity for a particular medium, as illustrated in FIG. 05.

Advanced Channel Measurement & Control techniques also enable any topology media channel calibration for optimal signal controls and intelligence flow. Today's cable and wireless communication infrastructures are less than ideal. The communications channel must be first characterized so that errors and imperfections, such as frequency, phase, time and other distortions, can be identified. Com2000™'s calibration system then uses these measurements to improve communication channel resolution by controlling the errors and imperfections of the channel. The Residual measurements of the Com2000™ Intelligence (Modem)—Channel Measurement and Calibration Control (343) system are very powerful tools for troubleshooting and calibrating communications across any wireline and wireless channels. Once the reference signal has been subtracted, it is easier to see small errors that may have been swamped or obscured by the signal distortion and modulation itself.

In the Com2000™ digital communication system, non-uniform noise distribution or discrete signal peaks indicate the presence of externally coupled interference. A goal of the Com2000™ Measurement and Calibration system is to ensure that the sending and receiving of selected parameters are measured and calibrated. Seven parameters measured by the Com2000™ Measurement system include power, frequency, phase, timing and other code modulation accuracy related parameters. The frequency and phase counter capabilities provide another method of measurement for the Com2000™ Measurement (343) system for determining the channel transmission medium frequency and phase distortions. Com2000™ Measurement Technology is used to measure many parameters that contribute to the propagation delays of communication channel infrastructure. The Com2000™ Measurement circuitry is also used to measure phase interval, frequency, period, pulse width, phase, rise and fall time and also does event counting The Com2000™ Technologies set out to adapt over any communication channels and topologies. The Com2000™ Intelligent (Modem)—Advanced Medium Adaptation & Equalization Technology seamlessly filter adaptation techniques over any channel's topologies in any wireless & wireline infrastructure such as bus, point-to-point, point-to-multipoint, mesh, etc., so that higher speed and more reliable data transmission may be achieved, as illustrated in FIG. 05.

As an example with higher data rate applications in the new optimal phase domain alone, the Com2000™ Intelligent (Modem)—Multi-Channel Signal Coding technology allow to deliver higher data rates in a unique way from a single continuous or burst streams carrier frequency. The technology delivers multi-channel (phase division) network architecture that uses parallel bitstream in a novel way. It uses the non-complex or complex base band symmetry signal with phase division multiplex coding scheme or PDM to deliver the multi-channel requirements which also meets the selected media FCC constraints, as illustrated in FIG. 05.

As an example of the equivalent multi-channel optical networks based on wavelength division multiplexing (WDM), the phase domain's multi-channel wireline and wireless network utilize the optimal phase division multiplexing (PDM) for multi-channel wireline and wireless network. The Com2000™ Intelligent (Modem)—Precision Sampling technology enables to the precision sample the signal's parameters any or combination of the Time (Multi-Timne Slot sampling), Phase (Multi-Channel Phase sampling) and Frequency (Multi-Carrier sampling) signal spaces, as illustrated in FIG. 05.

As in most of M-PAM or M-QAM (M symbol Pulse Amplitude Modulation or M symbol Quadrature Amplitude Modulation) base-band modulation scheme, the signal coding and decoding is orchestrated in a "Relative" Phase Synchronization manner. The receivers recover the clock and phase from the received signal and use it for the sample timing to recover the data. Our enhanced technique is not only to deliver the "Relative" Synchronization scheme, but it also delivers the "Absolute" Synchronization technique to enable multitude of novel ways to increase bandwidth and intelligence controls. With the absolute and relative synchronization capabilities, the ordinary and single carrier frequency channel can be interpreted in a vector of channels, which can be characterized through precision phase channel measurement and calibration. Every other channel in a multi-channel media will be a non-interference channel with respect to the other channel and the selected M-PAM or M-QAM signal coding can be used to transmit over channels as in the current scheme.

Intellegence (Mac & Higher Layers)

Today a network carrier can be analogized with an airline business. You buy jumbo jets and attempt to ensure that all the seats in that jet are full. The goal is to make sure the network is full all the time. All traffic today is delivered via cargo class, but emerging needs such as voice and video traffic will require higher priority and must be upgraded to first class. With this capability, the present invention also allows to monitor which traffic moves in which class, and charge higher rates for better service. The carriers want to find ways to extract more revenue, and we are going to provide that capability of offering different tiers of network service. The carrier would also be able to have more intelligence about what their customers are doing with the network, so they could have separate billing for voice traffic or for Internet traffic, as illustrated in FIG. 01.

Com2000™ Intelligence (Transport)—QoS Transfers technology, as illustrated in FIG. 05, utilizes a synchronous and controlled enviromnent via a precision clock transfer and controls resident at the edge and the core of the network, to deliver universal and next generation synchronous, isochronous and asynchronous integrated data services or a novel Synchronous and Distributed Switching and Routing method. This precision controlled synchronous clock transfer technology not only enables the physical layer to communicate in increased speeds with a high capacity multi-channel and shared medium access, but also provides a basis for true quality of service, or Hard QoS. This can fundamentally be interpreted as a universal transport mechanism for integrated services that seamlessly map into and out of any new or current and legacy data corn and telecom protocols. These protocols include ATM, SONET, Frame Relay, and T1/E1, etc,. from the telecom services and IP networking protocols such as TCP/UDP from data communications. In short, this universal transport mapping or Fast Protocol Synchronous Circuit Switching, which is anything over anything transport mechanism such as IP over ATM, IP over SONET, ATM over IP, ATM over SONET, PPP over SONET, . . . etc. is applicable to all protocols from a very stringent synchronous services such as SONET, loosely isochronous services such as ATM and Frame Relay, etc, to a very loosely and best effort asynchronous data services such as Internet IP protocols. Due to precision network synchronization and fixed cell based processing at the physical layer of the transceivers, the data processing intelligence (distributed QoS/switching/routing) and networking system intelligence (Advanced Bandwidth Improvement via TCP/UDP/IP Latency Suppression, Timed Policy Based System Management, Web Remote Computing, and many other applications) are enabled with a new dimension and capabilities.

The ultra high speed bandwidth and network element and data processing intelligence enable a new architecture such as the Fast Data Synchronous Circuit Switching architecture which the fabric intelligence performs most of its tasks at the edge such as: fragmentation/defragmentation of the received packet based into Cell based for QoS controls and other network element intelligence such as the Switching/Router Functional intelligence in a distributed intelligence manner. These networking intelligence tasks, such as addressing, switching or forwarding, routing, policing and shaping, sequencing and flow controls for each switching node, for example, can be migrated to the edge node systems or Com2000™ UniNet PHY in this case. The high speed network connection between the end node(s) and the core node(s) is (are) just the extension of the "QoS" switching fabric, as illustrated in FIG. 06.

The ultra optimized method of time division multiplexing (TDM) data of the UniNet PHY, the network system intelligence are enabled with a new architecture Fast Transport Synchronous Circuit Switching architecture which the network intelligence performs most of its tasks at the edge such as: (a) Multiprocessor TDM Networking Operating System & Scheduling which can be used in different remote OS applications such as fragmentation/defragmentation of the received TCP/IP packet based into TDM cell TCP/IP based for further bandwidth improvements; (b) Time Policy based Management; (c) Follow the SUN Management (Universal UTC-Time based Management); (d) Web Remote Computing; and many more other applications.

Advanced TCP/UDP/IP Latency Reduction and TDM Scheduling Software Techniques, as an example, which are derived from Fast Transport Synchronous Circuit Switching, to further improve the bandwidth or capacity at the upper layer, e.g., when the layers deal with the information that are transferring over the data line for a convergence data/video/voice related applications and host. Each application such as in Video (Video Conference—TCP/IP) or Data (Email—UDP/IP ) or Voice (Tele-Conference TCP/IP) has the dedicated network connection such as IP addresses for different host nodes or/and at different TCP ports addresses for the same host node that is hosting all of the related applications. DOCCIS 1.1 for cable modem of most home with digital cable MSC internet access will be installed with this single IP address scenario. For Telephone carrier xDSL for Telephone Digital Services allow more than one IP address for each of the access node, as illustrated in FIG. 01.

Security

The precision controlled environment at the physical layer and other layers offers a new method for the next generation security systems and services. Com2000™ Security—E-DNA Technology of packet/circuit processors for internet networking processor technology set out securing all of the data transmission of web applications over existing wireline and wireless infrastructure while providing seamless integration to the legacy telecom & data-com backbone. SSI Com2000™ Security is to deliver, in a novel way, the lowest encryption and decryption layer possible without significantly impacting the speed by generating unique electronic signal signatures that proliferate through the entire data communication network, as illustrated in FIG. 02.

Summary

In summary, the Com2000™ Technology addresses Speed, Security and Intelligence limitations of the new information communication challenges, not only at the physical level for universal shared and non-shared medium interface, such as POTs, CAT5, wireless etc.; but also at the universal transport layer with stringent telecom delays & jitter requirements for Circuit Switching time sensitive related applications at media access layer or above. Com2000™ Technology addresses and meets all of the above challenges for the new unified architecture of packet/circuit processors for internet networking processor requirement and solutions, as illustrated in FIG. 02.

This new unified network can be used, in ISO application layer, directly for application-to-application communication or may be used in physical, data and transport layers as a carrier network for other protocols, such as ATM, ISDN or IP. The universal law of the unified network apply and traverse across the ISO layers for which it supports the legacy and new protocols for each of the ISO layer with the most optimal delivery mechanism. Com2000™ Technology for next generation universal synchronous networking communications will not only coexist with all legacy communication system but also as a new information communication platform that can be used to enable new technology advancement for future data commnunication challenges.

The Analogy

The Com2000™ technologies can be further explained in terms and analogy of the Internet Data Super Highway Management with emphasis of copper wireline applications.

As the population growth increases within a local or regional metropolitan area, the freeway traffic and its associated traffic congestion also increases. Due to increasing demand for commuting car, trucks, semi (data type loads) in the metropolitan (Internet) area, the freeway (Internet data freeway) needs to be widened so that new lanes can be built and traffic regulations are needed in place for accommodating new traffic type and demands. The freeway overpasses are added and needed to be re-architectured for easy access, freeway changeover, freeway entry, exits and timely regulated freeway admission during the particular time of the day. The commute lanes are also created during certain time of the day for removing traffic congestion. Notice that we can see all of our traffic demands and loads are correlated to our working hours. The demands are different and different time zone for example of pacific and eastern time zone or world standard time (UTC) as far as the global scale traffic demand is concerned.

The Com2000™ Speed Technology addresses the capacity (widen the road) of the network over the existing infrastructure copper links which has been the main bottleneck in a broadband access and high speed networking data communication system at the edge and the core of the network. The demands for high-capacity communications keep increasing at an exponential rate in recent years and have opened doors for opportunities to offer broadband communications solutions for multimedia services.

The Infrastructure to support such demands is in question and represents a major cost segment. Let us take a look into the current Broadband Access market and goals. One question is if we can use the existing infrastructure such as copper POTs media so that there is minimum additional/new costs for broadband communications and access? This question is "translated" into a general technical question: what are the limits of these media on capacity? or how fast we can send data over them? and can we do it? The last question has pushed the transmission technologies and techniques combined with VLSI technologies to achieve the theoretical capacity limits. Wireless communications, on the other hand, offers its advantages over wireline counterpart in fast system configuration and re-configuration.

Moreover, it provides a cost-effective solution in terms of infrastructure. However, bandwidth limitation is always a challenge for development of wireless broadband communications. The revolutionary Com2000™ Speed Technology of the wireline copper changes this situation; with the large amount of data capacity offered by copper at the edge networks. However, with the current and legacy architecture, the bottleneck is still moving towards the processing and buffering in central switch-points of the enterprise and telecom networks. In combination of Com2000™ Intelligence and Speed Technology, the data bottleneck problem at the core and the edge of the network are addressed and resolved. For example, the Com2000™ Speed and Intelligence transceiver technology can deliver up to 2.4 Gb/s over existing 4 pairs CAT5 infrastructure for enterprise high speed networking backbone with the intelligence of distributed switch-points processing.

SSI's Com2000™ Speed technology offers a unique approach for suppressing ISI and cross talk noise to previously unprecedented low levels, to guarantee and even increase the bandwidth (Signal to Noise Ratio) available over the existing copper cable infrastructure. As mentioned previously, An aspect of Com2000™ Speed technology is a collection of state of the art filtering schemes which filter noise intelligently in both the pre-ISI and post-ISI processing, interference and signal distortion and hence substantially boosting the signal-to-noise ratio. SSI Com2000™ Speed or Noise Suppression via Advanced Equalization Techniques are invented to increase capacity of any channel such as to deliver a ~3× Signal to Noise Ratio Increase over existing copper infrastructure so that higher speed and more reliable data transmission can be achieved.

Com2000™ Intelligent Technology addresses and resolves the bottleneck problems at the edge and core of the network (overpasses and traffic regulations). The new generation fast circuit-switched network architecture is addressed to enhance the current legacy circuit-switched techniques to a high capacity multimedia network with an integrated services enviromnent. This new architecture is interoperable with a robust protocol suite in which is only available at the telecommunication fiber backbone such as SONET, and WDM transports.

The legacy and current Circuit-switched for the existing telecommunication architecture and packet-switched networks of data communications have very different characteristics. They can both support an integrated service environment, but have different merits in terms of providing various service aspects. A new fast or next generation integrated network architecture that is an effort to enhance existing circuit-switched techniques of telecommunication and with seamless integration to existing packet switching system of the wireless and wireline data communication domain are required for the next generation data transfer and delivery infrastructure. This new Intelligent architecture should seamlessly extend a high capacity to the edge of the network with an integrated service environment and seamlessly integrate with the existing wireline and wireless backbone networking without having to resolve the heavy bottleneck processing and buffering in switching points and end-points.

The Com2000™ Intelligent technologies for modem offer automatic selection of operating spectrum and bandwidth for a given medium transmission rate and modulation adaptively to given environment to select the optimum capacity versatility and universal in topology: bus (mesh), star (point-to-multi-point), linear (point-to-point), robustness and deterministic in transmission, worldwide or global synchronization and capacity allocation to support Synchronous data delivery such as SONET (SDH), Isochronous data delivery such as real-time data delivery, Asynchronous data delivery such as IP and other different QoS requirements for multimedia services. This is done based on the unified multi-access controllers of the frequency/phase/time multiple access schemes with fixed bursting switching frame size. Time, Phase and Frequency Division multi-access scheme for reconfigurable system are supported with flexible frame structure and slot definition and global signal synchronization for supporting current and future wireless and wireline information conmmunication.

In the Com2000™ Intelligent Technology wireline applications, we examine the capability of multi-channel and multi-data stream networks that run over the same copper pair. Our Com2000™ Intelligent Technology delivers a revolutionary way of delivering a combination of multiple distinct Burst data Switching channels via the Time Division Multiplexing scheme and multi-data stream via the multi-channel Phase Controlled Signal Coding scheme simultaneously over the copper media. This is possible via the Com2000™ Intelligent Signal Coding and Precision Sampling Technology. We believe that the parallel channel and parallel data stream structure in such networks are a more flexible solution in terms of bandwidth on demand services, than increasing the bitrate of a single bitstream. This revolutionary Com2000™ Intelligent Technology proposes and evaluates a network architecture that uses parallel channels and bit streams in a flexible way, and uses distributed switching to avoid the potential bottleneck of centralized switches.

In the Com2000™ Intelligence for wireline modem applications, we unify the networks based on Time, Phase division multiplexing (TDM, PDM) using multi-channel signal coding with distinct phases and time in multi-channel with each have parallel bits stream. All of them are transmitted over a single carrier communication scheme. The capacity of the channel will increase when multi-carrier communication scheme is deployed. These multi-channel (TDM) and multi-data stream (FDM, PDM) networks provide a circuit-switched type service with a programmable coarse or fine-grain channel granularity. Often the highest channel granularity is a single bitstream, e.g., a signal with appropriate phase delay. Before starting to send data, a synchronization between sender and receiver is needed so that they are attached and connected to the same bitstream.

SSI Com2000™ Intelligence delivers the capability of creating and removing new and dedicated data signal lanes in which can simultaneously transmit from any node to any node in point-to-point, point-to-multipoint, multidrop bus topologies. With this capability over existing copper infrastructure, higher speed lanes (commuted lanes) can be intelligently created and managed during the traffic jam time period of the day. This will also allow the Unified Packet/Circuit Switch data type and transmission for convergence of data communication and telecommunication can be seamlessly integrated. Com2000™ Intelligence delivers the capability of differentiating services between different traffic class or type (such as car/truck/semi) for each of the new data lane traffic.

SSI Com2000™ Intelligence delivers the capability of differentiating between one's network receiving and sending nodes with respect to the other's receiving and sending nodes on shared switched medium data lane traffic (Overpasses with Distributed Switching Nodes). The technology delivers a capability of simultaneously transmitting and receiving on the shared medium of any circuit node to any circuit node, in point-to-point, point-to-multipoint, multidrop bus topologies of local and other networking switching node of existing copper infrastructure. The Com2000™ Intelligence delivers an intelligent routing and switching, selection of the data freeway overpasses, exiting and admitting back into the freeway for real time delivery of the assembled and reassembled data for all of the data types, channels, circuits. The overpass is also intelligently created and managed during the traffic jam time period of the day between local region and world wide Internet Freeway UTC traffics.

SSI Com2000™ Intelligence delivers Synchronous, Isochronous and Asynchronous data messages and services. It is used to seamlessly integrate to the existing SONET telecommunication systems, enhance the capacity of the channels, and synchronize all of the data types channels and circuits.

Com2000™ Security set out securing all of the data transmission of web applications over existing wireline and wireless infrastructure while providing seamless integration to the legacy telecom & data-com backbone. Com2000™ Security is a collection of the state of the art algorithms that applies across the ISO layers for delivery of the encryption and decryption data message over a defined channel.

At the upper layers such as Application, Transport and Network ISO layers of the TCP/UDP/IP data messages, the data is encrypted and transported with a higher level E-DNA (Electronic—Deterrence Network Address Access) protocols. The average absolute and relative predictable time and the measured time for a message to travel over a predefined and calibrated channel is generally known to within a precise time window. UTC absolute and relative Time Division Password Algorithm, Connection Awareness Algorithms of the present invention deliver the encryption and decryption to a standard delivery channel with an unsecured key source of the channel communications without the possibility of impacting the speed at the application level and at the highest data security level. In general, the message is encrypted and decrypted with a scrambled & unscrambled key of certain symbol at certain time. The secured transport protocols and connection will be monitored and queried at certain period of time for Deterring Network Address (IP or TCP port) Access (DNA).

The Electronic elements of the Com2000™ Security (E-DNA) system are designed from the start to enable data and network security at the physical signal layer. The technique greatly reduces the overhead associated with today's encryption and decryption schemes and is implemented to generate unique electronic signal signatures that proliferate through the entire data communication network.

At the physical layer security, the absolute and precision control of a universal time event via the Com2000™ Clock Transfer technology is marching along between the communicating nodes. This precision and bias forward in time marking is used as the basis for a security seed. This seed will be used to generate a true and unbreakable random number generator during one's lifetime. There will be three markings for the 3 dimensional cubical seeds such as Time, Phase and Frequency matrix cell. This is the Carrier Signal Offset Algorithm.

The signal's signature is composed of both the waveform signal itself and the content of the waveforms. The security system transmits the signature of the waveform by pre-positioning the signal at a specific frequency and phase matrix cell. The signal signature of the waveform's content is provided via the pseudo-random noise (PN) signature for each node of the network. The PN auto correlation will be exercised for multi user ID access. This PN signature provides network security by prohibiting any unauthorized intrusion by validating the signature, or E-DNA, of the sending node.

In the combination of The Com2000™ Security (E-DNA) technology at the physical layer such as the Carrier Signal Offset Algorithm for the signaling security systems, and in conjunction with standard MAC layer encryption and decryption algorithms, such as the UTC absolute and relative Time Division Password Algorithm, Connection Awareness Algorithm, The Com2000™ Security technology make transmissions over the Com2000™ system virtually impregnable from unwanted snooping and unauthorized access.

In Summary, Com2000™ Technology, as illustrated in FIG. 01, aims to develop the next generation Fast (Data & Transport) Circuit Switch for Information Communication System or Internet Networking Processor. It resides either at the edge and/or the core of the unified convergence network with a focus of integrated services such as multi-media data transmission over existing wireline and wireless infrastructure. This new architecture will seamlessly integrate to the legacy telecom & datacom backbone. This is done via an innovative and breakthrough software and hardware solutions and intellectual property based on SSI's Com2000™ technology, as disclosed herein. The technology addresses the universal nature of Speed, Security and Intelligence limitations over existing data communication and telecommunication infrastructures. As described above, Com2000™ Technology is applied on higher level of application layers which reside in the Web OS host. It is described for a high-speed Web OS host interface between a non centralized workstation and a network node with remote computing via Web enabled processing and IT distribution capability. The CyberIT Web host interface has been designed to provide a virtual Web IT Management and Controls of applications with the flexibility and intelligence of buffer management using conditional interrupts, allowing cacheable shared memories and support of fast connection establishment.

BRIEF DESCRIPTION OF THE DRAWINGS

FIG. 47b is an illustration of the High Level UniNet Internet System Architecture Diagram.

FIG. 51b is an illustration of the Subsymbol Sampling Phase and SNR Correlation.

FIG. 67a/b is an illustration of the UniNet Variable TCP Window and Size Controls.

FIG. 67d is an illustration of the UniNet Variable TCP & IP Window Controls.

FIG. 67h/i is an illustration of the UniNet E-DNA DES Algorithms.

FIG. 67j/k is an illustration of the UniNet E-DNA Key Encryption Control algorithms.

DETAILED DESCRIPTION OF THE PREFERRED EMBODIMENT

One aspect of the present invention is taking advantage of non-optimal way of current data communication, telecommunication, application communication and processing. The Com2000™ Internet Communication Processor can be thought as a most ideal platform for application processing, data communication & telecom communication and processing (Information Communication System or InfoCom).

Figure 7:
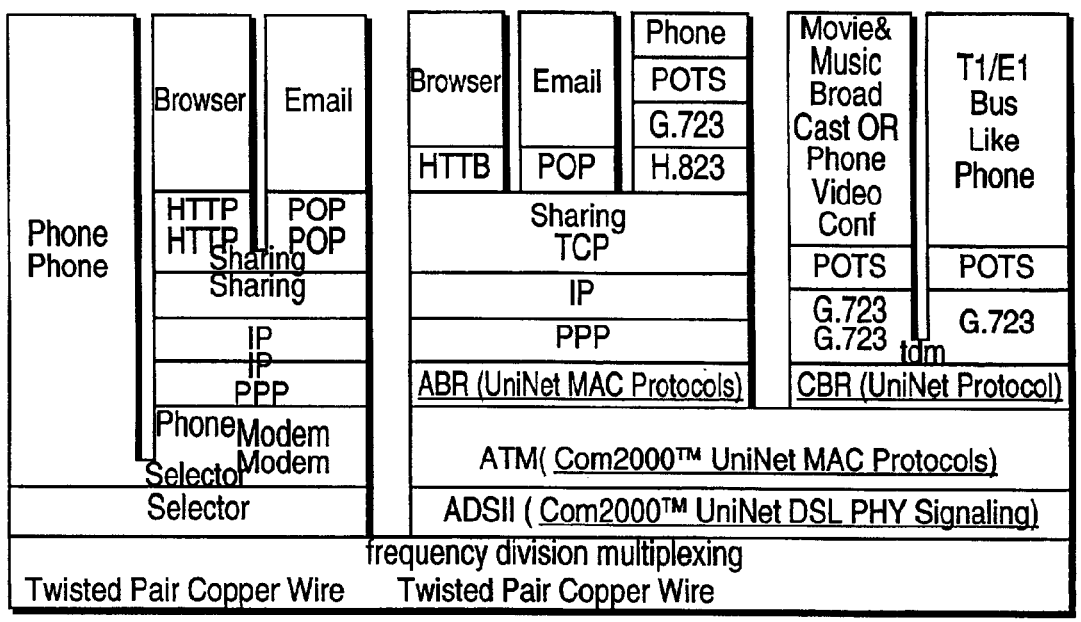
FIG. 07 is an illustration of a Network Layers example of the UniNet Network.

The improvement can start at the media or channel(s) and then moving into higher level such as of ISO data communication and processing layers (Physical, Data, Network, Transport, Session, Presentation, Application). The Com2000™ Technologies set out to increase speeds over any communication channel, synchronizing, enabling, improving, controlling and securing all of the data transmission with Web OS related application's processing over existing wireline and wireless infrastructure while providing seamless integration to the legacy telecom & data corn backbone, as illustrated in FIG. 07.

At the Physical Layer (Channel & Equalization), Com2000™ technologies, represents the collection of state-of-the-art characterization and optimization schemes which is not only improving the current data communication over any channel, but also enables a new information communication architecture which enable multitudes of new technologies. We now describe each of ISO layers and the medium optimization schemes, as illustrated in FIG. 07.

The non-characterized signal parameters of a relatively slow in time invariant Gaussian communication channel (from one node to another communication node) of any wireline communication, allows a new optimum way of recovering the signal parameters as to consider the combination of the trellis encoder (FEC—Forward Error Correction) and the channel as on large finite-state machine. The combination of advance and adaptive precoder equalization, Trellis Coding Modulation and Channel Shaping schemes allows us to take advantage of non-characterized channel samples during Symbol Detection, Error Correction and filtering processing of the front-end receiver. This new scheme results in increased Signal to Noise Ratio or SNR and is called "DCA" or Decision Channel Adaptation (Channel Adaptive Equalization). This is described below. A difference between a wireline channel and a wireless channel "DCA" is that in the wireless channel, the channel is estimated for every sending frame or burst while the channel impulse response measurement for wireline channel is refreshed periodically.

To characterize the communication channel and signal parameters distortion over a channel allows new way of controlling and recovering the sending signal symbols as to consider the combination of Precision Network Synchronization, Channel Measurements and Calibration Schemes. These new scheme allow us to take advantage of non characterized and non synchronized channel(s) distortion results in further increased SNR and are called "XFER" and "CMEAS" or "Clock Transfers" and "Channel Measurement & Calibration". They are described in section 2.1.1 and 2.1.2 respectively.

Figure 8:
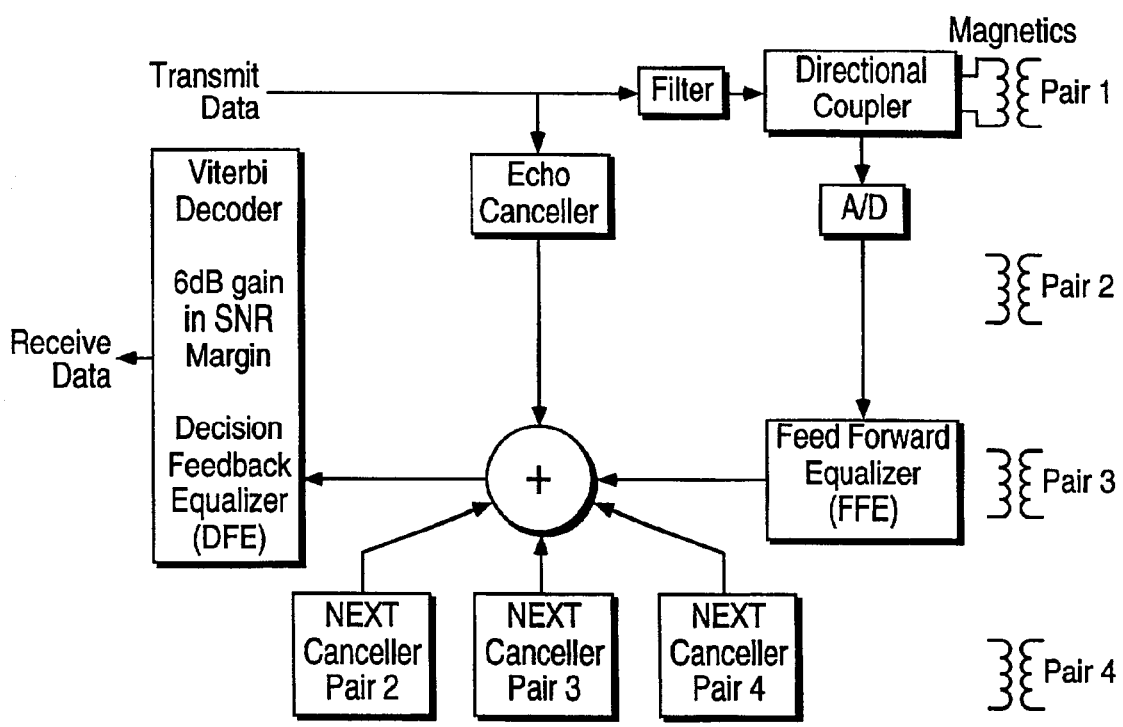
FIG. 08 is an illustration of a Parallel Cross Talks Noise example of the UniNet.

The non-synchronized and un-optimized signal processing of a receiving distorted signal and noise also allows the present invention to take advantage of non-optimized noisy A/D samples and Symbol samples detection, filtering processing of the front-end receiver. This scheme results in further increased Signal to Noise Ratio or SNR and is called "DPIC" or Decision Precursor Intersymbol Interference Canceller, as illustrated in FIG. 08.

The synchronized transmitted signals over multiple media or communication channels exhibits a cyclostationary noise and cross-talk characterization that allows new advance and adaptive equalization scheme to further enhanced the SNR. This new advance and adaptive equalization which take advantage of pseudo-synchronized receiving signals (vector) over multiple media or channels simultaneously, is called "FS-DPIC" or Fractional Space Linear Equalization with DPIC. It is described in section 1.0. The section also described the vector equalization processing for removing multi-path of the wireless channel.

Figure 3:
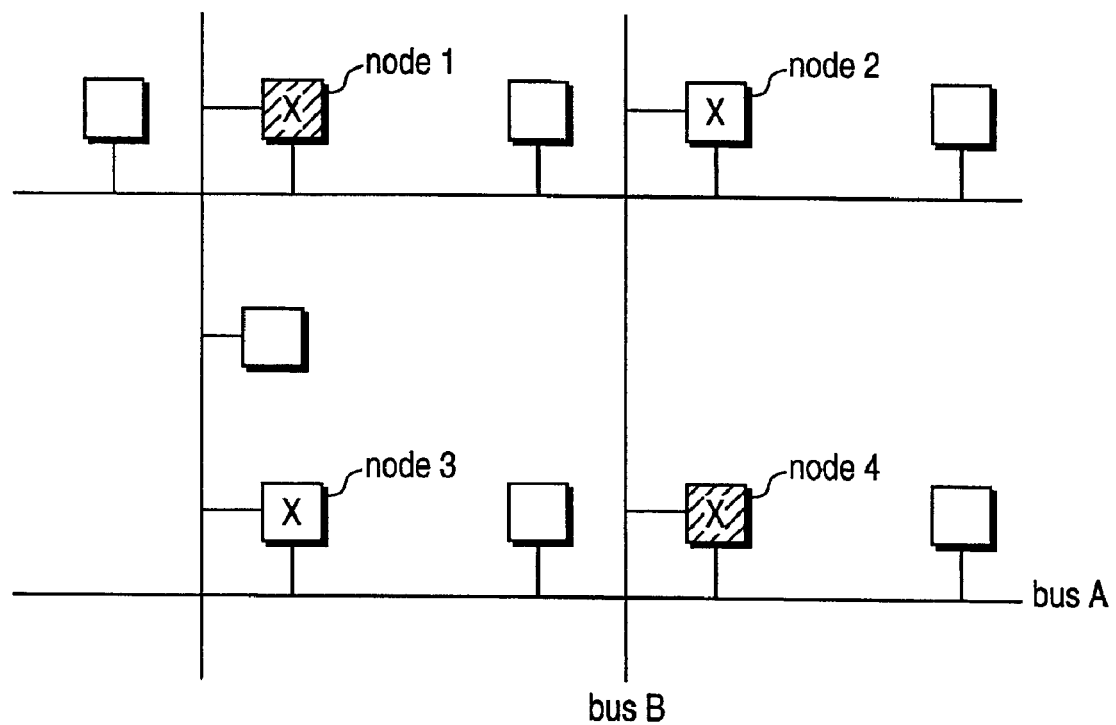
FIG. 03 is an illustration of the interconnect of the Private UniNet Network.

The non-synchronized phase plane controls the baseband signal processing of a receiving distorted signal and noise also allows new advance multi-channel signal coding scheme to take advantage of non-optimized and non-synchronized phase offset controls Symbol samples detection processing of the front-end receiver. This scheme results in further increased data bits per hertz or Bps/Hz. This new advance signal coding scheme which takes advantage of synchronized controls of Phase Signal Space of receiving signals (vector) over multiple media or channels simultaneously and is called "MSC" or Multi-Channel Signal Coding and is described below. Com2000™ Intelligent (Modem)—Multi-Channel Signal Coding technology allows higher data rates to be delivered in a unique way from a single continuous or burst streams carrier frequency. The technology delivers multi-channel (phase division) network architecture that uses parallel bitstream in a novel way. It uses the non-complex or complex base band synmmetry signal with phase division multiplex coding scheme or PDM to deliver the multi-channel requirements, as illustrated in FIG. 03.

As an example of the equivalent multi-channel optical networks based on wavelength division multiplexing (WDM), the phase domain's multi-channel wireline and wireless network utilize the optimal phase division multiplexing (PDM) for multi-channel wireline and wireless network. The Com2000™ Intelligent (Modem)—Precision Sampling technology enables to the precision sampling of the signal's parameters or combination of the Time (Multi-Time Slot sampling), Phase (Multi-Channel Phase sampling) and Frequency (Multi-Carrer sampling) signal spaces. The non-synchronized in time, frequency and phase signal plane controls of the baseband signal processing for the receiving distorted signal and noise also allows new advance multi-channel signal sampling scheme which takes advantage of non-optimized and non-synchronized time, frequency, phase offset controls Symbol samples detection and vector processing over multiple media or channels and is called "PSAM" or Precision Sampling, which is described below, as illustrated in FIG. 03.

The Com2000™ Multi-Channel DPIC capitalize on the synchronous nature of the vector wireless or wireline receiver. Conceptually, each stream of data for each channel in turn is considered to be the desired signal, and the remainder are considered as interferers. The Com2000™ Multi-Channel DPIC take advantage of the non-linear alternative approach which is to exploit the signal parameters synchronization inherent in the new synchronous transmit and receiver Com2000™ systems. The synchronous signal parameters are carrier, carrier phase, symbol timing, sampling phase synchronous vectors, as illustrated in FIG. 03 and FIG. 08.

As an example of wireless application, using only the symbol timing synchronization, the symbol cancellation as well as linear nulling to perform the detection. Using symbol cancellation, interference from already-detected components of the symbol vector, is subtracted out from the received signal vector, resulting in a modified received vector in which, effectively, fewer interferers are present. This is similar to DFE or Decision Feed back Equalization of DPIC. This technique can be applied any other or to all of the synchronization signal parameters such as Carrier Synchronization, Carrier Phase Synchronization, Sampling Phase Synchronization and others for the simultaneous transmitting signal space in Frequency (FDM,CDMA)), Phase(CDMA), Time(TDMA) and receiving vector signal processing. When one component cancellation or all of the combination of component cancellation are used, the order in which the component for each of the signal state data vector becomes important to the overall performance of the system.

At the Data Layer (Frainer & Media Access), Com2000™ technologies, as illustrated in FIG. 07, represents a collection of state-of-the-art characterization and optimization schemes which not only improves the current data communication over any protocols, but also to enables a new information communication structure that enables a multitude of new QoS and controls technologies. The reconfigurable DSP structures of the design to increase speeds and to deliver real-time, robust and deterministic multiple-access, and intelligence transport protocols, which can be used of mapping of legacy protocols. It reflects the concept of reconfigurable and remote-computing internet networking processor applied to future communications so-called software radio/wireless/wireline or web transceiver/internet processor.

Figure 9:
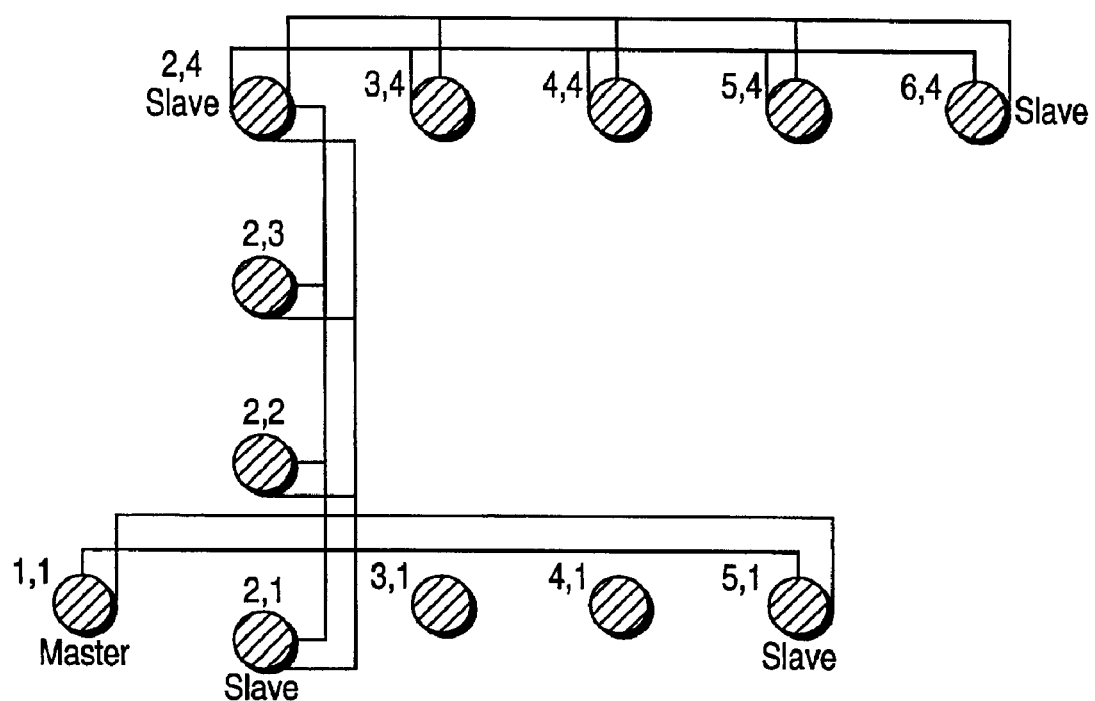
FIG. 09 is an illustration of a UniNet Hierarchical Structure.

The non-synchronized application & data distribution and processing of the current packet and circuit switching data processing also allows new advance multi-channel and multi-purpose QoS or Quality Service distribution scheme which take advantage of non-optimized and non-synchronized quality service controls, detection and processing over multiple media or channels and is called "QoS-XFER" or QoS Transfers, as illustrated in the FIG. 09.

Figure 2:
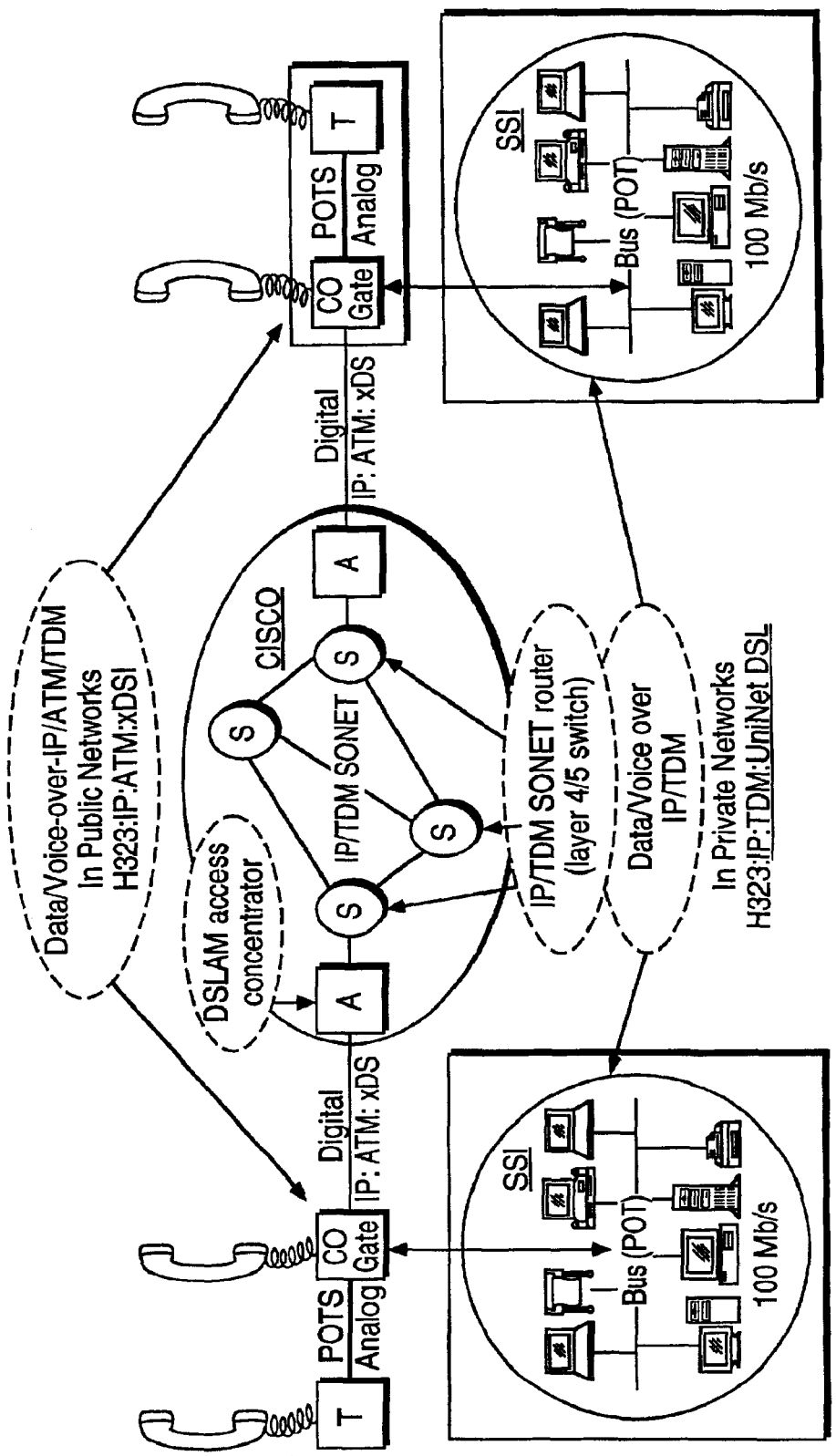
FIG. 02 is an illustration of the deployment example of the Private UniNet Network.

Circuit-switched for existing telecommunication architecture and packet-switched networks for data communications have very different characteristics. They can both support an integrated service environment, but have different merits in terms of providing various service aspects. With Com2000™ Speed, Security and Intelligence Technology, we are architecting, developing and marketing the new "Information Communication System—Internet Networking Processor", as illustrated in FIGS. 02 and 03, at the networking edge environment such as Home Networking, SOHO office, Private Enterprise. This new "Columbus" architecture, stems from Com2000™ technology, is a highly integrated networks, which are set out to address and resolve the following networking issues:

1. Com2000™ Intelligence technology addresses and resolves the real-time guarantees issues, e.g., bounded end-to-end delay and bounded delay variations (jitter);
2. Com2000™ Intelligence technology addresses and resolves the Multicast issues, i.e., sending data from one sender to many receivers;
3. Com2000™ Speed technology addresses and resolves the High capacity over any media and any topology;
4. Com2000™ Speed & Intelligence technology addresses and resolves the Bandwidth on demand service, i.e., providing a multi-rate service;
5. Com2000™ Intelligence technology addresses and resolves the Transaction support, for example support for bursts of messages with short access delay;
6. Com2000™ Intelligence technology addresses and resolves different types of traffic with different demands. Traffic in our future network will be both isochronous/asynchronous and distributive/commutative and the services associated with each will be different;
7. Com2000™ Intelligence technology addresses and resolves the capability of a network interface which should depend on the level of service assigned to a service access point, not the capacity of the total network;.
8. Com2000™ Intelligence technology addresses and resolves the Distributed Intelligence and data switching/routing processing that seamless integrated into the Fiber Optic Backbone;
9. Com2000™ Security technology addresses and resolves the Privacy & Security issues of data communication;
10. Com2000™ Intelligence technology addresses and resolve the Wireless access support, i.e. mobility;

This detailed section of the paper is divided into 6 subsections. The subsection 1 describes the Universal Speed Technology for the Higher Speed in wireline and wireless. The subsection 2 describes the Universal Wireline Intelligence Technology for any type of services, any type of media and any channel topology adaptations. The subsection 3 describes the Universal Security Technology for any data type of services, any type of media and any channel topology adaptations. The subsection 4 describes the Universal Wireless Intelligence Technology for any type of services, any type of media and any channel topology adaptations. The subsection 5 describes the Universal Network Processor and Communication System from the System Architecture point of view. The subsection 6 describes the Universal Operating System or Environment for Network Processor and Communication System's application from the System Architecture point of view. And the last subsection 7 describes the summary of the current and next generation Com2000™ technology.

1. Universal High Speed: Channel Equalization Technology

Figure 1:
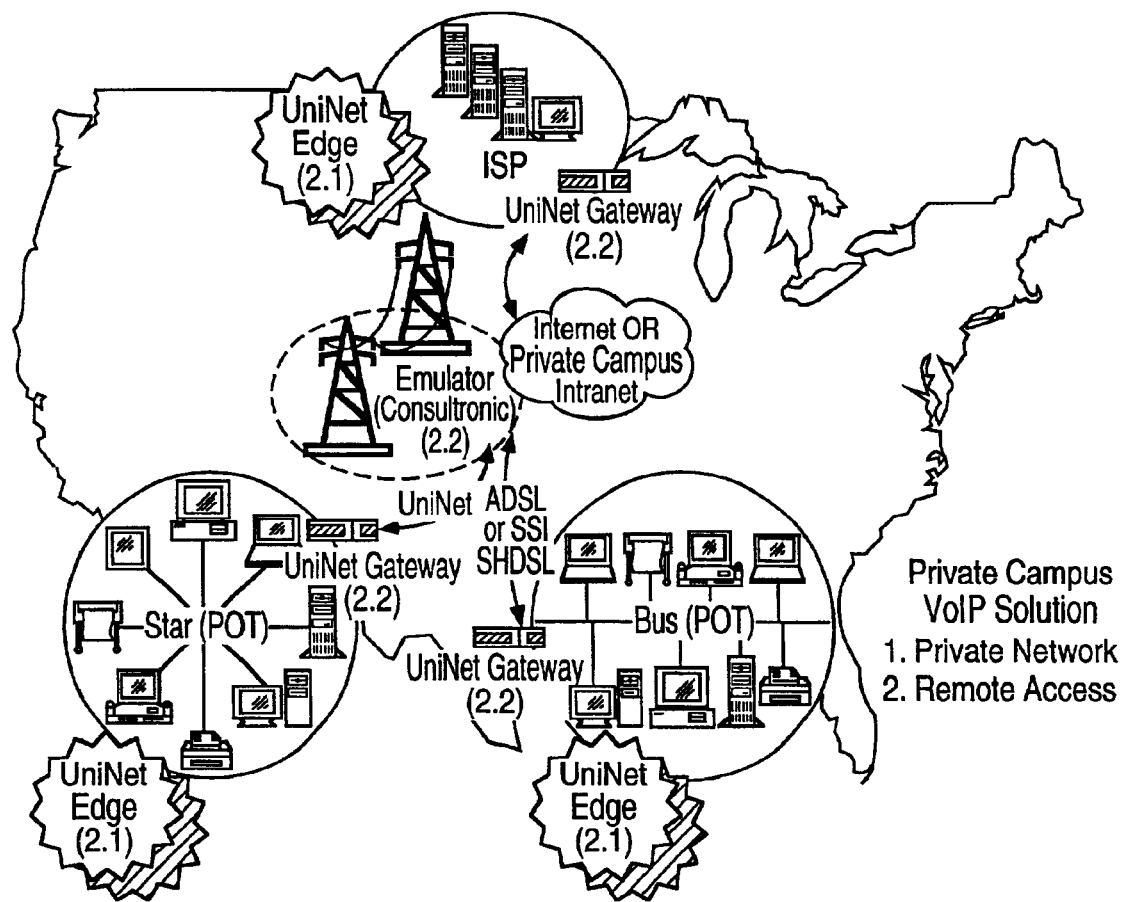
FIG. 01 is an illustration of the Universal Intelligence Network "UniNet".

This subsection of the paper presents a revolutionary Noise Suppression Com2000™ Technology that allows much higher data speed over wireline and wireless than is currently available. Com2000™ Noise Suppression Technology is applicable to all wireline such as xDSL, Copper Gigabit and Cable Modem Standards, as illustrated in FIG. 01.

A. Increased Wireline Channel Capacity Data-General

In any type of wireline communication channel, there is distortion that can cause errors in data signaling thereby reducing effective throughput. When data is transmitted over a communication channel at a particular signal parameter and characteristics, the signal's characteristics often changes as the signal propagates along the channel. The imperfections in the communication channel tend to reduce the resolution of the data bandwidth of the signal being transmitted across the channel. Furthermore, the data may not be interpreted correctly at the receiving end of the channel if the transmitted signal's characteristics are outside of a defined signal's parameter range.

To illustrate the technical solution of the current problem, we select Copper Gigabit IEEE 802.3ab problem statement as an example.

Performance Analysis of Interference-Suppression Based FSLE/DFE Receiver over Cat5 Cables Technique:

I. Introduction

Interference (echo and crosstalk) is one of the major performance-liniting impairments on UTP cables. In this note, we consider various receiver structures suitable to the transmission of Gigabit Ethernet over 4 UTP cables. In particular, we examine the performance of a receiver structure using a cascade of FSLE and DFE for interference suppression. Our investigation is also based on the assumption that the interference can be cyclostationary, i.e., interference statistics are periodic with period equal to a symbol interval. This property can result if all transmitter symbol timing clocks are synchronized in frequency.

Suppression of cyclostationary interference by linear equalizers has been considered in [1]. The more general case of multiple channel outputs has been investigated in [2–5]. It was pointed out that linear processing of cyclostationary interfering signals can exploit spectral correlation properties peculiar to these signals.

In Section II, we describe the channel characteristics and modeling. In Section III, we present the different receiver structures suitable to the transmission of Gigabit Ethernet over 4 cat-5 UTP cables. In Section IV, we present the analytical model for the cascaded FSLE/DFE receiver structure using interference suppression approach and its performance analysis. Numerical results on the SNR and numbers of taps required for the FSLE and DFE are discussed in Section V.

II. Channel Characteristics and Modeling

Figure 10:
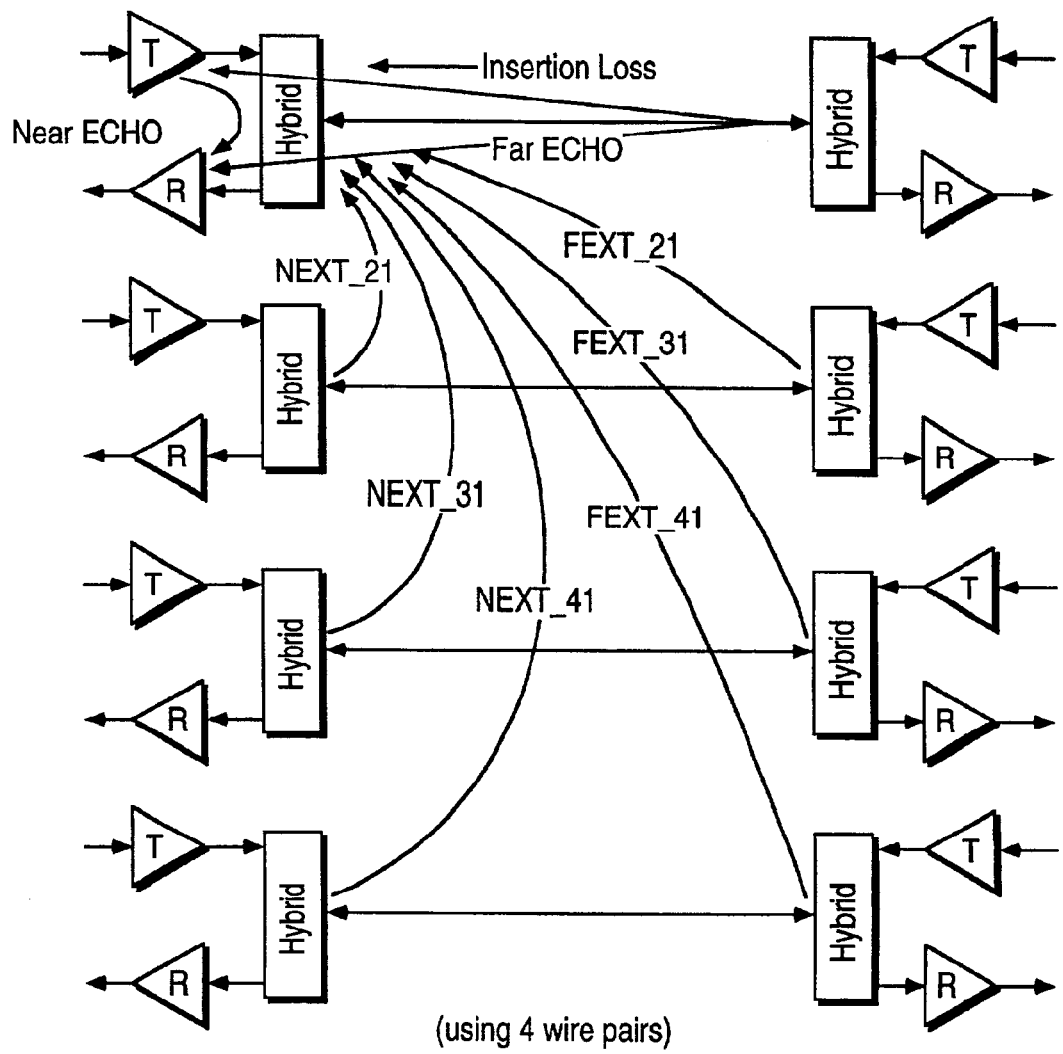
FIG. 10 is an illustration of the Copper Gigabit Ethernet over 4 Pairs of UTP Cables.

The two major causes of performance degradation for transceivers operating over UTP wiring are propagation loss and crosstalk generated between pairs, as shown in FIG. 10. As shown in FIG. 10, each UTP support a 250 Mb/s full-duplex channel using a 5-level 125 Mbaud transmission scheme. Consider the transmission on pair#1. With respect to the Receiver #1L on the left, its wanted signal is sent by the Transmitter #1R on the right. The transmitter #1L on the left sends a signal to the Receiver #1R on the right, but also generates spurious signal (called echo) to its own Receiver#1L on the left. The interference signals generated by Transmitters 2L–4L on the left appear at the input of the Receiver #1L are called near-end crosstalk (NEXT) interferers, NEXT_21 to NEXT_41. The interference signals generated by Transmitters 2R–4R on the right appear at the input of the Receiver #1L are called far-end crosstalk (FEXT) interferers, FEXT_21 to FEXT_41.

A. Propagation Loss:

The models for the propagation loss of a loop that are presented in this section are valid for frequencies that are larger than about 500 kHz. The signals considered in this paper have a very small amount of energy below this frequency. Thus, for simplicity, we will assume that the propagation loss models discussed here are valid at all frequencies.

The transfer function H(d,f) of a perfectly terminated loop with length d can be written as follows $$H(d,f)=e^{-d\gamma(f)}=e^{-d\alpha(f)}e^{-jd\beta(f)}$$

where γ (f) is the propagation constant, α(f) is the attenuation constant, and, β(f) is the phase constant. The quantity that is usually specified in practice is the propagation loss for a given cable length (e.g., d=100 meters). The propagation loss (or insertion loss) limit $L_p$ (f) for category 5 (cat-5) 100 m cable is a positive quantity expressed in dB $$L_P(f) = -20\log|H(d = 100 \text{ m}, f)|$$
$$= \frac{20}{\ln 10}\alpha(f) \approx 2.1 f^{0.529} + 0.4/f$$

Figures 11A, 11B:
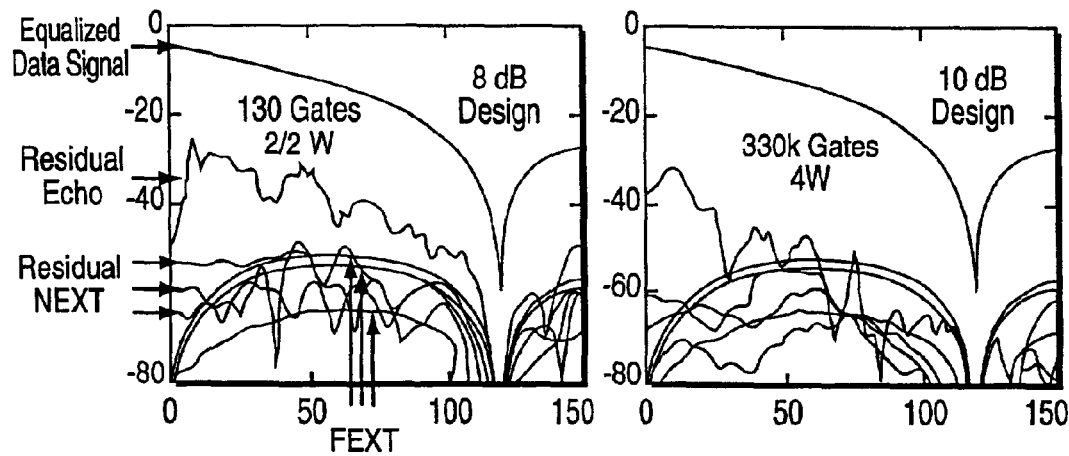
FIG. 11a is an illustration of the Copper Gigabit 802.3ab Suggested design Overall margins.
FIG. 11b is an illustration of the Copper Gigabit 802.3ab Suggested design FEXT noise margins.
Figure 12A:
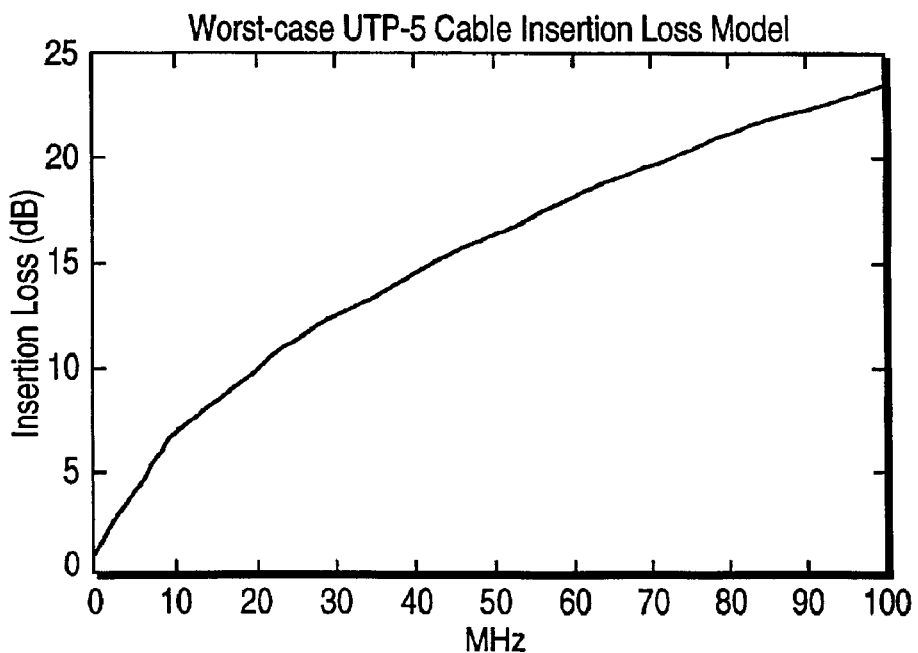
FIG. 12a is an illustration of the Copper Gigabit 802.3ab Insertion Loss of 100 m CAT5 Cable.
Figure 12B:
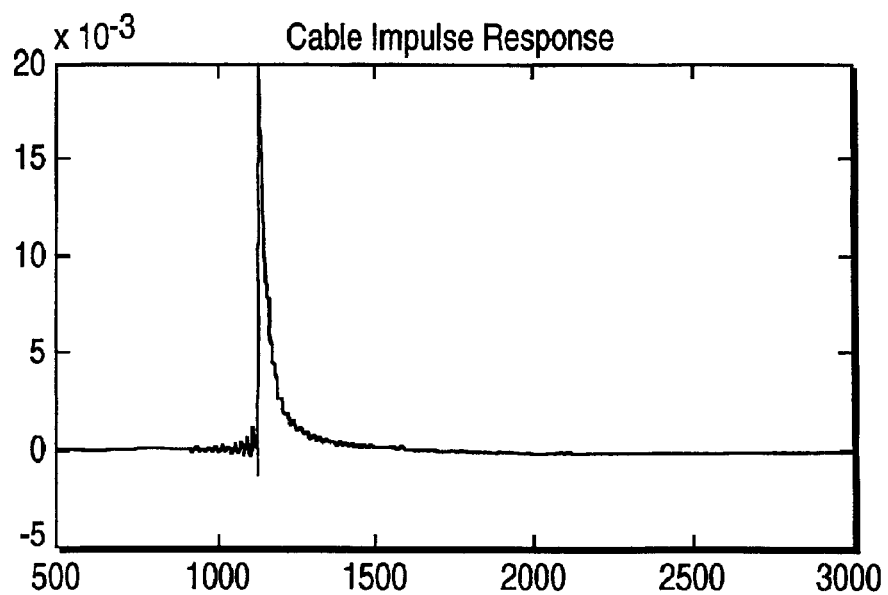
FIG. 12b is an illustration of the Copper Gigabit 802.3ab Impulse Response of 100 m CAT5.

The plot of the suggested 3 dB and 10 dB designs relative to the residual Echo, NEXT and FEXT noise are shown in FIGS. 11a and 11b. The Plot of the propagation loss limit for cat-5, 100 m cable and the cable impulse response are shown in FIGS. 12a and b, respectively.

Figure 13A:
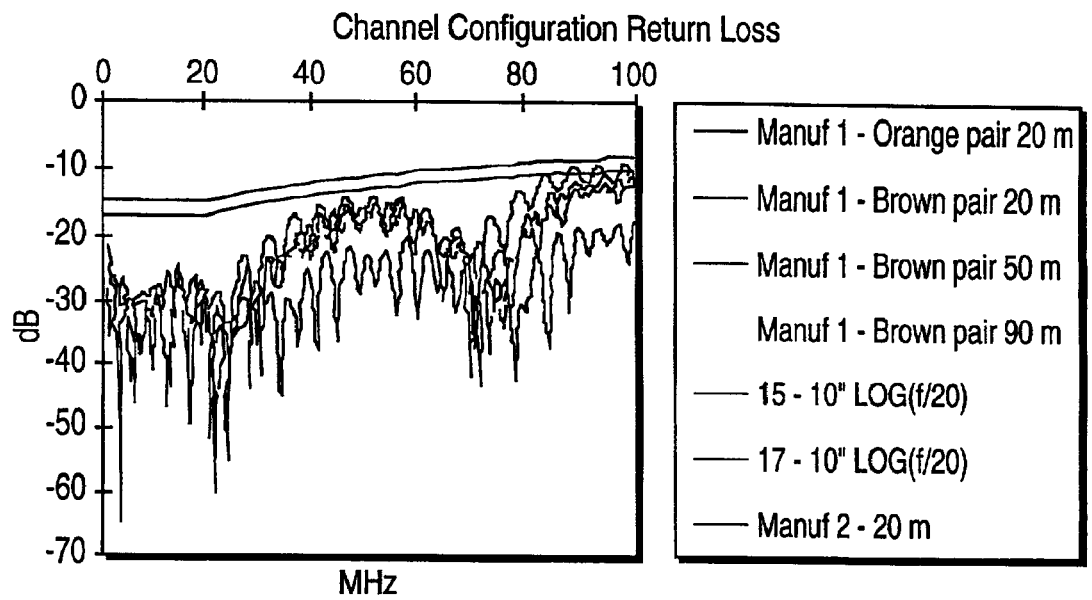
FIG. 13a is an illustration of the Copper Gigabit 802.3ab Return Loss ECHO of 100 m CAT5.
Figure 13B:
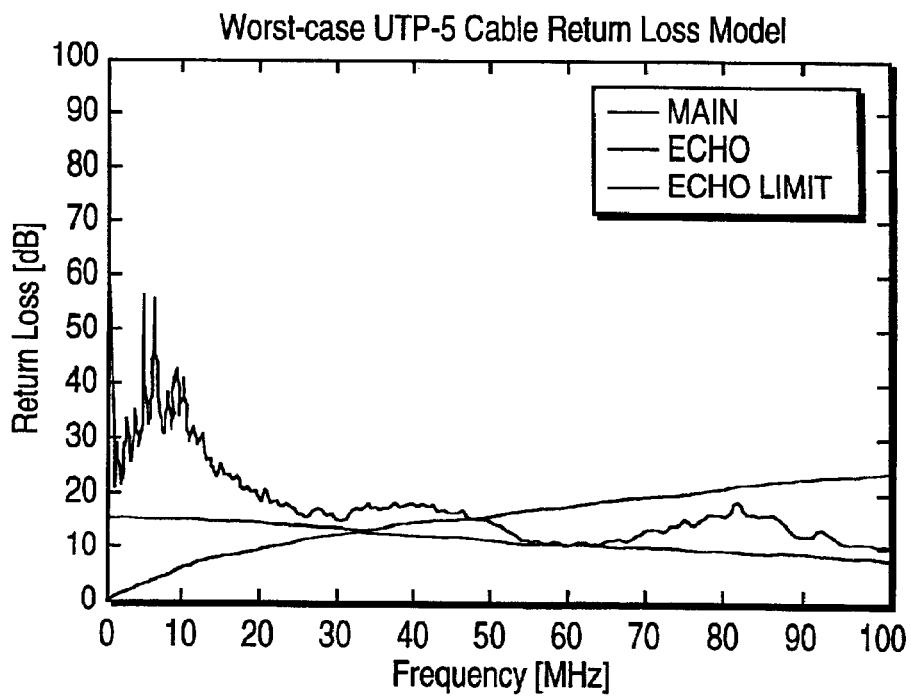
FIG. 13b is an illustration of the Copper Gigabit 802.3ab Worst Case ECHO Loss wrt Signal.

B. ECHO Loss:

The Echo loss is indicated by the return loss. FIG. 13 shows the plot of the measured return loss and the return loss limit which is 15 dB for frequency from 1 to 20 MHz and 15–10 log (f/20) for frequency from 20 to 100 MHz.

Figure 4:
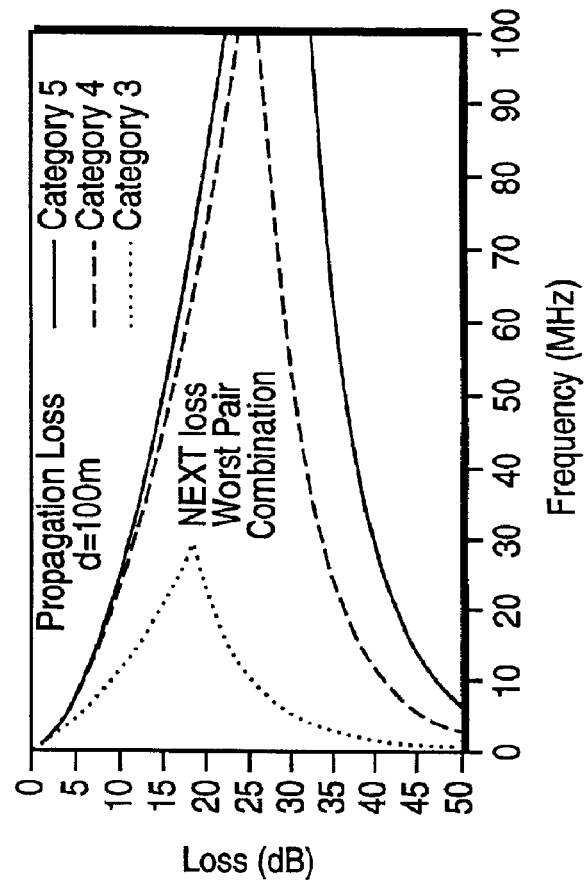
FIG. 04 is an illustration of a NEXT & FEXT Noise example of the UniNet Network.
Figure 4:
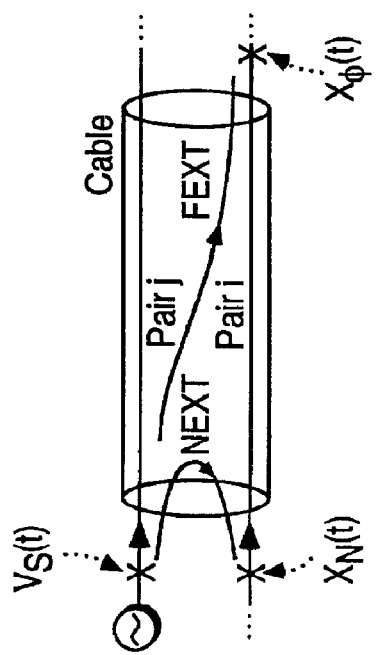
Figure 14:
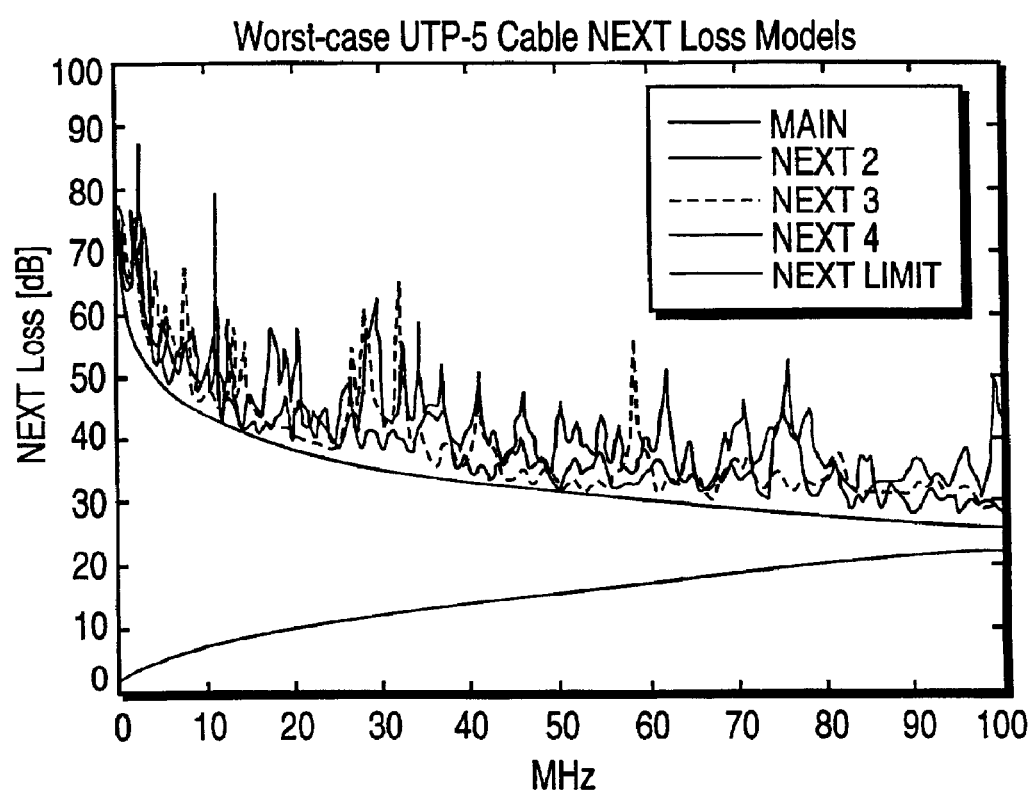
FIG. 14 is an illustration of the Copper Gigabit 802.3ab Worst Case NEXT Loss wrt Signal.
Figure 15:
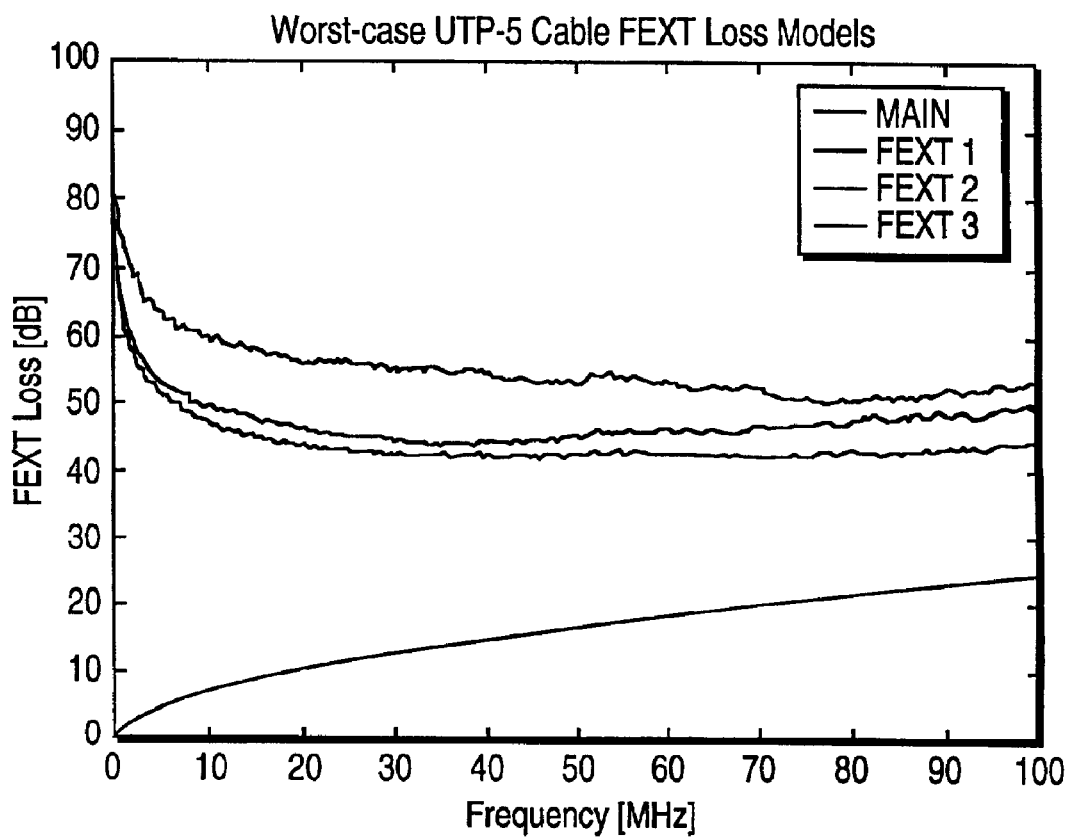
FIG. 15 is an illustration of the Copper Gigabit 802.3ab Worst Case FEXT Loss wrt Signal.

C. NEXT Loss:

The wavy curves in FIG. 4 give the measured pair-to-pair NEXT loss characteristics for three different combinations of twisted pairs in 100 m cat-5 cables. The existence of the minima (small loss) and maxima (large loss) in these curves is due to the fact that the frequencies considered here correspond to wavelengths that are in the same length range as the distance between points of unbalance in the NEXT coupling path. Notice that the minima and maxima usually occur at different frequencies for the three pair combinations. Notice also that the NEXT loss corresponding to the minima decreases with increasing frequency and tends to follow the smooth dotted curve on the bottom in the figure, which is defmed as the worst-case pair-to-pair NEXT loss (or NEXT loss limit) as a function of frequency. The worst-case TIA/EIA-568-A NEXT loss model shown in FIG. 14 is 27.1–16.8log(f/100) in dB.

Figure 16:
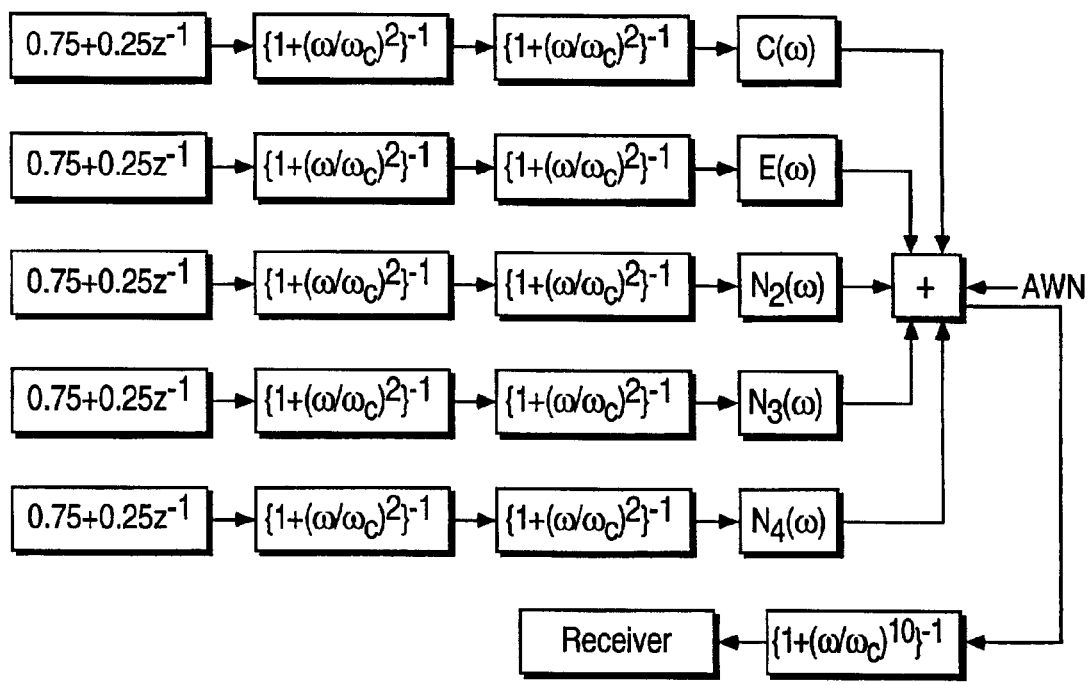
FIG. 16 is an illustration of the Copper Gigabit 802.3ab System Modeling for Analysis.
Figure 17:
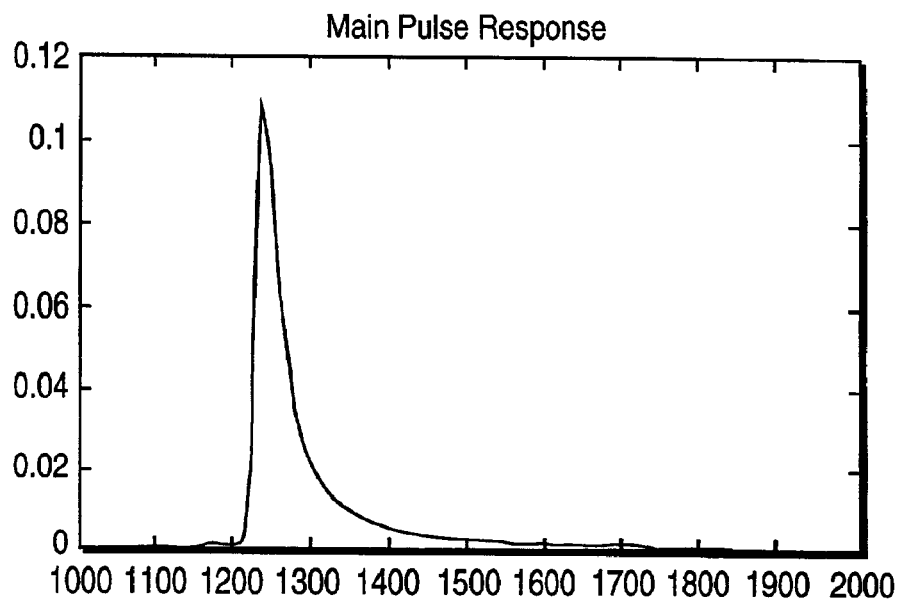
FIG. 17 is an illustration of the Copper Gigabit 802.3ab Received Desired Impulse Response.
Figure 18:
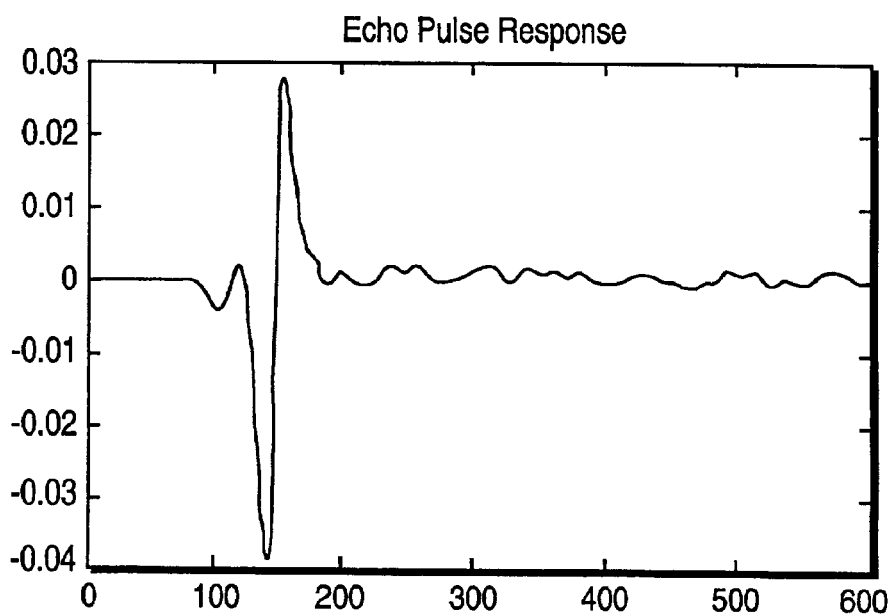
FIG. 18 is an illustration of the Copper Gigabit 802.3ab Received ECHO Impulse Response.
Figure 19A:
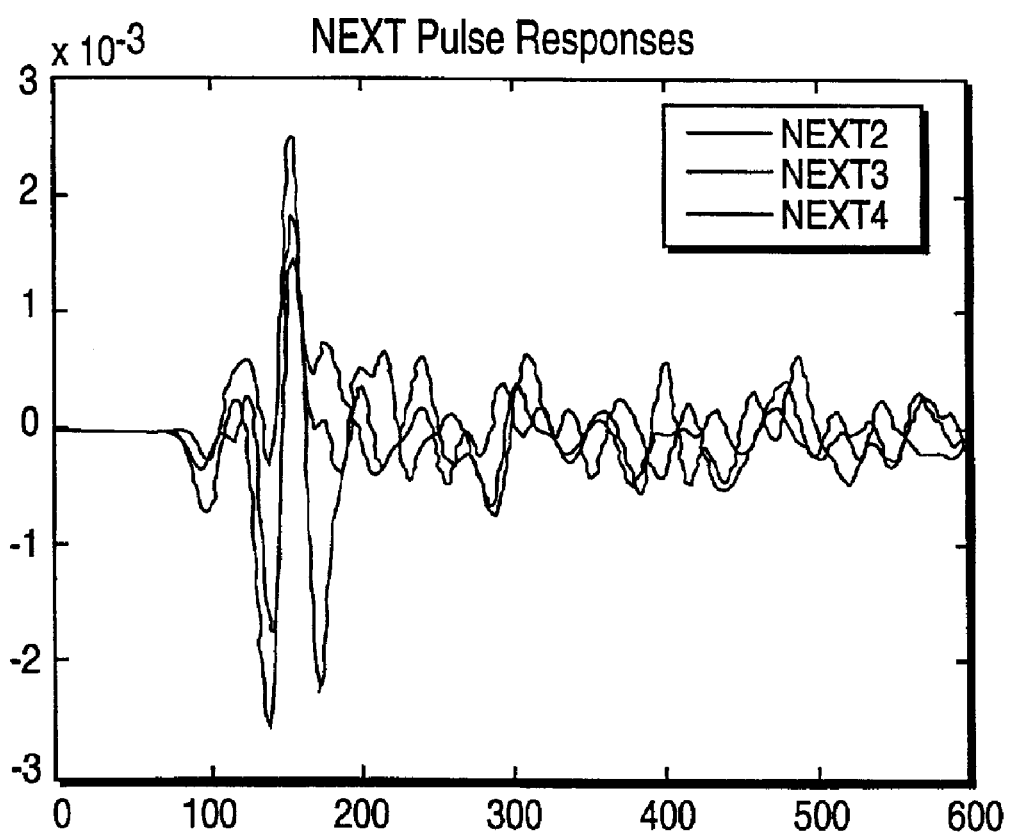
FIG. 19a is an illustration of the Copper Gigabit 802.3ab Received NEXT Impulse Response.
Figure 19B:
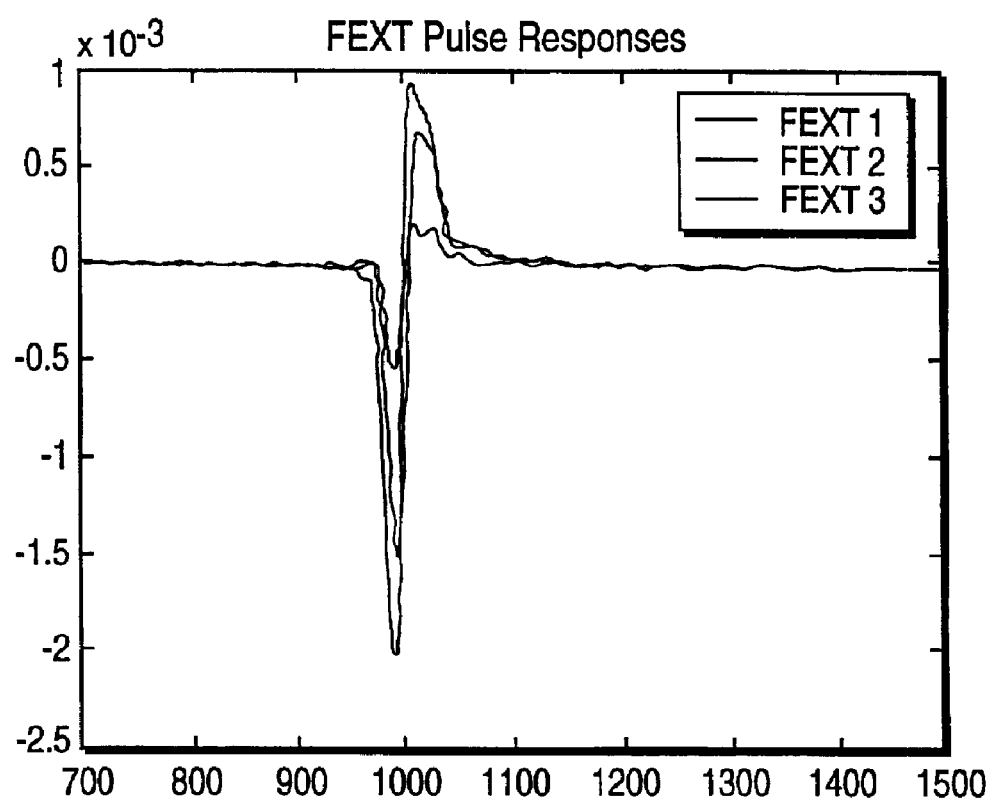
FIG. 19b is an illustration of the Copper Gigabit 802.3ab Received FEXT Impulse Response.

D. FEXT Loss:

FIG. 16 shows the channel model including the effects of partial response, DAC and hybrid filtering in the transmitter, the main and coupling channel characteristics, and the filtering in the receiver front-end. The DAC and hybrid filtering is represented by the cascade of two identical first-order Butterworth sections with a comer frequency of 180 MHz. This introduces a 4 ns rise/fall time. The receiver front-end is modelled as a fifth-order Butterworth filter with a corner frequency of 80 MHz. The main channel, echo coupling and NEXT coupling channels are represented by C(ω), E(ω), $N_2(ω)$, $N_3(ω)$, and $N_4(ω)$, respectively. The models for the FEXT's are similar to those of the NEXTs except the coupling channels will be $F_2(ω)$, $F_3(ω)$, and $F_4(ω)$, instead of $N_2(ω)$, $N_3(ω)$, and $N_4(ω)$. The pulse responses of the main, echo, NEXT's and FEXT's at the input of the RECEIVER shown in FIG. 16 are shown in FIGS. 17, 18, and 19, respectively.

1) Summary of Wireline Advanced Signal Equalization Techniques

The non-synchronized and un-optimized signal processing of a received distorted signal and noise also allows a new advance and adaptive equalization scheme to take advantage of non-optimized noisy A/D samples and Symbol samples detection, filtering processing of the front-end receiver. This scheme results in further increased Signal to Noise Ratio or SNR and is called "DPIC" or Decision Precursor Intersymbol Interference Canceller. The frequency synchronized transmitted signals over multiple media or communication channels exhibits a cyclostationary noise and cross-talk characterization which allows new advance and adaptive equalization scheme to further enhance the SNR. This new advance and adaptive equalization which takes advantage of frequency, phase pseudo-synchronized receiving signals (vector) over multiple media or channels simultaneously, is called "FS-DPIC" or Fractional Space Linear Equalization with DPIC. The section also descnbes the vector equalization processing for removing multi-path of the wireless channel. Achieving the increased throughput requires the line signal channel to be as noise free as possible. This is accomplished through two methods:

(a) Single DPIC Channel Optimization ("DPIC")—The method delivers the optimally suppression the noise propagation in the FFE/DFE equalizers by which suppress the residual of white noise errors between the A/D Samples and Symbol Recovery Samples. The method minimize the Precursor ISI errors in a close loop fashion, so that the error between the white correlated noise induced by the Feed Forward filter's coefficient taps from its digital sampling A/D clocking and the white noise induced by the Decision Feed Back filter's coefficient taps from its digital sampling A/D clocking are suppressed;

(b) Symbol or Channel Vector DPIC Processing ("FS-DPIC")—The specific and salient point of our introduced scheme here is to effectively combine the fractionally spaced feed forward equalizer (FSFFE) and decision feedback equalizer (DFE) to suppress the cyclostationary interference and post-cursor ISI with the newly introduced decision precursor ISI canceller (DPIC) to remove the pre-cursor ISI. The method delivers the optimally suppression the residual of cyclostationary interference and ISI errors between the multi-channel A/D Samples and multi-channel Symbol Recovery Samples. The method, which utilizes the receiving channel's carrier phase and delay synchronization feature to control the correlation of the crosstalks and noise in a multi-channel or vector environment. The correlated cross talks and noises between multi-channel behaved as in a cyclic pattern or in a cyclostationary fashion. This pattern is further utilized to in minimize the Vector Precursor ISI errors in a close loop fashion. It is done so that the error between the multi-channel residuals of pre ISI correlation noise, which are induced by the Feed Forward filter's coefficient taps from its digital sampling A/D clocking and the multi-channel post ISI correlation noise induced by the Decision Feed Back filter's coefficient taps from its digital sampling A/D clocking are suppressed.

The multi-channel precision synchronization is done from utilizing the channel's characterization and error calibration of channels. The suppression of induced communication channel distortion and signal distortion to more thoroughly characterize the communication channel signal response. The reason, that inter-stream jitter degrades the performance of the ECHO, NEXT Canceller and FFE/DFE filters of the selected channel equalization, because it creates a transient mismatch between the true signal SAMPLES of the ECHO or NEXT Canceller, FFE, DFE impulse responses and the taps of the cancellers for each associated channel. The method such as the Phase Residual Detector Error Vector Measurement or EVM, are used to determine the external ISI coupling and non-linearity of the signal zero-crossings for each of the channel. This is done so that the multi-channel DPIC can be optimized of the ECHO/NEXT/FFE/DFE filters quantization jitter or noise for each perspective channel.

Com2000™ Single or Multiple Channel DPIC Equalization Technology is comprised of a set of multiple conventional FFE/DFE filters and delays with a unique combination of multi-stage filtering and Slicer. Every component of the DPIC filter is the conventional. However, the combination of filter taps and delays for each of the multi-stage FFE/DFE, slicer, along with the A/D Samples input and logic paths are defined the algorithm for DPIC.

The Com2000™ Single or Multiple Channel DPIC Equalization Technology provides a revolutionary approach involving adaptive filters and algorithms that model the estimated signal and channel responses to optimize signal recovery for improving the signal to noise ratio (SNR) of the Com2000™ system. This increased SNR margins allow many applications such as cost reduction of the current standard design or delivery a ultra high-speed data modulation methods that increase the channel capacity and data for every Hz bandwidth of signal frequency.

In this section, we introduce a new Decision Precursor ISI Cancellation Technique for wireline advanced equalization. As an example of the application, we picked 802.ab and HDSL2 to illustrate the performance increase. The new DPIC receiver that can significant improve the performance of the currently proposed receiver structure for the Copper Gigabit Transmission over CAT-5 Cable and HDSL2 transmission over POTs.

We will provide a brief review of the performance of the currently proposed receiver structure for the Gigabit Transmission over CAT-5 Cable, and then introduced the new scheme and its improved performance. We will also discuss the implication and applications of the newly introduced scheme. The results of POT cable application for HDSL2 also illustrated.

2) Detailed Method Steps of Interference Suppression ("FSFFE")

Figure 20A:
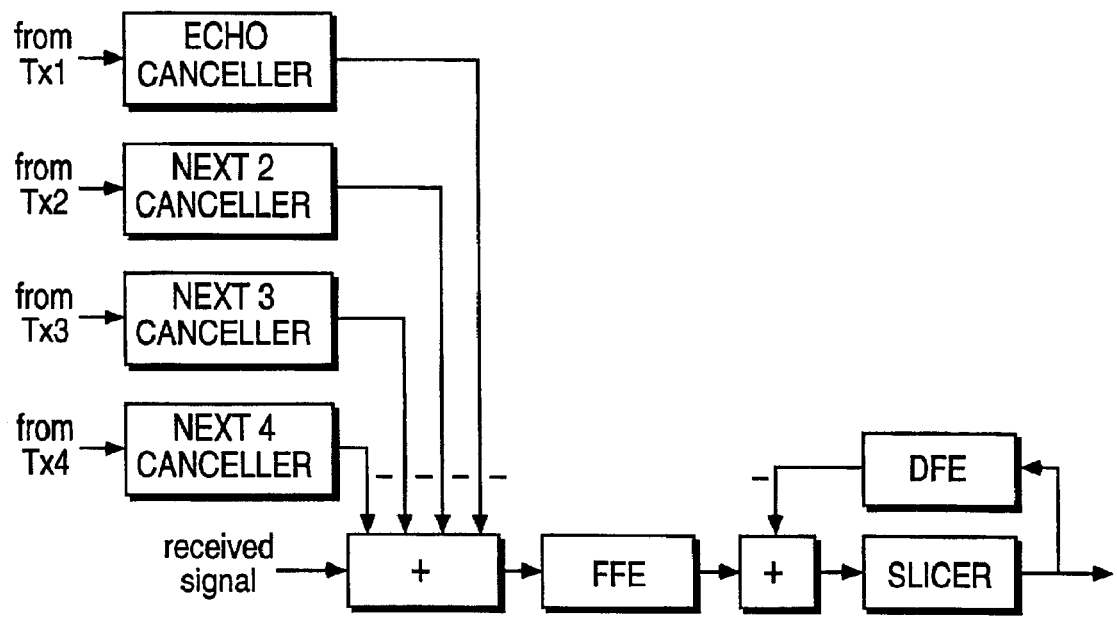
FIG. 20a is an illustration of the Copper Gigabit 802.3ab Receiver Cancellers prior to FFE.
Figure 20B:
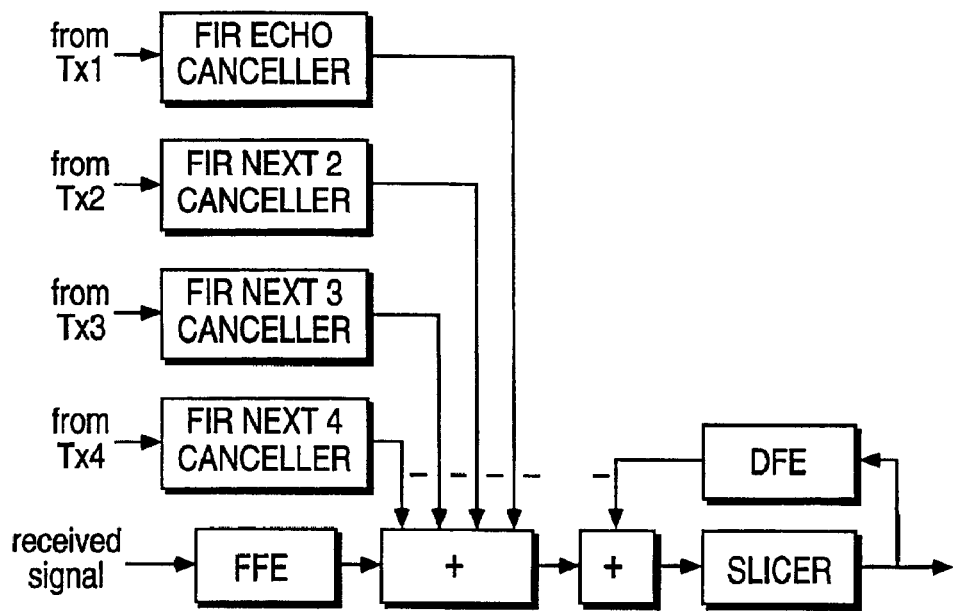
FIG. 20b is an illustration of the Copper Gigabit 802.3ab Receiver Cancellers after to FFE.
Figure 20C:
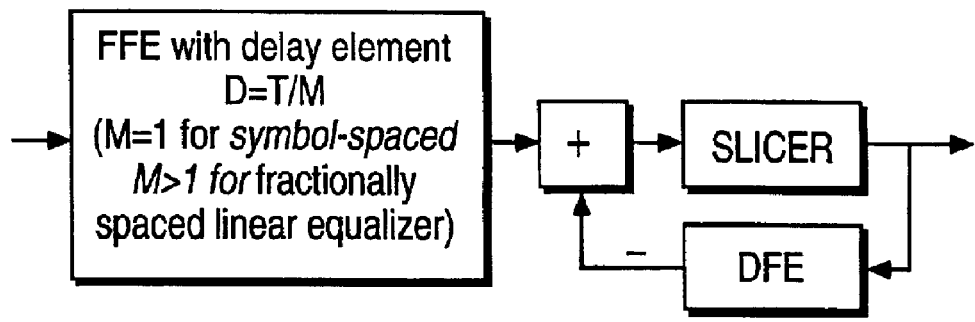
FIG. 20c is an illustration of the new Gigabit 802.3ab cascaded FSLE/DFE receiver Structure.

Reliable duplex operation at 250 Mb/s over two pairs of a CAT-5 UTP cable requires the usage of some kind of technique to combat interference including echo, NEXT and FEXT. Since the FEXT has a small contribution in interference level, we can neglect FEXT's and focus on the echo and NEXT's. Since the transmission on all four pairs uses the same Tx clock, the crosstalk can be shown to be cyclostationary, i.e., crosstalk statistics are periodic with period equal to a symbol interval. The two techniques that are presently being used are NEXT cancellation and NEXT equalization (or suppression). FIGS. 20a–c show three general receiver structures.

Structures shown in FIGS. 20a and b are based on interference cancellation. A NEXT canceller synthesizes, in an adaptive fashion, a replica of the NEXT interferer. The interferer is then cancelled out by subtracting the output of the canceller from the signal appearing at the receiver. A NEXT canceller has the same principle of operation as an echo canceller, and all the familiar structures used for echo cancellers can also be used for NEXT cancellers. The cancellers needs to have access to the local transmitters from which they get their input signals. Typically, this input signal is the stream of symbols generated by the transmitter's encoder. In FIG. 10a the output signal of the canceller is subtracted from the received signal immediately after the A/D. With such an approach, the canceller has to generate outputs at the same rate as the sampling rate of the A/D. An alternative is to make the subtraction at the input of the slicer as shown in FIG. b. In this case, the outputs of the canceller need only be generated at the symbol rate.

The FFE (feed-forward equalizer) in FIGS. 20a and b can be a symbol-spaced (SS) or fractionally spaced (FS) FFE or an analog equalizer. It is used to equalize the precursor ISI. The DFE is used to remove the post cursor ISI. Note that the performance of the DFE is also dependent on the reliability of the symbols detected by the slicer and influenced by the error propagation. For this, one may replace the simple slicer by a sequence detector (such as Viterbi decoder) for a better performance. In that case, the long processing delay of the decoder can be an issue.

With NEXT equalization shown in FIG. 20c, no attempt is made to cancel out the NEXT interferer and there is no need to have access to the transmitter generating the interferer. Rather, what is done is to equalize the interfering NEXT signals at the receiver in such a way that it passes through zero at all the sampling instants of the slicer. In FIG. 10b, the FSFFE or DFE used by the receiver equalizes the desired signal received from the other end of the cable and the echo and NEXT interferers, but in a different fashion. Let f(t) be the impulse response of the in-phase component of the desired signal and r(t) be the impulse response of the in-phase component of the interferer. The conditions for perfectly equalizing the desired signal and interferer in the desired fashion can then be written as $f(kT)=\delta(k)$ and $r(kT)=0$ where k is an integer, T is the symbol period, and $\delta(.)$ is the Dirac delta function, i.e., $\delta(0)=1$ and $\delta(k)=0$ for $k \neq 0$. These conditions also guarantee that the impulse responses of the quadrature component of the far signal and NEXT interferer satisfy $f(kT)=r'(kT)=0$ for all k. Interference equalization is only feasible if the transceiver uses a large excess bandwidth. Specifically, it can be shown that, with one cyclostationary interferer, these conditions can only be satisfied if the transmitter uses an excess bandwidth of at least 100%. Heuristically, the need for such a large excess bandwidth can be explained as follows. With 0% excess bandwidth, an adaptive equalizer has just enough degrees of freedom to perfectly equalize one signal, but cannot do anything else. In order to equalize two signals, the number of degrees of freedom available to the equalizer has to be doubled with respect to what is required for one signal. This is achieved by doubling the bandwidth of the transmitted signal, which results in an excess bandwidth of 100%. Theoretically, it is possible to perfectly equalize the two interferers, but this requires the usage of an excess bandwidth of 200%, and, in general, perfect equalization of n interferers requires an excess bandwidth of n times 100%. For most applications of bandwidth-efficient digital transmission schemes, the usage of excess bandwidth would be considered as a waste of bandwidth.

IV. Analysis of the Receiver Using Cascaded FSLE/DFE:

FIG. 16 shows the overall system that is used to study the performance of the receiver structure using a FSLE cascaded with a DFE (shown in FIG. 20c) in the presence of interference (echo and NEXTs), ISI, and additive white noise (AWN). The AWN has power spectral density of $N_0/2$. The waveform received by the receiver is:

$$r(t) = \sum_{k=-\infty}^{\infty} a_k \phi_0(t-kT) + \sum_{l=1}^{N} \sum_{k=-\infty}^{\infty} b_{kl} \phi_l(t-kT-\Omega_l) + n(t) \quad (1)$$

where the first term of r(t) is the desired signal (i.e., sequence to be detected), while the second term represent N interferers, and n(t) is the AWN at the input of the FFE. $0 \leq \Omega_1 \leq T$ is the Ith interferer's delay. $\Phi_0(t)$ is the overall end-to-end pulse response (e.g., FIG. 17), and $\Phi_1(t)$ is the pair-to-pair pulse response of the Ith interferer (e.g., FIGS. 18–19).

$a_k$ is the transmitted symbol, $b_{k1}$ is the interfering symbol. It is assumed that:

1) all $a_k$ and $b_{k1}$ are uncorrelated;
2) $E(a_k)=0$; $E(a_k^2)=1$;
3) $E(b_{k1})=0$; $E(b_{k1}^2)=1$; and
4) there are no decision errors (i.e., practically negligible).

The input to the slicer (in FIG. 20c) is $$Y_n = \sum_{m=0}^{N_w} w_m r(nT - (mD + \theta)) + \sum_{m=1}^{N_f} f_m a_{n-m-p} \quad (2)$$

where θ is the sampling phase representing time shift in a symbol period, D=T/M is the delay element used in the FFE (M=1 for symbol-spaced FFE and M>1 for fractionally spaced FFE). $W_m$'s and $f_m$'s are the tap settings of the FFE and DFE, respectively, and p is the delay in the receiver's decision relative to the receiver's input. The FFE and DFE coefficients are optimized to minimize the mean squared error (MSE), where the error is:

$$e_n = Y_n - a_{n-p} \quad (3)$$

and includes interference, ISI, and AWN.

Equation (2) for the output of the slicer can be expressed as:

$$Y_n = U^T X_n,$$

where T is the transpose operator:

$$U^T = [w_0 \ w_1 \ldots w_{N_w} \ f_1 \ f_2 \ldots f_{N_f}]$$
$$X_n^T = \lfloor R_n^T \ a_{n-1-p}^T \rfloor$$

with
$$R_n^T = [r(nT-\theta) r(nT-D-\theta) \ldots r(nT-N_w D - \theta)]$$
and $$a_{n-1-p}^T = \lfloor a_{n-1-p} \ a_{n-2-p} \ldots a_{n-N_f - p} \rfloor \quad (4)$$

The MSE we need to minimize is:

$$MSE = [E[(Y_n - a_{n-p})^2] = U^T A U - 2 U^T V + 1 \quad (5)$$

where $A = E[X_n X_n^T]$, and $V = E[X_n a_{n-p}]$.

Setting the derivative of the MSE to zero, we find the optimum weight of the forward and feedback coefficients, which is:

$$U_{opt} = A^{-1} V \quad (6)$$

and the corresponding minimum MSE is $$MMSE = 1 - V^T A^{-1} V = 1 - V^T U_{opt} \quad (7)$$

where V and A are obtained by taking expectations, using (4):

$$V^T = E \lfloor a_{n-p} \ X_n^T \rfloor \quad (8)$$
$$= E \lfloor r(nT-\theta) \ldots r(nT - N_w D - \theta) \ a_{n-1-p} \ a_{n-p} \ldots a_{n-N_f - p} \ a_{n-p} \rfloor$$
$$= [\Phi_0(pT-\theta) \ldots \Phi_0(pT - N_w D - \theta) \ 0 \ 0 \ldots 0]$$

$$A = E[X_n X_n^T] = E\left[\begin{pmatrix} R_n \\ a_{n-1-p} \end{pmatrix} (R_n^T \ a_{n-1-p}^T)\right]. \quad (9)$$

This matrix A could be written as $$A = \begin{bmatrix} A_1 & A_2 \\ A_2^T & I \end{bmatrix} \quad (10)$$

where $A_1 = E(R_n R_n^T)$, $A_2 = E(R_n a_{n-1-p}^T)$, and I is the identity matrix.

Under our assumptions, we find that $A_2 = [x_{i,j}]$, where $$x_{i,j} = \Phi_0(p+j)T - iD - \theta), \ 0 \leq i \leq N_w, \text{ and } 1 \leq j \leq N_f \quad (11)$$

and $A_1 = [q(i,j)]$, where $$q(i,j) = \sum_{k=-\infty}^{\infty} \Phi_0(kT - iD) \Phi_0(kT - jD) + \quad (12)$$
$$\sum_l \sum_{k=-\infty}^{\infty} \Phi_l(kT - iD - \Omega_l) \cdot \Phi_l(kT - jD - \Omega_l) +$$
$$R((i-j)D), \text{ and}$$

$$0 \leq i, j \leq N_w.$$

R(t) is the autocorrelation function of the power spectral density of AWN at the output of the receiver filter.

Note that for stationary interference with power spectrum equal to that of the cyclostationary interference, the results are the same except the q(i, j) term becomes:

$$q(i,j) = \sum_{k=-\infty}^{\infty} \Phi_0(kT - iD) \Phi_0(kT - jD) + \quad (12b)$$
$$\frac{1}{T} \sum_l \int_{-\infty}^{\infty} \Phi_l(t) \Phi_l(t - (i-j)D) + R((i-j)D).$$

V. Numerical Results and Discussions

The above model and analysis are used with pulse shapes shown in FIGS. 17–19 to compute the SNR at the slicer input for different values of taps and D.

We assume a small contribution of AWGN, i.e. in the absence of NEXT, the receiver signal-to-noise ratio is about 60 dB The choice of a low AWN level ensures that crosstalk is the dominant additive impairment.

The performance measure used in the evaluations of this and the next section is output SNR, defined as SNR= $10*\log_{10}(1/MSE)$ where the mean squared error (MSE) expression is shown by Equation (7) above. Thus, the transmitted data symbol levels are normalized so as to have unit variance. Note that we do not address the problem of error propagation in the DFE.

With the above channel models, SNR, maximized with respect to receiver sampling phase, has been evaluated for two interferers for various numbers of DFE feedforward and feedback tap coefficients. Preliminary results on the SNR performance as a function of receiver sampling phase are summarized in FIGS. 21 and 22. In these figures, NT is the span of the FFE in terms of the number of symbol intervals, and D is the delay element used in the FFE. Hence, the number of taps of the FFE is given by the product of (NT)(T/D); and NF is the number of DFE taps.

Figure 21:
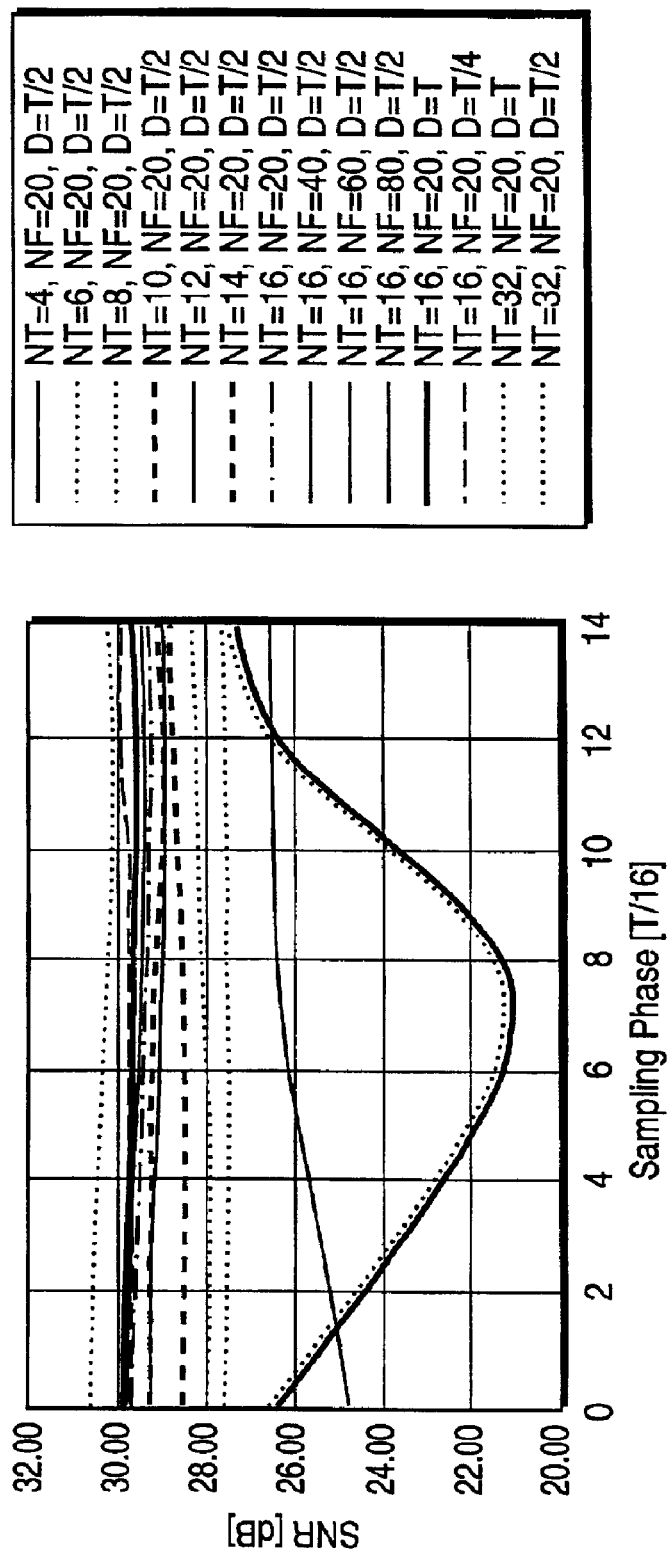
FIG. 21 is an illustration of the different Gigabit 802.3ab cascaded FFE/DFE SNR comparisons.

As shown in FIG. 21, for the case of symbol-spaced FFE (i.e., D=T), the SNR is quite sensitive to the sampling phase with a variation of 6 dB. With a proper choice of sampling phase we can achieve an SNR of 27.36 dB. It also indicates that with a symbol-spaced FFE (i.e., D=T), the increase in NT from 16 to 32 does not make any noticeable improvement in SNR. In other words, NT=16 is sufficient.

For the case of fractionally spaced FFE (i.e., D=T/M with M>1), we can make the following observations:

The SNR is very much less sensitive to the sampling phase.

For NT>5, increasing NT from 6 to 32 introduces an increase in SNR of around 2.5 dB. As NT increases, the SNR increase get smaller and smaller. An SNR of 30 dB is achievable.

With NF=20, changing D=T/2 to D/4 will not provide a noticeable increase in SNR.

For NT=16 or larger, increasing NF from 20 to 80 does not provide a noticeable increase in SNR.

The results indicates that combinations of NF=20, NT=16 and D=T or T/2 is the good choices:

The combination of NF=20, NT=16 and D=T with a proper sampling provides an SNR of 27.36 dB with symnbol-spaced 16-tap FFE and The combination of NF=20, NT=16 and D=T/2 can achieve an SNR of 29.63 dB with a fractionally space 32-tap FFE, i.e. an increase of 2.27 dB in SNR at the expense of doubling the sampling rate and number of FFE taps.

Figure 22:
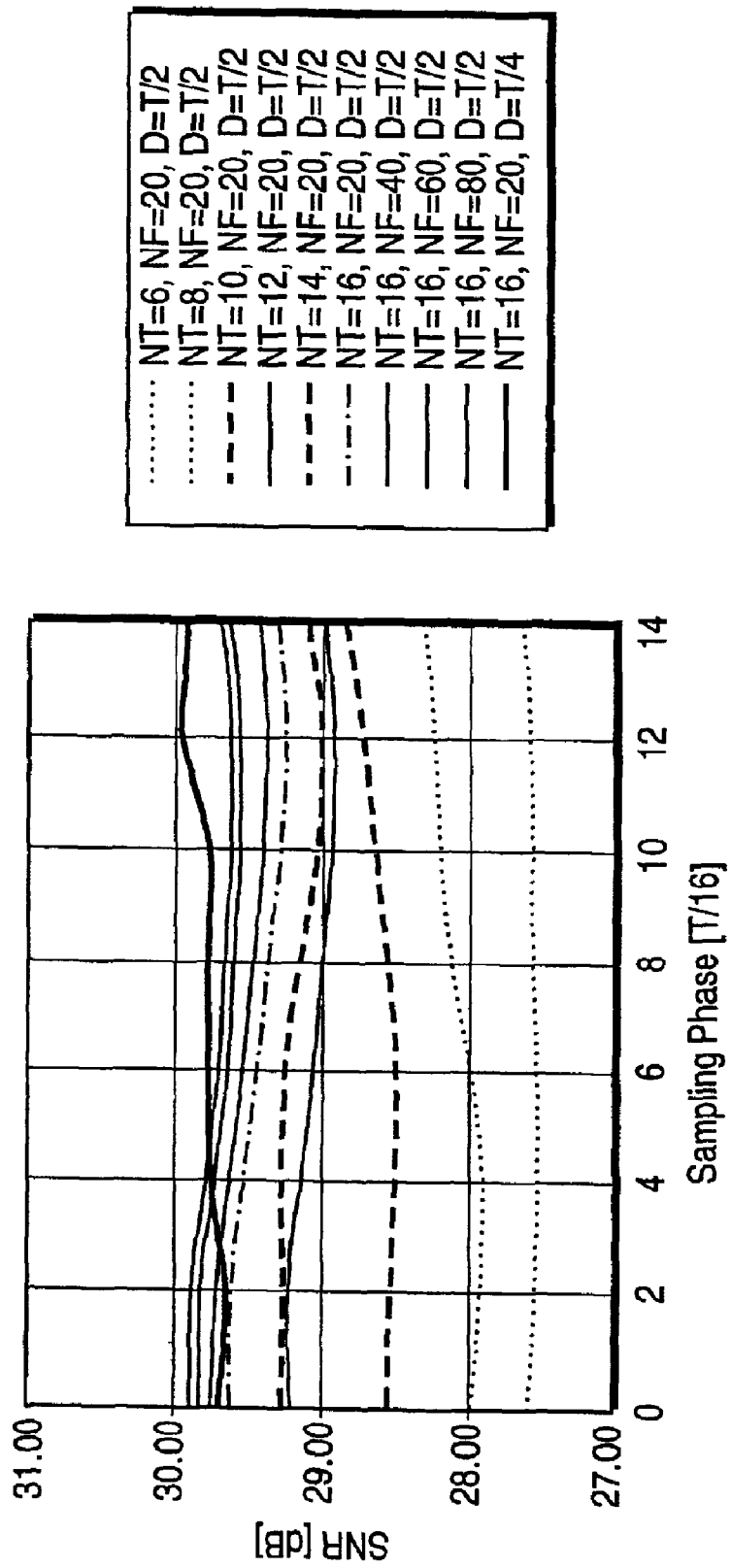
FIG. 22 is an illustration of different Gigabit 802.3ab cascaded FSFE/DFE SNR comparisons.

Numerical Results Used in FIGS. 21–22

Figure 23:
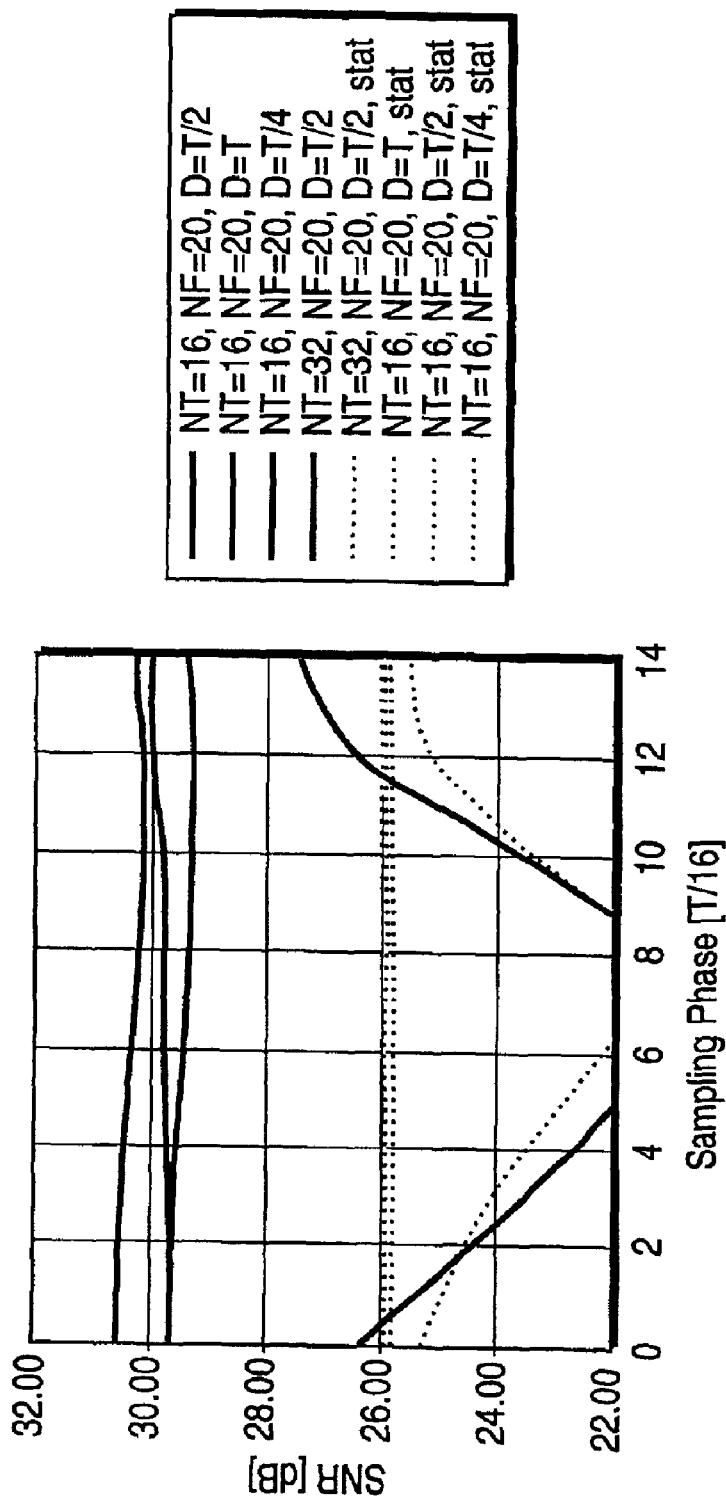
FIG. 23 is an illustration of the new cascaded FSFE/DFE and old FFEIDFE SNR comparisons.

The above results assume cyclostationary or synchronized interferers. We also investigated the performance in case of stationary interferers when the delays of various interferers are uniformly distributed. As shown in FIG. 23, by using FSLE, the obtained SNR is worse than that in the case of cyclostationary interferers by more than 3 dB for 2 interferers. For 4 interferers, it is expected to have 6 dB worse in SNR.

From the obtained results, we can conclude that the proposed receiver structure using a fractionally spaced FFE combined with a DFE can be used to suppress the NEXT's. It has a simpler structure than the receiver using NEXT cancellers. Compared to the proposed receiver structure shown in FIG. 20c, FIG. 20a or b requires 4 additional cancellers. It is also noted that the proposed receiver in FIG. 20c can suppress the FEXT's.

The following references are incorporated by reference herein in their entirety:

1. E. Biglieri, M. Elia, and L. LoPresti, "The optimal linear receiving filter for digital transmission over nonlinear channels," IEEE Trans. Inform. Theory, vol. 35, no. 3, pp. 620–625, May 1989;
2. W. VanEtten, "An optimal linear receiver for multiple channel digital transmission systems," IEEE Trans. Commun., pp. 828–834, August 1975;
3. J. Salz, "Digital transmission over cross-coupled linear channels," AT&T Tech. J., vol. 64, no. 6, pp. 1147–1159, August 1985;
4. P. Crespo, M. L. Honig, and K. Steiglitz, "Suppression of near- and far-end crosstalk by linear pre- and post-filtering," IEEE JSAC, pp. 614–629, April 1992; and
5. M. Abdulrahman, D. D. Falconer, "Cyclostationary Crosstalk Suppression by Decision Feedback Equalization on Digital Subscriber Loops", IEEE JSAC, pp. 640–649, April 1992.

3) Detailed Method Steps of Decision Precursor ISI ("DPIC") Cancellation

In this Section of the paper, we introduce a new Decision Precursor ISI Cancellation Technique that can significant improve the performance of the currently proposed receiver structure for the Gigabit Transmission over CAT-5 Cable.

| sampl'g time | NT = 2, NF = 20, D = T/2 | NT = 4, NF = 20, D = T/2 | NT = 6, NF = 20, D = T/2 | NT = 8, NF = 20, D = T/2 | NT = 10, NF = 20, D = T/2 | NT = 12, NF = 20, D = T/2 | NT = 14, NF = 20, D = T/2 | NT = 16, NF = 20, D = T/2 |
|---|---|---|---|---|---|---|---|---|
| 0  | 1.85  | 24.80 | 27.58 | 27.97 | 28.56 | 29.23 | 29.28 | 29.63 |
| 2  | 1.79  | 25.19 | 27.55 | 27.94 | 28.54 | 29.24 | 29.27 | 29.62 |
| 4  | 1.78  | 25.70 | 27.53 | 27.92 | 28.51 | 29.17 | 29.28 | 29.54 |
| 6  | 1.83  | 26.19 | 27.54 | 28.00 | 28.49 | 29.06 | 29.25 | 29.44 |
| 8  | 1.93  | 26.44 | 27.57 | 28.13 | 28.55 | 29.00 | 29.15 | 29.36 |
| 10 | 2.77  | 26.50 | 27.57 | 28.19 | 28.64 | 28.94 | 29.03 | 29.28 |
| 12 | 5.96  | 26.53 | 27.58 | 28.24 | 28.72 | 28.91 | 28.99 | 29.23 |
| 14 | 10.02 | 26.58 | 27.62 | 28.30 | 28.82 | 28.97 | 29.08 | 29.29 |

| sampl'g time | NT = 16, NF = 40, D = T/2 | NT = 16, NF = 60, D = T/2 | NT = 16, NF = 80, D = T/2 | NT = 16, NF = 20, D = T | NT = 16, NF = 20, D = T/4 | NT = 32, NF = 20, D = T | NT = 32, NF = 20, D = T/2 |
|---|---|---|---|---|---|---|---|
| 0  | 29.75 | 29.87 | 29.91 | 26.38 | 29.70 | 26.60 | 30.61 |
| 2  | 29.73 | 29.84 | 29.88 | 24.43 | 29.66 | 24.64 | 30.57 |
| 4  | 29.64 | 29.75 | 29.79 | 22.65 | 29.76 | 22.86 | 30.47 |
| 6  | 29.54 | 29.66 | 29.71 | 21.29 | 29.76 | 21.49 | 30.34 |
| 8  | 29.47 | 29.61 | 29.66 | 21.32 | 29.76 | 21.50 | 30.22 |
| 10 | 29.40 | 29.55 | 29.62 | 23.74 | 29.75 | 23.91 | 30.10 |
| 12 | 29.36 | 29.54 | 29.61 | 26.43 | 29.93 | 26.59 | 30.07 |
| 14 | 29.42 | 29.60 | 29.67 | 27.36 | 29.91 | 27.54 | 30.17 |

We will provide a brief review of the performance of the currently proposed receiver structure for the Gigabit Transmission over CAT-5 Cable, and then introduced the new scheme and its improved performance. We will also discuss the implication and applications of the newly introduced scheme.

Figure 24:
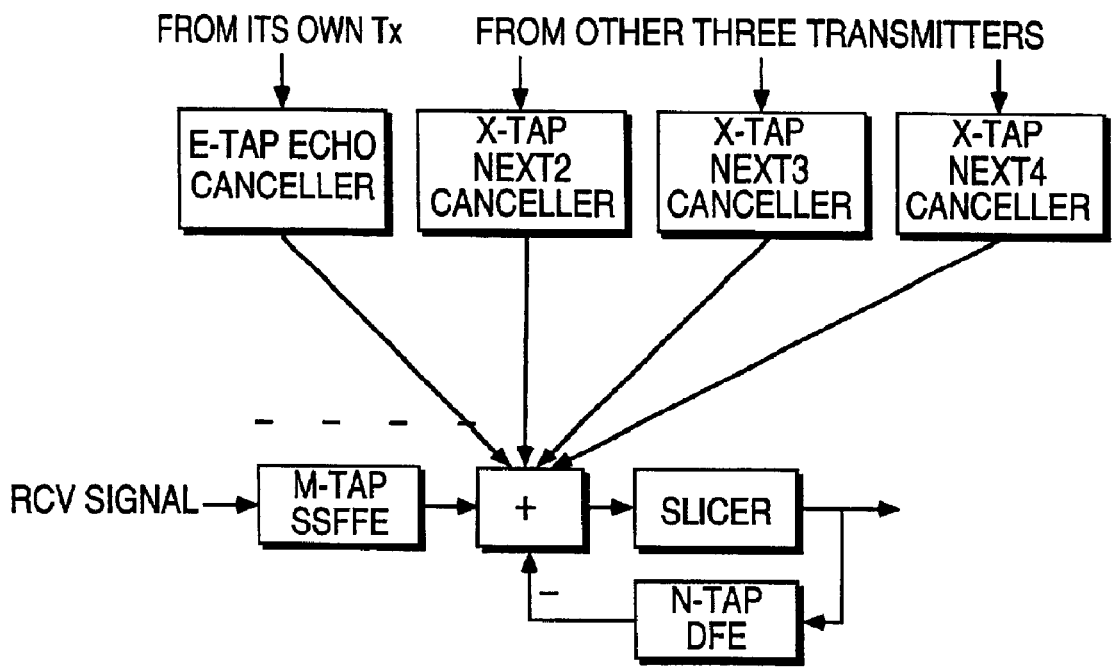
FIG. 24 is an illustration of the Current proposed Gigabit 802.3ab SNR receiver architecture.

2. Background:

Currently, the proposed structure of the receiver prior to the 4D-TCM Viterbi decoder consists of 4 paths and each path includes:

one M-tap Symbol-Spaced (SS) Feedforward Equalizer (FFE) to remove the precursor ISI, one N-tap Decision Feedback Equalizer (DFE) to remove the post-cursor ISI, one E-tap Echo Canceller to eliminate the echo interference, and three X-tap NEXT Cancellers to eliminate the NEXT interferers as shown in FIG. 24.

Including the coding gain of 6 dB from the 4D-TCM Viterbi Decoder, calculations have been made to achieve 3 dB and 10 dB margins and a target output SNR of 16.2 dB for a BER=1E-10. For convenience, we will call the corresponding 3 dB-margin and 10 dB-margin designs Scheme PL (Proposed structure with Low complexity) and Scheme PH (Proposed structure with High complexity), respectively. Their structures and numbers of taps are:

SCHEME PL: ONE 50-TAP ECHO CANCELLER, THREE 12-TAP NEXT CANCELLERS, SYMBOL-SPACED 12-TAP FFE, AND 10-TAP DFE (and ADC with effective 48 levels).

SCHEME PH: ONE 121-TAP ECHO CANCELLER, THREE 72-TAP NEXT CANCELLERS, SYMBOL-SPACED 16-TAP FFE, AND 12-TAP DFE (and ADC with effective 96 levels).

Figure 25:
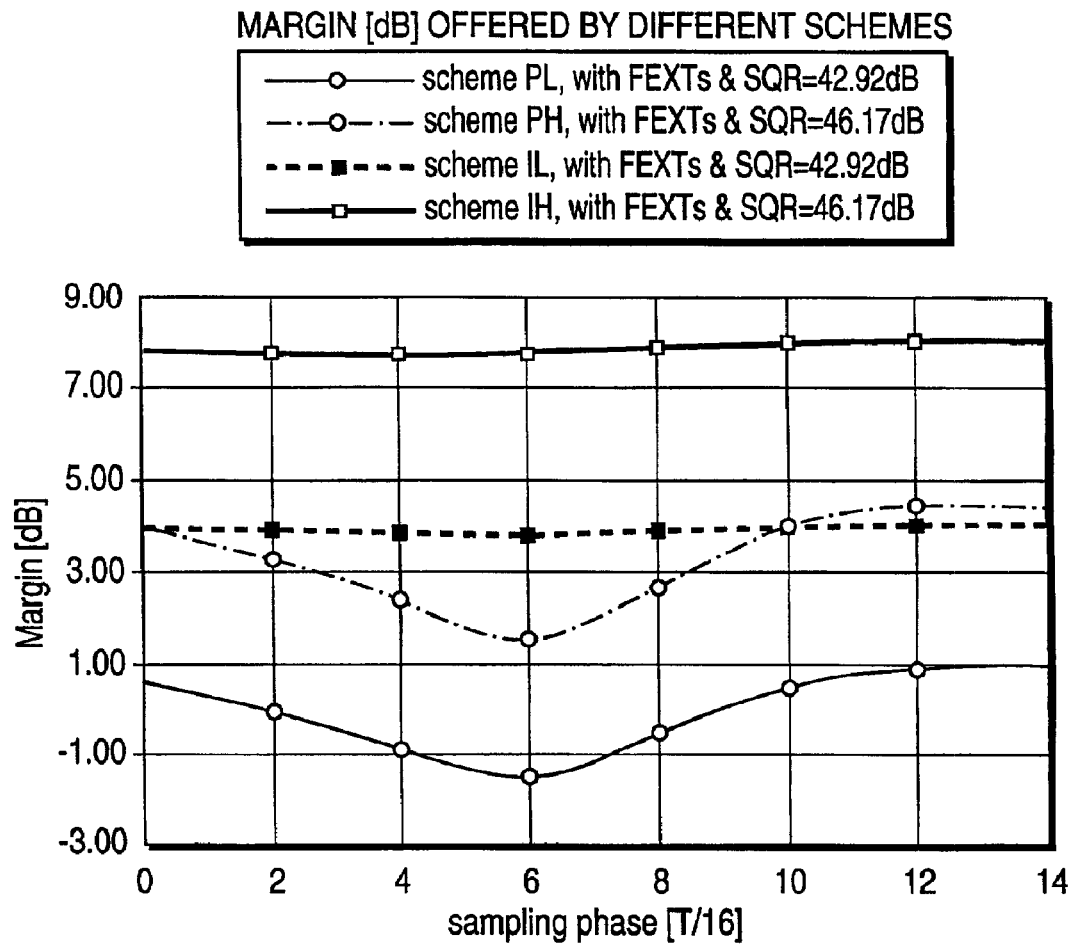
FIG. 25 is an illustration of the Margin offered by DPIC architecture scheme relative 802.3ab.

Note that study was done with the assumption that the FEXT's are neglected. The margin was expected to be adequate for FEXT's. Therefore, in the presence of 3 FEXT's, the margins provided by Schemes PL and PH are reduced. It is noted that Scheme PL has a much lower complexity than Scheme PH (a total saving of 71 echo canceller taps, 180 NEXT taps, 4 FFE taps and 2 DFE taps per path). FIG. 25 shows the plots of the margin including 6 dB coding gain when FEXT's are present. It indicates that Scheme PL is not acceptable due to the insufficient margin (i.e., shown as negative margin) while the margin of Scheme PH varies between 1.5 dB to 4.5 dB dependent on the sampling phase. This can be marginal in practice.

3. Decision Precursor ISI Cancellation Technique:

An investigation of the contribution of interferers shows the following distribution of equivalent RMS voltages of the interference at the receiver input: 104 mV for ISI, 35.5 mV for Echo, 4.5 mV for total NEXT and 3.1 mV for total FEXT. It indicates a large value of ISI. The Symbol-Spaced Feedforward Equalizer is supposed to remove the precursor ISI. However, it works with samples (not detected symbols) and samples contain noise (predominantly quantization noise). Therefore, the Symbol-Spaced Feedforward Equalizer is not so effective in removing the precursor ISI. In other words, there is a substantial level of residual precursor ISI at the input to the Slicer and it reduces the output SNR.

To improve further the output SNR we propose the new decision precursor ISI cancellation technique.

Figure 26:
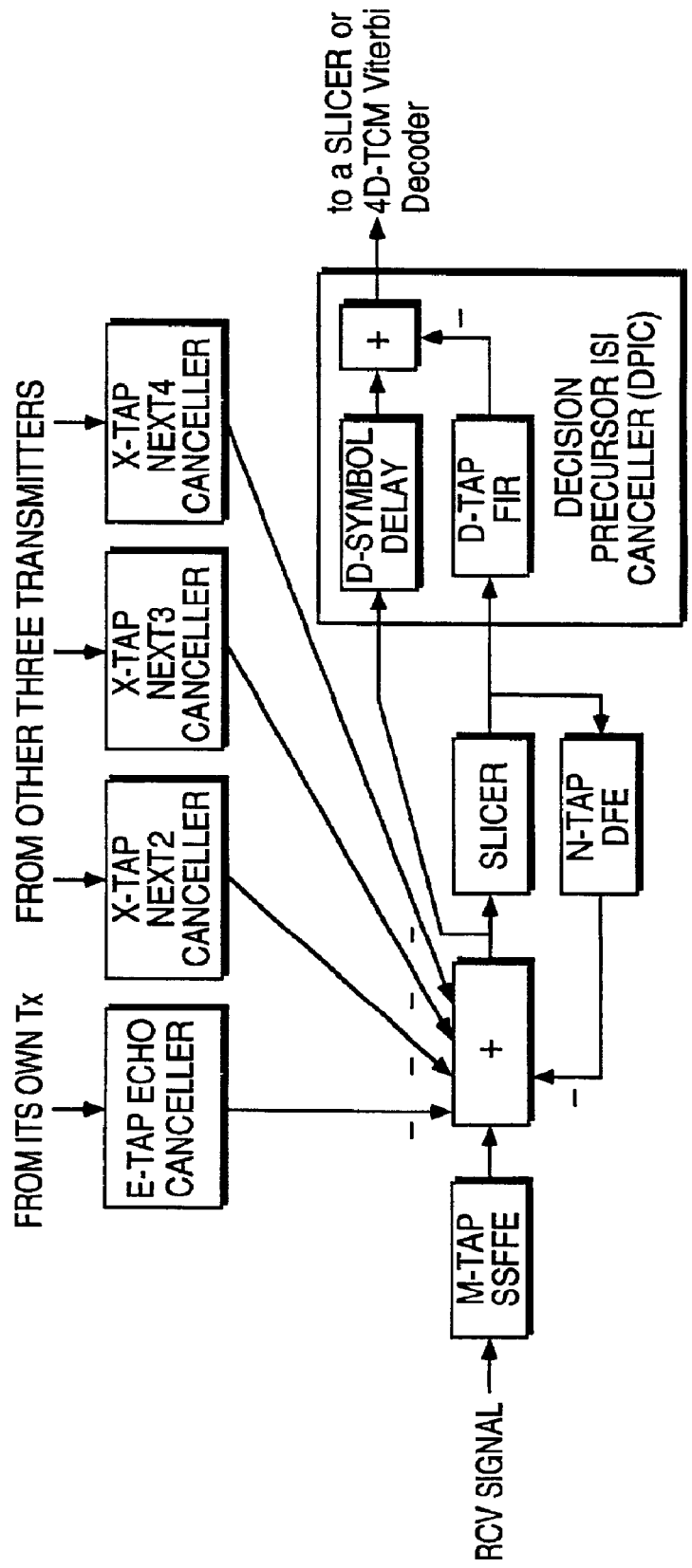
FIG. 26 is an illustration of the Improved performance DPIC architecture scheme relative 802.3ab.

FIG. 26 shows the position of the newly introduced Decision Precursor ISI Canceller (DPIC). The DPIC makes use of the D detected symbols from the output of the Slicer to estimate the precursor ISI which still exists at the input sample of the Slicer. The estimation of the residual ISI value is done by a D-tap Finite Impulse Filter (FIR). This D-tap FIR has the same structure as the DFE or the Echo or NEXT canceller except the values of the coefficients. Since it calculates, A D-symbol delay element is used to keep the DT-delayed sample, from which the corresponding residual precursor ISI computed by the D-tap FIR is removed.

The DPIC has a simple structure with D-symbol delay (or a memory of D locations) and a D-tap FIR. The value of D is small. We consider a DPIC with D=10 or 12 in the following schemes:

SCHEME IL: ONE 50-TAP ECHO CANCELLER, THREE 12-TAP NEXT CANCELLERS, SYMBOL-SPACED 12-TAP PFE, 10-TAP DFE(and ADC with effective 48 levels) and ONE 10-TAP DECISION PRECURSOR ISI CANCELLER. (i.e., SCHEME PL with DPIC)

SCHEME IH: ONE 121-TAP ECHO CANCELLER, THREE 72-TAP NEXT CANCELLERS, SYMBOL-SPACED 16-TAP FFE, 12-TAP DFE (and ADC with effective 96 levels), and ONE 12-TAP DECISION PRECURSOR ISI CANCELLER. (i.e., SCHEME PH with DPIC)

It can be seen that Schemes IL and IH are actually the improved versions of Schemes PL one 10-tap DPIC and PH with one 12-tap DPIC, respectively.

FIG. 25 shows the performance of Schemes IL and IH as compared to Schemes PL and PH. We observe from FIG. 25 the following:

The performance of both new Schemes IL and IH is robust, insensitive to the sampling phase.

Both new Schemes IL and IH provide positive margins.

The new Scheme IL provides a margin of 4 dB while the currently proposed Scheme PH has a worse performance than new Scheme IL except for the timing phases of 10T/16 to 15T/16 where Scheme PH is better by at most 0.5 dB. Note that the complexity of currently proposed Scheme PH is much higher than that new Scheme IL as shown in Table 1 (3 times).

The new Scheme IH provides a large margin of 8 dB (including 6 dB from the 4D-TCM Viterbi Decoder) or a performance improvement of 4 dB over the currently proposed design. This implies that without 4D-TCM and complex Viterbi Decoder, the new Scheme IH still provide 2 dB margin. In other words, the 4D-TCM and complex Viterbi Decoder can be dropped for cost and simplicity, or the new DPIC technique can be used in conjunction with 4D-TCM and complex Viterbi Decoder for high performance and longer distance, or higher capacity.

TABLE 1

Complexity of PL, PH, IL, and IH

|  | currently proposed Scheme PL | currently proposed Scheme PH | new, improved Scheme IL | new, improved Scheme IH |
|---|---|---|---|---|
| Echo Canceller (using symbols): | 50 taps | 121 taps | 50 taps | 121 taps |
| NEXT Cancellers (using symbols): | 3 × 12 taps | 3 × 72 taps | 3 × 12 taps | 3 × 72 taps |

TABLE 1-continued

Complexity of PL, PH, IL, and IH

| | currently proposed Scheme PL | currently proposed Scheme PH | new, improved Scheme IL | new, improved Scheme IH |
|---|---|---|---|---|
| FFE (using samples): | 12 taps | 16 taps | 12 taps | 16 taps |
| DFE (using symbols): | 10 taps | 12 taps | 10 taps | 12 taps |
| DPIC (using symbols): | | | 10 taps | 12 taps |
| Delay element | | | 10 locations | 12 locations |
| Total no. of taps using symbols: | 96 taps | 349 taps | 106 taps | 361 taps |
| Total no. of taps using samples: | 12 taps | 16 taps | 12 taps | 16 taps |
| TOTAL NO. OF TAPS: | 106 taps | 361 taps | 116 taps | 371 taps |

4) Detailed Method Steps of the Combination ("DPIC-FSFFE")

Figure 27:
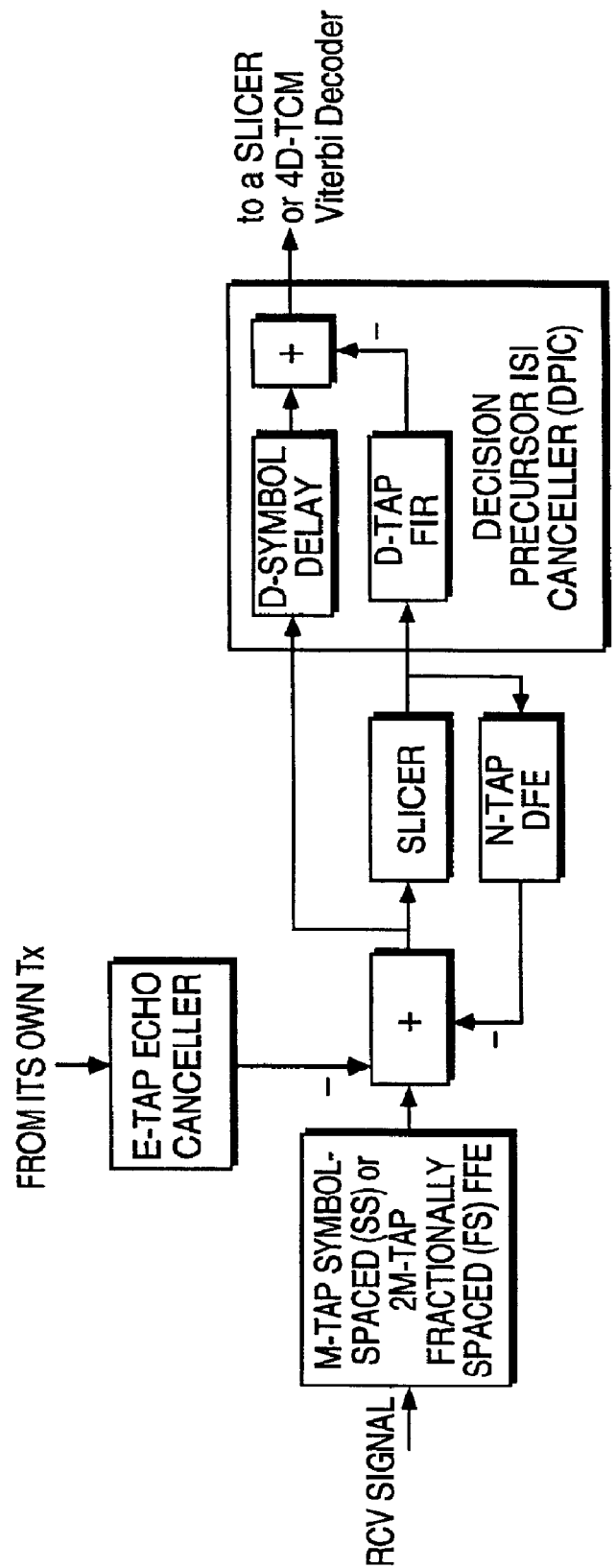
FIG. 27 is an illustration of the Improved Performance DPIC architecture without NEXT.

DPIC can be used with FFE (Fractionally Spaced or Symbol Spaced) plus DFE plus Echo Canceller to obtain an excellent performance without NEXT Cancellers as shown in FIG. 27 below.

We consider 3 more schemes, ILE(T), IHE(T) and IHE(T/2) using the structure shown in FIG. 27. ILE(T) and IHE(T) use a Symbol-Spaced FFE while IHE(T/2) use a Fractionally Spaced T/2-FFE. The numbers of taps and complexity of these schemes for the Gigabit receiver are summarized in Table 2 below

TABLE 2

Complexity of various schemes

| | CURRENTLY PROPOSED | | OUR SCHEMES WITH NEXT CANCELLERS | | OUR SCHEMES WITHOUT NEXT CANCELLERS | | |
|---|---|---|---|---|---|---|---|
| | PL | PH | IL | IH | ILE(T) | IHE(T) | IHE(T/2) |
| Echo Canceller (using symbols): | 50 taps | 121 taps | 50 taps | 121 taps | 50 taps | 121 taps | 121 taps |
| NEXT Cancellers (using symbols): | 3 × 12 taps | 3 × 72 taps | 3 × 12 taps | 3 × 72 taps | | | |
| FEE (using samples): | 12 taps | 16 taps | 12 taps | 16 taps | 12 taps | 16 taps | 32 taps |
| DFE (using symbols): | 10 taps | 12 taps | 10 taps | 12 taps | 10 taps | 12 taps | 12 taps |
| DPIC (using symbols): | | | 10 taps | 12 taps | 10 taps | 12 taps | 12 taps |
| Delay element: | | | 10 locations | 12 locations | 10 locations | 12 locations | 12 locations |
| Total no. of taps using symbols: | 96 taps | 349 taps | 106 taps | 361 taps | 70 taps | 145 taps | 145 taps |
| Total no. of taps using samples: | 12 taps | 16 taps | 12 taps | 16 taps | 12 taps | 16 taps | 32 taps |

The performance in terms of margin (including the 6 dB from the Viterbi decoder is shown below:

MARGIN [dB]

| | PL | IL | PH | IH | ILE(T) | IHE(T) | IHE(T/2) |
|---|---|---|---|---|---|---|---|
| 6 | 0.59 | 3.94 | 4.00 | 7.83 | 3.47 | 6.56 | 7.84 |
| 2 | −0.03 | 3.89 | 3.35 | 7.80 | 3.37 | 6.49 | 7.88 |
| 4 | −0.93 | 3.84 | 2.40 | 7.78 | 3.31 | 6.45 | 7.91 |
| 6 | −1.55 | 3.83 | 1.49 | 7.80 | 3.30 | 6.48 | 7.93 |
| 8 | −0.53 | 3.87 | 2.66 | 7.87 | 3.35 | 6.55 | 7.95 |
| 10 | 0.45 | 3.93 | 3.99 | 7.94 | 3.45 | 6.67 | 7.96 |
| 12 | 0.86 | 3.97 | 4.40 | 7.99 | 3.54 | 6.78 | 7.97 |
| 14 | 0.89 | 3.97 | 4.38 | 7.99 | 3.55 | 6.81 | 7.98 |

Figure 28:
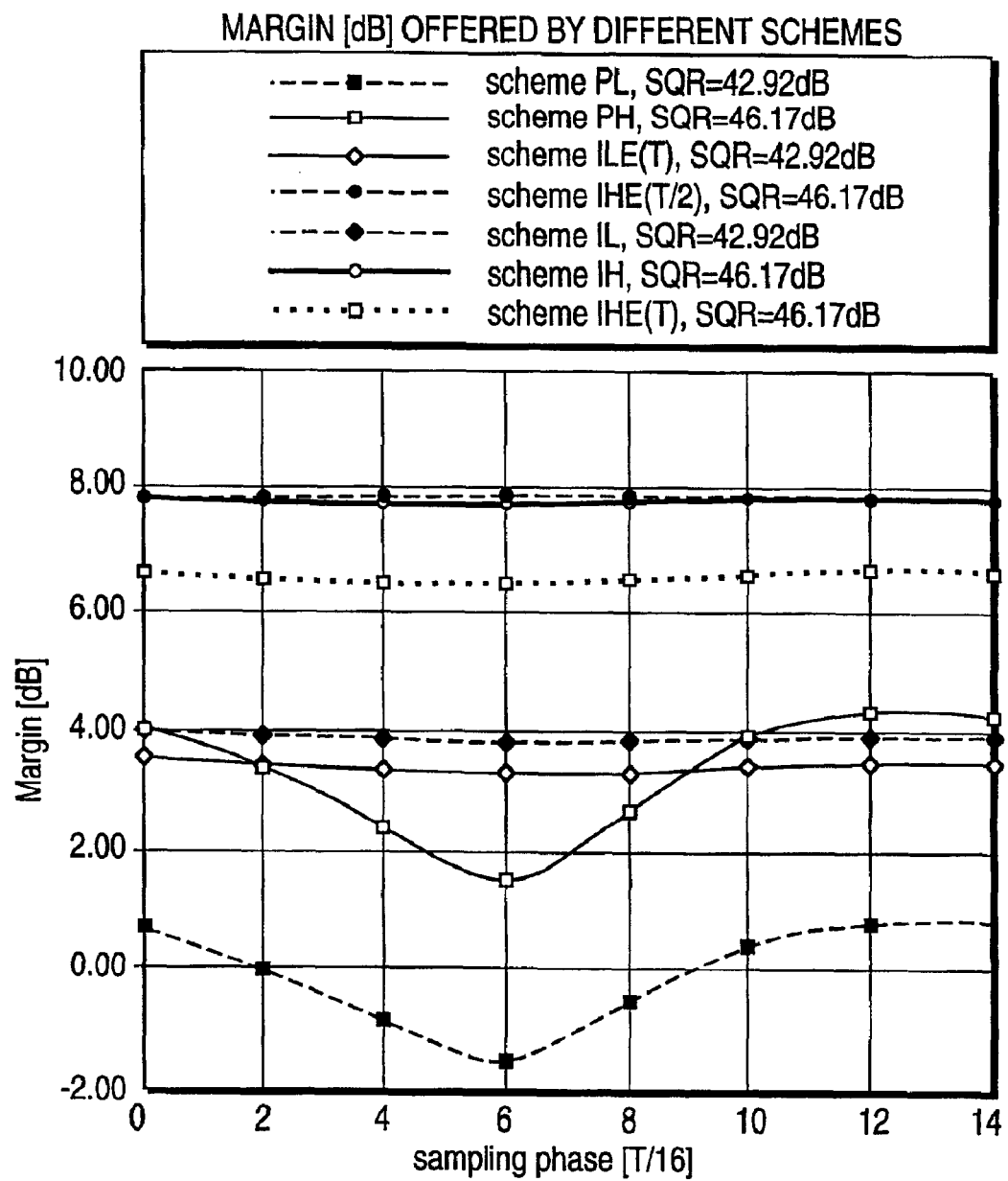
FIG. 28 is an illustration of the Margin offered by various architecture schemes relative 802.3ab.

FIG. 28 indicates the best performance with a margin (including Viterbi decoder) of 8 dB offered by our introduced schemes IH and IHE(T/2). From Table 2, Scheme IHE(T/2) only needs 145 "symbol" taps and 32 "sample" taps. The number of "symbol" taps is about 1.4 times larger than that of Scheme IL and still less than 0.5 that of the currently proposed scheme PH. Scheme IHET/2) needs a 32-tap T/2-spaced FFE operating at twice the symbol rate. Compared to IHE(T/2), the performance of IHE(T) is about 1 dB worse. However, Scheme IHE(T) uses a 16-tap Symbol-Spaced FFE operating at the symbol rate as the currently proposed PH. Scheme IHE(T) provides a significant improvement in both performance and complexity as compared to the currently proposed scheme PH (called "10 dB margin design): 2.4 dB better in performance and 42% of the complexity.

5) Detailed Method Steps of the "DPIC-FSFFE" on HDSL2

This application disclosed some of the potential applications of the DPIC to xDSL (Digital Subscribed Loop) to enhance the transmission performance without affecting the proposed coding standards. For illustrative purposes, the HDSL and SHDSL (or HDSL2) are used in the following discussions.

HDSL is an extension of DSL based on the same 2B1Q baseband line coding to provide 2-pair repeaterless T1/E1 symmetric service. The transmission throughput improvement of HDSL over DSL is due to shorter CSA (Carrier Serving Area) operation range instead of that defined by all non-loaded loops.

The critical issues were that the required performance would include a BER of 1E-7 and that the margin used in theoretical and simulation studies would be 12 dB, while the margin on a measured piece of equipment need only be 6 dB. The crosstalk model has a NEXT loss of about 57 dB at 80 kHz and decreases at about 15 dB per decade for frequencies above about 20 kHz.

Early study results indicated that single-pair HDSLs using modified basic access technology would have a range of about a mile, or 5.3 kft at 1.544 Mb/s. At 800 kb/s, it performs satisfactorily on most CSA loops, but would have only 6 dB (theoretical) margin on the lossiest loop in a population of CSA loops. IT was found that performance is not enhanced by increasing the length of the symbol-spaced feedforward equalizer (in a configuration using DFE) more than 9.

Measured results indicated a margin of 3.7 dB on a 12 kft, 24-AWG loop for a full-duplex 772 kb/s system using 2B1Q. Margins of greater than 6 dB on some CSA loops for a half DS1 rate 2-pair simplex system with simulated crosstalk noise were achieved.

Study for single-pair HDSL (SHDSL) was proposed by Metalink at the June 95 T1E1.4 meeting based on the claim that a 6 dB margin could be achieved with coded 16PAM on 5 CSA test loops for 10.6 kft/24-AWG and 7.7 kft/26-AWG. Coded 64-CAP can also provide a slightly shorter distance.

On CSA 12 kft 24-AWG loop, coded 16PAM and coded 64QAM offer a margin of 3.1 dB and 2.9 dB, respectively. On CSA 9 kft 26-AWG, both coding schemes provide only 1.9 dB of margin.

At the December 1997 T1E1.4 meetings, the basics of an HDSL2 standard were agreed and include the following recommendations Performance margin of 5 dB on all CSA loops (measured by increasing the crosstalk noise until a BER of 1E-7 is reached).

Use of asymmetrical Tx power spectrum OP'NS (Overlapped PAM Transmission with Interlocking Spectra)

Use of a programnmable encoder for rate-¾, 512-state trellis codes for 5.1 dB of coding gain.

Figure 29:
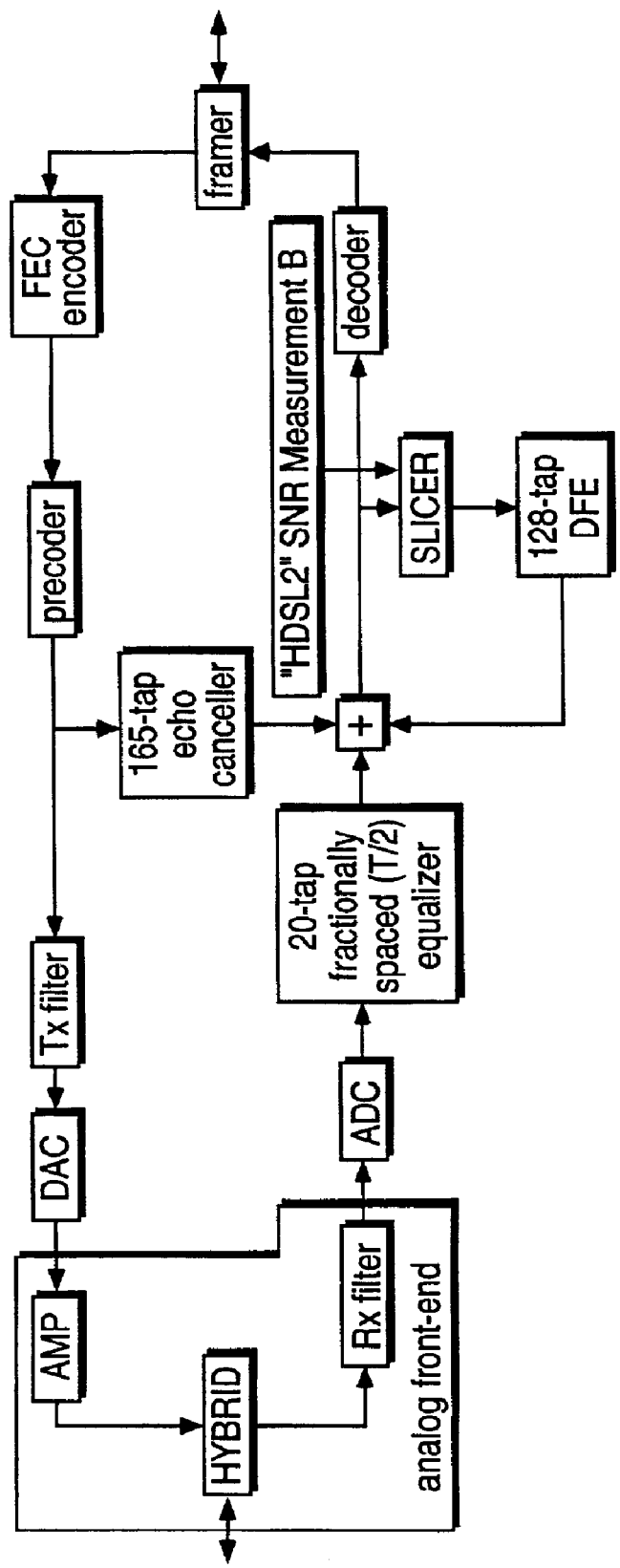
FIG. 29 is an illustration of the current HDSL2 architecture schemes.

FIG. 29 shows the currently proposed transceiver structure for SHDSL. The symbol timing recovery is not shown in this figure. The receiver includes a 20-tap fractionally spaced (T/2) equalizer, an 128-tap DFE and an 165-tap symbol-spaced echo canceller.

Figure 30:
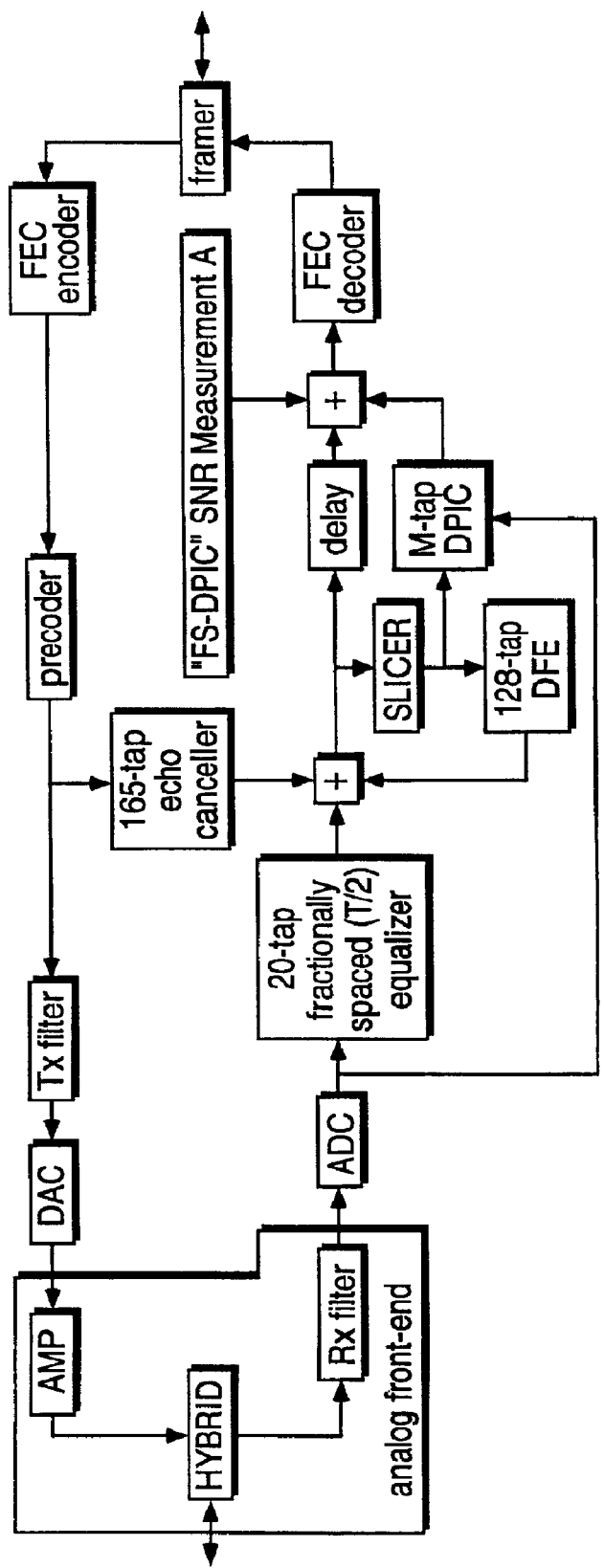
FIG. 30 is an illustration of the Improved Performance DPIC architecture scheme relative HDSL2.
Figure 31:
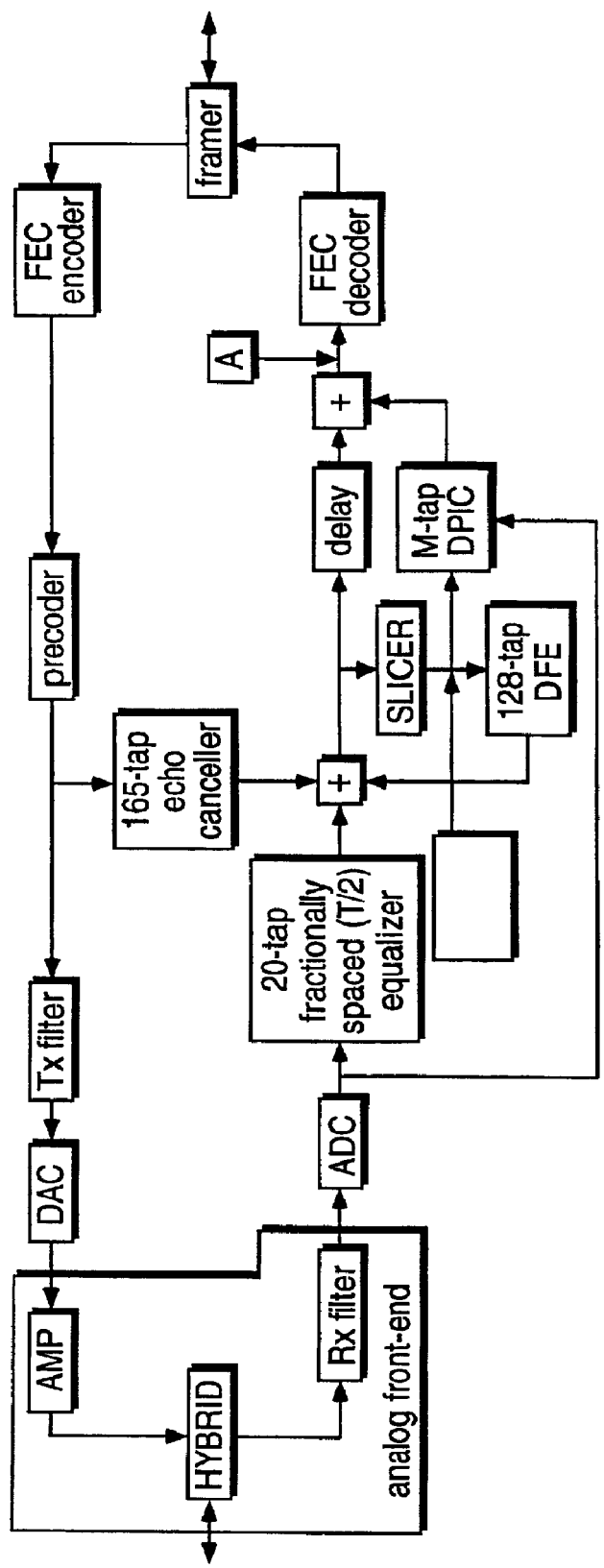
FIG. 31 is an illustration of the Improved Performance DPIC architecture scheme Measurement Pt.

As discussed above, the performance margin is very tight and a rate ¾ 512-state Trellis Code is used in order to provide 5.1 dB of coding gain required for a proper operation. It is therefore desired to enhance the transceiver performance so that a larger margin can be provided. Additional margin can be used to increase the range (distance) or Tx rate. FIG. 30 shows the proposed transceiver structure using DPIC.

Preliminary analysis shows an improvement of 3 dB in performance margin can be achieved. Further improvement is possible and under study. Schemes IHE(T) or IHE(T/2) are applicable to xDSL to improve the performance of the current xDSL. Especially, the Scheme IHE(T/2) use a Fractionally Spaced FFE to suppress the NEXT's and FEXT's as NEXT and FEXT cancellation is not possible in the environment of xDSL. The specific and salient point of our introduced scheme here is to effectively combine the fractionally spaced feed forward equalizer (FSFFE) and decision feedback equalizer (DFE) to suppress the cyclostationary interference and post-cursor ISI with the newly introduced decision precursor ISI canceller (DPIC) to remove the pre-cursor ISI.

HDSL2 Simulation Results

These results present an SNR evaluation of a uncoded HDSL2 using some enhanced equalization technique.

Data and parameters: We used the data and parameters provided by a member of T1E1 Standard Committee. −140 dBm/Hz background, 26AWG cable @9000 ft.

Assumptions: For a quick analysis, we considered the uncoded HDSL2, i.e., using PAM8 at 1.544 Mbps, in our study of three following cases:

Ideal—Case 1: Rx with infinite-length DFE for an optimum SNR: The formula in [1] is used to evaluate the SNR. This formula is widely used to evaluate the performance of DFE [2]. Numerical integration is used with PSD's discussed above and for 1.6 Mbps.

Ideal—Case 2: Rx with infinite-length DFE for an optimum SNR: The formula in [1] is used to evaluate the SNR. This formula is widely used to evaluate the performance of DFE [2]. Numerical integration is used with PSD's discussed above and for 1.544 Mbps.

Figure 32:
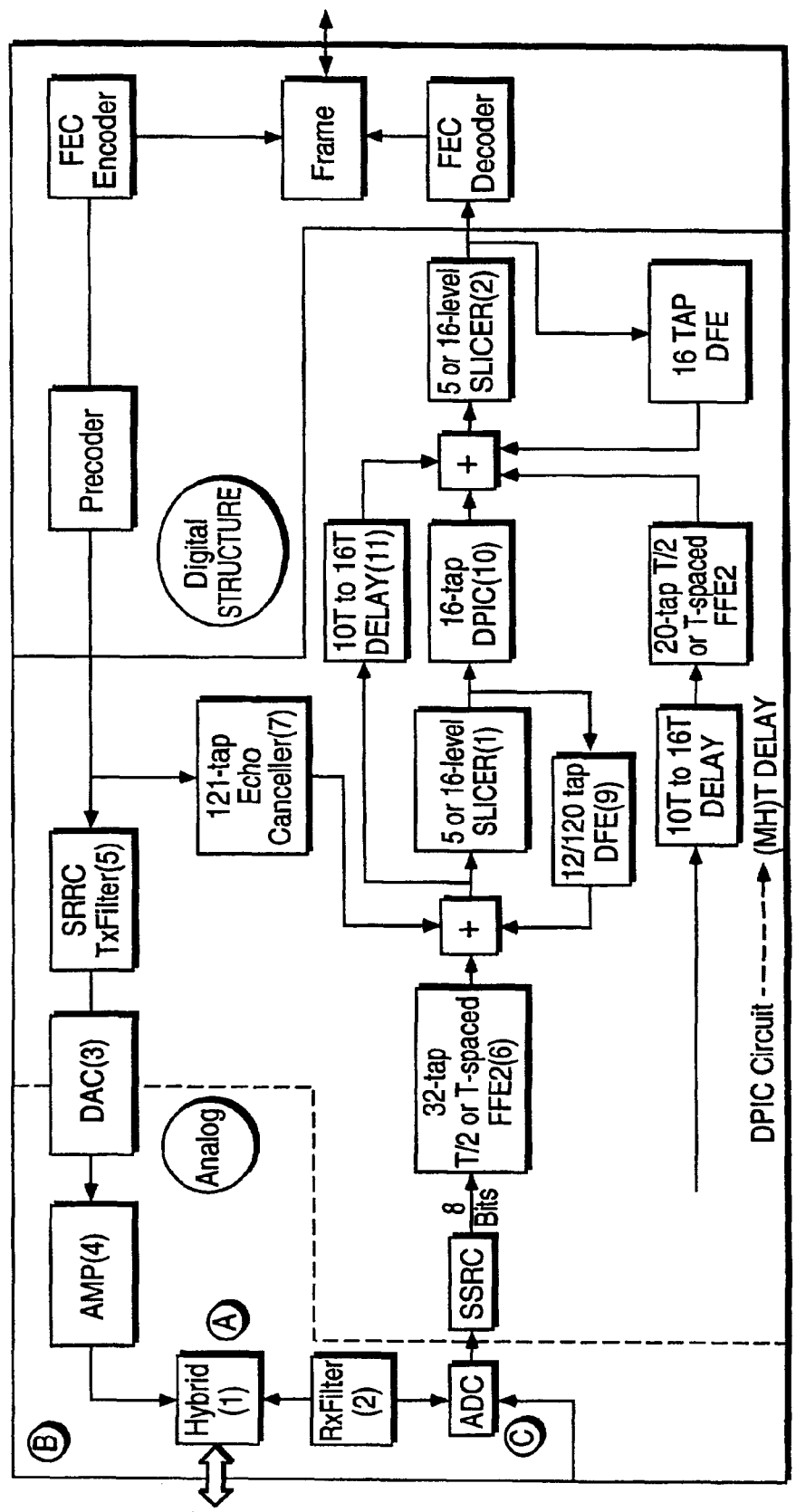
FIG. 32 is an illustration of the Improved Performance DPIC architecture scheme relative HDSL2.

Conventional Rx with 32-tap T/2-fractionally spaced FFE followed by a 12-tap,120-tap or 150-tap DFE, as illustrated in FIG. 32.

Enhanced-performance Rx made of a conventional Rx described above plus an enhanced-performance equalizer.

The SNR is calculated at the input of the slicer (decision device). We considered three following environmental situations (disturbers):

Self: 24 Self

T1: 24 Self+24 T1

DSL: 24 ADSL+24 HDSL

Results: We obtained the following analytical results for the SNR (dB):

The following references are incorporated by reference herein in their entirety:

[1] G. J. Pottie and M. V. Eyuboglu, "Combined coding and precoding for PAM and QAM HDSL systems", IEEE JSAC, vol.9, no.6, pp. 861–870, August 1991; and

[2] R. Goodson, K. Schneider, and M. Turner, "Single loop HDSL CAP/PAM Comparison", T1E1.4/95–107, 21–23 Aug. 1995.

Upstream Comparisons @ Measurement Point A&B

|  | Ideal | | Conventional - HDSL2 (B) | | | Enhanced "FS-DPIC" (A) | | |
|---|---|---|---|---|---|---|---|---|
|  | | | 12-tap | 120-tap | 150-tap | 12-tap | 120-tap | 150-tap |
|  | Case 1 | Case 2 | DFE | DFE | DFE | DFE | DFE | DFE |
| Self | 29.7 | 29.81 | 26.02 | 26.83 | 26.83 | 28.90 | 29.50 | 29.53 |
| T1 | 31.7 | 31.85 | 27.77 | 28.38 | 28.39 | 30.77 | 31.74 | 31.76 |
| DSL | 29.7 | 29.80 | 26.11 | 26.88 | 26.89 | 29.43 | 29.50 | 29.51 |

Downstream Comparisons @ Measurement Point A&B

|  | Ideal | | Conventional - HDSL2 (B) | | | Enhanced "FS-DPIC" (A) | | |
|---|---|---|---|---|---|---|---|---|
|  | Case 1 | Case 2 | 12-tap DFE | 120-tap DFE | 150-tap DFE | 12-tap DFE | 120-tap DFE | 150-tap DFE |
| Self | 36.5 | 36.81 | 30.14 | 32.01 | 32.01 | 35.37 | 36.00 | 36.00 |
| T1 | 28.8 | 28.94 | 25.13 | 26.21 | 26.21 | 28.49 | 28.51 | 28.52 |
| DSL | 38.7 | 38.78 | 32.29 | 33.92 | 33.92 | 36.65 | 37.37 | 37.38 |

Enhanced "FS-DPIC" SNR Improvement @ Measurement Point A

From the above results, we can see the improvement in terms of SNR (in dB) provided by the Enhanced-performance Rx as compared to the Conventional one is:

| FS-DPIC | UPSTREAM IMPROVEMENT | | | DOWN-STREAM IMPROVEMT | | |
|---|---|---|---|---|---|---|
|  | 12-tap DFE | 120-tap DFE | 150-tap DFE | 12-tap DFE | 120-tap DFE | 150-tap DFE |
| Self | 2.88 | 2.67 | 2.70 | 5.23 | 3.99 | 3.99 |
| T1 | 3.00 | 3.36 | 3.37 | 3.36 | 2.30 | 2.31 |
| DSL | 3.32 | 2.62 | 2.62 | 4.36 | 3.45 | 3.46 |

Assumptions: For another quick analysis, we considered the uncoded HDSL2 (as illustrated in FIG. 32 as an example.), i.e., using PAM8 at 1.552 Mbps, in our study of three following cases:

Ideal Rx with infinite-length DFE for an optimum SNR: The formula in [1] is used to evaluate the SNR. This formula is widely used to evaluate the performance of DFE [2]. Numerical integration is used with PSD's discussed above and for 1.552 Mbps.

Conventional Rx with 120-tap or 150 T/2-fractionally spaced FFE followed by a 120-tap DFE.

Enhanced-performance Rx made of a conventional Rx described above plus an enhanced-performance equalizer. The SNR is calculated at the input of the slicer (decision device). We considered three following environmental situations (disturbers):

Self: 24 Self

T1: 24 Self+24 T1

DSL: 24 ADSL+24 HDSL

Results: We obtained the following analytical results for the SNR (dB):

| | Ideal | | UPSTREAM | | | | | |
|---|---|---|---|---|---|---|---|---|
| | | | Conventional | | Enhanced | | Improvement | |
| | Case 1 | revised for 1.552M bps | 120-tap T/2-FFE | 150-tap T/2-FFE | 120-tap T/2-FFE | 150-tap T/2-FFE | 120-tap T/2-FFE | 150-tap T/2-FFE |
| Self | 29.7 | 29.81 | 27.52 | 27.64 | 29.80 | 29.80 | 2.28 | 2.16 |
| T1 | 31.7 | 31.85 | 29.16 | 29.28 | 31.84 | 31.84 | 2.68 | 2.56 |
| DSL | 29.7 | 29.80 | 27.53 | 27.65 | 29.80 | 29.80 | 2.27 | 2.15 |

| | Ideal | | DOWNSTREAM | | | | | |
|---|---|---|---|---|---|---|---|---|
| | | | Conventional | | Enhanced | | Improvement | |
| | Case 1 | revised for 1.552M bps | 120-tap T/2-FFE | 150-tap T/2-FFE | 120-tap T/2-FFE | 150-tap T/2-FFE | 120-tap T/2-FFE | 150-tap T/2-FFE |
| Self | 36.5 | 36.81 | 33.83 | 33.93 | 36.80 | 36.80 | 2.97 | 2.87 |
| T1 | 28.8 | 28.94 | 26.84 | 26.85 | 28.93 | 28.93 | 2.09 | 2.08 |
| DSL | 38.7 | 38.78 | 35.70 | 35.81 | 38.32 | 38.42 | 2.62 | 2.61 |

CENTER TAP (defined as the tap with the largest coefficient): The position of the center tap of the T/2-FFE for various cases is shown in the following table:

| | UPSTREAM | | | | DOWNSTREAM | | | |
|---|---|---|---|---|---|---|---|---|
| | Conventional | | Enhanced | | Conventional | | Enhanced | |
| | 120-tap T/2-FFE | 150-tap T/2-FFE | 120-tap T/2-FFE | 150-tap T/2-FFE | 120-tap T/2-FFE | 150-tap T/2-FFE | 120-tap T/2-FFE | 150-tap T/2-FFE |
| Self | 60 | 74 | 60 | 74 | 63 | 77 | 60 | 74 |
| T1 | 60 | 74 | 60 | 74 | 60 | 74 | 60 | 74 |
| DSL | 61 | 75 | 60 | 74 | 63 | 77 | 60 | 74 |

6) Detailed Method Steps of the "DPIC-FSFFE" on Next Gen 1553

Background

The AS1553 standard, formerly and commonly referred to as MIL-STD-1553, was introduced in the early 1970's to define a digital communications bus for the interconnection of different subsystems that were required to share or exchange information in a multi-drop configuration. Since its introduction, the AS1553 standard has been evolving to incorporate functional and user community enhancements. However, the basic communications and architectural characteristics of the bus have not varied from its original release. Message-based communications over the multi-drop bus make use of the Manchester II bi-phase coding for 1 Mb/s transmission in a half-duplex mode over Twisted-Shielded Pair (TSP) with 90% shield coverage. The largest message is 32 word long where a word has 20 bits. Transmission performance is specified for a word error rate (WER) of $10^{-7}$ or better for an equivalent worst-case Additive White Noise (AWG) of 140 mVrms in a bandwidth from 1 kHz to 4 MHz, and a signal level of 2.1 Vpp.

Problem:

Over the last 2 years, the Society of Automotive Engineers (SAE) Avionics Systems Subcommittee (AS-1A) has been investigating the use of different technologies to increase the data transfer capacity of existing AS1553 networks. The SAE initiated this investigation in response to a tri-service request from the United States Department of Defense (DoD). The DoD request was driven by present and projected future needs for retrofitting existing weapon system platforms with subsystems that would demand more data transfer bandwidth. The main research objective is to find a solution to support robust, deterministic, and reliable transmission at higher data transfer rates over the existing physical cable plants. The primary goal of the transfer rate is 100 Mb/s. The desirable aim is the interoperability with existing AS1553 terminals and transformer assemblies.

Some study on 100 ft-cable shows an insertion loss of 2 dB or less for frequency range from 100 kHz to 8 MHz and the insertion loss increases rapidly beyond 8 MHz. An insertion loss of 8 dB was measured at 100 MHz. A group delay variation within 3 ns was measured for frequencies from 75 kHz to 100 MHz. Other studies indicate a successful transmission of recognizable square wave of 20 MHz.

Many vendors had performed several tests on the data bus couplers to determine its operating characteristics in the high speed applications. First, Amplitudes received at Stub 8 (8 Data bus Couplers in the loop), which is the last coupler, indicate that the bus tested may operate at up to 6 MHz. Secondly, The stub cables cause little attenuation up to 10 MHz. Thirdly, The signals are subject to little attenuation in passing through couplers. Fourthly, The presence of stubs has little effect and the main cause of attenuation is believed to be the bus cable. High speed data transmission of digital data over C-17 cables requires adaptive equalization to equalize channel distortion and adaptive interference cancellation to remove both echo and crosstalk interference (NEXT's and FEXT's).

Channel distortion includes mainly amplitude distortion and delay dispersion. It causes the smearing and elongation of the duration of each symbol. In the high speed 1553 network communications where the data symbols closely follow each other, specially at multiple of hundred of megabit speed, time dispersion results in an overlap of successive symbols, an effect known as inter-symbol interference (ISI). Equalization system in concert with a synchronous communication environment alleviates the relative phase dispersion of the interfered and interfering signals that greatly reduces ISI. This is a critical factor affecting the C-17 or Mil-Std 1553 receiver performance. Interference (echo and crosstalks) is another major performance-limiting impairments on STP C-17 cables at the high-speed communication. In many systems, perfect equalization and interference cancellations are not possible and residual ISI, NEXT's and FEXT's are present at the decision device (slicer).

To deliver a robust Multi-Gigabit data stream over C-17 or Mil-Std 1553 cable, in the Advance High Speed 1553 embodiment of this system, the sources of interference and noise for a system need to be analyzed in order to provide methods of removing interference and increasing the Signal to Noise Ratio (SNR). The problem is that there may be insufficient margin in SNR for the receiver to operate reliably (at the required threshold BER) on an existing C-17 or Mil-Std 1553 cable plant. The current 1553 Receiver Design and analysis found that there is only a small SNR margin (1.0 dB) at 1 Mb/s for C-17 or Mil-Std 1553 Cable Specifications.

Figure 39A:
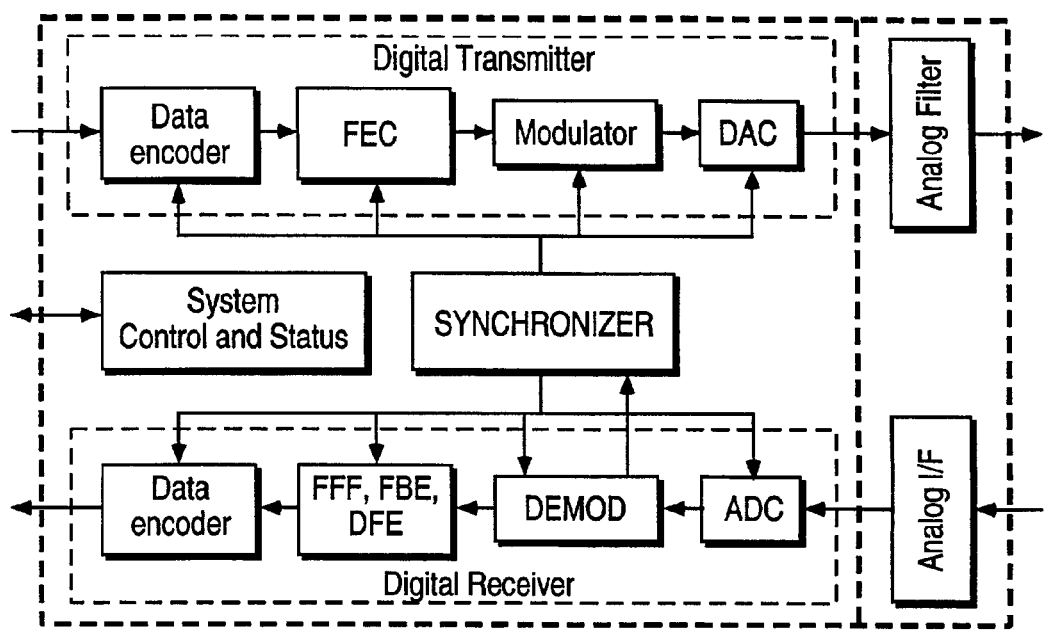
FIG. 39a is an illustration of the Newly Proposed High Level Next Generation 1553 Structure.
Figure 39B:
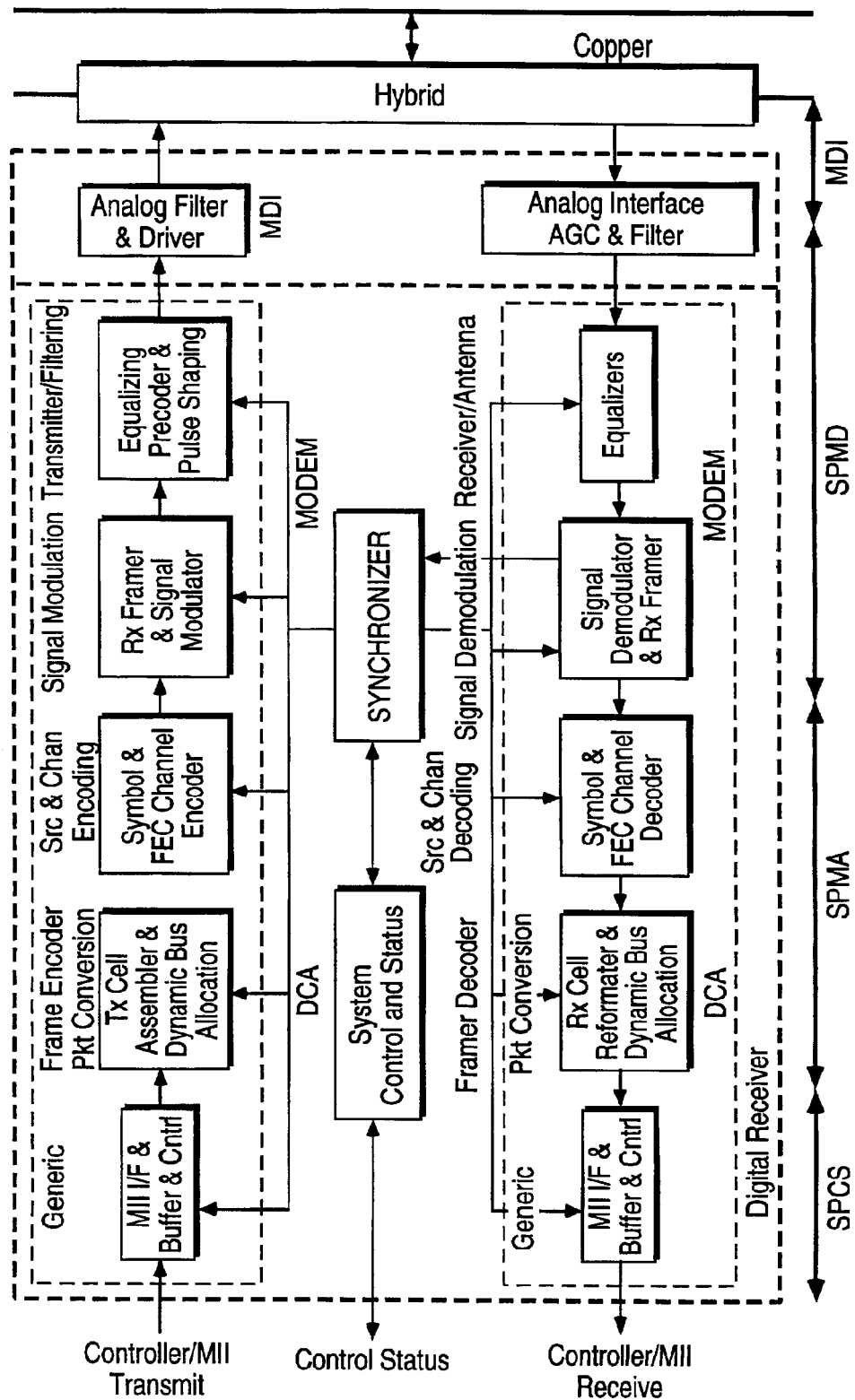
FIG. 39b is an illustration of the Newly Proposed Med Level Next Generation 1553 Structure.
Figure 39C:
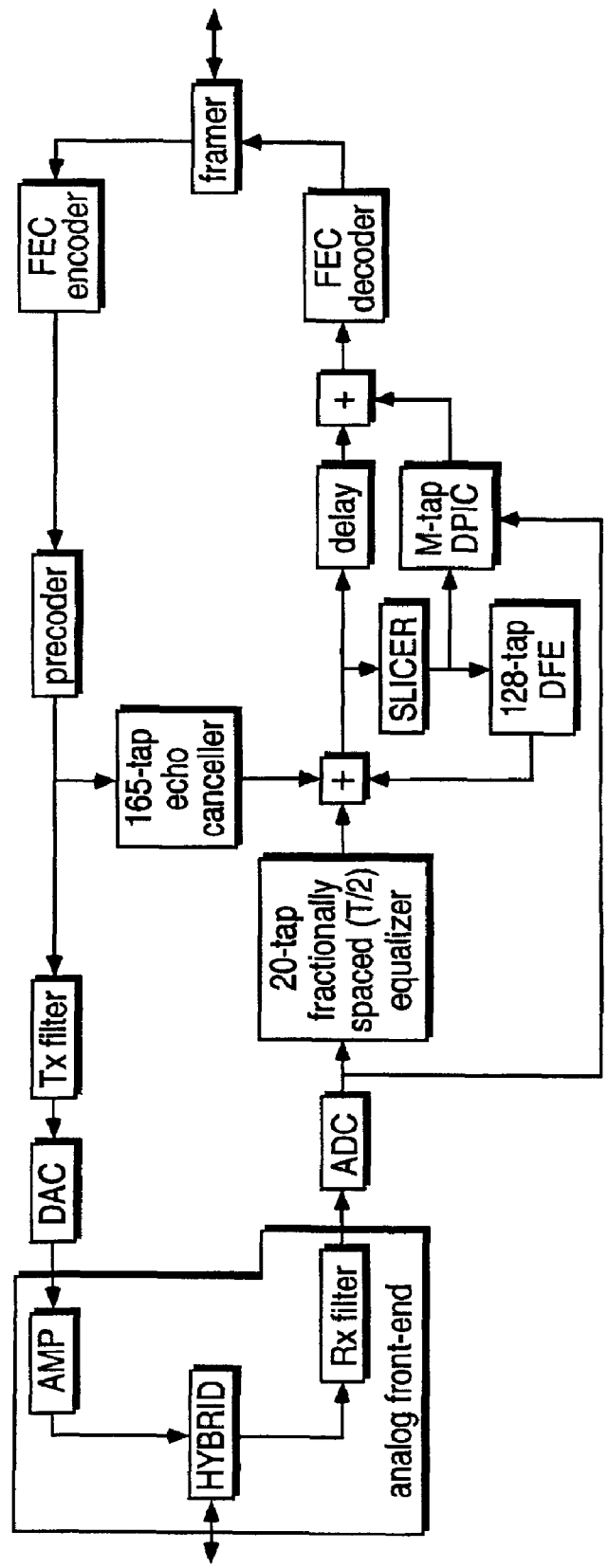
FIG. 39c is an illustration of the Newly Proposed Detail Level Next Generation 1553 Structure.

Solution:

One aspect of the present invention is the means and method of High Speed Data Transmission over existing Mil-STD-1553 wireline communications, called Next Generation 1553 utilizing the Advance Com2000™ Signal Equalization of Decision Precursor ISI Canceller (DPIC), and Advance Com2000™ Signal Coding Quadrature Amplitude Modulation (QAM-16) with the emphasis of backward compatible with existing Mil-STD-1553 standard (As illustrated in FIGS. 39*a*, 39*b*, 39*c*).

The above discussions indicate that it is desired to find advanced signaling techniques for high-speed data transmissions over the multi-drop bus using the existing MIL-C-17 Cable. For this purpose, we proposed the Next Generation 1553 coding scheme for the enhanced 1553 Standard to support new terminals with data rate up to 100 Mb/s using enhanced coupler. The Next Generation 1553 also provides the interoperability with existing low-speed AS1553 terminals at rate 1 Mb/s using the existing AS1553 transformer assemblies.

As discussed in the previous section, the cable channel has a severe frequency-selective attenuation at frequencies beyond 1 MHz, which limits the transmission at higher rate. The transmission using Manchester coding is limited by the bandwidth of 1MHz in which the attenuation is relatively flat. However, by using the present inventions' equalization techniques and advanced combined coding and modulation schemes transmission at 100 Mb/s or above is possible.

At first, we propose to use the baseband bandwidth up to 30 MHz. Based on the previously mentioned study on 100 m-cable, the insertion loss variation is about 2 dB, i.e., the frequency-selective attenuation has a depth of 2 dB. Our DPIC equalization technique will be used to remove the inter-symbol interference and crosstalk due to such frequency-selective attenuation. Furthermore, adaptive equalization will be applied to adapt to a particular bus in use.

Secondly, for a larger bandwidth in use, multi-level modulation combined with advanced coding schemes are proposed to enhance both the bandwidth and power efficiencies. Multi-level modulation such as Quadrature Amplitude Modulation (QAM-16) will increase the bandwidth efficiency required to support transmission of 100 Mb/s over a bandlimited channel of up to 30 MHz. However, it will require higher signal level to maintain the WER of $10^{-7}$ for the specified noise floor.

Note that a specified noise floor of 140 mVrms in a frequency range from 1 kHz to 4 MHz is equivalent to 383 mVrms in a frequency range from 1 kHz to 30 MHz. In other words, the use of multi-level modulation scheme for high bandwidth efficiency alone will require a much larger signal level to maintain the same WER of $10^{-7}$, especially when the bandwidth is also increased.

In order to reduce the signal level, a combined power-efficient coding and modulation must be used. However, such a combined coding and modulation technique must take into account the frequency-selective attenuation of the cable. For this end, we propose a new signaling scheme 100 Mb/s 1553+ that combines our breakthrough modulation, coding and advanced equalization for noise suppression to achieve a high performance and high capacity suitable to support 100 Mb/s over the existing MIL-C-17-Cable.

Next Generation 1553 signaling scheme for 100 Mb/s speed does not require new coupler. However, Next Generation 1553 signaling scheme for 300+ Mb/s requires a new coupler for higher data throughput, additional stub wiring would also need to be added to power the couplers. When Next Generation 1553 transmit and receives in 1 Mb/s and 100 Mb/s speed, the current legacy passive coupler supports the new transceiver chip operations. However, when one wants higher throughput and bandwidth (300+ Mb/s), an active coupler, which is provided power by the new Next Generation 1553 node via a new stub wire, are required. Some of challenges such as additional power requirements, cooling concerns, as well as system reliability are addressed.

1553 Simulation Results

Figure 33A:
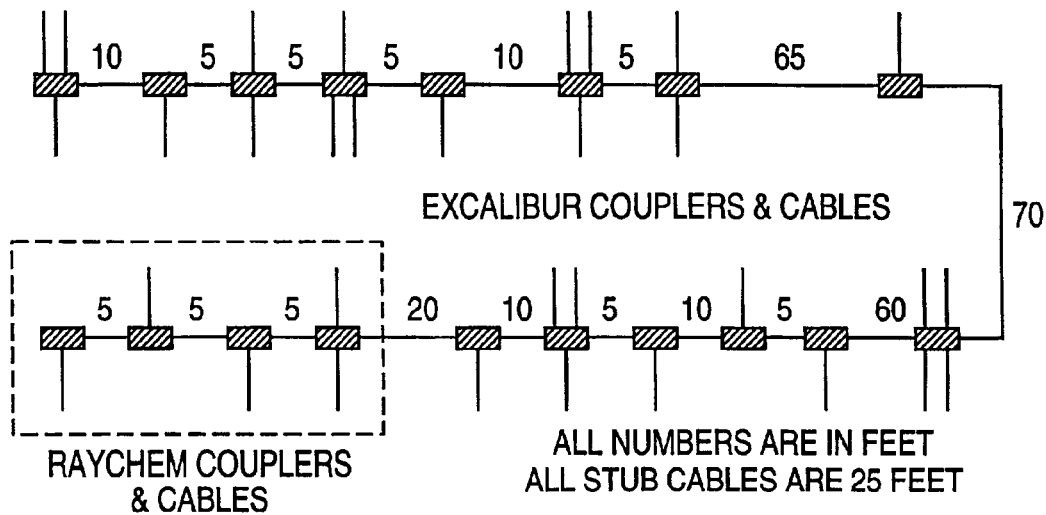
FIG. 33a is an illustration of the Society of Automobile Engineering Delong Network architecture.
Figure 33B:
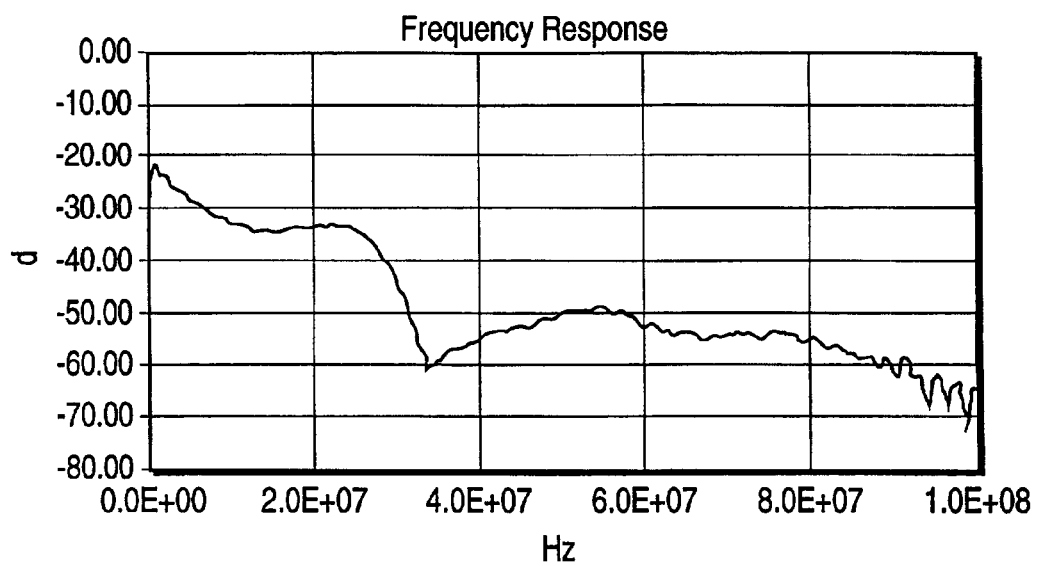
FIG. 33b is an illustration of the SAE Delong Network's Impulse Response.

Propagation Loss:

The models, as illustrated in FIGS. 33a and 33b, for the propagation loss of a loop that are presented in this section are valid for frequencies that are larger than about 500 kHz. The signals considered in this paper have a very small amount of energy below this frequency. Thus, for simplicity, we will assume that the propagation loss models discussed here are valid at all frequencies.

The transfer function H(d, f) of a perfectly terminated loop with length d can be written as follows:

$$H(d,f) = e^{-d\gamma(f)} = e^{-d\alpha(f)} e^{-jd\beta(f)} \quad (1)$$

where γ (f) is the propagation constant, α (f) is the attenuation constant, and β(f) is the phase constant. The quantity that is usually specified in practice is the propagation loss for a given cable length (e.g., d=100 meters). The propagation loss (or insertion loss) limit $L_p$ (f) for C-17 100 m cable is a positive quantity expressed in dB $$L_P(f) = -20 \log|H(1, f)|$$

$$= \frac{20}{\ln 10} \alpha(f) \approx 8.686(a\sqrt{f} + bf)$$

Figure 34:
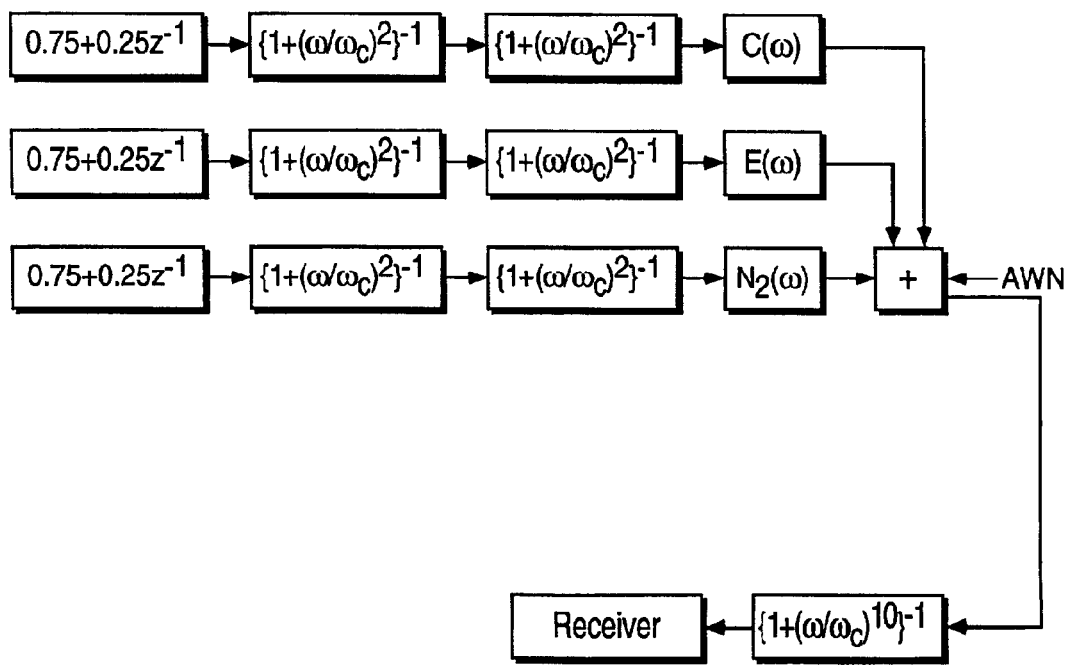
FIG. 34 is an illustration of the Delong Network for NG 1553 System Modeling for Analysis.

Channel Modeling:

FIG. 34 shows the channel model including the effects of partial response, DAC and hybrid filtering in the transmitter, the main and coupling channel characteristics, and the filtering in the receiver front-end. The DAC and hybrid filtering is represented by the cascade of two identical first-order Butterworth sections with a corner frequency of 180 MHz. This introduces a 4 ns rise/fall time. The receiver front-end is modeled as a fifth-order Butterworth filter with a corner frequency of 80 MHz. The main channel, echo coupling and NEXT coupling channels are represented by C(ω), E(ω), N₂(ω) respectively. The models for the FEXT's are similar to those of the NEXT's except the coupling channels will be F₂(ω) instead of N₂(ω).

Figure 35:
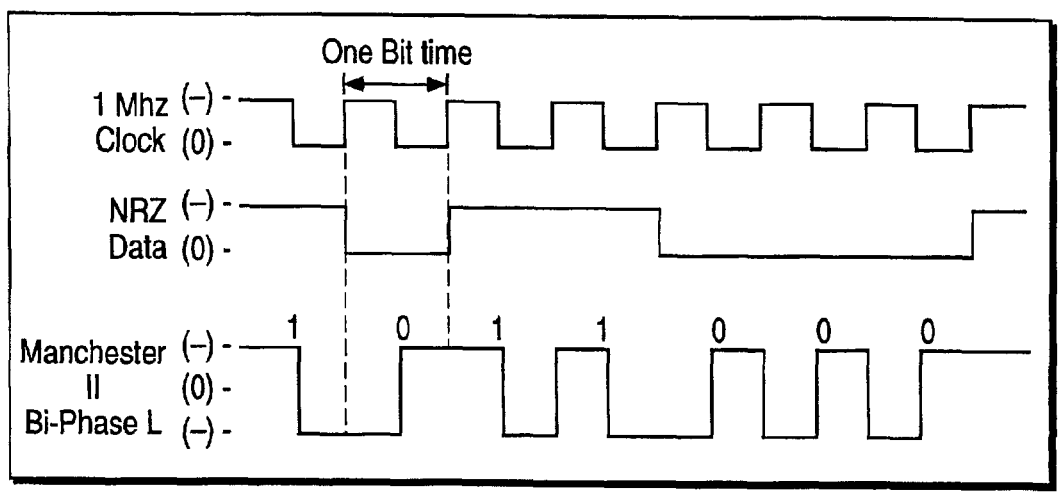
FIG. 35 is an illustration of the Current 1553 Transceiver Architecture & Data Coding Scheme.
Figure 35:
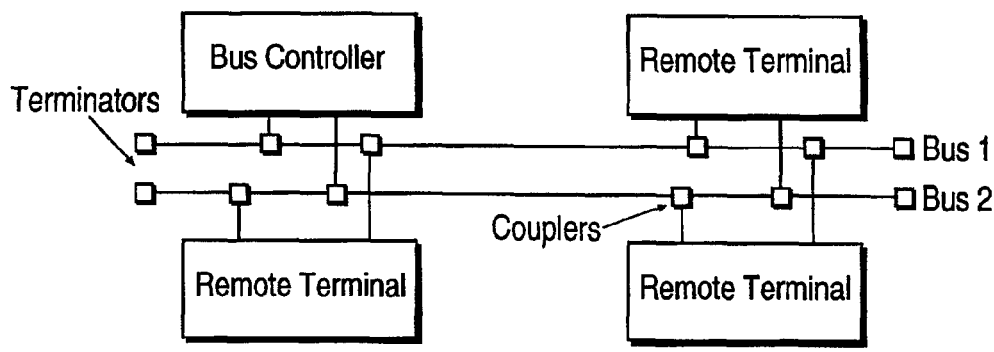

FIG. 35 shows the currently proposed transceiver structure for 1553 . The symbol timing recovery is shown in this figure. The current 1553 receiver is a standard Bi-Phase Manchester Signaling Receiver.

New 1553+ 100 Mb/s Solution

Figure 36:
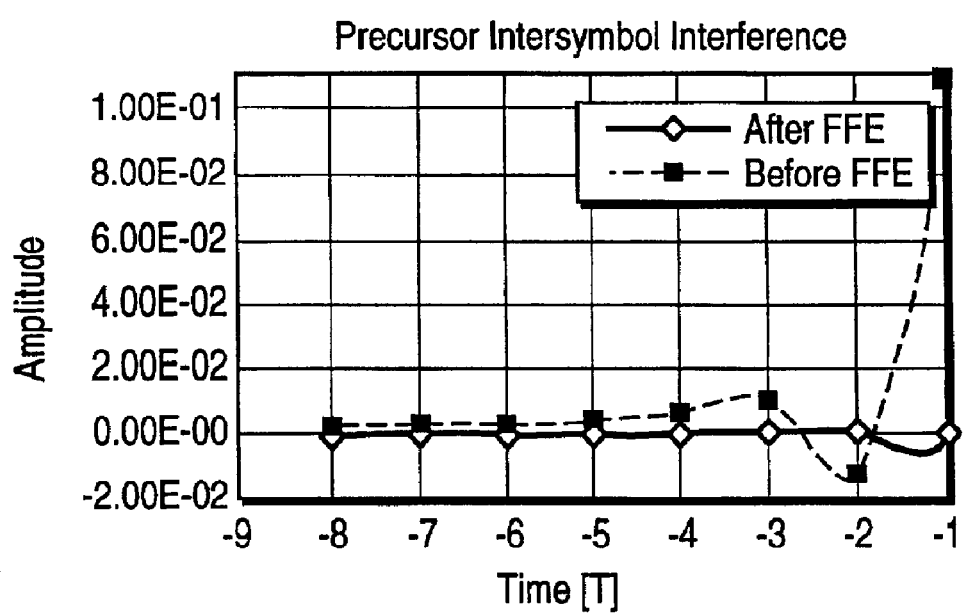
FIG. 36 is an illustration of the DPIC-FSFE application on 1553 ISI cable for Precursor.
Figure 37:
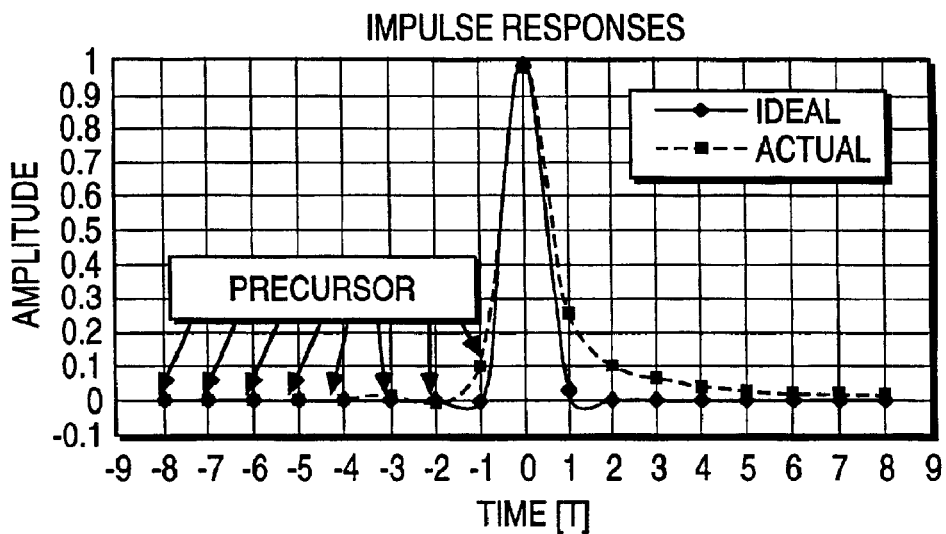
FIG. 37 is an illustration of the DPIC-FSFE application on 1553 ISI cable for Pre & Postcursor.
Figure 38:
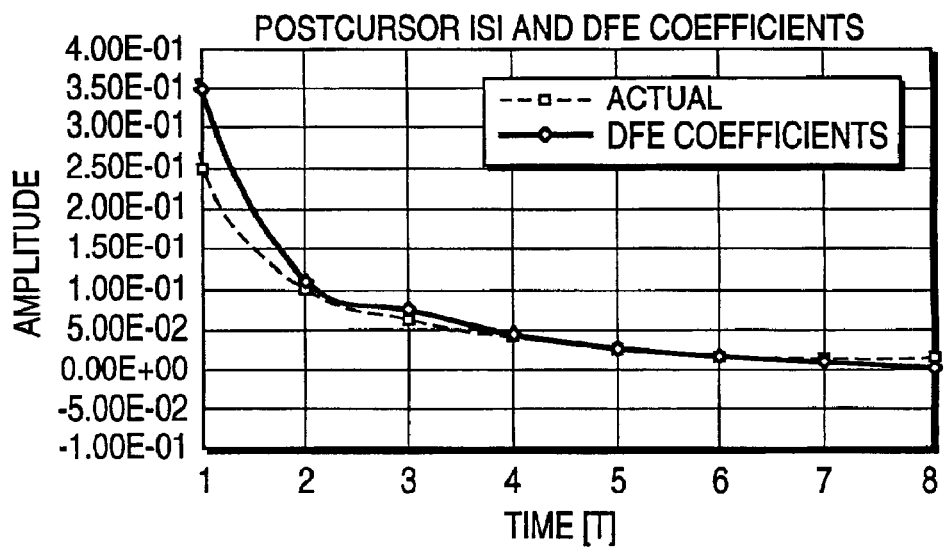
FIG. 38 is an illustration of the DPIC-FSFE application on 1553 ISI cable for Postcursor.

The new proposed 1553+ transceiver, as illustrated in FIGS. 39a, 39b, 39c with the simulation results as illustrated in FIGS. 36, 37, 38, includes a 20-tap fractionally spaced (T/2) equalizer, an 128-tap DFE and an 165-tap symbol-spaced echo canceller. As discussed above, the performance margin is very tight and a rate ¾ 512-state Trellis Code is used in order to provide 6 dB of coding gain required for a proper operation. It is therefore desired to enhance the transceiver performance so that a larger margin can be provided. Additional margin can be used to increase the range (distance) or Tx rate. FIG. 39c shows the proposed transceiver structure using DPIC.

The critical issues were that the required performance would include a BER of 1E-7 and that the margin used in theoretical and simulation studies would be 12 dB, while the margin on a measured piece of equipment need only be 6 dB. The crosstalk model has a NEXT loss of about 57 dB at 80 kHz and decreases at about 15 dB per decade for frequencies above about 20 kHz.

Early study results indicated that single-pair C-17 using modified basic access technology would have a range of about 300 ft at 4 Mb/s. At 4.0 Mb/s, it performs satisfactorily on most 1553 loops, but would have only 1.0 dB (theoretical) margin on the lossiest loop in a population of 1553 loops. It was found that performance is not enhanced by increasing the length of the symbol-spaced feed forward equalizer (in a configuration using DFE) more than 9 dB. Study for single-pair Advanced 1553 was proposed by this paper claim that a 17 dB margin could be achieved with coded Synchronous 16PAM on existing 1553 test loops for 300 ft. In this paper, the basics of the proposed Next Generation 1553 standard include the following recommendations:

- performance margin of 17 dB for 1 Mb/s speeds and 2 dB of margin on all 1553 loops (measured by increasing the crosstalk noise until a BER of 1E-7 is reached) at the speed of 300 Mb/s.
- use of symmetrical Tx power spectrum S-PAM (Synchronous Overlap PAM Transmission with Interlocking Partial Response Spectra)
- use of a programmable encoder for rate-¾, 512-state trellis codes for extra 6 dB of coding gain.

B. Increased Wireless Channel Capacity Data-General

Com2000™ Advanced Multi-Channel Equalization Technology (Com2000™ Multi-Channel DPIC) delivers the advanced parallel transmitter and receiver's adaptive filters and algorithms that model cyclostationary signals in a varying cross-talk noise channel model with the response to optimize parallel signal recovery. Our Advanced Equalization system delivers the noise suppression and cancellation schemes used to improve the Signal-to-Noise ratio (SNR) of the multi-channel system. Increasing SNR enables ultra high-speed data modulation methods that increase the channel capacity and data for every hertz of signal frequency.

1) Summary of Wireless Advanced Signal Equalization Techniques

Multi-path propagation is one of the most challenging problems encountered in a wireless data communication link. It cause signal fading, inter-symbol interference (ISI) due to channel delay spread and doppler spread due to the relative motion between receiver and transmitter. For high speed wireless communication (more than 10 Mb/s), signal fading and ISI due to the channel delay spread, are the main factors that significantly degraded the average bit error rate (BER) performance.

This section focus on Com2000™ Precision Sampling Techniques that enable a new and Advanced Equalization Techniques such as DPIC in combination with the CEBA or DA algorithms, to combat against channel delay spread or ISI. Com2000™ Advanced Multi-Channel (Diversity) Decision Precursor ISI Cancellation (DPIC) & Delays are used to combat against signal fading and the Com2000™ Advanced Clock Transfer Techniques are used to combat against the Doppler spreading issues. While the receiver diversity (Multi-Channel DPIC) is the technique to use against signal fading, while adaptive equalization (FFE/DFE) is the technique to combat ISI. The present invention includes new techniques for integrating these two techniques to simultaneously combat signal fading and ISI.

2) Detailed Method Steps (Flow chart)

An Adaptive Decision Feedback Equalizer (DFE) and DPIC can be optimized, on a symbol-by-symbol basis, using the channel-estimation based adaptation (CEBA) or Direct Adaptation (DA) algorithms. In the CEBA algorithm, the channel pulse response (CPR) is estimated, and the DFE filter coefficients are then computed from the CPR estimates.

In the DA algorithm, the DFE filter coefficients are directly computed from the received signal samples using the least square algorithm without going through channel estimations. In both algorithms, a sequence of training symbols is used for initializing the DFE and DPIC filter coefficients.

In applying the advanced equalization algorithms such as CEBA and DA, the filtered received signal must first be sampled at the proper sampling instants. When a finite impulse response filter (FIR) are used for the DFE, the decision delay must be pre-determined (This is done by Multi-Channel DPIC and Delay circuits). The optimization of the sampling instants and DFE decision delay is refereed to as the "Precision Sampling". In the determination of Precision Sampling approach, the "Sampling Delay" and the "Sampling Phase" are need to be determined.

The "Sampling Delay" is obtained using the Propagation delay measurements (CPR) and time-correlation between the sequence of the received signal samples and the transmitted training sequence. The "Sampling Phase" is obtained from the Clock Transfer using the Error Vector Measurement or EVM methods. The sampling instant or "Precision Sampling" is the sum of the "Sampling Delay" and the "Sampling Phase". It is important to optimize both of the Precision Sampling and the Decision Delays. Optimizing the "Sampling delay" alone improves the robustness of the DFE with respect to the channel delay-spread variations. Optimizing both of the "Sampling Delay" and the "Sampling Phase" provides additional performance gain for the symbol-spaced DFE's. Further more, with the "Sampling Delay" and "Sampling Phase" optimized, a Decision Delay optimization using Multi-Channel (Diversity) DPIC will increase performance in excess of 5 dB approximately at the high average SNR relative to the fixed -decision-delay DFE.

Throughout the discussion, the frequency offset between the transmitter and receiver oscillators is assumed to be negligible. The Doppler spread is significant for out door wireless systems. The Com2000™ Advanced Clock Transfers are used to combat against Doppler spreading. The Doppler spread is insignificant for indoors wireless environments.

The Com2000™ Precision Sampling System comprises a method for precisely positioning the phase sampling and measurement windows at the center of the Eye Diagram with minimal error. This system relies on the complete frequency and phase synchronization of one or more network nodes, preferably accomplished using the Clock Transfer system. The clock synchronization can be either relative or absolute and is used as one improvement to deliver a multitude of benefits, such as bandwidth and SNR improvements, ISI suppression and more data bits per frame. This technique is also possible due to the Channel Jitter Suppression and Measurement Technologies.

The Com2000™ Coherent Clock Phase and Carrier Recovery Circuits allows the Precision Sampling Technology to sample the receiving signal with a predefined phase error for a extend period of time. This is due to the fact that the crystal frequency drift and phase noise and jitter are less than the jitter caused by the VCO oscillator of the PLL circuits. This feature, therefore, also allows the increasing of the message size or number of data bits per packet load to be sent across a wireless communication channel such as TDMA packet. Through the Com2000™ Coherent Clock Phase and Carrier Recovery Circuits, the recovered carrier frequency remain a clean locked for more than 5× of the normal PLL lock.

The Precision Sampling technology is responsible to produce carrier, carrier phase, symbol timing, sampling phase synchronous vector processing receiver and other derived clock signals. We propose the scheme in which the above three main signals have their frequencies derived from one source frequency of the Reference Node or RN. Therefore, during the initialization, the RN sends a clock signal to be synchronized by all nodes. Subsequently, each node derives the carrier, symbol timing, sampling signals by adjusting only the phase (or offset timing instant).

The Com2000™ Diversity Decision Feed Back technology for Multi-Channel DPIC capitalize on the synchronous nature of the vector receiver. Conceptually, each stream of data for each channel in turn is considered to be the desired signal, and the remainders are considered as interferers. The Com2000™ Diversity Decision Feed Back technology for Multi-Channel DPIC take advantage of the non-linear alternative approach which is to exploit the signal parameters synchronization inherent in the synchronous transmit and receiver systems. The synchronous signal parameters are carrier, carrier phase, symbol timing, sampling phase synchronous vectors. As an example, using only the symbol timing synchronization, the symbol cancellation as well as linear nulling to perform the detection (This is better than the Antenna Nulling alone). Using symbol cancellation, interference from already-detected components of the symbol vector, is subtracted out from the received signal vector, resulting in a modified received vector in which, effectively, fewer interferers are present. This is similar to DFE or Decision Feed back Equalization. This technique can be applied any other or to all of the synchronization signal parameters such as Carrier Synchronization, Carrier Phase Synchronization, Sampling Phase Synchronization and others for the simultaneous transmitting signal space in Frequency (FDM, CDMA)), Phase (CDMA), Time(TDMA) and receiving vector signal processing. When one component cancellation or all of the combination of component cancellation are used, the order in which the component for each of the signal state data vector becomes important to the overall performance of the system.

Figure 40:
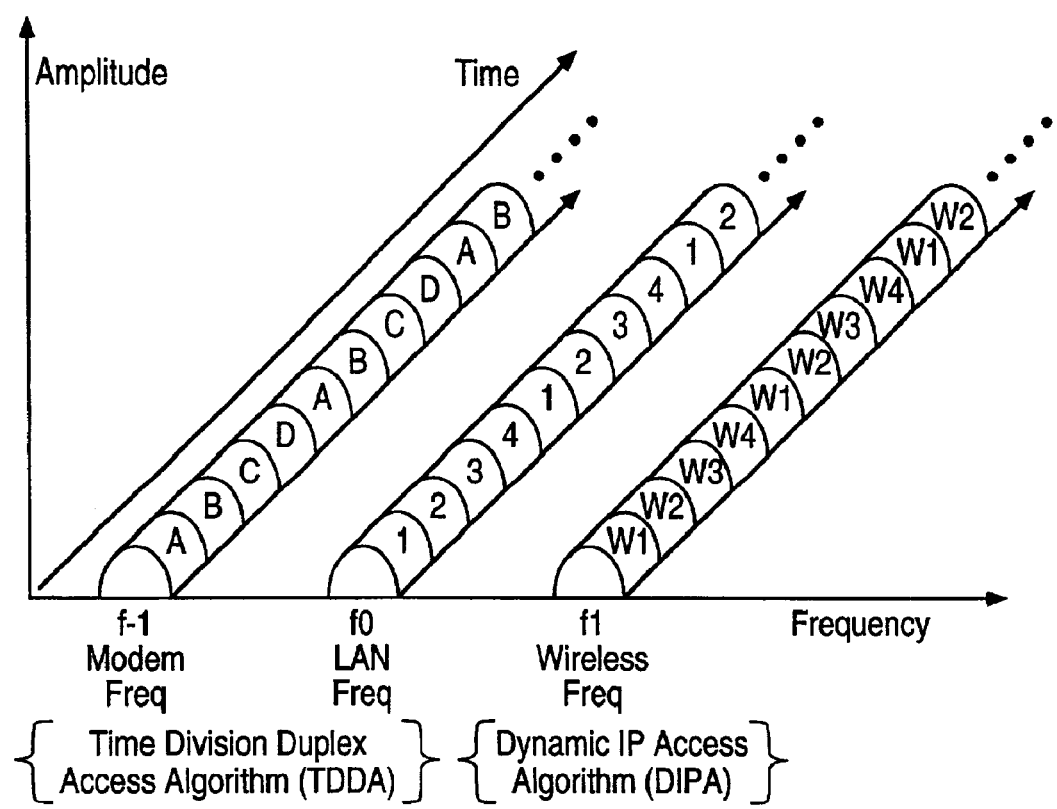
FIG. 40 is an illustration of the Newly Designed UniNet Time, Frequency Multiplexing Scheme.

As previously mention, this optimality approach will have wider applicability to multi-user, multi-quality of service cancellation based detection. The best fit scheme or Least Mean Square Error (LMS) convergence for each of the filter for the signal parameter's error cancellation is choosing at each stage of the vector detection process. Each of the cell in a parallel (vector or multi-channel) synchronous data receiver is the signal synchronization cancellation matrix cell in a parallel multi-channel data vector, and can be thought of as a 3 dimensional (Frequency, Sampling Phase, Time) with amplitude detection scheme, as illustrated in FIG. 40.

2. Universal Wireline Transport: Intelligence Technology

Figure 5:
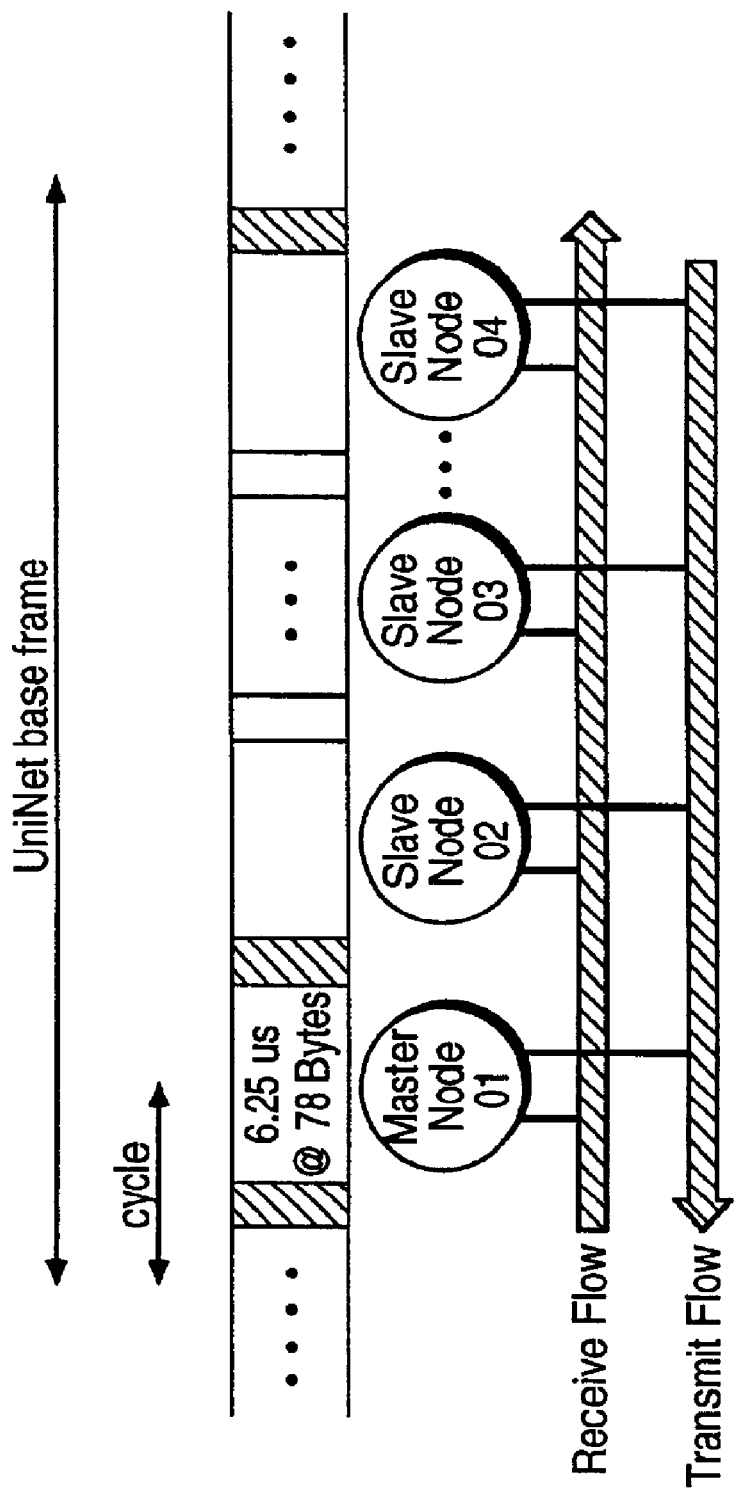
FIG. 05 is an illustration of the node access in Time Domain of UniNet Share Medium Network.

A wireless and wireline Com2000™ Multi-channel Uni-Net system, as illustrated in FIG. 05, can be described as follows. A single data stream is demultiplexed into M substreams or M multi-channels. Each substreams or channel, which behave as a point-2-point connection and has its own precoder equalizer coefficients, is then encoded into symbols and fed to its respective transmitter. Each of the channel transmitter and receiver are synchronously detected in any or combination of the following signal parameters detection processes, but not limited to: Symbol absolute carrier and symbol Phase Sampling and Timing, Symbol relative carrier and symbol Phase Sampling and Timing (Relative to the Reference Channel or substreams), Symbol Carrier Phase and Frequency Offsets (Relative to Reference Channel Carrier Phase and Frequency Offsets, etc. . . .

Each of the transmitter operate co-channel at either fractional or symbol rate 1/T symbols/sec with synchronized symbol timing, phase, frequency and others. Each transmitter is itself an ordinary QAM transmitter. The baseband symmetry is maintained for wireline by a selecting the same baud rate and the carrier frequency. For wireless, the baseband symmetry is maintained via the multi-channel complex DPIC and synchronous receivers. In parallel channel scenario, the collection of transmitters comprises, in effect, a vector-valued transmitter, where components of each transmitted vector are symbols drawn from the PAM/QAM constellation. Each of the substreams or channel has the flexibility of having different constellation, and those transmissions are organized into bursts of symbols (as illustrated in FIG. 05).

Although Comn2000™ Multi-channel UniNet is essentially a single-user system which uses multiple transmitters for each channel, one can naturally ask in what way the Com2000™ Multi-channel UniNet data modem deliver the differentiations from a simply using traditionally multiple access techniques in a single user fashion. Some of these difference are First, unlike Code Division Multiplexing Access (CDMA) scheme or other spread-spectrum multiple access techniques, the total channel bandwidth utilized in the Com2000™ Multi-channel UniNet is only a small fraction in excess of symbol rate, i.e. similar to the excess bandwidth required by the conventional QAM system. Second, unlike Frequency Division Multiplex (FDMA) scheme or other frequency hopping multiple access techniques, each transmitted signal occupies the entire system bandwidth. Finally, unlike Time Division Multiplex Access (TDMA) scheme or other time hopping multiple access techniques, Com2000™ Multi-channel UniNet uses the entire system bandwidth and which is used simultaneously by all of the transmitters all of the time, as illustrated in FIG. 40.

Com2000™ Intelligence (Modem)—Data Flow Transfer Technology, in general, utilizes a combination of the frequency division, phase division and time division duplex techniques in signal coding and latency controls to provide new and integrated solutions for next generation universal synchronous networking communications. This scheme supports legacy modulations and also as an integrated platform for 2-dimensional CDMA (Phase), TDMA (Time) and FDM (Frequency) multi-access schemes. Each of these legacy schemes, in each of the transmission domain, will be further exploited for higher data rate transfers with the help of 3-dimensional multi-access scheme and controls. However, when all of the domain are exercised for the most optimal data transfer mechanism, along with all 3-dimensional multi-access scheme's precision controls, data transfers will be further increased as the results of orthogonal signal parameters are characterized.

As an example with higher data rate applications in the new optimal phase domain alone, the Com2000™ Intelligent (Multi-Channel Signal Coding) technology allow to deliver higher data rates in a unique way from a single carrier PAM-M baseband signal frequency. The technology delivers multi-channel (phase division) network architecture that uses parallel bitstream in a novel way. It uses the non-complex or complex baseband symmetry signal with phase division multiplex coding scheme or PDM to deliver the multi-channel requirements which also meets the selected media FCC constraints, illustrated in FIG. 41 and FIG. 42 for 2 G/bs PAM5 signaling Copper Gigabit 802.3ab Example.

As in most of M-PAM or M-QAM base-band modulation scheme, the signal coding and decoding is orchestrated in a "Relative" Phase Synchronization manner. The receivers recover the clock and phase from the received signal and use it for the sample timing to recover the data. Our enhanced technique is not only to delivering the "Relative" Synchronization scheme, but it also delivers the "Absolute" Synchronization technique to enable multitude of novel ways to increase bandwidth and intelligence controls that can extend and interoperable with to the WAN networks. With the absolute and relative precision synchronization to the world frequency standard capabilities, the ordinary and single carrier frequency channel can be interpreted in a vector of channels, which can be characterized through precision phase channel measurement and calibration. Every other channel in a multi-channel media will be a non-interference channel with respect to the other channel and the selected M-PAM or M-QAM signal coding can be used to transmit over channels as in the current scheme.

A new Com2000™ data delivery architecture, as illustrated in FIG. 01, for wireline and wireless is the shared or non-shared medium access with multi-channel networks with the stringent support of synchronous and controlled environment such as SONET. To support the local network precision controls in bits, symbol, subsymbol, frame, sampling, carrier and phase timing of synchronous transceivers, the Com2000™ Intelligent (Precision Clock Transfer) technology is used to proliferate the synchronous nature throughout the UniNet communication networks. The precision clock transfer and control technology relates to stringent applications such as ITU global and local synchronization level service of SONET and telecom synchronization, as illustrated in FIG. 02.

As an example of the equivalent multi-channel optical networks based on wavelength division multiplexing (WDM), the phase domain's multi-channel wireline and wireless network utilize the optimal phase division multiplexing (PDM) for multi-channel wireline and wireless network. The Com2000™ Intelligent (Precision Sampling) technology enables to the precision sample of the signal in any combination of the Time (Multi-Time Slot sampling), Phase (Multi-Channel Phase sampling) and Frequency (Multi-Carrier sampling) signal spaces, as indicated in the FIG. 05.

Let us take a look at a higher level of UniNet intelligence technology. Today Network carrier is a lot like an airline business. You buy all these jumbo jets and you make sure that all the seats in that jet are full. The goal is to make sure the network is full all the time. All traffic today is delivered via cargo class, but emerging needs such as voice and video traffic will require higher priority and must be upgraded to first class. With this capability, it also allows to monitor which traffic moves in which class, and charge higher rates for better service. The carriers want to find ways to extract more revenue, and we are going to provide that capability of offer different tiers of network service. The carrier would also be able to have more intelligence about what their customers are doing with the network, so they could have separate billing for voice traffic or for Internet traffic.

Com2000™ Intelligence—QoS Transfers technology again utilizes a synchronous and controlled environment via a precision clock transfer and controls resident at the edge and the core of the network, to deliver universal and next generation synchronous, isochronous and asynchronous integrated data services or a novel Synchronous and Distributed Switching and Routing method in local LAN network or WAN networks, as shown in FIG. 01. This precision controlled synchronous clock transfer technology is not only enables the physical layer to communicate in increased speeds with a high capacity over a intelligence controlled signaling of multi-channel and shared medium access, but also to provide a basis for true quality of service, or Hard QoS that can be extended into the current telecom backbone, as shown in FIG. 02. This can fundamentally be interpreted as a universal transport mechanism for integrated services that seamlessly maps into and out of any new or current and legacy data corn and telecom protocols. These protocols include ATM, SONET, Frame Relay, and T1/E1, etc,. from the telecom services and IP networking protocols for Internet such as TCP/UDP from data communications. In short, this universal transport protocol mapping covers across the QoS spectrum from a very stringent circuit like requirement to a very unreliable data deliver such as current packet switching method. As an example, the QoS service is also applicable to very stringent synchronous services such as SONET, loosely isochronous services such as ATM and Frame Relay, etc, and best effort asynchronous data services such as Internet IP protocols. Com2000™ Intelligence technology, is a highly integrated networks, which are set out to address and resolve the following networking issues:

1. Com2000™ Intelligence technology address and resolve the real-time guarantees, e.g., bounded end-to-end delay and bounded delay variations (jitter);
2. Com2000™ Intelligence technology address and resolve the Multicast, i.e., sending data from one sender to many receivers;
3. Com2000™ Speed technology address and resolve the High capacity over any media and any topology;
4. Com2000™ Speed & Intelligence technology address and resolve the Bandwidth on demand service, i.e., providing a multi-rate service;
5. Com2000™ Intelligence technology address and resolve the Transaction support, for example support for bursts of messages with short access delay;
6. Com2000™ Intelligence technology address and resolve different types of traffic with different demands. Traffic in our future network will be both isochronous/asynchronous and distributive/commutative and the services associated with each will be different;
7. Com2000™ Intelligence technology address and resolve the capability of a network interface which should depend on the level of service assigned to a service access point, not the capacity of the total network;
8. Com2000™ Intelligence technology address and resolve the Distributed Intelligence and data switching/routing processing that seamless integrated into the Optic Backbone;
9. Com2000™ Security technology address and resolve the Privacy & Security issues of the data communication;

2.1 Modem (Physical Layer) Intelligence—Data Flow Transfer Technology

The below description focuses on to the modem or physical layer portion of the network. The present invention focuses on how to enhance or to improve the current TDMA, FDM and CDMA multiple access schemes and/or the combination thereof, to deliver a precision control TDM signaling or SONET Quality of Services like data delivery infrastructure for wireless and wireline private networks, as illustrated in FIG. 02.

This section describes the Com2000™ enabling technology for Convergence of Data Communication and Telecommunication systems, that allows the IP networks to have the predictable latency control and characteristics of the SONET networks (IP over SONET TDM Like as shown in FIG. 02). The Com2000™ technology incorporates lessons learned in studying data communications bandwidth control and efficiency requirements. Over the Internet data communication channels, such as nodes on Small Office or Home Office (SOHO) Networks and Central Offices Switches, there is unpredicted nature in packet-based voice and video data delivery mechanisms that cause errors that reduce the effective use of the real-time applications such as voice and multimedia data messages.

Firstly, the new network has to be synchronous and can be synchronized to the standard frequency structure as the SONET backbone for extending the precision control to the edge of the network. The precision controlled communication environment is enabled through a Com2000™ Clock Transfer system. This system provides synchronous and precision absolute relative to the world standard or relative time, phase and frequency transfer at the physical signaling layer from one network node to another which proliferates throughout the entire network, as shown in FIG. 02. The network then in turns, providing a Synchronous Communication Environment that enables a multitude of other enabling technologies, such as increased bandwidth with the capability of capacity dynamic allocation and control solutions for either point to point or point to multi-point network topologies. The Com2000™ Clock Transfer system are primarily in the area of enabling synchronization infrastructure of SONET-like over UniNet delivery system, improving network throughput and QoS of existing data communication channels with its real time data messages and its challenges of Internet, Intranet and Extranet infrastructure equipment, long haul WAN network and Telecommunications synchronization, as illustrated in FIG. 02.

The Com2000™ Clock Transfer system provides the baseline precision requirements for manipulating and controlling signal delays throughout the networks, video and voice synchronization, security, Information Technology Controls, and specific signal characteristics enabling increased data throughput and more efficient bandwidth utilization. The technology provides absolute and relative time reference to the world frequency and time standards that allows synchronous PC platforms to exploit the remote WAN or LAN computing breakthrough capability via clock transfer of the synchronized clocks throughout the network by enabling synchronous Operating System and any Signal Communication schemes, as illustrated in FIG. 01. The combination of the product's integrated stratum one frequency reference can be used as a means to suppress the long-term drift and short term jitter. This allows Internet and long distance WAN communication data synchronization problem goes away, as part of the UniNet solution.

This precisely controlled communication environment is enabled through Com2000™ Advanced Signal Coding and Control Technology for any media topologies. This new controlled network environment provides the baseline precision required for manipulating and controlling specific signal characteristics such as multi-carrier (FDM), multi-phase (PDM) and multi-time (TDM) signal coding which are enabling factor of increasing data throughput and more efficient bandwidth utilization. In this way, Com2000™ Advanced Signal Coding and Control Technology enables a multitude of novel technologies.

Today's cable and wireless communication infrastructures are less than ideal. There are many instances where the highest achievable data rates are not possible due to the imperfections and defects of the communications medium. Com2000™ Channel Measurement, Calibration and Control Technology measures and calibrates the communication channel to determine the highest possible data capacity for a particular medium, and allocate appropriately and intelligently for the nodes on the network. The communications channel must be first characterized so that errors and imperfections, such as frequency and phase distortions, can be identified. Com2000™'s calibration system then uses these measurements to improve communication channel resolution by controlling the errors and imperfections of the channel. This system provides scaleable bandwidth transmissions or rate adaptively for each of the node, while allowing the best possible data throughput across the transmission medium, as illustrated in FIG. 05.

Once channel noise has been suppressed, Com2000™ Advanced Signal Coding and Control Technology provides a revolutionary approach for FDM, PDM baseband line signal coding method that increases effective data throughput by increasing the number of symbols per hertz of data transmitted. By using this technology, data rates, as an example for Copper Gigabit Ethernet data transmission, can be increased up to 2 Gigabits per second over the existing CAT5, provided there is enough margins on SNR. Com2000™'s new Frequency, Phase or Time synchronous signal coding then utilizes uses the multi-phase baseband Synchronous PAM-5 (or SPAM-5, as shown in FIG. 41) signaling and coding, with appropriate data scrambler to satisfy the FCC power emission requirements (as suggested in the IEEE 802.3ab standard).

Figure 41:
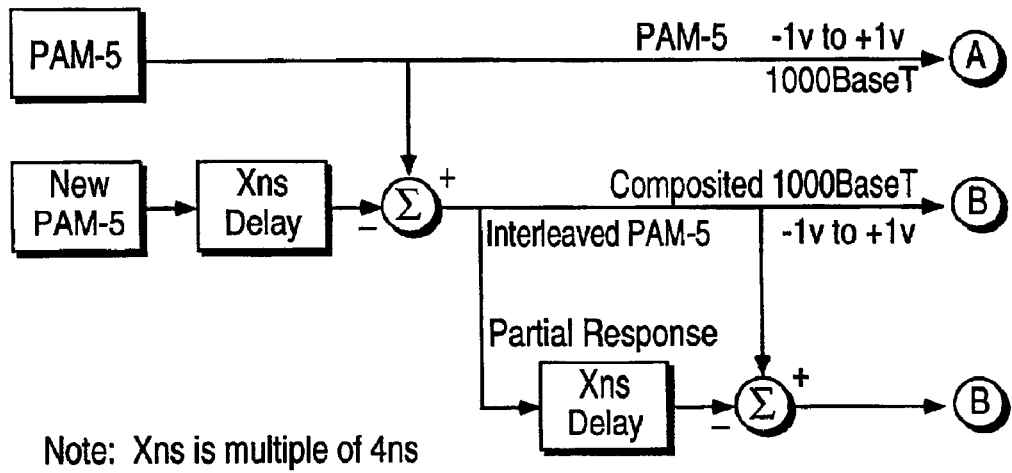
FIG. 41 is an illustration of the Newly Developed Synchronous PAM Signal Coding Scheme.

In addition, Com2000™ Precision Sampling Technology implements the ultra-precise control of specific signal characteristic offset in order to deliver precise signal control for multi-channel signal detection and tracking condition as shown in FIG. 05 and FIG. 41 (SPAM-5). With this precisely controlled of multi-level phase, frequency and amplitude signaling capability, the Com2000™ System provides multi-level, multi-dimensional scalability. As an example for baseband multi-level amplitude Ethernet Transmission, for 100BaseT (MLT3), 1000BaseT(PAM5) and newly introduced 2000Base-T(SPAM5) data transfers, the Precision phase and amplitude Sampling system ensures that every clock carrier and phase offset signal in each multi-channel system is synchronously transmitted and sampled at the receiver within a predicted synchronous phase interval. The System also provides a precise method of measuring the power of the received signal, as illustrated in FIG. 03.

2.1.1 Multi-Channel Synchronous Network Environment—Clock Transfer Technology

The precision controlled of the synchronous communication environment is enabled through a UniNet™ Clock Transfer system. This system provides synchronous time, phase and frequency transfer from one network node to another that proliferates throughout the entire network. The network is then in turns providing a Synchronous Communication Environment that enables precision controls and multitude of other enabling technologies to deliver an increased bandwidth and quality of service solutions. The Clock Transfer system provides the baseline precision required for manipulating and controlling specific signal parameter characterization and measurements. The environment is also enabling an large increased data throughput, as later discussed and illustrated in FIG. 10 for cyclostationary crosstalk-noise controlled environment in a parallel and multi-channels vector processing systems. The synchronous environment also provide more efficient bandwidth detennination and dynamic allocation with QoS utilization metering capability for pay per use of bandwidth.

The UniNet™ Clock Transfer Technology's synchronous nature further enables the reduction in both self-generated noise and Inter-symbol Interference (ISI). The Com2000™ Clock Transfer Technology provide SNR increase via more optimized method of error detection and reduction between the raw signal samples and the derived symbol sample time. This allows a better and cleaner FFE/DFE Filter coefficient convergence and determinations. For channel measurement and calibration, it is also removing channel distortion, via a completely controlled capability of the transmit and receiving channel signal parameters measurement and characterization. These include time, frequency, phase and power control of the level of radiated EMI emissions through the determination of propagation. On top it all, the precision synchronization controls enabled by the Clock Transfer Technology also provide mechanisms for the unique Com2000™ security feature, as described later in section 3.0, of a personalized electronic signature for each system node ID (Electronic Deterrence of Network Address (E-DNA)).

A. Brief Summary of Network Synchronization problems

Applications that need to present high-quality sound and video over the network rely on the network to provide a communication service with real-time guarantees. For example, HDTV requires transfer of large volumes of data in short periods of time. If applications are interactive, a short delay between sender and receiver is required. Furthermore, the human ear and eye are sensitive to discontinuities in their input, so sound and picture should be transferred with low delay variations (jitter).

The telecommunication existing Circuit-switched networks have many attractive properties for providing real-time guarantees. Since all of the operating nodes of the telecom backbone and telecom edges such as T1/E1 nodes or other xDSL nodes are transferred as TDM and all synchronized to the SONET stratum clocks in someway.

To deliver a broad spectrum of Quality of Service (QoS), from soft to hard QoS of a network, the UniNet™ network starts out with the stringent requirement of the circuit switching hard QoS. To implement the SONET like QoS, the Circuit Switching resource allocation method needs to be examined. The Circuit Resource is reserved at a constant bit-rate from sender to receiver and therefore, is a deterministic way of transport and multiplexing of data. This means that data circuits are isolated from each other so that traffic on one circuit is unaffected by activities on the others, as illustrated in FIG. 02 SONET backbone. Even in a precision synchronous environment of the telecom backbone with a stringent standard frequency reference of every node, queues is still exist in circuit-switched networks. It is only to compensate for differences in clock rates of different network links, which arises, from the different propagation delays and clocks for each links. The variance in delay is therefore very low. However, if the sender temporarily generates data at a higher rate than the channel rate, for example during a burst, delay can be experienced at the access point of the network. Since the access to the medium is deterministic once a circuit is set up, data loss does not occur within a circuit-switched network. On the other hand, a sender may experience blocking when setting up the circuit or the bit-rate of the circuit at the time its capacity may be insufficient for the application bandwidth requests.

If the network introduces jitter or delay, resynchronization may be needed at the receiver. Intra-stream or virtual circuit synchronization is needed for an isochronous stream, such as an audio stream, to regain the pace at which the data was created. Inter-stream synchronization is also performed between two different data streams to make them synchronized at the transmitter and receiver of the circuit. For example between an audio stream and a video stream for providing lip synchronization, the inter-data stream needs to be synchronized where the streams are carried over the networks by 2 separated TDM telecom data circuits, as shown in FIG. 01 when two remote user of UniNet™ networks interface with each other via a realtime data such as video conferencing via the existing TDM telecom infrastructure.

In the current Internet networking structure, an unreliable way of IP data deliver such as packet switching methods is now migrating into the telecom backbone, where there is some QoS policy that applies over the IP data. To conclude, many additional mechanisms, such as traffic regulation, queuing policies and resynchronization schemes, are needed in order to provide quality of service guarantees in packet-switched telecom networks. One of the main concerns with packet-switched networks in general is whether it is possible to realize these "QoS" mechanisms in a cost-effective way.

B. Network Synchronization—General

Over any type of communication channel, such as nodes on a private UniNetm wireline network, as illustrated in FIG. 02, there is distortion that can cause errors in data signaling thereby reducing the effective throughput. For example, when data is transmitted over a multi-channel communication medium at a particular phase and frequency, the frequency and phase of that signal often changes as the signal propagates along the channel. The imperfections in the communication channel tend to reduce the resolution of the data bandwidth of the signal being transmitted across the channel. Furthermore, the data may not be interpreted correctly at the receiving end of the channel if the transmitted signals are outside of a defmed phase and frequency range. The present invention, hereinafter referred to as the Com2000™ Synchronous system, provides a system and method of the environment that can be used to measures the channel, precodes a predefined signal training burst sequence for signal characterization over a communication channel by using, enabling and delivering the precision control of the signal's frequency and phase synchronization, and by adjusting the receiving signal parameters with a predetermine value to eliminate distortions arising from the increased data throughput of channel provided by the new signal. Additionally, the new signal is both scaleable and secure using coding systems that take advantage of the precision synchronous nature and controls. The present invention integrates the subsystems that provide this functionality and may be manifested at either the physical layer interface for improving the communication capacity and controls or at the medium access layer interface for improving the channel allocation, QoS controls, Security and other usages. The channel for all communication system types are including, but not limiting to, Ethernet signaling, cable and xDSL modems, POTS, Satellite and wireless networks.

The Com2000™ Clock Transfer system provides the baseline precision requirements for manipulating and controlling signal delays throughout the networks, video and voice synchronization, security, Information Technology Controls, and specific signal characteristics enabling increased data throughput and more efficient bandwidth utilization. The technology provides absolute and relative time reference that allows synchronous PC platforms to exploit the remote computing breakthrough capability via clock transfer of the synchronized clocks throughout the network via using Synchronous Operating System and Signal Communication schemes, as illustrated in FIG. 02. The combination of the product's integrated stratum one frequency reference can be used as a means to suppress the long-term drift and short term jitter. This allows Internet and long distance WAN communication data synchronization problem to be resolved at the edge synchronization of the network.

1) Summary of Clock Transfer and Control Techniques

Figure 43:
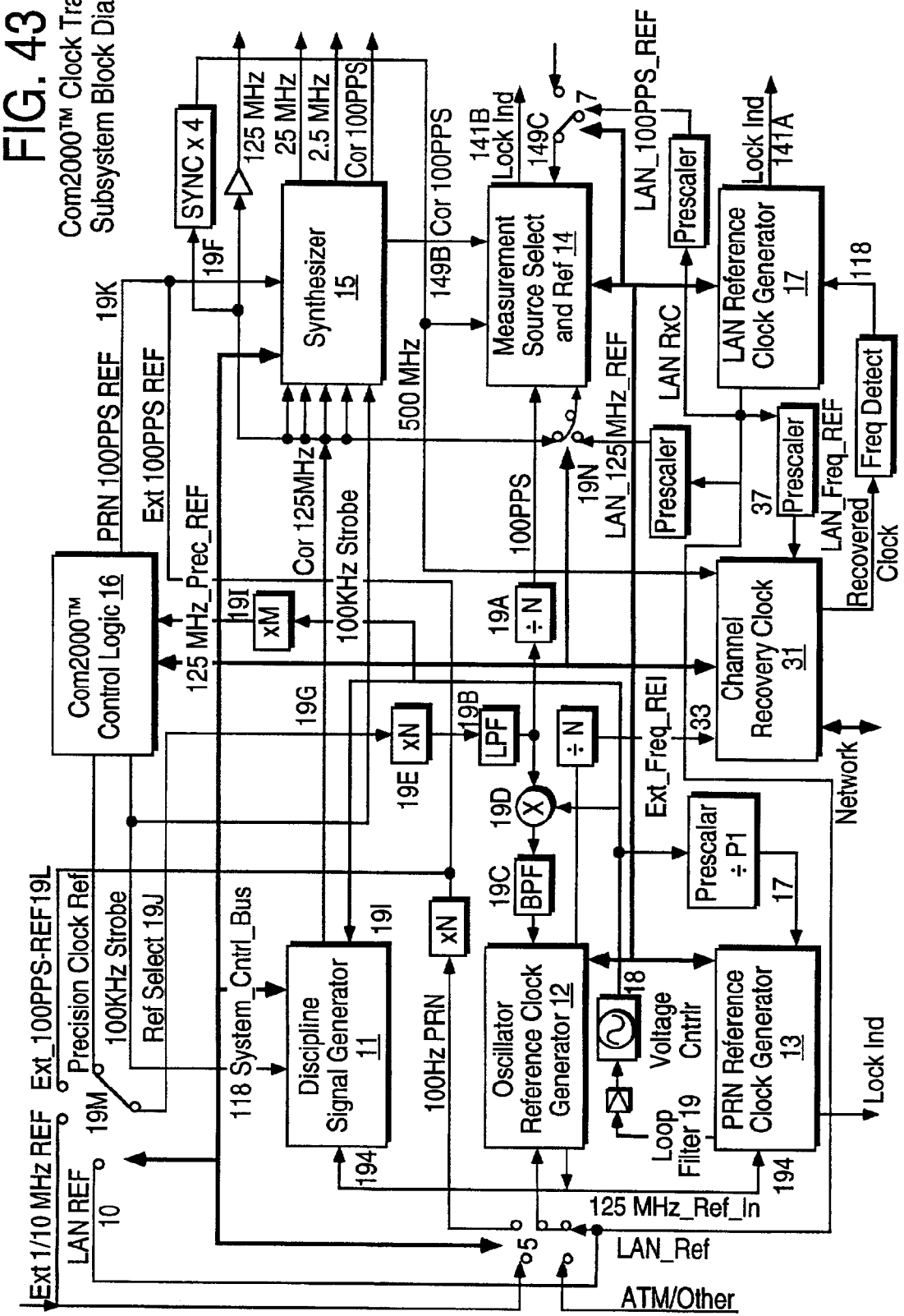
FIG. 43 is an illustration of the Newly Clock Transfer and Measurement Scheme.

The Precision Synchronization Environment is enabled via the combination of the following clock transferring methods:

1. Signal Equalization and Synchronization
2. Pilot Synchronization, Local Oscillator Calibration, Tuning and distributions The Clock Transfer System block diagram, as shown in FIG. 43, is responsible for recovering, regenerating and distributing the different clock frequencies and phases required of the PMD and PMA layers of the nodes from the networking master reference node (RN) to the slave plain nodes (PN) in the networks. Burst to burst synchronization between transferring node is also done via the synchronization of the equalization training sequence as shown in FIG. 45.

Signal Equalization and synchronization

The physical layer composed of Physical Medium Access Layer or PMA and Physical Medium Dependent Layer (PMD). PCS and other blocks above the PMA should be synchronized at that level with the available/required clocks from the PMD synchronizer (lower layer) or clocks from the higher layers. The synchronizer is done in a separate block from the equalization block. It is aiding from the equalizer (FFE& DFE & DPIC) via interfacing to the equalization block for sampling, symbol timing and carrier clock recovery and synchronization and other controls & purposes as well.

Figure 45:
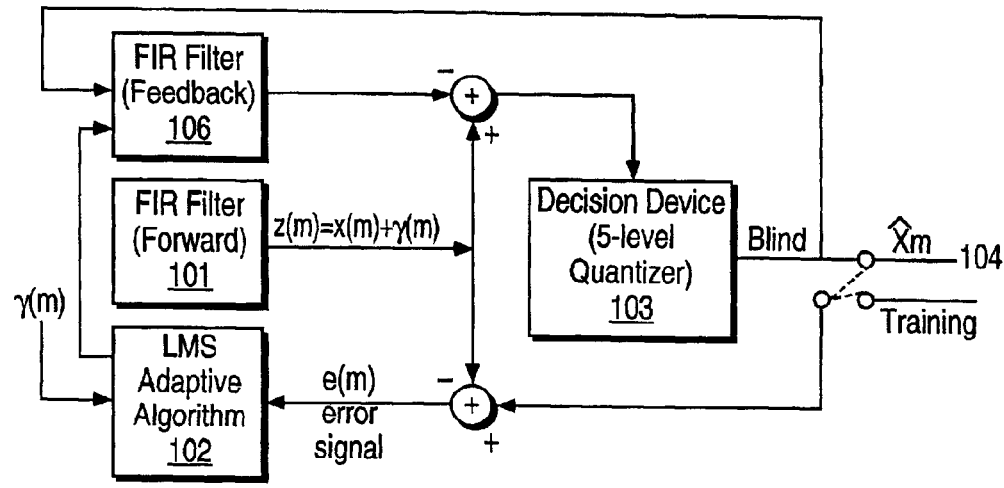
FIG. 45 is an illustration of the Typical Least Mean Square Adaptive Equalizer Control Logics.

Once the equalizer is trained via the training sequence, as illustrated in FIG. 45, the equalizer training sequence is converted into the synchronization sequence that is currently using standard pseudo random or PN sequence now. This periodic synchronization sequence is used to acquire and track the carrier and carrier phase and phase delay of the channel and as the basis for synchronization tuning. The sequence also be converted into new security PN sequence for security and privacy purpose and other special controls as required. As to any master synchronization and distribution, the master tone can be used to supplement the synchronization as needed based on the controls during the start up or channel calibration process. The Timing Synchronization and the Equalization algorithm can be thought as of one tracking channel (Equalization Algorithm) and on Acquisition Channel (Synchronization Algorithm). These two algorithm fundamentally are the same as far as filter coefficient convergence concerns. However, the filter coefficients for the synchronization algorithm equalizers are used to determine the channel phase delay of the channel and offsets.

However, The design is currently done in two concurrent operating blocks. These two blocks will interface with each other for providing each other aiding and other controls & purposes.

The DPIC Equalization, as illustrated in FIG. 30, which behave as the DFE algorithm, is currently as more effective than the standard equalization algorithms. Once the receiver synchronization algorithm in place, the symbol vector can be processed in parallel and the noise are not correlated. The FFE algorithm can then be sampled in T/2 or as fractional space equalizers to take advantage of the cyclostationary cross talk and noise characteristics. The DPIC equalization and the Synchronization equalization algorithm are currently done independently from each other. As we show you in the Gigabit FIG. 26 and FIG. 10, the standard algorithm has a lot of deficiencies in handling the ISI and Crosstalks. Our DPIC filter for each single channel equalization scheme can be added to improve the SNR margin up to 8 dB relative from 3 dB 802.3ab suggested design. This has not yet take into accounts the channel vector synchronization aspects, as illustrated in FIG. 27. With this kind of margin increases, we can use it to reduce the complexity of the chip. By reducing the # of filter taps in ECHO/NEXT cancellers, and FFE/DFE equalizers, we can effective reducing the current standard 802.3ab design by 40–60%.

The standard 802.3ab implementation is loosely operating in the master and slave frequency synchronization mode. We don't need precision synchronization in this case. However, should we have the precision synchronization, the coupling between DFE and viterbi's decoder algorithms will further benefits results from the symbol vector processing. Should we want to removed all of NEXT Cancellers, we need to the precision synchronization control for all channels. The combination of our synchronization, Fractional Space Equalizer (T/2) for FFE and our DPIC filter, we can remove all of the NEXT cancellers and leave with a simplified ECHO canceller and DFE.

Calibration & Tuning Level

Once the synchronization clock distribution signal in place (as described above) and the Carrier Clock recovery circuitry is utilized for Carrier, Carrier Phase and other signal parameter locked to the synchronization signal, the Clock Transfer Algorithm are exercised for delivery synchronous network nodes throughout the systems. The functional aspect of the Clock Transfer Technology for step 2 or the calibration and tuning method operates within the Com2000™ State Transition Diagram (STD). Let us describe in detail the VHDL logic interaction for each system mode of the STD. The states, or operating modes, are setup in such a way that the Com2000™ Clock Transfer System can set the desired starting mode through a Control Mode command that forces the VHDL logic to go directly to the selected mode. For standard operation the VHDL logic increments through each of the modes in sequence.

Figure 46:
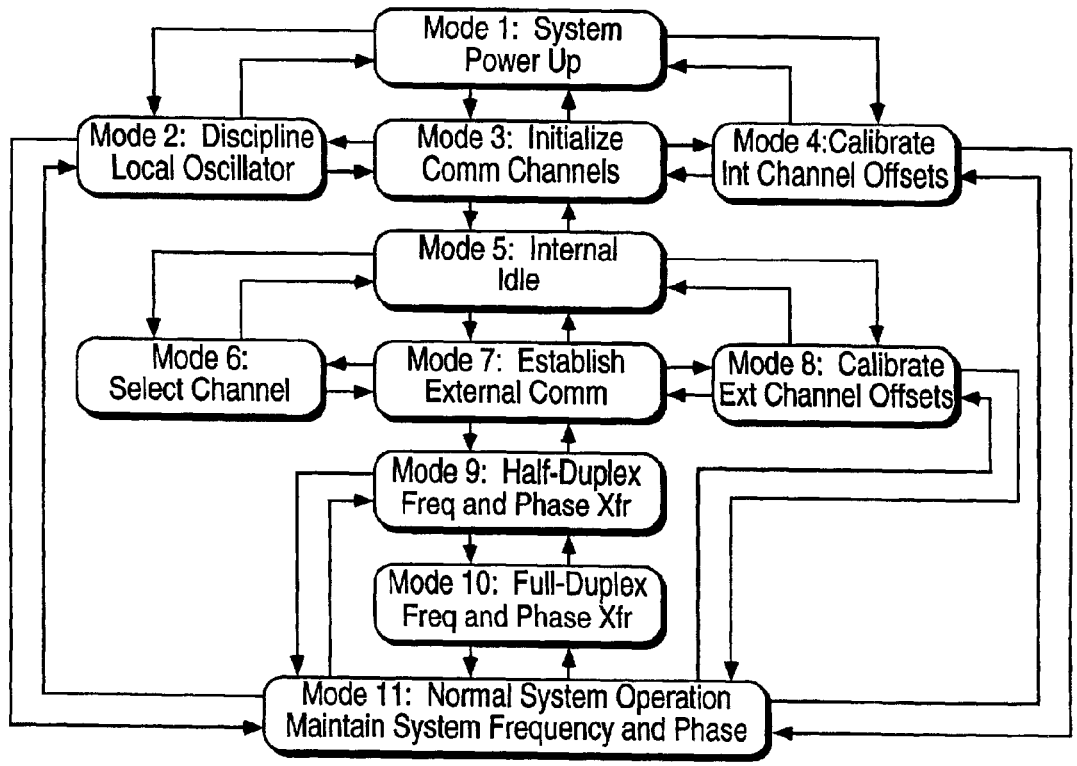
FIG. 46 is an illustration of the Newly UniNet Internet Clock Transfer Transition Diagram.

The eleven-initialization and training states, or operating modes, are described below: (See FIG. 46)
1. Power Up.
2. Discipline Local Oscillator.
3. Initialize all communication channels.
4. Calculate internal communication channel offsets or biases for intrinsic calibration.
5. Internal Idle—Stay off communication channel & maintain system phase.
6. Select the communication channel for Phase and Frequency Transfer.
7. Establish communication channel.
8. Calculate external communication channel offsets or biases for extrinsic calibrations.
9. Perform half-duplex Frequency & Phase Transfers.
10. Perform full-duplex Frequency & Phase Transfers.
11. External Idle—Stay off communication channel & maintain external system phase and frequency.

In summary, upon power up (Mode 1), the system performs a self-test and starts disciplining (precision tuning) its local oscillator to the selected traceable reference source (Mode 2). For Master Node (RN), its traceable reference can be 100 Hz from external source or from the standard frequency source such as GPS. The communication channel signal protocols are then initialized (Mode 3) to the common heartbeat of the reference, or disciplined frequency and phase, so that the communication channel biases can be determined (Mode 4). The system is now ready for external phase and frequency transfers (Mode 5) that can be initiated through an automatic sense signal on the communication channel's data signal (Mode 6).

The received data signal is tracked and decoded (Mode 7) for Station Identification verification and node awareness, and to determine whether the received station identification is synchronized to the traceable reference. If it is not synchronized, the station's Phase and Frequency Transfer process is initiated (Mode 8). The system first determines its phase and frequency offsets relative to the received signal data of the station ID (Mode 8). Once the offsets are determined, the values can be sent back to the requested station ID and used for tuning its local oscillator accordingly (Mode 9). The process continues until the Station ID local reference is within the designated tolerances (Mode 9). The Station ID then does the final full duplex ranging estimates of the offsets (Mode 10) for fine-tuning of the synchronization phase and frequency offsets. Once the station ID completes its fine tuning of the local reference, the Station ID is declared as a Disciplined Station ID and the process will suspend for a predetermined period before the commencing fine tuning process again (Mode 11). The training process continues until all newly identified station ID's internal oscillators are disciplined. Within a few seconds, this training and calibration process brings the network system into an initial disciplined state that is continuously fine-tuned during normal system communication.

2) Detailed Method Steps (Flow Chart)

The Clock Transfer Technology operates within the Com2000™ State Transition Diagram (STD). Let us describe in detail the VHDL logic interaction for each system mode of the STD.

Even though that this technique can be applied for both wireline and wireless applications, for the sake of clarity of the descriptions, we describe the method on the wireline (POTs) UniNet LAN application.

Mode 1—Power Up

Within this state the system conducts a proper power up sequence where blind equalization and self-tests are performed to validate the integrity and readiness of the system.

Mode 2—Discipline Local Oscillator

Within this state the Com2000™ system is internally locked to the station reference source through the default UniNet LAN communication channel input signals. The Clock Transfer logic has the option to select from other reference sources if the current LAN communication channel signals are not available.

The Com2000™ system has the capability to synchronize its local reference to the phase and frequency of any communication reference source. The system can therefore be used to determine the phase and frequency offsets of its local reference (RN) source relative to any communication node (PN) through the tracking of the communication channel, as illustrated in FIG. 05. The system can determine the phase and frequency offsets (matrix cell of frequency versus Phase) of one particular communication channel node (RN to PN1) relative to another similar communication channel node (RN-PN2) or an entirely different communication channel node. In the case of the frequency or phase standard is used as a frequency input for RN, the input reference standard source is used as a reference source (through RN PLL circuitry) for disciplining the internal RN oscillator and then is used as the standard and disciplined reference source to propagate the absolute phase and frequency across the UniNet LAN communication nodes.

Before getting into the actual mode 2 VHDL logic algorithms for disciplining the local RN and PN oscillator of the Com2000™ Clock Transfer System, a description of the overall logic and system operation is required.

The Reference Clocks & Measurements Subsystem, shown in FIG. 43, includes the Disciplined Signal Generator (11), Oscillator Reference Clock Generator (12), Precision Reference Clock Generator (13), Measurement Source Selector (14), Measurement Reference Clock Generator (141), Corrected Output Generator (15) and The Precision Sampling Logic (16).

The Precision Sampling Logic (16) controls all aspects of the Precision measurement and timing tracking functions for frequency, symbol, sample phase and timing for each node of the UniNet LAN network. This includes RN signal clock tracking and management of the Precision signal processing, Phase Estimator Control of the measurements for timing solutions, phase/frequency transfer, security signature processing and PLL controls.

Figure 43A:
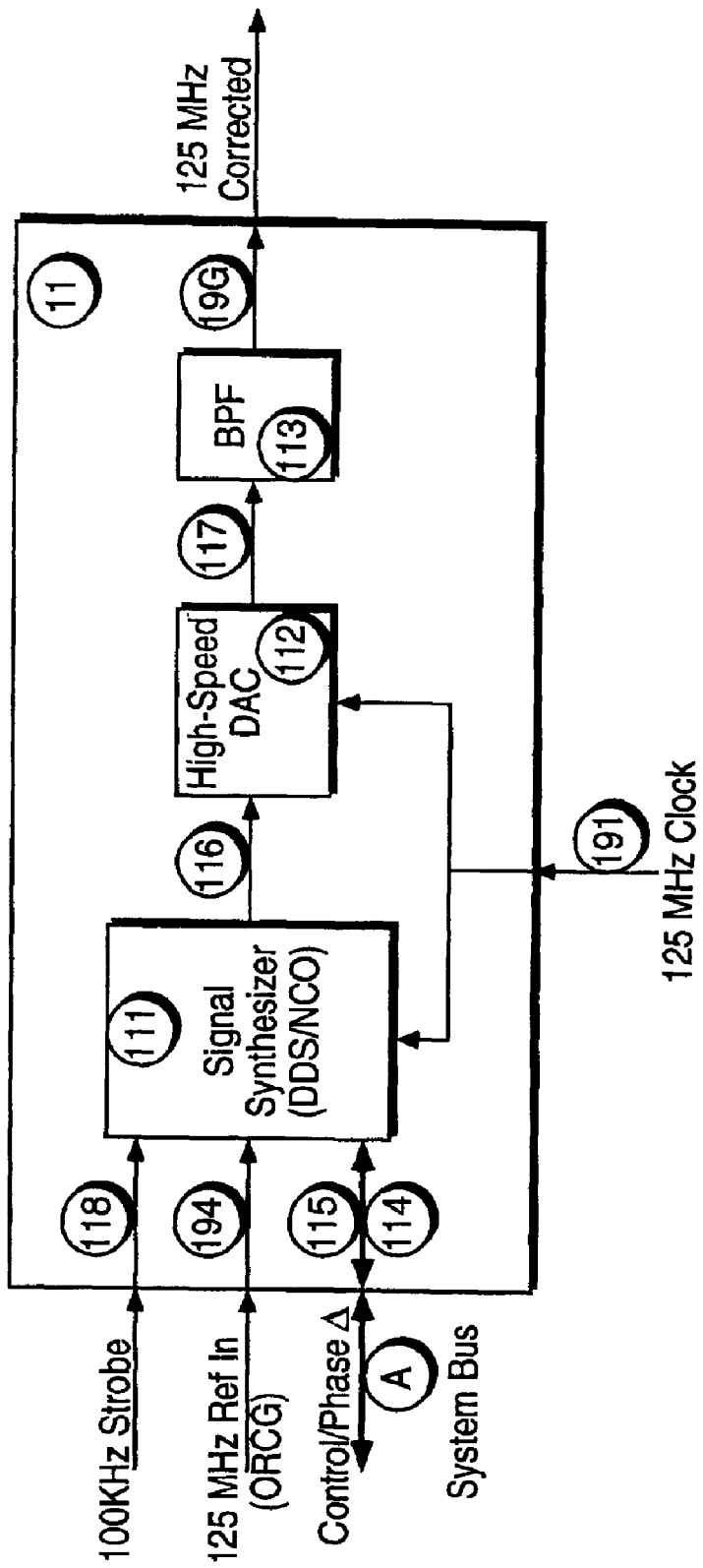
FIG. 43a is an illustration of the Clock Transfer Subsection—Discipline Signal Generator.
Figure 43B:
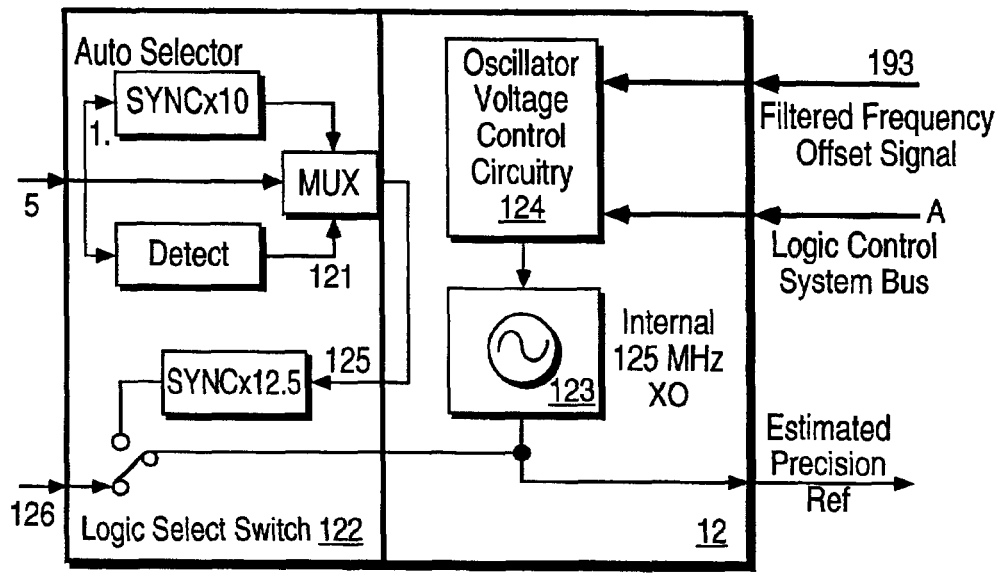
FIG. 43b is an illustration of the Clock Transfer Subsection—Osc Reference Clock Generator.
Figure 43C:
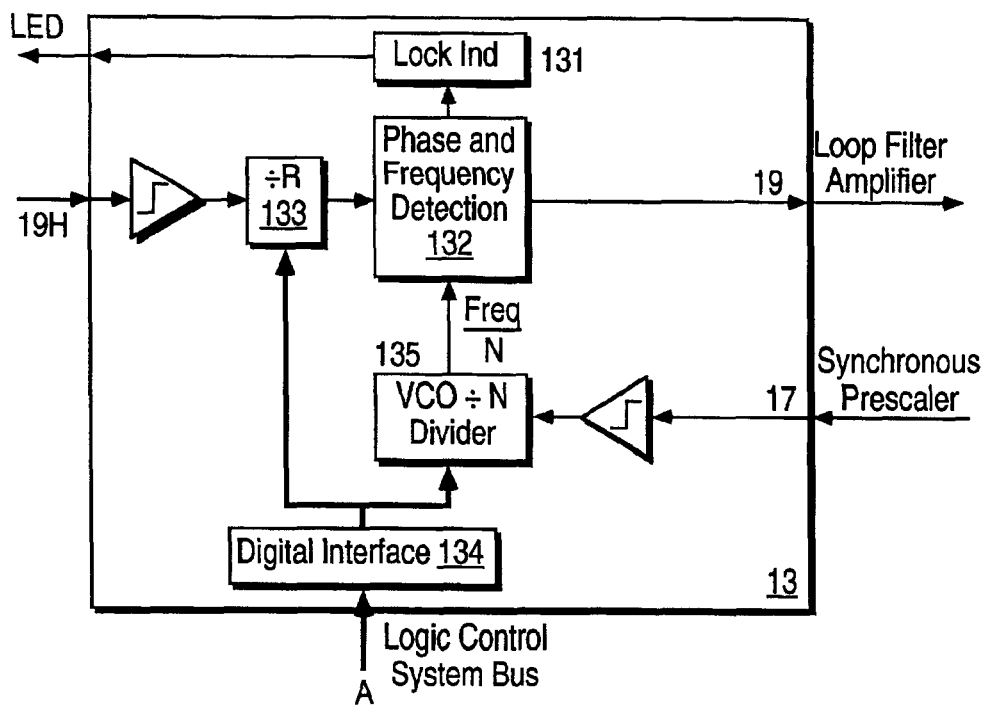
FIG. 43c is an illustration of the Clock Transfer Subsection—Precision Ref Clock Generator.

The frequency reference (194) for the Precision Reference Clock Generator (13), as illustrated in FIG. 43 and FIG. 43b, is selectable (122) from either an internal Tunable Crystal Oscillator (123) or an external reference input (125). The selected Precision reference (194) drives a phase lock loop of the Precision Reference Clock Generator (13) at the Precision Sampling Logic signal input reference rate or Precision reference (194). The Precision reference clock (19I) is distributed to the Precision Sampling Circuit logic and the DDS Signal Synthesizer (111) for generating the Precision corrected 125 MHz output (19G).

The Precision Sampling Logic performs all of the Phase and Frequency offset comparison functions, signal phase and frequency related processing and tracking of individual frequency and phase errors.

Figure 43D:
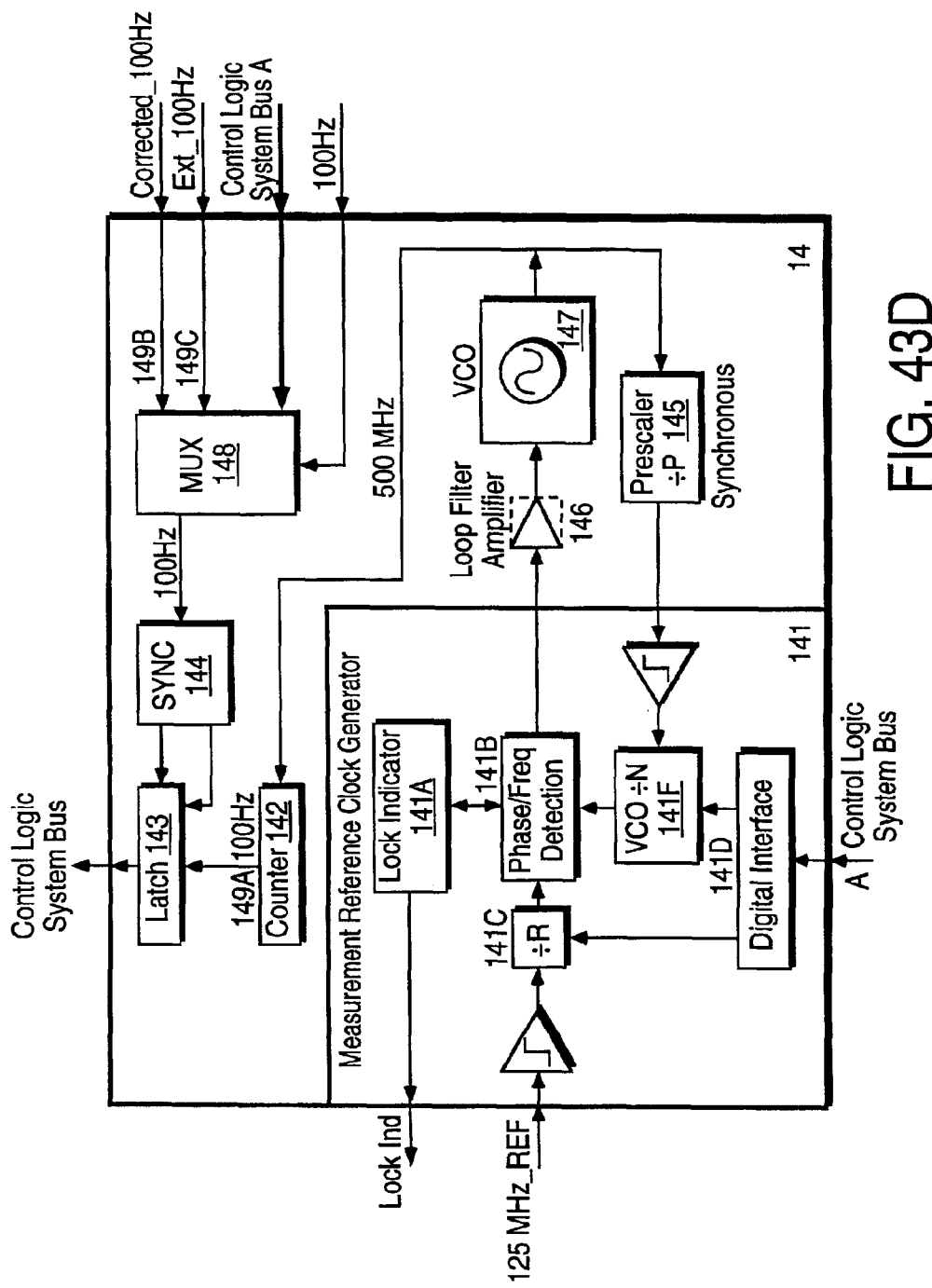
FIG. 43d is an illustration of the Clock Transfer Subsection—Measurement Source Selector.
Figure 43E:
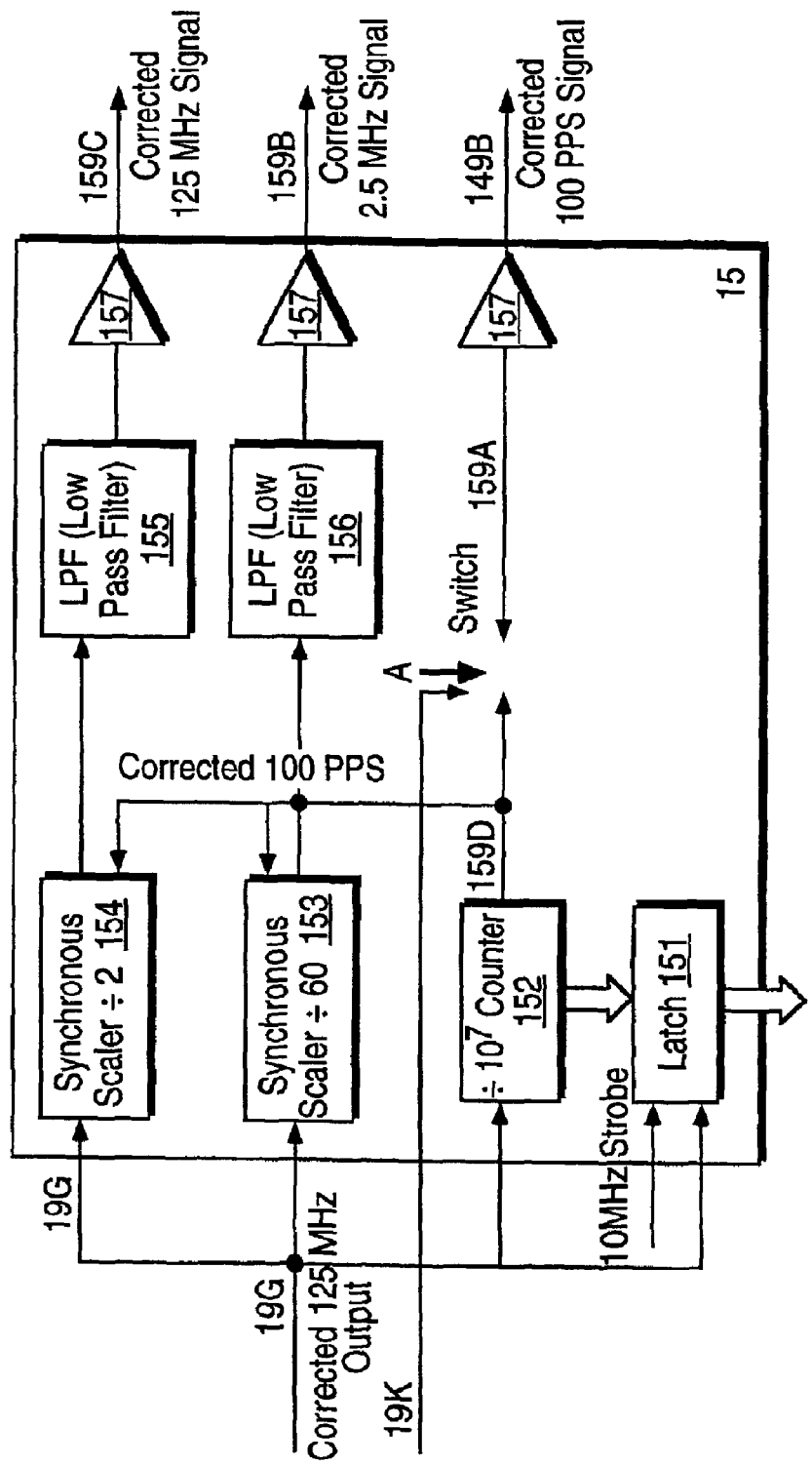
FIG. 43e is an illustration of the Clock Transfer Subsection—Correct Output Generator.

The Corrected Output Generator (15), as illustrated in FIG. 43e, produces 2.5, 25, 125, 250 and 500 MHz outputs (159B, 159C) and a 1 and 100 Pulse Per Second (PPS) signal (159A). The Disciplined Signal Generator (11), FIG. 43a, produces a disciplined 125 MHz output (19F). The corrected output signals are all synchronized to the Precision reference tracking clock (19J). The Precision reference tracking clock is traceable to the World Standard Reference.

When tracking, the Precision Reference Tracking Clock (19J) and the output frequencies (159A, 159B, 159C) are all within 10 parts per trillion. The 100 PPS (19K, 159D and 159A) is maintained within 4 ns RMS of the Precision Reference Tracking Clock (19J).

The DDS Signal Synthesizer (111), as illustrated in FIG. 43a, is used to generate the 125 MHz Precision corrected reference signal (19G). The output frequency is controlled by the input control value (114) from the Clock Tuning Logic (161) of the sampling circuitry (16). The N bit control value (114) allows the output digital frequency (116) to be controlled to better than 10 parts per trillion. The control value is derived by the Phase Estimator Control solution of the VHDL logic (161). This value is continually updated to maintain accuracy. During periods of Precision signal outage, the DDS Signal Synthesizer (111) flywheels using the last valid control number (114). The output digital frequency (116) will then drift according to the aging rate of the oscillator (123), <50 PPM drift per day.

The output digital frequency of the DDS Signal Synthesizer (116) is a digital sine wave that is converted to analog using a fast Digital-to-Analog (DAC) converter (112). The resulting analog signal (117) is filtered using a narrow bandpass filter (113) to remove the unwanted noise and harmonics. The output Precision corrected 125 MHz is buffered for isolation (19F).

The 2.5 and 25 MHz frequency outputs (159B, 159C), as illustrated in FIG. 43e, are generated from (153,154) the 125 MHz Precision corrected signal (19G). The two frequencies are then filtered to remove spurs and to convert the signals to a sine wave (155,156). The frequency dividers (153,154) are synchronized to the 100 PPS (159D) to insure consistent phase relationships between the output frequencies (159B, 159C) and the 100 PPS signal (159D). The outputs are buffered (157) to achieve an isolation between frequency outputs (159B, 159C) of greater than 100 dB.

The 100 PPS signal (159D) is generated from the 125 MHz clock. The counter (152) is initially jam set (159) to properly set the phase, and thereafter maintained through corrections to the DDS Signal Synthesizer (111). Verification of the 100 PPS phase is accomplished by sampling both the 100 PPS (152) and the DDS phase (115). Calibration and alignment of these two registers is performed at power up to achieve a resolution of 125 ps.

The method of generating the 100 PPS signal (159A) is critical as it allows all generated clocks such as 500, 125 MHz (19F), 2.5 MHz (159B) and the 25 MHz (159C) to maintain phase coherence with each other. Non-coherent designs can jump the phase of the 100 PPS signal (159A) with respect to the Precision corrected clock outputs (19F, 159B, and 159C) and upset the phase measurement and calibration circuitry.

Because the Precision corrected 100 PPS signal (159D), as illustrated in FIG. 43e, is derived from the 125 MHz oscillator (123 & 111), the Pulse-to-Pulse jitter is kept to less than 1 ns RMS. Corrections of the 100 PPS (159D) over phase are created by slowly tuning the 125 MHz oscillator (123,111) so that for changes in Precision reacquisition, or other operating conditions, the corrected signals maintain extremely stable outputs. Phase jumps and output discontinuities are therefore eliminated.

The Measurement Source Selector (14), as illustrated in FIG. 43d, allows an external 100 PPS input (149C), or an external 100 PPS derived from the external frequency (19A), to be measured using the Precision corrected reference (19G). The 100 PPS is measured to a resolution of 1 ns and the frequency is measured to a long-term resolution of 10 parts per trillion.

To achieve the accuracy and resolution required by the system a 500 MHz clock (147) can be generated for future applications, as illustrated in FIG. 43d. The 500 MHz clock (147) is Precision corrected because it is phase locked, as shown in the Measurement Reference Clock Generator (141), to the Precision corrected 125 MHz signal (19G). The Synchronization Circuit (144) for the latch (143) resynchronizes the asynchronous signal input (149C) to the 500 MHz clock (147) while latching (143) the phase of the 500 MHz clock (149A). This allows a measurement resolution of 1 ns to be obtained.

To measure the external 100 PPS input signal (19A), the corrected Precision PLL 500 MHz signal (147) is down counted (142) in a series of decade counters to 100 Hz (149A). The 100 Hz and the Precision corrected 100 PPS (149B) are in phase with each other but with some fixed but unknown offset. A one-phase measurement is made by latching (143) the phase of the counter (142) at the Precision corrected 100 PPS signal selection (149B). The received external 100 PPS (149C) is then selected from the multiplexor (mux)(145) and the phase of the counter (142) is again latched (143). The difference is the offset of the Precision corrected 100 PPS (149B) relative to the input 100 Hz signal (149C). The measurement continues at a 0.1 second update rate.

To measure the external frequency (121), as illustrated in FIG. 43b, the external input is divided down (19A) to a 100

Hz signal. The 100 Hz is used by the mux (145) and the Sync (144) to latch (143) the phase of the 500 MHz down counter (142). By monitoring the changes in the counter over time, the offset is calculated. The one-shot Sync (144) measurement's accuracy of 5 parts per billion is initially obtained. The resolution improves when integrated over time. At 500 seconds, during normal data communication operation, the measurement resolution reaches the specified 10 part per trillion. All counter measurements are averaged for 500 seconds to insure fill resolution at each subsequent measurement (100 Hz).

Once the local frequency (19F) is disciplined to the selected reference, as illustrated in FIG. 43, it is used to generate the corresponding timing and clock signals for the UniNet LAN signal mod and demod such as Synchronous Partial Response PAM or QAM16 Modulator and Demodulator and the LAN Communication Channel (37).

The previous discussion provided the overall RN structure and operation of the Reference Clocks and Measurement Subsystem. The following paragraphs will discuss how the master RN generated reference source is transferred across the UniNet LAN communication channel to discipline the local slave's oscillator with respect to the phase and frequency reference of the master.

Figure 47A:
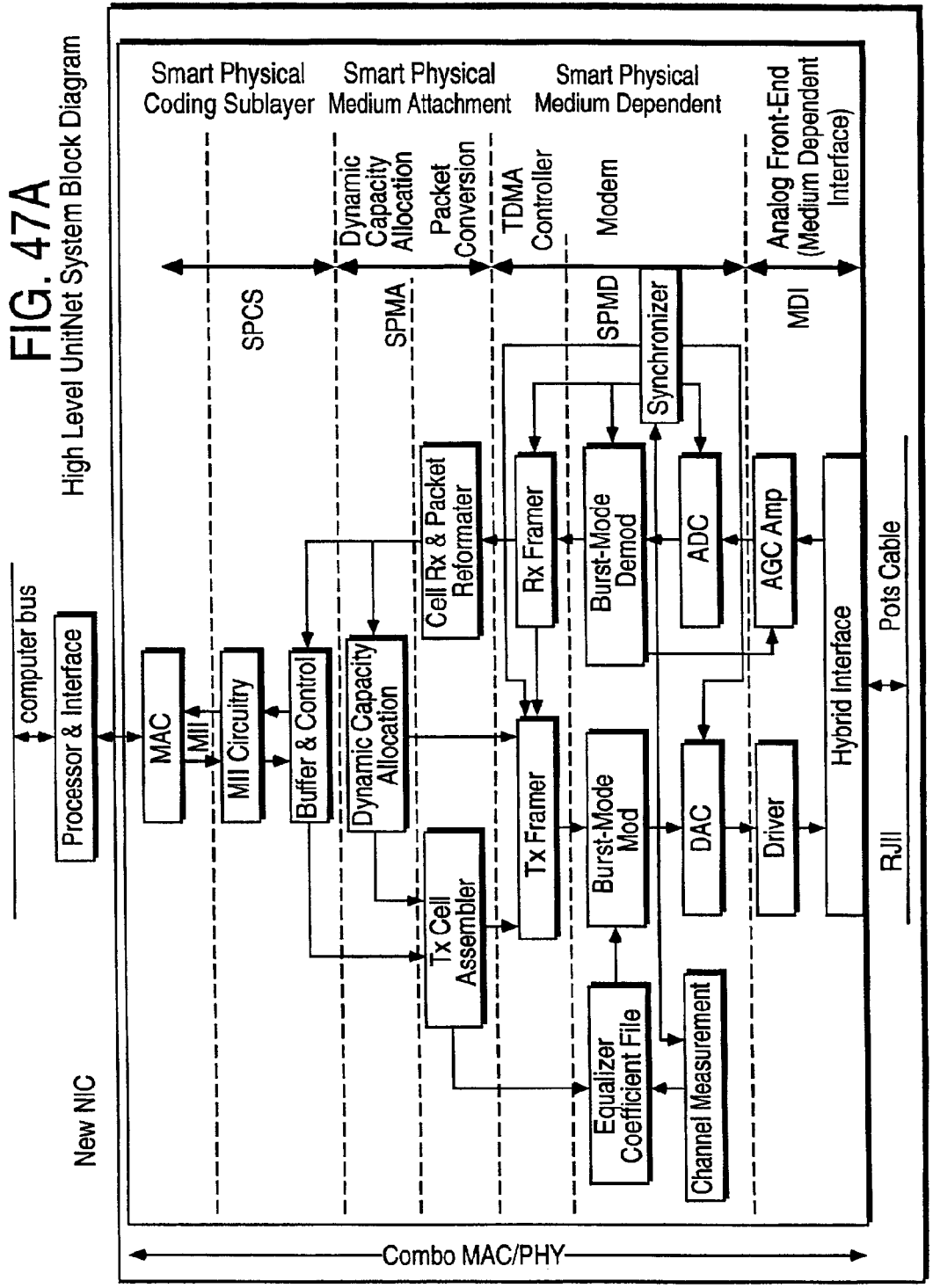
FIG. 47a is an illustration of the High Level UniNet Internet System Block Diagram.

The Network Com2000™ Transceiver (31), or the LAN Front End Interface shown in FIGS. 47a, 47b, is comprised of a Physical Layer RN Tone, Digital UniNet Transceiver Section and a Receiver Timing Recovery Section. Upon completion of the initialization and training phase, the network system enters the normal data processing phase that maintains the disciplined Clock Phase and frequency across the networking system. During normal operation when data is not being sent, the Com2000™ RN Clock Transfer Logic of transmits the IDLE Clock Symbol on the burst data channel and the frequency tone is also maintained always for continuous system phase and frequency tuning by PN nodes.

For the clarification purpose, let us discuss the synchronization nature of the share medium as illustrated in FIG. 03 with the existing IEEE 802.3ab Copper Gigabit communication scheme between RN and PN nodes.

For the transmitter function (Channel Equalization Filter) (312) of the system, as illustrated in FIGS. 47a and 47b, Transmit Symbol Encoder (315) accepts 8-bit data from the MAC interface such as MII or GMII and converts it into Quinary encoded symbols for PAM-5 signal modulation transmission. The signal levels of the differential driver (314) conform to the specifications in the 100Base-T IEEE proposed standard.

The Com2000™ Channel Equalization and Filter Subsystem (312) performs the auto-correlation function for the received unique Multiple Access PN (Pseudo Random Noise) sequence of the FFE/DFE equalizer predefined training sequenced data. The clock recovered from the received training sequence of the filter, is used to aid in the phase lock loop of the Clock Recovery Controller Logic block (311), and is captured and used to steer the local clock. For transmission of data, the RN Transmitter clock reference is the corrected and disciplined 500 MHz clock (19F) and is used as the reference source for the Channel Equalization and Filter (312).

This clock is derived from the selection of either an internal clock source (123), the received data clock from The Clock Recovery Controller Logic block (311) or an external disciplined clock (121). The derived clock is used as the RN transmitting frequency reference (312). This provides enormous flexibility for the data throughput and synchronization whether utilizing packet-based or cell-based data packages or an external or internal clock source for the transmission frequency reference.

The clock transfer is able to deliver frequency and phase synchronization based on the transmit and receive symbol clock pulses (19A). Once the RN transmitter's clock pulse (37) is the same as the PN receiver's clock pulse (171) (within a minimal phase and frequency offset) with the phase time stamps for the encoders and decoders of each node in the network are within a 1 ns phase delta, the Com2000™ system is able to use the network clock synchronization to improve bandwidth and QoS controls throughput over the UniNet LAN network communications channels.

The RN transmitting symbol frequency reference of 125 Mbaud (37) is derived from the Com2000™ absolute oscillator clock (19A) (World traceable frequency). This clock pulse (19A), or heartbeat, is used for the carrier phase signal of the modulated PAM5 or our Partial Response PAM-5 Coding data stream (315,313). Because the same heartbeat is on both the Com2000™ RN transmitter and PN receiver sides of the UniNet LAN communication nodes, the receiver further enhances the SNR by improving the vector processing of filter and equalizer operations, virtually eliminating frequency and phase lock loss and improving the complex signal modulation and data demodulation schemes.

Figure 49:
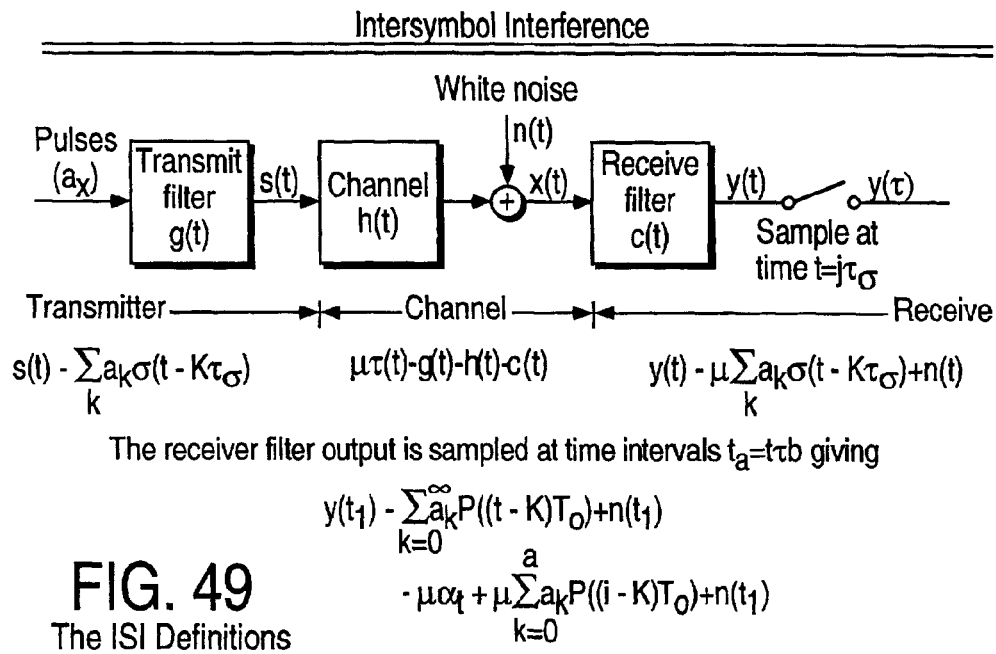
FIG. 49 is an illustration of the High Level Intersymbol Interference Definitions.

The improvements, when selecting the reference signal (19A), are mostly generated in the 100Base-T Function Block. This Block performs legacy CSMA/CD functions such as function link integrity test, link failure indication and link reverse polarity correction, SQE test generation at the end of each transmitted packet, and collision detection for simultaneous transmit and receive packets. Even in point to point communication, during heavy network traffic on a typical network, the effective throughput of the 125 Mbaud network would be reduced in capacity due to the signal ISI noise, data retries due to lost data bits and phase lock loss. However, with the Com2000™ System implementation, during heavy network loads, the system operates at near maximum capacity. This is due to the elimination and suppression of the relative phase offset between ISI sources, as indicated in FIG. 49 and DPIC FIG. 26. It also used to optimize the current FFE and DFE equalizers, detection circuitry, and the elimination of the management overhead that a typical unsynchronized parallel vector processing network incurs.

For a typical data receive operation, the filtered recovered clock (311) is fed to the UniNet LAN Reference Clock Generator (17) for providing the 125 MHz receive reference clock signal to the Measurement Source Selector (14) for measuring the phase and frequency offsets relative to the disciplined reference signal (19A). This is done so the UniNet LAN communication signal, phase & frequency offset calibrations and phase & frequency transfers can commence.

Figure 43F:
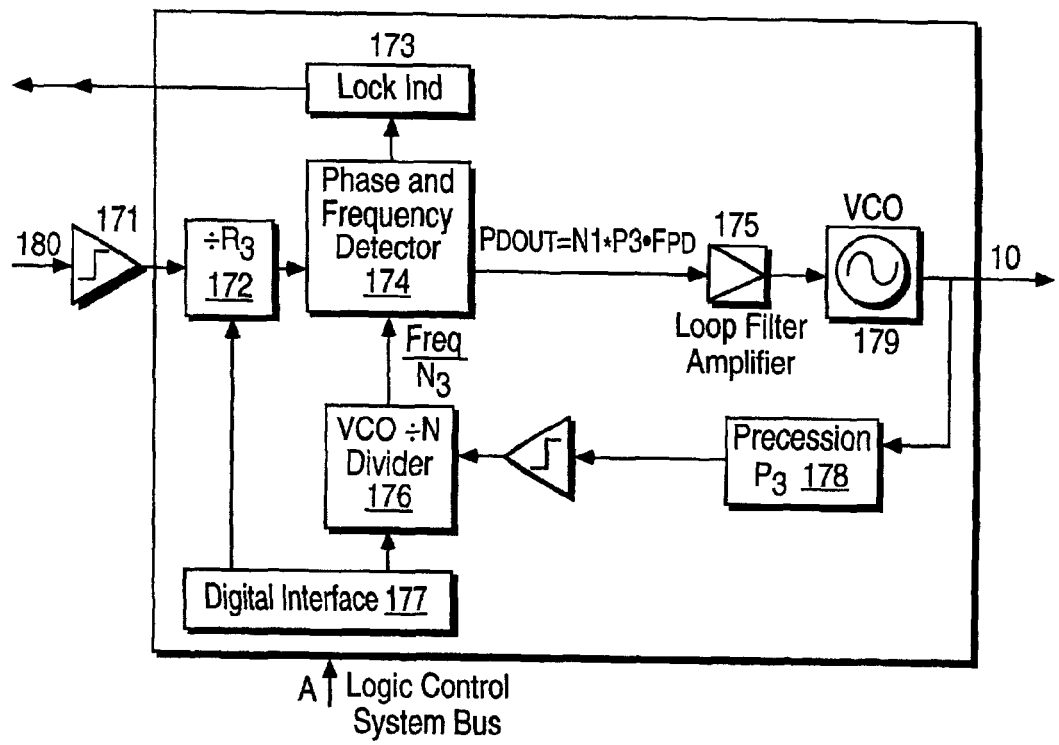
FIG. 43f is an illustration of the Clock Transfer Subsection—Communication Ref Clock Gen.

The LAN Reference Clock Generator (17), as illustrated in FIG. 43f, is a Phase-Locked Loop (PLL) Frequency Synthesizer. This block is the signal synthesizer for the UniNet LAN reference RN signal. It provides a pre-scaler performance (178,172) for high frequency operation, permitting PLL designs that can utilize a smaller VCO division ratio (176). The block 17 design makes possible wider loop bandwidths yielding faster settling phases and lower VCO phase noise contributions (179).

The Reference Clocks and Measurements Subsystem provides the system heartbeat and reference sources for the Com2000™ UniNet LAN System, as indicated in FIG. 43. The control of this subsystem is from the Clock Transfer Precision Logic block (166), which executes the mode 2

VHDL logic algorithms for disciplining the local oscillator of the Com2000™ system.

Let us now begin the discussion of the Com2000™'s System VHDL logic for Mode 2. The mode 2 logic is designed for autonomous operation. The Com2000™ has three distinct phases of operation for disciplining the internal oscillator to the absolute phase and frequency reference for RN reference signal. The first phase is the Frequency Jam Control, the second phase is the Phase Jam Control and third phase is the Closed Loop Tuning Control. The Reference Clocks & Measurements control logic (M201, See FIG. 48) controls the clock skewing of the local oscillator for disciplining to the Precision clock reference. The Com2000™ System receives the Precision phase measurement (16) for the local oscillator frequency and phase offset values from the Phase Estimator Control Solution (M202). This data is used by the Com2000™ system to determine the frequency value of the local oscillator (23) relative to the tracked Precision coded signal frequency (19J) and the phase of the local oscillator (123) relative to the phase value decoded from the Precision Reference signal (19L).

During the Frequency Jam mode, the Reference Clocks and Measurements Control Logic (M201) loads the controlled frequency value (the Phase Estimator Control Frequency solution), with certain gain K, into the Numerical Control Oscillator, or NCO, using the received Phase Estimator Control Frequency offset value. This is done every cycle as defined by the Phase Estimator Control Solution rate and the Suspend Time Logic (M216). Once the Phase Estimator Control frequency solution is within 500 ps/s (M203) of the frequency error, the gain K for the Frequency Jam mode is adjusted (M204) and the Frequency Jam Cycle repeats.

The Frequency Jam Mode is performed every cycle at the Phase Estimator Control solution rate until the value is within 50 ps/s (M205) of the frequency error. The Clock Control Logic (M201) then transitions the system into the next state, the Frequency Fine Tune Mode. The gain value K for the Frequency Jam mode is quite large and the Frequency Fine Tune Mode gain value K is quite small. As with the Frequency Jam Mode, the Phase Estimator Control for the Frequency Fine Tune mode solution value is loaded into the NCO. This is done for every cycle at the Phase Estimator Control solution rate until the value is within 20 ps/s (M206) of the frequency error.

The Clock Control Logic (M201) transitions the system into the next state, Phase Jam Mode, upon completion of the Frequency Fine Tune Mode. Using the received Phase Estimator Control Phase offset value, the Reference Clocks & Measurements Control Logic (M201) loads the controlled Phase value (The Phase Estimator Control solution), with certain gain K, into the NCO during the Phase Jam mode. This is done every cycle as defined by the Phase Estimator Control Solution rate and the Suspend Time Logic (M216). Once the Phase Estimator Control phase solution is within a 100 ns (M207) of the phase error, the gain K for the Phase Jam mode is adjusted (M208) and the Phase Jam Cycle repeats. This is done every cycle at the Phase Estimator Control solution rate until the value is within 50 ns (M209) of the phase error. When this is achieved the Clock Control Logic (M201) transitions into the next state of operations.

During the Phase Jam Mode the corrected 100 PPS (159A) is adjusted by the amount indicated in the next Phase Estimator Control phase offset solution and the Precision sensor is commanded to adjust its internal Precision phase calculation with the same amount as the phase jam value.

Once the clock settles and the Phase Estimator Control phase and frequency solutions are within the fme tuning tolerance, the logic will transition into the Closed Loop Tuning mode (M212). During this mode, the NCO is loaded with the 70%, 50% and 30% values of the Phase Estimator Control frequency solutions for a frequency error of 500 to 400 ps/s, 400 to 100 ps/s and 100 to 1 ps/s respectively. During this mode, the time (phase) is loaded with the 70%, 50%, 30% value of the Phase Estimator Control phase solutions for a time (phase) error of 100 ns to 500 ns, 500 ns to 200 ns and 200 ns to 50 ns respectively.

When the Phase Estimator Control phase and frequency solutions are within the disciplined tolerance (5 ns and 20 ps/s respectively), the Valid Data signal (M211) is enabled and the Disciplined Mode is completed.

Mode 3—Initialize Communication Channels

Figure 48:
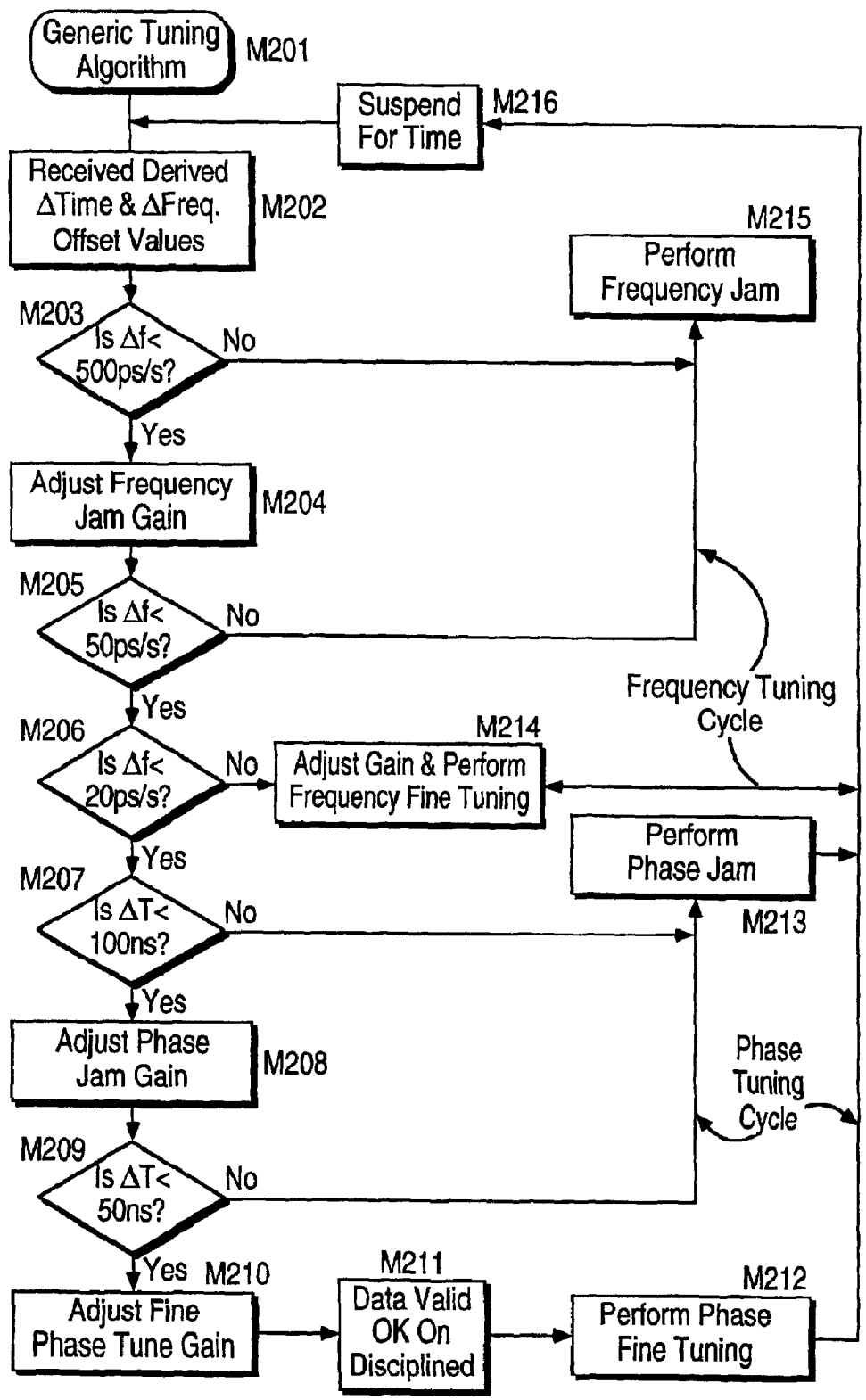
FIG. 48 is an illustration of the High Level UniNet Internet Clock Tuning Logics.

In this state the Com2000™ UniNet communication channels are internally locked to the local reference signal source (123). The Channel Equalization Filter (312) and the Clock Recovery Controller Logic (311) select the derived Corrected 125 MHz signal source (19F) as the reference signal for the PLL and the decoding (313) and encoding (315) blocks, as illustrated in FIG. 48.

Mode 4—Calculate Internal Communication Channel Bias for calibration.

In this state, the Com2000™ UniNet communication receiver, as illustrated in FIGS. 47a, 47b, is phase locked to the internal transmitter BIT (Wrap around injection) signal with a clock frequency that is traceable to the 125 MHz Reference signal source (19F).

Before external phase and frequency transfers are performed on the selected communication channel, the channel phase and frequency offsets are determined. This is a state where the Com2000™'s communication channels are internally locked to the local reference signal (123) and the phase and frequency offsets for the transmitters and receivers of the channels are determined relative to the absolute reference phase and frequency source (123). The Phase and Frequency measurement (14) are performed for the selected communication channel, as illustrated in FIG. 43d.

For the UmnNet LAN Network communication channel, a BIT signal from the Com2000™ Channel Equalization Filter (312), as illustrated in FIG. 47b, which is derived from the corrected 125 MHz signal source (19F), is used as the transmit and receive signal for the LAN channel calibration calculations.

In order to obtain the phase difference between the absolute phase source (123) and the received signal phase (9) from two phase reference stations, the offset of the 100 PPS Reference signal (15) and the 100 PPS derived from the UniNet LAN received signal (9) has to be determined. By using the Measurement Source Selector (14) the 100 PPS phase offset value and frequency offset value of the BIT signal and the LAN reference source is determined.

To measure the external communication channel 100 PPS input signal (9), the corrected Precision PLL 500 MHz signal (147), as illustrated in FIG. 43d, is down counted (142) in series decade counters to 100 Hz (149A). The 100 Hz and the Precision corrected 100 PPS (149B) are in phase with each other but with some fixed but unknown offset. A one-phase measurement is made by latching (143) the phase of the counter (142) of the Precision corrected 100 PPS signal selection (149B). The received external 100 PPS (9) is selected at switch 7 for the Mux input signal (149C) and is selected through the Mux (145). The phase of the counter (142) is again latched (143) and the difference between the precision 100 PPS latched value and the external 100 Hz latched value is the phase offset relative to the Precision corrected 100 PPS (149B). The measurement continues at a 0.1-second update rate.

To measure the external communication channel frequency (10) offset relative to the local frequency reference, switch 5, as illustrated in FIG. 43, selects the external input frequency source for the Auto Selector (121) input frequency. The external input is divided down (19A) to a 100 Hz signal. The 100 Hz is passed through the Mux (145) to the Sync (144) to latch (143) the phase of the 500 MHz down-counter (142). By monitoring the changes in the counter over time, the offset frequency can be calculated. The one-shot (144) phase measurement accuracy of 5 parts per billion is initially obtained. The resolution improves when integrated over time. At 500 seconds, during normal channel communication, the measurement resolution reaches the specified 10 parts per trillion resolution. All counter measurements are averaged for 500 seconds to insure full resolution at each subsequent measurement (100 Hz).

Mode 5—Internal Idle, Stay Off Communication Channel & Maintain System Phase.

In this state the Com2000™ UniNet communication channels are internally locked to the local reference signal source (123) without transmitting or receiving any data from the communication channel. The system phase is maintained and calibration is done periodically. This phase is performed during IDLE system operation.

Mode 6—Select The Communication Channel for Phase and Frequency Transfers.

In this state the external Com2000™ communication channels are selected and internally locked to the local reference signal source (123) to be ready for transmitting and receiving data to or from the selected communication channel. The system phase is maintained and calibration is still done periodically via the synchronization training sequence of the equalizer filter and the reference tone from RN.

Mode 7—Establish Communication Channel

In this state the Com2000™ communication channels are sending and listening to and from external nodes. This state performs a signal search in two-dimensional space, frequency and phase, for the received data signal. It performs a frequency search and then phase-locks the received preamble training PN sequence of the burst signal. The received signal offsets from the local reference are determined and compared with the expected frequency and phase cell of the sending node. This establishes a node specific electronic signature (E-DNA) that is utilized for network security. For the sending data signal, the transmit reference carrier is phase locked to the local reference signal source (123) and the encoded data is superimposed on the carrier for sending the data out on the selected communication channel.

Within this mode, the Com2000™ Transceiver System extracts the station ID (filter PN sequence training preamble) or identification information from the data received from each station node and determines if the station is a proper group member. If the incorrect ID is received, the LAN/WAN UniNet transceiver will keep attempting to extract the ID from the data until the correct or expected station ID is received.

Mode 8—Calculate External Communication Channel Offsets or Biases for Calibration.

In this state the UniNet PN communication receivers are phase locked to the external transmitter signal with a clock frequency and phase that have unknown offsets relative to the internal local reference that is traceable to the 125 MHz Reference signal source (19F).

Before external two-way phase and frequency transfers are performed on the selected communication channels, their respective channel offsets are determined. In this state, the Com2000™ UniNet communication channel receiver is externally locked to an unknown input reference signal and the phase and frequency offsets on the transmit and receiver section of the channel are determined relative to the absolute reference phase and frequency source (123). This condition is existed when the user wants to measure the PN receiver's host computer clocks relative the RN transmitted reference clock. The Phase and Frequency measurements (14) are performed for the selected communication channel utilizing its received derived 100 PPS frequency signal.

Also, the Com2000™ UniNet Transceiver unit includes circuitry to count the number of cycles after the "On Phase" mark when decoding the data and resolving down to the "Digital Carrier Cycle Resolution". The unit outputs a 100 PPS pulse synchronized to the phase code "On Phase" mark. This pulse is available as a TTL/CMOS output and can be used to initiate a host (MAC) interrupt that is a precision interval clock pulse for host reference. This interrupt pulse can be programmed to generate a synchronized pulse from 2000 PPS to 100 PPS. This provides an absolute time reference source capability within the Com2000™ Transceiver's host domain. This can be used as an UTC and World Standard time reference (i.e. year 2000-rollover solution).

Mode 9—Perform 1 Way Frequency & Phase Transfer to an External Communication Node.

In this state the Reference Clocks and Measurements Subsystem performs the phase and frequency transfer between nodes with an absolute reference from the sending node to a receiving node that has no absolute frequency tone signal references from the RN. The same frequency and phase tuning that is performed in mode 2, discipline of internal oscillator, is performed by PN except the recovered clock of the received signal from the training synchronization sequence of preamble burst is utilized as the receiving node clock source of the PN. This is in a sense, a degraded mode of operations, since the RN reference clock signal is not continuously available for the PN nodes. The TDM tracking and timing recovery is utilized instead.

Mode 10—Perform 2 Way Frequency & Phase Transfer to an External Communication Node.

Once the receiving PN station oscillator is disciplined, full duplex phase and frequency transfers can comnmence. This is done in the full duplex signaling mode such as baseband signal PAM5 over the channel CAT5. Since the signaling of QAM is used for UniNet share structure, as illustrated in FIG. 03, this mode can be only utilized when there is different frequency carrier channel for uplink and downlink. Anyhow, during the Full duplex transfer technique is used for point-to-point phase and frequency transfer to obtain the highest precision and accuracy. Both the Slave and Master receive and transmit stations exchange timing and frequency information through the communication channel protocol employing appropriate coding signals for Category 5 UTP infrastructure and pseudo noise (PN) coded signals for security.

The relative phase measurement consists of simultaneous phase interval measurements (14) at both the Slave and Master nodes in which the 100 PPS generated by the local clock (159A) starts both the local phase and frequency counters (142,143). The master 100 PPS signal is encoded and transmitted across the communication channels. The received encoded 100 PPS stops the remote phase and frequency counters (142,143). The relative phase difference, T1–T2, between the clocks of both stations is given by the following equation:

$$T1-T2=\tfrac{1}{2}(C1-C2)+\tfrac{1}{2}[(d1U+d2D)-(d2U+d1D)]+\tfrac{1}{2}(d12-d21)+\tfrac{1}{2}[(d1Tx-d1Rx)-(d2Tx-d2Rx)]$$

Where:

C1–C2 is the difference of the phase counter readings of station 1 and station 2, which are exchanged in order to compute the clock difference.

d1U, d2U is the Transmit link delay of station 1 and station 2 d1D, d2D is the Received link delay of station 1 and station 2.

d12, d21 is the path reciprocity terms from 1 to 2. Under the assumption of path reciprocity, this term, d12–d21, should cancel out. This assumption is likely to hold better than 2 ns for multiplexing transmission at IEEE-802.3 protocols, which demonstrated in the lab via the 100BaseT links.

(d12–d21) is the difference of the Category 5 UTP infrastructure or wireline transceiver delays in both signal directions.

d1Tx–d1Rx is the differential delay of the transmit part and receive part (station delays) of station 1 and 2. The knowledge of these station delay differences determines the accuracy of the phase comparison.

Once the Phase Interval Measurements are determined, the Frequency measurement follows. It consists of simultaneous Frequency interval measurements (14), as illustrated in FIG. 43d, at the master and slave nodes for an extended period of time. This enables clear definition of the slope of the curve of the counter readings relative to the measurement phase interval.

Mode 11—External Idle and Stay Off Communication Channels and Maintain System Phase.

In this state the Com2000™ communication channels are externally locked to the system reference signal source (123). The system nodes continuously transmit and receive IDLE or Synchronization symbols to maintain system phase and frequency synchronization within a fixed tolerance. The system returns to normal transmit and receive mode upon receipt of a valid data symbol.

The next description of the background of the Com2000™ smart clock technology (344), as shown in FIG. 47b as the OSC and Precision Clock Reference, which is a breakthrough design for improved stability that is responsible for signal modulation references and synchronization sources, is included in the following paragraphs.

The Com2000™ smart algorithm of the Com2000™ Precision Clock Reference (344) improves the quartz based oscillator system performance, making it equal or better than a cesium-based solution. The algorithm (344) compares the oscillator frequency (345) with an absolute signal traceable to the World reference signal. By learning the aging behavior and the environment effects on the oscillator over time, the Com2000™ Smart Clock adjusts the oscillator output frequency accordingly and significantly improves the accuracy.

The ensuing discussion deals with the Com2000™ Precision Clock Reference (344), as shown in FIG. 47b as the OSC and Precision Clock Reference, fast and efficient frequency and phase estimation and transfers in an additive white Gaussian communication channel. The frequency and phase transfers of the Com2000™ Precision Clock Reference (344) from node to node can be associated as calibrating a low precision of a frequency source's node relative with another node with a high precision frequency reference source.

The following discusses the Com2000™ Precision Clock Reference (344) efficient phase estimation in an additive white Gaussian noise environment, where the received modulated signal is a function of both phase and frequency error (Delta Phi, Delta f).

This section describes a modified version study of the Com2000™ Precision Clock Reference (344) phase estimator. The comparison is performed in terms of two criteria—estimator variance and phase ambiguity resolution, reference FIG. 43a.

In order to take advantage of the Com2000™ Precision Clock Reference (344), as shown in FIG. 47b as the OSC and Precision Clock Reference, a gain term is provided for digital coherent communications. The input of the Com2000™ receiver detection device (351,353) is independent of any phase and/or frequency errors (Delta Phi, Delta Frequency). These errors come about as a result of the small discrepancies between the transmitter and receiver oscillator (344) frequencies, or may be introduced by the communication channel. The process of ensuring error independence is called synchronization, and generally the Com2000™ Precision Clock Reference (344) synchronizers fall into on of two categories. The First category is where the received signal is fed into a tracking loop (353) whose objective is to track the phase and frequency errors, thereby driving some error signal to zero. Two of the common examples of such loops include the re-modulator and Costas loop. Since these loops possess feedback, they suffer from hang up, and thus they tend to have large acquisition time. As a result, these Com2000™ Precision Clock Reference (344) synchronizers are not applicable if Delta Phi, or phase, and Delta Frequency are quickly varying, or if the information is transmitted in bursts (as is the case for an Ethernet and TDMA UniNet scheme). For these cases, the Com2000™ Precision Clock Reference (344), as shown in FIG. 47b as the OSC and Precision Clock Reference, synchronizers that fall under the second category are more appropriate.

The Com2000™ Precision Clock Reference (344) synchronizers can handle both types of data clock modes. The continuous data clock mode such as 100/1000BaseT signaling scheme for 802.3ab (IDLE Symbols) and burst type transmission such as TDMA signaling as illustrated in FIG. 03. These are classified as feed forward estimators and have the property of a fixed and fast acquisition phase due to synchronization circuitry of the Com2000™ Precision Clock Reference (344). Essentially, the estimate of Com2000™ Precision Clock Reference (344), derived from the estimated denote Delta Phi Hat and Delta Frequency Hat and is based on a block of received data for equalizers to process and referred to as the observation window. This data is processed in such a way that the Com2000™ Precision Clock Reference (344) estimates for Delta Phi and Delta Frequency are obtained via aiding from the receiver equalizers. These estimates denote Delta Phi Hat and Delta Frequency Hat and are used by a phase rotator to correct the received data through the Com2000™ Measurement Circuitry (343). Since the estimators are feed forward, hang up cannot occur.

The receiver PN equalizer is tracking signal RN source and it is used as the reference source for disciplining the local oscillator or Com2000™ Precision Clock Reference (344). The calibration of precision frequency and phase sources of the Com2000™ Precision Clock Reference (344) requires comparison between the oscillator device to be calibrated and a precision reference source. All secondary frequency sources, such as quartz oscillators, require periodic calibration, usually against a local reference standard from another node. For the highest precision reference node, comparison against a national reference standard may be required.

The main concern of the calibration process of the Com2000™ Precision Clock Reference (344) is the ability to determine the frequency of a given unit relative to the accepted definition. In order to relate the measurement to the accepted definition a means of obtaining "traceable" comparisons is required. There are a variety of acceptable means of making such a comparison. In the USA, there are two organizations which provide services that provide to calibrated frequency references to an internationally accepted definition, the National Institute of Standards and Technology (World) and the US Naval Observatory (USNO).

The local Com2000™ Precision Clock Reference (344) parameters are the phase and frequency that are maintained at the calibrated node, and are synchronized in phase and frequency with the reference node. In the Com2000™ Clock Transfer Technology approach of the Com2000™ Precision Clock Reference (344) circuitry, where an accurate degree of precision is required for PAM5 or our Partial Response PAM5 signaling, the phase and frequency reference signals may be transmitted with digital signals from one site to another. As a result of the transmission process, the Com2000™ Precision Clock Reference (344) receiving (phase and frequency) signals are degraded by the propagation delay and induced line noise. A more subtle effect that degrades the Com2000™ Precision Clock Reference (344) reference signal is the environmental performance of the transmission media. The following describes the transmitting and receiving equations for the Com2000™ system implementation.

Sending Node Frequency & Phase:

$$Fs=F0+Fsref*t+Fserror*t;$$

$$Ps=Ps+(Fs/Fsrf-1)*t+\frac{1}{2}(s\_aging\ rate)t^2+Ps\_noise+Ps\_intrinsic\_delay;$$

Receiving Node Frequency & Phase:

$$Fr=F0+Frref*t+Frerror*t;$$

$$Pr=Ps+Pr+(Fr/Frrf-1)*t+\frac{1}{2}(a)t^2+Pr\_noise+Pr\_intrinsic\_delay;$$

2.1.2 Multi-Channel Error Controlled Environment: Meas, Calibration & Control Tech Advanced Channel Measurement & Control techniques enable any topology media channel calibration for optimal signal controls and intelligence flow, as illustrated in FIG. 03. Today's cable and wireless communication infrastructures are less than ideal. There are many instances where the highest achievable data rates are not possible due to the imperfections and defects of the communications medium.

Com2000™ Channel Measurement, Calibration and Control Technology perform the following process:

(a) Measures and calibrates the communication channel so that the highest possible data capacity can be achieved. The communications channel between each node pair (RN, PN), as illustrated in FIG. 03, must be first be synchronized and then characterized so that errors and imperfections, such as frequency and phase distortions, can be identified. Com2000™'s calibration system then uses these measurements to improve communication channel resolution by controlling the errors and imperfections of the channel.

In an ideal world and conditions of the data communication between 2 devices and it is existed when the channel errors in range, power, phase, frequency, timing, or any other signal parameters are negligible just as the two communicating devices are integrated into a single chip size space. In realistic world of data communication, the two communicating devices are always apart in range and distance via a communication channel, either as the guided medium such as Fiber optics, Copper wires, . . . etc, or non-guided medium such as air in the case of wireless communication. The signal errors are therefore induced and effected each of the signal parameters differently while traverse over the established communication channel. To characterize and calibrate the errors is the function of this step.

Even these measurements and calibration techniques are publicly available and also currently available at the counter top test equipment. The novel idea of channel measurement and calibration here is that these features at firstly is built-in into the physical layer device, due the precision synchronization signal references. Secondly, this is a means of dynamic channel adaptability such as in universal wireline transceiver in any topology, configuration and applications.

(b) Sniff and Determine the appropriate operating frequency spectrum channel so that the highest possible data capacity can be achieved. Once the networks on the channel are synchronized and calibrated, the allowable communication channel between (RN, PN) node's operating frequency range is measured. This is done to avoid any frequency interoperable issues. As an example, in the private networking environment such as home, a family member may still want to use the Analog Phone or The 56K modem, The xDSL G.lite modem, The ADSL modem and the UniNet Networking all in the same time. Each of these devices operates over a specified operating frequency range. Analog Phone & 56K modem is at 0–4 KHz; G.Lite modem is at 25 KHz–500 KHz; ADSL modem is at 25 KHZ–1.1 MHZ frequency range.

The UniNet will sniff the environment in frequency at the initialization and periodically in order to determine the best and safe operating frequency range for the Networks automatically without contention. This is done determined based on the activity of the channel during measurements, predetermined and pre-configured value from the user of each node.

(c) Determine the highest possible data capacity for a particular medium by measuring the signal to noise ratio or SNR of the most distance locating nodes during the training period. Upon completion of defming the open frequency spectrum to work with and the most distance node on the channel bus is identified, The channel SNR characterization is performed (d) Sniff and determine the number of users on the networks and allocate the bandwidth intelligently and accordingly to each user node bandwidth's requirements. This capability is refreshed periodically for any network or user updates. This is done by selecting the most distance end nodes to communicate with each other during the start up training sequences.

A. Brief Sunmmary of Channel Measurement & Calibration Problems

In any type of communication channel, there is distortion that can cause errors in data signaling thereby reducing effective throughput. When data is transmitted over a communication channel at a particular signal parameter and characteristics, the signal's characteristics often changes as the signal propagates along the channel. The imperfections in the communication channel tend to reduce the resolution of the data bandwidth of the signal being transmitted across the channel. Furthermore, the data may not be interpreted correctly at the receiving end of the channel if the transmitted signal's characteristics are outside of a defined signal's parameter range, as illustrated in FIG. 03.

B. Channel Measurement & Calibration—General

Figure 44:
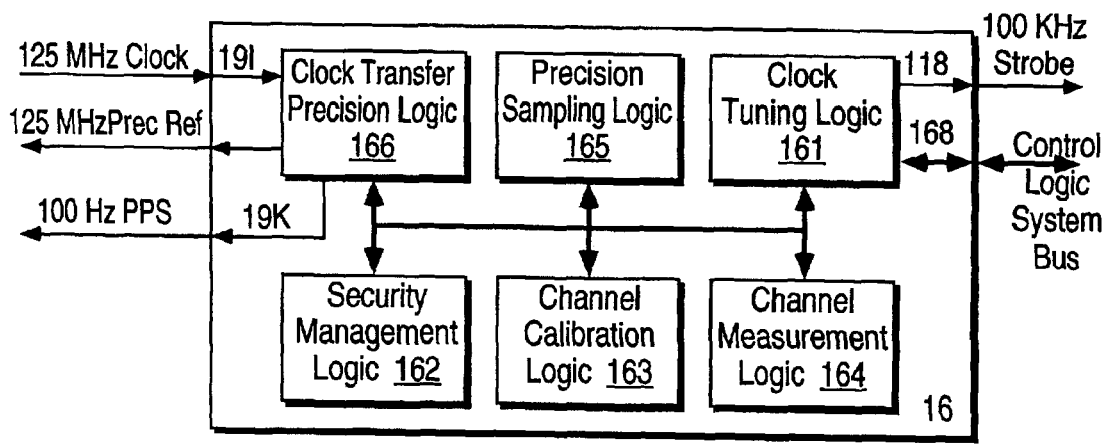
FIG. 44 is an illustration of the Newly UnNet Internet Clock Transfer Control Logics.

Com2000™ Channel Measurement and Calibration Control Technology measures and calibrates the communication channel to determine the highest possible data capacity for a particular medium. Com2000™ Residual measurements of the Com2000™ Channel Measurement and Calibration (343), as illustrated in FIG. 44, system are very powerflil tools for troubleshooting and calibrating communication channel across any wireline and wireless channels. Once the reference signal has been subtracted, it is easier to see small errors that may have been swamped or obscured by the signal distortion and modulation itself as in the case of filter or equalizer initialization during the training sequence.

1) Summary of Channel Measurement & Calibration Techniques

Com2000™ Measurement (343) Technology is used to measure many parameters that contribute to the propagation delays of communication channel infrastructure. The Com2000™ Measurement circuitry (343) is also used to measure ranging via phase interval, frequency, period, pulse width, power, sampling phase, rise and fall time and also does event counting. This capability of the Com2000™ Measurement (343) system is then used to determine the frequency and phase error or drift due to the communication channel assuming the sending and receiving frequencies are synchronized and have the same heartbeat. With built-in frequency and phase counter capabilities, Com2000™ Measurement provide another method for determining the channel transmission medium frequency and phase distortions.

In the Com2000™ UniNet digital communication system, such as shown in FIG. 03, non-uniform noise distribution or discrete signal peaks indicate the presence of externally coupled interference. The goal of the Com2000™ Measurement and Calibration (343) system is to ensure that the sending and receiving selected parameters are the measured and calibrated. The five or more parameters measured by the Com2000™ Measurement (343) system are power, frequency, phase, timing and pulse code modulation accuracy 2) Detailed Method Steps of Channel Measurement and Calibration (Flow chart)

The communications channel must also be characterized so that errors and imperfections, such as frequency and phase distortions, can be identified and calibrated. Com2000™ Channel Measurement and Calibration Control Technology uses these measurements to improve communication channel resolution by controlling the errors and imperfections of the channel. When both the channel predefined input and received output PN signal's parameters over a transmitted channel are available, the corrected frequency, phase and time synchronization, the channel magnitude and phase response of the channel can be measured using conventional LMS criterion just as the Kalman filtering process does in time. The difference between the Com2000™ received signal modulation PN phase vector and the ideal reference signal PN phase vector is the channel phase modulation error. It can be expressed in a variety of ways such as Error Vector Magnitude (EVM), for amplitude magnitude Error, Phase magnitude error, and any other measured signal's parameters.

Com2000™ EVM Residual measurements of the Com2000™ Channel Measurement and Calibration Control (343) system are very powerfuil tools for troubleshooting and calibrating communications across any wireline and wireless channels. Once the reference signal parameter has been subtracted, it is easier to see small errors that may have been swamped or obscured by the single individual or a combination of other signal's parameter distortion and error modulations.

At this point further definition of the Error Vector Magnitude (EVM) is required. To illustrate the concept, let us pick the phase of the signal for the QAM signal coding. Before transmitting, the Com2000™ UniNet raw digital bits are mapped and transferred on a predefined M-QAM digital coded symbol (327) and burst carrier by varying the carrier's magnitude and phase transitions. At each symbol clock transition, the carrier occupies any one of several unique locations in the I versus Q plane. Each location encodes a specific data symbol, which consists of 4 data bits as in the case of QAM-16. A constellation diagram shows the valid locations (i.e., the magnitude and phase relative to the carrier) for all permitted symbols of which there must be $M=2 \exp N$, given N bits transmitted per symbol. In this case N is 4. In general, for M-QAM demodulator (332) to decode the Com2000™ incoming data, the exact magnitude and phase of the received signal for each 4× baud clock (sampling) transition must be accurately determined. The logic layout of the constellation diagram and its ideal symbol locations are determined generically by the modulation M-QAM format.

At any instance, the Com2000™ Measurement (343) system can measure the received signal's magnitude and phase. These values defme the actual or measured phasor. The difference between the measured and the predefined reference phasors forms the basis for the EVM measurements of the Com2000™ Measurement (343) circuitry.

The Com2000™ EVM is defined by the average voltage level of all the symbols (a value close to the average signal level) or by the voltage of the outermost (highest voltage) four symbols. The Com2000™ Measurement (343) system measures of phase error vector magnitude and related quantities can, when properly applied, provides great insight into the quality of a M-QAM digitally modulated signal. The Com2000™ Measurement (343) system can also pinpoint the causes of any problems related to power and phase by identifying exactly the type of degradation present in a signal and even lead to the identification of the sources.

When the EVM is resolved, by the Com2000™ Measurement (343) system can further resolves the errors into its magnitude and phase error components. It can be individually or in combination compared to their relative sizes, and when the average phase error (degree) is substantially larger than the average magnitude error, it can be determined that some sort of unwanted phase modulation is the dominant error (Inter-Symbol Interference). This is caused by noise, spurious or cross-coupling problems in the Com2000™ reference frequency and phase lock loops, or other frequency generating stages. This can be used then to calibrate the jitter window. Uniform noise is also a sign of some form of phase noise (random jitter, residual PM/FM)

The Quadrature error, when the Q-axis height does not equal the I-axis width, is caused when the phase relationship between the I and Q vectors are not exactly 90 degrees at the time signal arrives the receiver. When viewing the Com2000™ Measurement (343) measured EVM in terms of phase or symbol, errors may be correlated to specific points on the input waveform, such as peaks or zero crossings. The Com2000™ Measurement (343) measured EVM, in this example case, is a scalar (magnitude-only) value. Error peaks occurring with signal peaks indicate compression or clipping. Error peaks that correlate the signal minimum suggest zero-crossing non-linearities. These error value can be quantified and calibrated accordingly, specially on the wireline communication channel case.

In the Com2000™ UniNet digital communication system, non-uniform noise distribution or discrete signal peaks indicate the presence of externally coupled interference. The goal of the Com2000™ Measurement (343) system is to ensure that the sending and receiving Signal parameters are as close to the same as possible; as an example in the case of frequency and phase.

In a multiple Com2000™ encoded signal environment, the present invention accurately measures the signal parameters in the wireline or wireless digital data communication system. Measurements include analyzing the Com2000™ UniNet QAM code phase modulator and demodulator, characterizing the transmitted signal quality, locating causes of high Bit Error Rate (BER) and monitoring and maintaining link noise budgets. The four parameters, as an example, are measured by the Com2000™ Measurement (343) system: power, frequency, timing and burst code modulation The Com2000™ Power Measurement (343) system measures the power, which includes carrier power and associated measurements of gain of the transmitter drivers and insertion loss of filters and attenuators at the transmitter side. The signals used in the Com2000™ digital modulation are PN or Pseudo Random Sequence noise-like. The Com2000™ Measurement (343) system measures Bandpower or the power integrated over a certain band of frequencies or power spectral density (PSD). PSD measurements are normalized power to a certain bandwidth, usually 1 Hz. frequency counter measurement techniques are often not accurate or sufficient enough to measure center frequency. The Com2000™ Frequency Measurement system utilizes a measurement technique that determines the average accumulation of the PSD across a known bandwidth such that the roll-off and center points for a particular bandwidth are determined. This provides the capability to maintain the optimum probability of signal detection by estimating the carrier centroid, which is the center of the distribution of frequency versus PSD for a modulated signal.

The Com2000™ Duty Cycle Measurement (343) system measures duty cycle distortion that is made most often in pulse or burst mode. Measurements include pulse repetition interval or PRI, on time, off time, duty cycle, and time between bit errors. Turn-on and turn-off times are also involved with the power measurements.

The Com2000™ Phase Measurement (343) system measures Modulation accuracy that involves measuring how close either the constellation states or the signal phase vector trajectory is relative to a reference phase vector trajectory or ideal signal trajectory. The Com2000™ received signal is demodulated and compared with a Com2000™ reference signal parameter source for every parameter measurement case. As for the phase, the received signal phase is subtracted from the reference signal phase and the result is the difference or residual.

Modulation accuracy is a phase residual measurement for the signal that propagate over this communication channel.

The frequency and phase counter capabilities provide another method of measurement for the Com2000™ Measurement (343) system for determining the channel transmission medium frequency and phase distortions. The Com2000™ frequency counter function of the Com2000™ Measurement (343) system is a versatile device. Most simply, it is used to directly measure the frequency of a signal applied to its input port, which is derived from the recovery clock of the received signal carrier of the phase lock loop. The accuracy of the measurement is directly related to the internal resolution of the counter (50 ps) and the stability of the internal frequency source (344). The performance of the Com2000™ Measurement (343) system frequency counter is significantly improved in both accuracy and stability by using the external precision reference (standard frequency reference such as SONET stratum 1) node's frequency source as an external phase base for the counter.

However, the Com2000™ frequency counter function of the Com2000™ Measurement (343) system are still limited by their internal design resolutions on the order of 50 part per billion. But most high precision frequency sources can still be adequately evaluated by direct measurement with a Com2000™ frequency counter.

Another measurement is the stability and the accuracy of the receiving signal. Overall accuracy and stability is governed by the signal with the worst stability. Therefore, unless it is known that the Com2000™ frequency reference source (344) is significantly better than that being measured, we can only conclude that the signal being measured is no worse than the measurement indicates and may be much better.

Another method of frequency and phase measurement of the Com2000™ Measurement (343) system is the comparison of two signals that are essentially identical. This involves comparing the change in phase between the two sources. Both signals are applied to a digital linear phase comparator and the result is accumulated as a function of time. The data variation in time is similar to "Direct Phase Interval" variations as a function of the time, but is generally continuous. The slope of the comparator's results in time indicates the difference in frequency of the unknown signal versus the frequency reference (344). This capability of the Com2000™ Measurement (343) system is then used to determine the frequency drift of the communication channel assuming the sending and receiving frequencies are synchronized and have the same heartbeat relative from the known accurate reference source.

The built-in Phase Interval counter of the Com2000™ Measurement (343) system is now available with resolutions on the order of 100 picoseconds. With this degree of precision, the Com2000™ frequency measurements of a very high precision source (344) can be made against a known frequency reference source. The degree of precision is governed by the signal with the greatest amount of noise, or instability, in the signal. The "Phase-Difference" technique of the Com2000™ Frequency Measurement (343) system is a method for comparing two signals that are essentially identical in frequency. The Start signal for the Com2000™ phase counter feature is derived from the internal reference frequency source (344). The Stop signal for the Com2000™ phase counter is derived from the external unknown frequency signal source (as an example, it can be from the recovered receiving signal clock's phase and frequency of Clock Recovery (353) system. The Com2000™ TM Measurement (343) system measured phase interval between the start and stop signals can be estimated as a function of elapsed time. The maximum phase interval that can accumulate is the "period" of the highest frequency applied to either the "Start" or "Stop" inputs of the counter.

When a full "period" of the phase interval accumulates, the data reduction becomes more complicated as proper one-period adjustments must be made to all of the data obtained after the data step. Since both the Start and Stop signals are relatively stable, a determination of the unknown frequency of the Com2000™ Measurement (343) system can be performed by computing the slope of the data on the fly. As mentioned before, the results will indicate that the unknown frequency is no worse than the measurement indicates and may be much better.

This following paragraph to illustrate the Com2000™ Measurement (343) Technology that can be used to measure many signal parameters that contribute to the propagation delays of communication channel infrastructure. The Com2000™ Measurement circuitry (343) is also used to measure, but not limited to, phase interval, frequency, period, pulse width, phase, rise and fall time and also does event counting.

Propagation Delay Measurements—

The Com2000™ Measurement (343) circuitry measures the phase interval between two independent signals A and B. This is used to measure the electrical length and time error of the communicating channel. As an example, the CAT5 cable can be configured as end to end or single ended with the remote end shorted to ground or left open. Using the Measurement circuitry's stable 125 MHz reference signal (344) as stimulus, the propagation delay from one end of the CAT5 cable to the other, or between the incident and reflected rising edge of the pulse and the phase offset can be measured. Knowing that electricity travels at approximately 1 ft per 1.7933 ns, or 136.65 ps/inch, the CAT5 cable length is easily calculated. This technique can be applied to the wireless channel as well.

The phase distortion or time error from the transceiver's input to the output is also measured with the Com2000™ Measurement (343) circuitry. Transmission Jitter of the signal is defined as short-term phase variations or phase distortion of the significant instants of a digital waveform from an ideal clock running at the same average rate as the signal. "Significant Instant" refers to any clearly defined point, such as zero crossing.

Pulse Width Measurement

Data communications and telecommunications use different modulation schemes to minimize the amount of data transfers and maxirnize the signal to noise ratio. The Com2000™ transceiver can uses any conventional 3–11 pulsewidth modulation scheme to define the equivalent pulse width of the channel. This scheme produces data patterns with different pulse widths. The Com2000™ Measurement (343) measures the pulse width of any signal and their variations within a specified phase interval between any two independent signals A and B. This is used to measure the electrical pulse length characteristics of the CAT5 channel as an example.

Rise and Fall Time Measurements

Since the 10–90% rise time of the transition is important for the wireline receiver, the Com2000™ Measurement (343) system measures the transition time. The small signal frequency response of the cable can therefore be calculated (Bw=0.35/Rise-Phase). The Com2000™ Measurement (343) system allows a squelch circuit to be triggered with the start and stop voltage thresholds to obtain maximum flexibility in rise and fall time measurements so that any part of a transition may be measured and analyzed.

Frequency and Period Measurements

The Com2000™ Measurement (343) system measures a self-generated OSC reference and compares this to the input receiving signal for determining the quality of the input frequency. The Com2000™ Measurement (343) analyzes the source over a set gate phase (Delta T) and then, for that interval, determines the maximum and minimum frequencies and the associated jitter, revealing the quality of the source. Frequency is measured as N/Delta_T and the period is measured as Delta_T/N, where N is the number of cycles and Delta_T is the elapsed phase to complete N cycles.

Phase Measurements

The Com2000™ Measurement (343) circuitry measures the difference in phase between the input and output and a self-generated reference phase.

Event Counting & Measurements

The Com2000™ Measurement (343) circuitry also has the capability to operate as a pulse counter that counts either transmit or receiving electrical pulses at a rate of up to 100 MHz.

The resolution of the measurement, or single shot resolution, is typically 50 ps RMS. This number can be improved by averaging over many measurements, or in the case of frequency and period measurements, increasing the time gate. The absolute error (the difference between the measured value and actual value) is typically less than ins for a time interval measurement of less than lms. This error is of interest in determining how far a value is from the actual value. Often only the relative accuracy (the difference between two measurements) is important. The differential non-linearity is a measurement of the relative accuracy of a measurement and is specified as the maximum phase error for any given relative measurement. The Com2000™ Measurement (343) circuitry differential non-linearity is typically +/−50 ps.

Short Term Stability & Measurements

The Com2000™ Measurement (343) circuitry measures the short-term stability of an oscillator frequency. The short-term stability is a measure of the changes in the output of frequency of the oscillator on a short time scale (seconds or less). These changes in the frequency are usually random and are due to the internal oscillator noise. These random changes in frequency affect the resolution of the measurement just as other internal noise. The short-term stability of the Com2000™ is 1 sec in 50 parts per billion. The measurement resolution for an interval 1 second gate or time interval, will be dominated by the short term stability.

The resolution in ps of the Com2000™ Measurement (343) circuitry is defined as:

$$Res=Sqrt[(50\ ps)(50\ ps)+(Delta\_T*Short\text{-}term\ Stability)(Delta\_T*Short\text{-}term\ Stability)]$$

Long Term Stability & Measurements

The Com2000™ Measurement (343) circuitry measures the long-term stability of an oscillator. The long-term stability is a measure of the changes in the output of frequency of the Com2000™ oscillator on a long time scale (days, months or years). These changes in the frequency are usually due to the internal oscillator's aging rate or physical change of the crystal and temperature response. This drift change in frequency affects the resolution of the frequency measurement of a long phase interval just as other internal noise does. The long-term stability of the Com2000™ in a day (aging rate for one day) is one part per million. The measurement resolution for a 1 day interval gate or time interval will be dominated by the long-term stability.

The frequency drift of the Com2000™ Measurement (343) system is defined as:

$$Freq\ Drift=\#Days*Aging\ Rate*Osc\ Output$$

The long-term stability of the oscillator does not pose an issue for the Com2000™ system. This is because the Com2000™ provides a common distributed clock reference source throughout the network system. This RN reference source is monitored and corrected during the Com2000™ network system operation. Therefore each of the network nodes is referenced to the same clock RN source which minimizes the relative long-term stability affect, specially the RN reference is traceable to the world frequency standards.

3) Summary of Channel Capacity Measurement Techniques

Once the networks on the channel are synchronized and calibrated, the allowable communication channel between (RN, PN) node's operating frequency range is measured. The UniNet will sniff the environment in frequency at the initialization and periodically in order to determine the best and safe operating frequency range for the Networks based on the activity of the channel during measurements, predetermined and pre-configured value from the user of each node. The UmNet then determine the highest possible data capacity for a particular medium by measuring the signal to noise ratio or SNR of the most distance locating nodes during the training period.

4) Detailed Method Steps of Channel Capacity Measurement(Flow Chart)

Com2000™ Channel Measurement and Calibration Technology measures and calibrates the communication channel to determine the highest possible data capacity for a particular medium for the allowable operating frequency spectrum. The Channel Measurement logic, as shown in the FIG. 44, utilize the frequency measurement capability to search in frequency and detect the signal as the squelch and AGC circuit threshold is exceeded.

As an example of home networking application for the UniNet, the ordinary telephone line (CAT3 @ 26 AWG or wire gauge) in the house has the typical frequency response out to approximately 35 MHz. The UniNet Home networking system is currently using the frequency spectrum out to 32.5 MHz center at 25 MHz with the bandwidth of 25 MHz, as illustrated in the section 5.0, FIG. 47b . The UniNet receiver center frequency has to move to from DC to 25 MHz for the filter to see the signal and then be used to determine whether there is any activity in the current looking bandwidth. A frequency mixing process of the front end receiver, for down and up converting from the 25 MHz carrier, from a controlled VCO of the Synthezier block (15) output reference, as illustrate in the FIG. 43, is needed before the filter of the receiver can see the signal in the filter. The AGC circuit is then be used to detect any activity of the signal within the observed window. This capability is very much needed the wireless applications of the UnINet when the signal has to be down converted to the working IF signal.

Once the operating frequency spectrum is defined by Com2000™ Channel Measurement and Calibration Technology, it start to measure and calibrates the SNR of the communication channel to determine the highest possible data capacity for the most distanced nodes of a particular share medium, as illustrated in FIG. 03. For each of the (RN,PN) channel pair, the equalizer filter coefficients of all the nodes on the share medium channel need to be defined and measured. This is done in the training period, during which a Pseudo Random (PN) noise training sequence, also available at each of the node's receiver, is transmitted. A synchronized version of the PN sequence is generated at each of the receiver, where the channel input and output signals are used for the identification of the channel equalizer coefficients. Using these coefficients, a modulated signal is sent for estimating the maximum capacity of the communication channel pairs (RN, PN) as illustrated in the FIG. 45, from the calculated received SNR after the slicer. The maximum channel capacity or data speed is the measurement of the SNR from the most distanced PN node relative to the Reference Node for a predefined BER.

5) Summary of Channel Bandwidth Allocation Techniques

Figure 42:
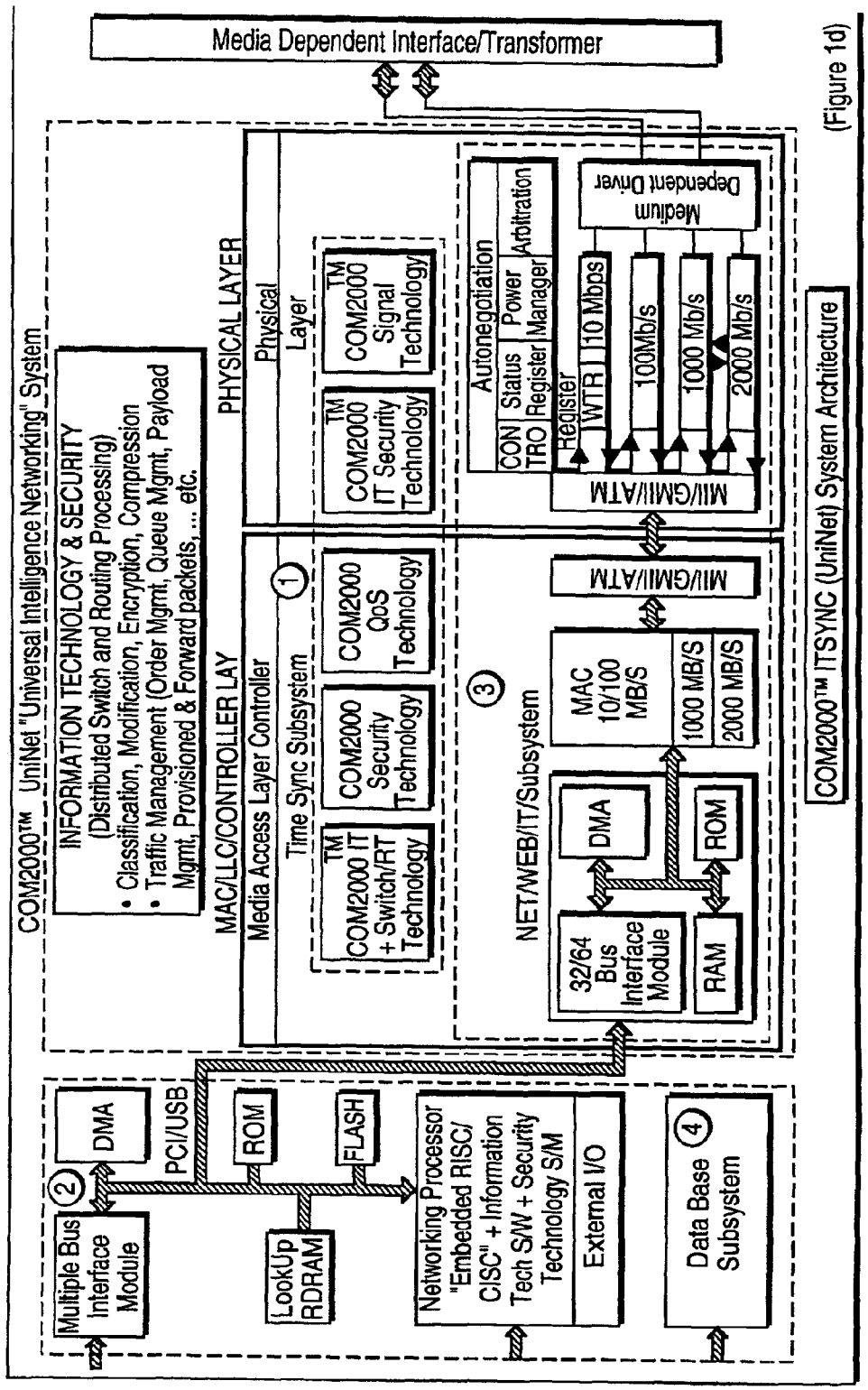
FIG. 42 is an illustration of the Newly UniNet Internet Communication Processor.

This section of the technology delivers scaleable bandwidth transmissions while allowing the best possible data throughput across the transmission medium. This is done via a Dynamic Capacity Allocation (DCA) algorithms. One node of the network will be assigned as the Reference Node. This node takes care of the capacity (slot) allocation. Demand-assignment or Per Request TDM scheme can be used. In this scheme, any node that needs transmission will send a request to the reference node, asking for capacity allocation. There are various dynamic capacity allocation (DCA) schemes/algorithms. The choice of a DCA scheme depends on its complexity and efficiency in supporting various traffic types (real-time, non-real-time) of different QoS, latency, robustness requirements. We can keep DCA schemes reconfigurable ( runs in the microprocessor related) as illustrated in FIG. 42, so that in the future we can apply different DCA schemes depending on the applications.

In general, each node can be a Reference Node (RN). However, there is only one RN operating in a network. For redundancy, we can also select a secondary RN. This secondary RN is on stand-by, and replace the RN only when the primary RN fails. The RN has other functions too. Here we focus on the DCA. The RN coordinates the transmission of all nodes over the bus. Therefore, other nodes wait for the signaling messages to schedule their transmission

6) Detailed Method Steps of Dynamic Channel Bandwidth Allocation (Flow Chart)

Dynamic Bandwidth Allocation or DCA is the UniNet Resource management, which is a centralized resource allocation scheme in which it comprises of two components: The Slot bandwidth allocations ( Slot Repetition Interval or SRI ) between nodes and the Channel bandwidth allocations (Channel Repetition Interval or CRI). The resource defragmentation algorithm is part of the RN DCA algorithm which serve the purpose of maintaining the free pool of slots from gathered in fragmenting way.

Slot Bandwidth Allocation Algorithms or Slot Repetition Interval (SRI)

The Reference node's SRI algorithm capitalize on the dynamic nature of the bandwidth allocation and deallocation requests periodically from the PN node, to establish a Request Refresh Interval for bandwidth deallocation or release of resource should the SRI message is not arrived in the proper interval.

The Channel Repetition Interval or CRI algorithm is a method of PN to request the total allowable bandwidth dedicated for the PN for a interval period. This PN channel bandwidth or CRI is composed of both Circuit like Constant Bit Rate (CBR) for continuous real-time flow or Variable Bit Rate (VAR) for continuous and real-time flow and Best Effort Traffic like Burst volume flow (Unspecified Bit Rate or UBR).

The CRI bandwidth allocation status is keeping tracked by the RN. It is broadcast to PN every CRI refresh cycle. Should the PN CRI request message are not arrived to the RN node at the regular and predefined interval, the PN node total bandwidth (CRI) will be deallocated and left with very minimal default value for maintenance and diagnostic data communication only. This also applies to the SRI algorithm of the DCA.

When a node requires more slots to be allocated, the PN node make a request to the RN node at the predefined SRI interval. The RN will then either honor the request or reject the request via a SRI response status. The condition of RN to honor or reject the SRI request is based on whether it has sufficient free slots for the requests. The SRI response status will send to the requested PN with appropriate status. Each of the PN node will maintain the status table for each of the SRI request histogram. Future algorithm of SRI in the RN will have the capability of honoring different priority level schemes for the requests ID and node ID. In the request pool the request ID and it associated priority are maintained and also dynamically changes based on the number of time on the PN requests of the same request ID and the total time that it was not served and remain in the request pool. This is done so that it can be avoided during the PN node's bandwidth starvation scenarios.

To minimize of the impact of changeover when an RN node is down and when a new RN node has to take over the control of the bus, the internal RN control related table is broadcast periodically over to all of PN for maintaining the RN table up to date. This is very useful when a new designated PN is to be selected as the secondary RN node and when the primary RN node is down. By doing the broadcasting, the PN node can also have an intelligently requests of seeing the total bandwidth of the bus in a time snapshot periodically from the RN point of view. This intelligence enables that in the request by the PN, it will minimize the access delay when the SRI stream is created by the RN and PN pair. This is due to the reason that the request has a high chance of success from the RN perspective. The CRI and SRI algorithm of the Dynamic Bandwidth Allocation can be different for different types of traffic and environment it operates in. This can be defmed during the initialization of the networks and the pre-configuration tables.

The CRI and SRI algorithms provides the Quality of Service or QoS of the UniNet network. There will be different level of accepting and rejecting the requests. The PN node has to make its assessment when the request bandwidth is not honored by the RN. There will be different exception handling mechanism for CRI and SRI algorithms.

2.1.3 Multi-Channel BW Controlled Environment-Channel Adaptive Equalization Tech The form of the Equalizer is considered a combination of LMS (Least Mean Square) based Adaptive Equalizer followed by a non-linear estimator. In the Training mode (104), the filter coefficients are adjusted to minimize the mean square distance between the filter output and the desired training signal (102). In the Blind Equalization mode (104), the desired signal, which is the channel input, is not available. The use of the Com2000™ Adaptive filter (101), for the blind equalizer, requires an internally generated desired signal.

As illustrated in FIG. 45, the Com2000™ Equalizer is comprised of two distinct sections: An adaptive equalizer (FIR Filter) (101), that removes a large part of the CAT5 channel distortion, followed by a Non-Linear Estimator (Decision Device) (103) for an improved estimate of the channel input. The output of the channel's non-linear estimator (103) is the final estimate of the CAT5 channel input, and is used as the desired signal to direct the equalizer adaptation (101). This Blind Equalization method ensures that the equalizer (101) removes a large part of the channel distortion. This method uses a cold start up (104) period during which no training signal is transmitted, and a warm start period during which a training signal sequence is transmitted.

Advanced Medium Adaptation & Equalization Techniques seamless channels adaptation techniques over any topologies of wireless & wireline infrastructure such as bus, point-to-point, point-to-multipoint, mesh, etc., so that higher speed and more reliable data transmission may be achieved, as illustrated in FIG. 03. Each of the (RN,PN) will be considered as a different and unique communication channel in a multi-channel communication environment. It has its own impulse channel response and its own FFE/DFE coefficients for Equalizer Precoder.

A. Brief Summary of Channel Adaptive Equalization

A Decision Feedback Equalizer or DFE has better performance compared with a linear equalizer. Also, a DFE with a fractionally spaced Forward Feedback Equalizer or FFE has the best performance. The draw back of a DFE, however, is the error propagation problem. Because the tail cancellation signal from the DFE is generated according to the estimated signal, a wrong estimation of the signal could reduce the chance of correct estimation of subsequent signals. In fact, for the channel with severe inter-symbol interference, which can be characterized by a channel impulse response with a long tail or a long DFE with significant magnitudes, multiple errors do occur because of the phenomenon of error propagation. It might take many more symbols intervals for a DFE to recover from the error propagation.

The Tomlinson/Harshima Precoding method for (point-to-point signaling) can be used to avoid the DFE error propagation problem. In this precoding method, the DFE is moved into the transmitter to filter the original data symbols.

B. Any Channel Adaptive Equalization—General

The section describes the method of Advanced Equalizer Precoding method for point-to-point, point-to-multipoint, or bus signaling topologies, as illustrated in FIG. 03. It is used to communicate between nodes in a shared medium topology. It is also used to avoid the DFE error propagation problems.

In this Advanced Equalizer Precoding method, the DFE coefficients are also moved into the transmitter to filter the original data symbols. The corresponding DFE coefficients for each of the node to node path (impulse response) are calculated and transmitted to the transmitter for each of the received impulse response channel/node. Note that the term DFE here means DFE+DPIC.

As to initialize the filter coefficient properly for each channel communication, as shown in FIG. 03, the process of receiver filtering synchronization, and optimization is defmed before the Equalizer Precoding method of measuring the DFE filter coefficient values, freeze and send to the transmitter portion of RN can be exercised.

1) Summary of Optimized Channel Equalization Techniques

While all of the front end filter's are implemented asynchronously, the equalization system capitalizes on the synchronous nature of the signal and optimize the channel response estimations to reduce channel noise.

High speed transmission of digital data over the wireline and wireless communication channel requires adaptive equalization to reduce coding errors caused by channel distortion. In wireline cable such as POTs, as illustrated in the FIG. 02, the channel distortions are mostly due to the non-flat magnitude response (amplitude distortion) and non-linear phase response (time dispersion) of the wireline channel.

The time dispersion distortion affect is perhaps the most important as time dispersion distortion causes the smearing and elongation of the duration of each symbol. In network communications where the data symbols closely follow each other, specially at multiple of gigabit speed, time dispersion results in an overlap of successive symbols, an effect known as inter-symbol interference (ISI). The Equalization system in concert with a Synchronous Communication Environment alleviates the relative phase dispersion of the interfered and interfering signals that greatly reduces ISI. This is a critical factor affecting the wireline receiver performance, as illustrated in FIG. 49.

2) Detailed Method Steps Optimized Charmel Equalization Techniques(Flow Chart)

The following paragraphs describe the high level of steps performed by the Com2000™ Channel Equalization calibration system to improve the overall SNR of the receiver and allow more advanced data coding and signal modulation techniques. (See FIG. 50). To illustrate the optimization process of the filters and the canceller for better efficiency and SNR improvement, Copper Gigabit examples is used due to the fact that it operates over a parallel channels of CAT5.

1. To Optimize the ECHO and NEXT Canceller filter coefficient calculation, as shown in FIG. 26, through a controlled Blind Equalization process during cold start up mode. The ECHO and NEXT Canceller's filters are initialized in the Blind Equalization phase. In this phase almost all of the error signal is ISI and channel noise. The Com2000™ Blind Equalization process utilizes the frequency and phase knowledge obtained from the 5-ary PAM signal input in conjunction with a Synchronous Communication Environment, and a statistical model of the CAT5 channel to estimate the channel impulse response in order to alleviate these noise contributors. The following and the order of the steps define the optimization method for equalizers:

2. Establish a Synchronous Communication Environment via Frequency & Phase Clock Synchronization during cold start up mode before the filter's coefficient determination of the Feed Forward Equalizer (FFE) and Decision Feedback Equalizer (DFE) are commenced. This a Synchronous Communication Environment initialization's order is used to offset the clock synchronization jitter, which degrades the performance of the FFE and DFE equalizers. This is because it creates a transient mismatch between the digital samples of the FFE/DFE impulse response and the taps of the filter, which can be interpreted as White Gaussian Noise.

The Frequency and Phase clock synchronization ensures the error signal, e(m), for recursive coefficient calculations noise is relatively small and primarily derived from the CAT5 channel synchronized received data and locally stored patterns during the autocorrelation process, as illustrated in FIG. 45.

Figure 50:
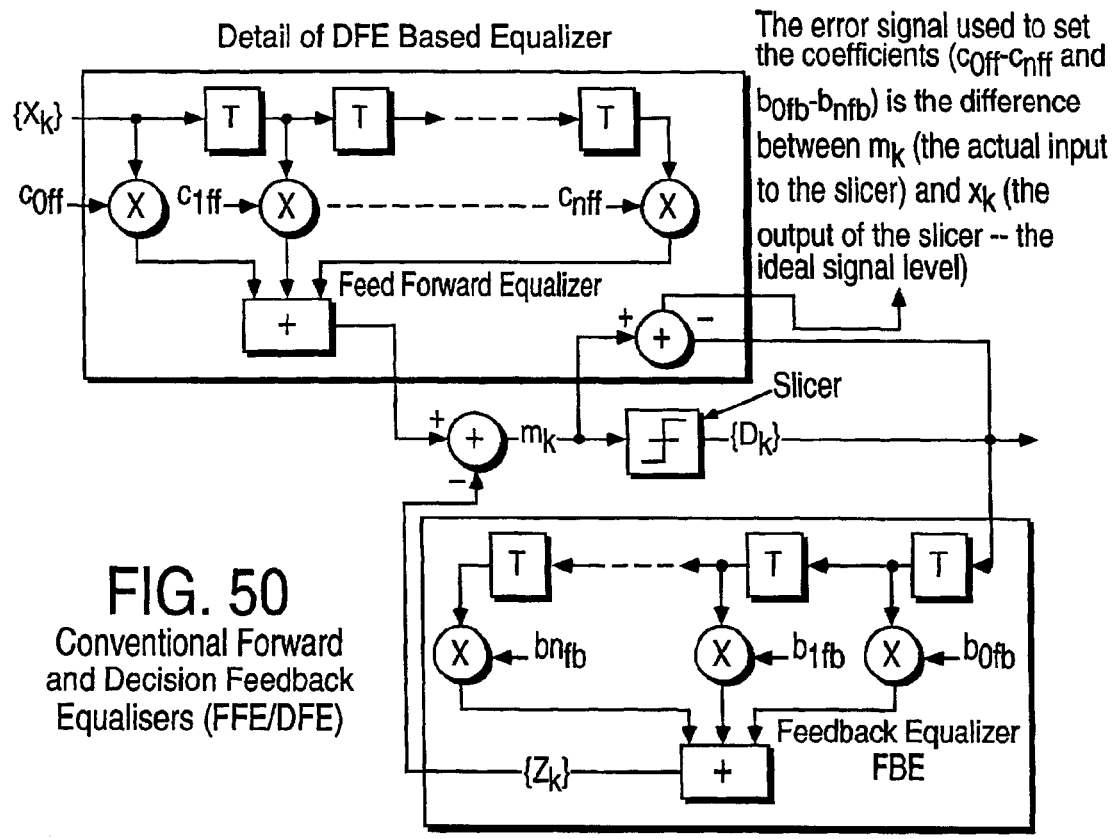
FIG. 50 is an illustration of the Conventional FFE and DFE Equalizer.

3. Optimize the FFE & DFE filter coefficient calculations through Training phase of the Com2000™ Equalization during warm start up mode. This phase initializes the FFE and DFE filter coefficients utilizing the Frequency and Phase Clock Synchronization between the Com2000™ Master & Slave of the Synchronous Communication Environment. This process also provide an propagation delay information so it can be used by the Com2000™ Equalizer system to deliver an optimal NEXT Canceller Memory Span estimation, as shown in FIG. 50. The memory span is a function of Com2000™ propagation round trip delay measurements, which performs by the Com2000™ Channel Measurement and Calibration Technology. The memory spans determine the number of real filter taps necessary to achieve optimized filter coefficients for tuning, calculations and fast filter convergence resulting in a positive SNR margin. This also ensures the error signal, e(m), as shown in FIG. 45, for recursive coefficient calculations noise is relatively small and primarily derived from the CAT5 channel synchronized received data and locally stored patterns during the autocorrelation process.

3. Maintain the optimized the FFE & DFE filter coefficient utilizing the Sounding phase of the Com2000™ Equalization process during normal operation mode. This is done via the training PN sequence during data communication process. Through the Synchronous Communication Environment of the Com2000™ Master to the Slave, which performed in the background during the data sending mode, a selected predefined node ID of specific Pseudo Random Noise (PN) sequence code, is used as the preamble bits for Master and Slave to perform as the background Sounding sequence autocorrelation for channel adaptation and also as a station code ID for security access purpose. Please refer to the section of E-DNA Technology for more details. This node ID is also used as Security Spread PN Coding for a Secured Signal Signature. This autocorrelation is done to ensure the minimum error signal, e(m), for filter's recursive coefficient calculations is adaptively to the communication channel response, as shown in FIG. 45. These sounding sequences or node ID are selected in such a way so that the security, synchronization and filter adaptations can be benefits from them. The correlation is done and the error derived from the appropriately synchronized received and locally stored PN sequence (Sounding) patterns that are used to update the filter's coefficients recursively and dynamically in order to reflect the CAT5 time-variant channel distortions.

Figure 51A:
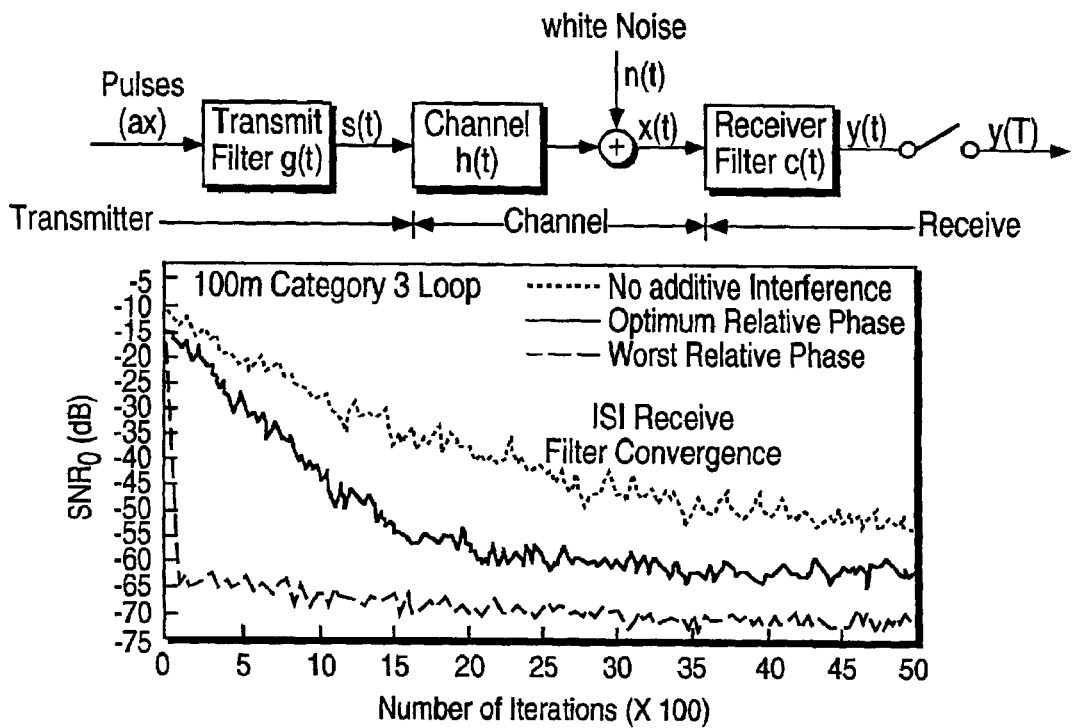
FIG. 51a is an illustration of a phase dependent coverage of a FFE/DFE filter.

4. Optimize FFE/DFE Equalization Filter Convergence by providing a method of suppressing the ISI caused by relative phase distortions. (Note: This provides an increase in the SNR, filter's convergence level, by optimizing the Com2000™ relative phase). With the symbol and sample clock of the Master and Slave synchronized, the difference of the relative clock phases of the disturbed and disturbing signals are relatively small. Phase offsets from Near and Far cross talk at the receiver from other local and/or remote sending terminal signals is relative phase difference between the desired receiving signal and the interference symbol. Hence, due to the relative phase's ISI is suppressed and the front end receiver benefits the increased SNR. This is due to the filter's converges cleanly with an SNR that has up to 6 dB signal SNR additional gain, as shown in FIG. 51.

5. Calibrate the FFE/DFE adaptive filter coefficients dynamically during background of normal data transfer mode. This is done by inserting a PN sequence of predetermined, known PN sounding preamble phasors with a known amplitude and phasor for both input and output of the selected node ID. This was determined during the Channel Measurement and Calibration phase. The known amplitude and Phasor is used for Carrier drift direction determination and is injected into the training sequence of the burst stream of useful data information symbols for optimal channel sounding calibration during the Com2000™ normal data burst sending mode.

6. Enhance Channel Impulse Response Symmetry through the Com2000™ Channel Measurement and Calibration Technology's capability of CAT5 where the channel frequency offset measurements are done due to channel cable doppler drift. The measured delta frequency offset is used to provide an optimum Square Root pulse shaping Com2000™ transmit filter with doppler frequency offset compensation, while maintaining the in-band differential mode signal.

Figure 52A:
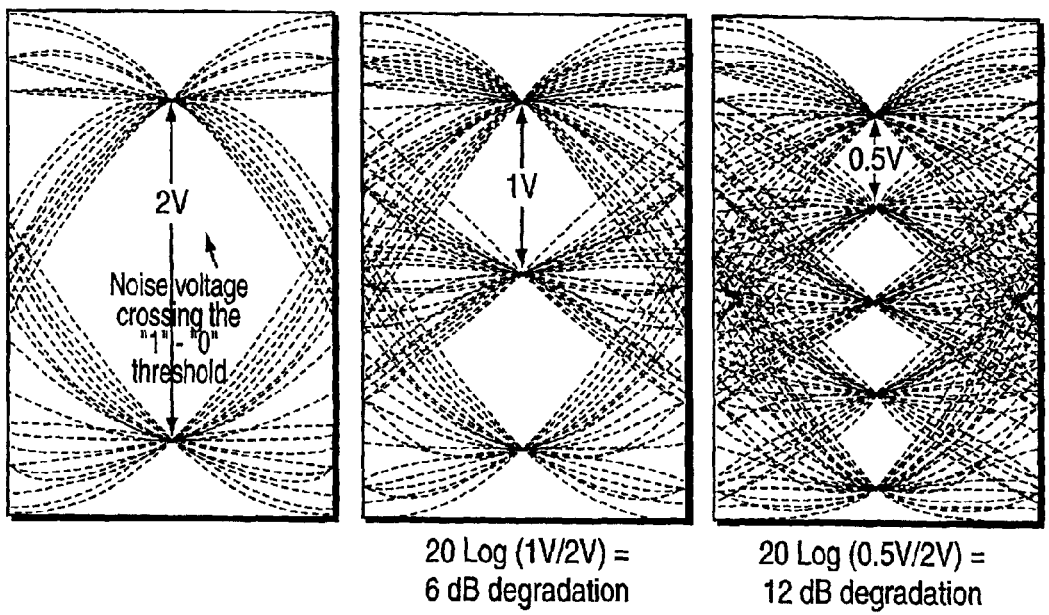
FIG. 52a is an illustration of the Eye Opening Diagram of Biphase Manchester, MLT3, PAM5.
Figure 52B:
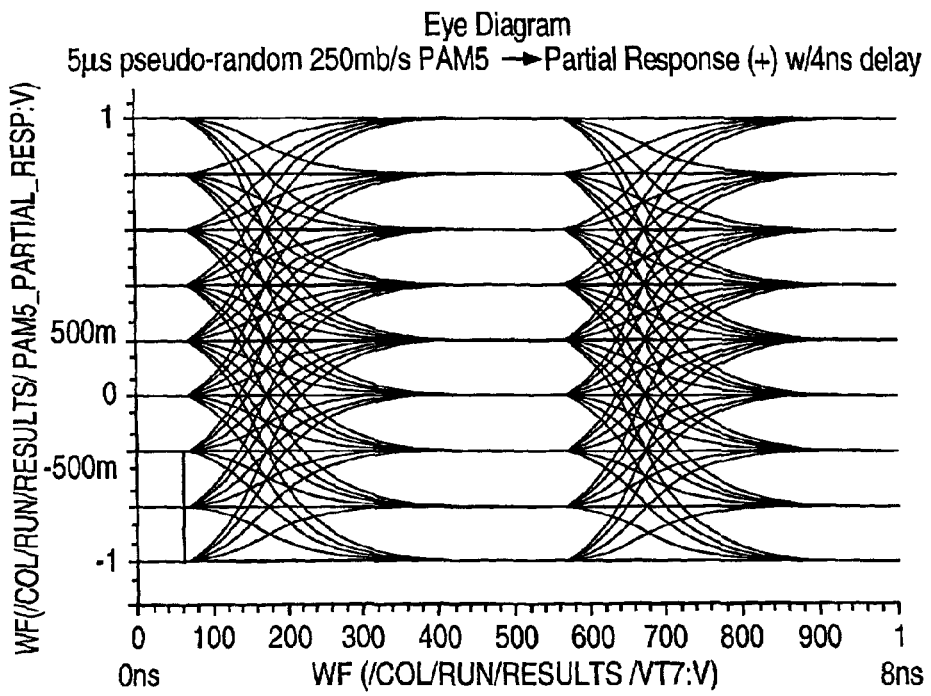
FIG. 52b is an illustration of the Signal Spectrum and Eye Opening Diagram of SPAM-5.

7. Optimize the receiving EYE Sampling time to a precision accuracy relative from the middle of the eye diagram, as shown in FIG. 52. Imperfectly timed sampling has the similar effect of increasing AWGN noise as far as the demodulator SNR is concerned. The Com2000™ Post Equalizer signal, which is the input signal that have passed through all of the above ECHO, NEXT, FFE and DFE filters will be used to aid the timing and sample recovery which in turn delivers a clean and wide-open eye diagram.

Figure 53:
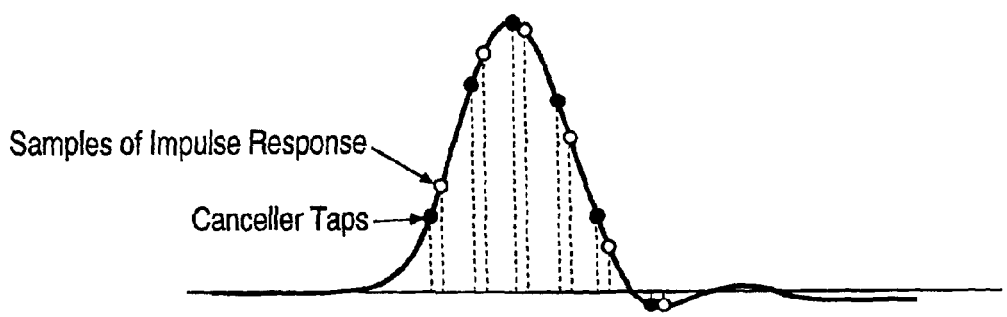
FIG. 53 is an illustration of the A/D Samples and Canceller Taps Errors for ECHO & NEXT.

In many systems, perfect equalization is not possible and some residual Inter-symbol Interference and NEXT will appear at the decision device. For the Multi-Gigabit CAT5 application, cross talk, due to the relative phase of the interfered and interfering signals, is the most significant source of Steady State noise affecting the receiver's performance. The second most significant source of steady-state noise is implementation-dependent noise, which is directly related to the variation of the characteristics of the transmission medium. Another method measures the channel distortions and uses filters to compensate for this distortion, specifically this is done by using a transmit pulse shaping filter and by receiving ECHO, NEXT, FFE and DFE filters. The method equalizes the desired signal in such a way that the impulse response from the transmitter to the receiver is as close as a Nyquist pulse, which goes through zero at all multiples of the symbol period except at the origin. It also equalizes the NEXT/ECHO signal (from local transmitters) in such a way that the impulse response from the local transmitter and local receiver goes through zero at all multiples of the symbol period, including the origin, as shown in FIG. 51. After passing through a 100 m CAT5 loop, the amount of inter-symbol interference (ISI) at the input of the receiver is larger than the amount of NEXT. Thus, the initial filter convergence curves of the solid and dashed lines follow the dotted line (see FIG. 51), which is the convergence curve of the FFE/DFE filter in the presence of inter-symbol interference only. Once the filter settles down to about 13 and 18 dB for dashed and solid curves, respectively, enough ISI interference has been removed by the filters so that the filters start to "sees" the NEXT interference and starts to jointly equalize the data signal and interfering signal. Notice that the steady-state SNR with the worst phase $\phi(0)$ is about 6 dB worse than that the optimum phase $\phi(3)$. As illustrated in FIG. 51, the convergence time with th achieved with the optimum phase. Simply put, SNR margin is a measure, in dB, of how much additional noise a system can tolerate or how far the system is from not working properly. Since some portions of the Com2000™ Equalizer are in the ECHO/NEXT canceller and the FFE/DFE of the receiver, the receiving signal jitter has to be controlled. This is done through a Phase Transfer Technique of Synchronous Communication Environment so that the Com2000™ Equalizer phase jitter of the signal, between the sending and receiving node, is bounded within 1/64 of the baud period (125 ps). This level of phase accuracy, enabled by the Com2000™ Master/Slave clock synchronization methods described above, provides additional SNR enhancement for the SPAM-5 signaling, as illustrated in FIG. 41. The jitter degrades the performance of the ECHO and NEXT cancellers and FFE/DEF filters because it creates a transient mismatch between the samples of the ECHO or NEXT impulse response and the taps of the canceller, as illustrated in FIG. 53.

Now let us address the method and means of improving the Signal to Noise Ratio (SNR) via optimizing the front end filters. There are many type of filters in the signal data communication front end: The ECHO, NEXT cancellers, and the FFE and DFE filters. The Com2000™ Adaptive Filters, or Equalizer, is the combination of filter's optimization techniques and designs used to decrease the channel response length while simultaneously preserving a good SNR in the resultant controlled inter-symbol interference channel.

To optimize of filters for SNR improvements, the following steps needs to be performed: (A) Optimize the ECHO and NEXT Cancellers via the Controlled Blind Equalization. This is done so that the cancellers filter coefficients can reflect to the good and coarse estimation of the communication channels without sending and receiving any signals of the system nodes. (B) Establish the external phase and frequency synchronization before Signal Training. This is done so that the underlying assumption of the predefined frequency and phase matrix cell are defmed. This frequency and phase synchronization are used as a baseline for the EVM measurements. (C) Optimize the FFE and DFE filter's coefficients for determining the Pre-ISI. This is done so that the filter's coefficients can be optimally trained in the presence of the large signal noise due to the relative phases of the true and interfered received signals. (D) Suppress the signal interference due to the relative phase difference of the receiving signals.

This is done so that the filter's coefficients can be optimally trained in the presence of the minimum signal noise due to the relative phases of the true and interfered received signals (E) Optimize the FFE and DFE filter convergence and filter's coefficients for determining the Post-ISI. (F) Maintain the optimization of the FFE & DFE filter's coefficients via channel adaptive method of the Sounding Sequence. This is done so that the filter's coefficients can be maintained optimally trained in the presence of the large noise due to environmental and channel response changes. (G) Deliver Coherent signal carrier recovery and frequency/phase synchronization for starting at a precision EYE sampling interval and maintaining the precision throughout the data sampling window.

To optimize the ECHO and NEXT Cancellers via Controlled Blind Equalization (A), the following steps are taken: (a) Establish internal the coarse phase and frequency synchronization and calibration before starting the blind equalization. It is used to isolate all of the noise that incurred between the true input signal noise and the clocking of the measured noise model pattern for each of the noise filter bandwidth. (b) Estimates the sending and receiving node coarse propagation path delays via using the propagation delay measurement circuitry. This is used to determine the accurate number of the filter taps for this channel filter memory. (c) Positioning the ECHO, NEXT, FFE and DFE right number of filter taps for optimizing the coefficient calculations and weighting determinations. (d) Send the BIT wrap around of the front end via a predefined signal (from transmitter to receiver) for stimulus and calibrate the initial estimate of the channel response on the predefined calibrated signal. (e) Calculate all of the filter's coefficients based on the received calibrated signal.

To establish the external frequency and phase synchronization before Signal Training (B), the following steps are taken: (a) Establish initial external (node to node) clock transfers and synchronization via sending and receiving the Synchronization Symbols. This is done so that the baseline for the precision controls and measurement related to the frequency, phase and power are defined. (b) Measure the sending and receiving node's propagation delay. This is done so that the filter's memory can accurately reflect to the channel's memory, and the power threshold level can be also defined accordingly. (c) Measure the channel's frequency offset. This defines the frequency and phase errors on the controlled frequency and phase matrix cell and will be used to compensated for during the EVM measurements.(d) Positioning the ECHO, NEXT, FFE and DFE right number of filter taps for optimizing the coefficient calculations and weighting determinations.

To optimize the ECHO, NEXT, FFE and DFE filter's coefficients via Signal Training (Pre-ISI)©, the following steps are needed to be taken: (a) Send a predetermined phase of the training sequences. This will allows the EVM to study the channels responses and its errors on to different signal phases. (b) Measure the EVM phase offset error vector.

These errors will be used to compensated and calibrated for the channel induced errors via fme tuning and capture the offset of the local oscillator signal frequency and phase. (c) Position and phase align the local stored training pattern to the receiving pattern. This is done so that the correlation noise induced from the filter's coefficient taps and its digital sampling A/D clocking is suppressed. (d) Clocking the FFE and DFE filter taps for training coefficient calculations. Starts the filter's coefficient calculation with a clean slate from the signal autocorrelation of the training and the predefined stored training patterns.

To suppress the signal interference due to the relative phase difference of the receiving signals (D), the following steps are taken: (a) Broadcast the predetermined time, frequency and phase training sequences. This is done so that the all of the adjacent sending nodes are sending at the same time interval with the predefined phase and frequency matrix cell. (b) Measure the received EVM phase and power error vector for phase noise magnitude determination. This will be used to defme the maximum and minimum signal level for a specific phase sector angles so that the EVM can compensated for the phase noise error during normal data transfer mode. (c) Clock Tune and Phase align local stored training pattern to minimum EMV rms errors. This is done so that the local clock's phase and frequency are compensated for this phase noise error.

To optimize the ECHO, NEXT, FFE and DFE filter's coefficients via Signal Training (Post-ISI)(E), the following steps are needed to be taken: (a) Send a predetermined phase of the training sequences. This will allows the EVM to study the channels responses and its errors on to different signal phases when the relative phase noise of channel are minimized. (b) Measure the EVM phase offset error vector. These errors will be used to compensated and calibrated for the channel induced errors via fine tuning and capture the offset of the local oscillator signal frequency and phase. (c) Position and phase align the local stored training pattern to the receiving pattern. This is done so that the correlation noise induced from the filter's coefficient taps and its digital sampling A/D clocking is suppressed. (d) Clocking the FFE and DFE filter taps for training coefficient calculations. Restarts the filter's coefficient calculation with a clean slate from the signal autocorrelation of the training and the predefined stored training patterns.

To maintain the optimization of the FFE & DFE filter's coefficients via channel adaptive method of the Sounding Sequence (F), the following steps are needed to be taken: (a) Insert and Send predetermined phase Sounding Sequences during the normal data transfers. This enables the filter's coefficients adaptively to the changes of the channel responses. (b) Measure the EVM phase offset error vector. This defmes the error vectors and its magnitude. (c) Position and phase align the local stored Sounding pattern to the receiving Sounding pattern. This is done so that the correlation noise induced from the channels are compensated for. (d) Clocking the FFE and DFE filter taps for sounding coefficient calculations. Restarts the filter's coefficient calculation with a clean slate from the signal auto-correlation of the Sounding and the predefined stored Sounding patterns.

To deliver Coherent signal carrier recovery and frequency/phase synchronization for starting at a precision EYE sampling interval and maintaining the precision throughout the data sampling window (E), the following steps needed to be taken: (a) Maintain Coherent Clock phase and carrier recovery via sounding sequence. This is done so that the sending and receiving frequency and phase are within the cell matrix. (b) Bound the long term drift via the clock transfer. When the master or the switching hubs front end has this technology in the PHY, the system can be synchronized to a very precision signal reference source so that the long term drift properties of the master clock are transferred to the slave or receiving local clocks. (c) Maintain the short term drift via the DLL lock with minimal drift and jitter generations. This is done via bypassing the regeneration carrier of the PLL. (d) Position and phase align the local stored Sounding pattern to the receiving Sounding pattern. This is done so that the correlation noise induced from the channels are compensated so that the phase of the signal for precision sampling can be maintained within a predefined phase error window of matrix cell for a extended period of time. This in turns improves the front end SNR.

3) Summary of Channel Adaptive Equalization Techniques

In the UniNet networks, the RN receivers are able to receive all of the PN node communications. This means that the PN transmitter will have the Advanced Precoder Equalizer. The PN will and can only talk to the RN node. This means that during the peer to peer communication of between PN nodes, the PN, PN peer to peer communication can only enabled via the RN message relaying. As with the RN transmitters, it can broadcast the message to all PNs, which means that the PN receiver will utilize the FFE/DFE and DPIC filters to receive the signal over the bus. All of the PN can receive the RN data signal. However, there is a security or privacy policy of the UniNet Network such that the designated PN training sequence, for each burst which destine for each of the PN node will be defined and used to converge the FFE/DFE filter with. The sequence is used for the privacy of the multiple access share environments. Each of The PN training sequence definition can be defined and updated in the PN ID table of the RN. The PN ID sequence is dynamically updated and distributed by the corresponding PN periodically should it requires.

Com2000™ Channel Adaptive Equalization Technology measures and calibrates the communication channel to determine the highest possible data capacity for a particular medium. The equalizer filter coefficients of all the nodes on the share medium channel needs to be defined and measured. This is done in the training period, during which a Pseudo Random (PN) noise training sequence, also available at each of the node's receiver, is transmitted. A synchronized version of the PN sequence is generated at each of the receiver, where the channel input and output signals are used for the identification of the channel equalizer coefficients. Using these coefficients, a modulated signal is sent for estimating the maximum capacity of the channel from the calculated received SNR after the slicer. The maximum channel capacity is measured from the SNR of the most distanced PN node relative to the Reference Node.

In a point-to-point configuration for the cable, the transmitting and receiving portion for each transceiver nodes are trained so that the corresponding DFE coefficients, for a single impulse response channel of the receivers can be calculated. As an example, there is 2 transceivers on the line. Receiver A will have the DFE coefficients for the impulse response of the channel from A to B. The receiver B will have another set of DFE coefficients for the impulse response of the channel B to A. Should there are more nodes or transceivers on the line, as in the case of a shared medium such as a bus configuration, there will be different impulse response channels for the each transceiver. For each of the channel, there is an association DFE coefficient set for each impulse response of node to node communication channel.

4) Detailed Method Steps of Channel Adaptive Equalization (Flow Chart)

The Advanced Medium Adaptation & Equalization Precoding method for (point-to-point, point-to-multipoint, or bus signaling) is a method of initializing the DFE coefficients for each node-to-node communication from one transmitter at a time and then moved the data into the transmitter in order to filter the original data symbols.

As shown in the FIG. 03, every (RN,PN) communication pair will constitute a communication channel in a multi-channel environment. RN transmitter can send data to either one PN node or to all of the available PN nodes on the bus. RN receiver will only receive one PN node data at a time.

This means that every PN Transmitter will have the setup of the Precoder Equalizer of Tomlinson characteristics. This is done so that RN receiver can only receive one PN at a time without have to do anything to the filters and continue to use FFE filters as to adapt to the channel, as shown in FIG. 03 and 26. This also means that every PN receiver will also have the ordinary FFE/DFE/DPIC filters, as shown in FIG. 03 and 26, so that all of them can receive the RN broadcast data messages from the RN transmitter. This is done without Precoder Equalizer.

The following steps need to be taken for setup as the indicated in the above RN, PN Communication channels as shown in the FIG. 03:

Setup the PN Transmitter with Precoder Equalizer
Step 01: Implement the full DFE in the RN receiver
Step 02: Disable the Tomlinson filter in the PN transmitter
(Note: Send the Training Sequence from PN to RN receiver for every (RN,PN) channel and Adapt the DFE filter at the RN receiver for every (RN,PN) channel pair)
Step 03: PN Transmitter A sends out a training sequence signals during coarse training period.
Step 04: RN Receiver will adapt its own FFE/DFE data coefficients and store the FFE/DFE coefficients into the internal table for PN transmitter ID.
Step 05. Repeat and Go back to steps 03 until all of the PN transmitters A, B, C . . . and so on the line are transmitted with the coarse training sequence signal.
Step 06: Calculate and determine the best weighted average FFE filter coefficient out of the stored FFE/DFE sets and use it to initialize the FFE filter regardless the channels and Reset the DFE filters.
Step 07: PN Transmitter A sends out a training sequence signals during coarse training period.
Step 08: RN Receiver will adapt its own FFE/DFE data coefficients and again store the FFE/DFE coefficients into the internal table for PN transmitter ID.
Step 09. Repeat and Go back to steps 07 until all of the PN transmitters A, B, C . . . and so on the line are transmitted with the fine training sequence signal.
Step 10: Send the value of the DFE feedback coefficients from the RN receiver to the every PN transmitter for each of the every (RN,PN) channel pair
Step 11: Setup the Tomlinson filter at the PN transmitter, using these DFE coefficients
Step 12: Disable the feedback section of the DFE filter in the RN receiver
Step 13: Begin sending data from PN to RN receiver during normal data operation, it should be satisfactory to continually adapt only the linear RN receiver FFE filter.

Establish Optimal Precoder Coefficients

The equalizer coefficient file realizes equalization over the channel. It can be derived and utilized based on the following assumption:

Using the measured channel data, the optimum weight coefficients for both Tomlinson Harashima Precoding (THP) and feed-forward equalizer (FFE) can be evaluated and saved somewhere as files The power of the weight coefficients for the FFE will be normalized so that the FFE has unit power (the square sum of the weight coefficients is one)

Note: Such arrangement is based on the assumption that the adaptive gain control (AGC) at the receiver can enhance the power of a slicer to make decision properly. (To be confirmed).

For each pair of nodes, a set of optimum weight coefficients is needed

During transmission, the corresponding coefficient file for the current destination can be loaded to THP and FFE Here, we consider the evaluation of optimum weight coefficients in a channel for one pair of nodes. The evaluation over other channels is exactly the same.

Case 1: PAM Signal

Suppose that the measured channel plus background noise for the i-th trial is:

$$C(i)=H+N(i)$$

where $C(i)=[c_1(i), c_2(i), \ldots c_L(i)]^T$, $H=[h_1, h_2, \ldots, h_L]^T$ is the sampled (in symbol rate) vector of the channel impulse response, and $[.]^T$ denotes the transpose of $[.]$. Here, we assume perfect time synchronization so that H appears the same regardless of the trial index i. $N(i)=[n_1(i), n_2(i), \ldots, n_L(i)]^T$ is the noise vector.

Assuming that the numbers of taps in THP and FFE are $N_{THP}$ and $N_{FFE}$, respectively, we construct two $N_{FFE} \times (L+N_{FFE}-1)$ matrices, $\Phi_C(i)$ and $\Phi_H$, as:

$$\Phi_C(i) = \begin{bmatrix} c_1(i), & c_2(i), & \ldots, & c_L(i), & 0, & 0, & \ldots, & 0 \\ 0, & c_1(i), & c_2(i), & \ldots, & c_L(i), & 0, & \ldots, & 0 \\ \ldots & \ldots & \ldots & \ldots & \ldots & \ldots & \ldots & \ldots \\ 0, & 0, & \ldots, & 0, & c_1(i), & c_2(i), & \ldots, & c_L(i) \end{bmatrix}$$

$$\Phi_H = \begin{bmatrix} h_1, & h_2, & \ldots, & h_L, & 0, & 0, & \ldots, & 0 \\ 0, & h_1, & h_2, & \ldots, & h_L, & 0, & \ldots, & 0 \\ \ldots & \ldots & \ldots & \ldots & \ldots & \ldots & \ldots & \ldots \\ 0, & 0, & \ldots, & 0, & h_1, & h_2, & \ldots, & h_L \end{bmatrix}$$

To evaluate the optimum weight coefficients, the correlation matrix of the received samples in the conventional FFE and the correlation vector of the desired symbol with the received samples are required. They can be written as:

$$A=\Phi_H \Phi_H^T - \Phi_{THP} \Phi_{THP}^T + R$$

$$V=\Phi_H(D)$$

where R is the noise correlation matrix, $\Phi_H(D)$ is the D-th column vector of $\Phi_H$, D is the decision delay, and $\Phi_{THP}$ is the sub-matrix generated from $\Phi_H$ by selecting the column vectors from $(D+1)$ to $(D+N_{THP})$. In Matlab expression, we have $\Phi_{THP}=\Phi_H(D+1:D+N_{THP})$.

Note: By using the above expressions for A and V, we have already assumed that the signal power and noise variance have been absorbed into $\Phi_H \Phi_H^T - \Phi_{THP} \Phi_{THP}^T$ and R, respectively. It suggests that in practical systems, the power used to measure the channel should be equal to the power used to transmit the information bearing data.

If we conduct the channel measurement many times and use the time-averaged data to approximate the statistical mean, we have:

$$\Phi_{THP} \cong \frac{1}{t}\sum_{i=1}^{t}\Phi_C(i, D+1: D+N_{THP})$$

$$A \cong \frac{1}{t}\sum_{i=1}^{t}\Phi_C(i)\Phi_C^T(i) - \Phi_{THP}\Phi_{THP}^T$$

$$V \cong \frac{1}{t}\sum_{i=1}^{t}\Phi_C(i, D)$$

where t is the number of trials, $\Phi_C(i,D+1:D+N_{THP})$ denotes the sub-matrix of $\Phi_C(i)$ by selecting the column vectors from (D+1) to (D+$N_{THP}$), and $\Phi_C(i,D)$ denotes the D-th column vector of $\Phi_C(i)$.

The optimum weight coefficients for FFE and THP (same as in the conventional DFE) are:

$$W_{FFE} = A^{-1}V$$

$$W_{THP}\Phi_{THP}^T W_{FFE}$$

Case2: QAM Signal

The following calculation follows a note "Notes on Calculation of QAM DFE" (J. F. Weng, July 1999) which is a little bit different from that used in "DSL Simulation Techniques and Standards Development for Digital Subscriber Line Systems" (W. Y. Chen, 1998) for calculating the optimum weight coefficients in QAM. (Comparison will be done later to see the difference and the effect on performance)

The calculation can be shown similar to that for PAM signal discussed above while bearing in mind that the signals discussed below for QAM signals are all complex-valued signals. Suppose that the measured channel plus background noise for the i-th trial is:

$$C(i)=H+N(i)$$

where $C(i)=[c_1(i), c_2(i), \ldots, c_L(i)]^T$, $H=[h_1, h_2, \ldots, h_L]^T$ is the sampled (in symbol rate) vector the channel impulse response, and $[.]^T$ denotes the transpose of $[.]$. Here, we assume perfect time synchronization so that H appears the same regardless of t. $N(i)=[n_1(i), n_2(i), \ldots, n_L(i)]^T$ is the noise vector.

Assuming that the numbers of taps in THP and FFE are $N_{THP}$ and $N_{FFE}$, respectively, we again construct two $N_{FFE} \times (L+N_{FFE}-1)$ matrices, $\Phi_C(i)$ and $\Phi_H$, as in the case for PAM signal.

To evaluate the optimum weight coefficients, the correlation matrix of the received samples in the conventional FFE and the correlation vector of the desired symbol with the received samples are required. They can be written as:

$$A = \Phi_H^* \Phi_H^T - \Phi_{THP}^* \Phi_{THP}^T + R$$

$$V = \Phi_H^*(D)$$

where $(.)^*$ denotes the conjugate of $(.)$, R is the noise correlation matrix, $\Phi_H(D)$ is the D-th column vector of $\Phi_H$, D is the decision delay, and $\Phi_{THP}$ is the sub-matrix generated from $\Phi_H$ by selecting the column vectors from (D+1) to (D+$N_{THP}$), i.e., $\Phi_{THP} = \Phi_H(D+1:D+N_{THP})$.

Note: Again, by using the above expressions for A and V, we have already assumed that the signal power and noise variance have been absorbed into $\Phi_H^*\Phi_H^T - \Phi_{THP}^*\Phi_{THP}^T$ and R, respectively. In other words, it suggests that in practical systems, the power used to measure the channel should be equal to the power used to transmit the information bearing data.

If we conduct the channel measurement many times and use the time-averaged data to approximate the statistical mean, we have $$\Phi_{THP} \cong \frac{1}{t}\sum_{i=1}^{t}\Phi_C(i, D+1: D+N_{THP})$$

$$A \cong \frac{1}{t}\sum_{i=1}^{t}\Phi_C^*(i)\Phi_C^T(i) - \Phi_{THP}^*\Phi_{THP}^T$$

$$V \cong \frac{1}{t}\sum_{i=1}^{t}\Phi_C^*(i, D)$$

where t is the number of trials, $\Phi_C(i,D+1:D+N_{THP})$ denotes the sub-matrix of $\Phi_C(i)$ by selecting the column vectors from (D+1) to (D+$N_{THP}$), and $\Phi_C(i,D)$ denotes the D-th column vector of $\Phi_C(i)$.

The optimum weight coefficients for FFE and THP (same as in the conventional DFE) are:

$$W_{FFE} = A^{-1}V$$

$$W_{THP} = \Phi_{THP}^T W_{FFE}$$

Here, A is a complex-valued matrix and its inverse matrix can be practically evaluated as follows. Suppose that $A = A_r + jA_q$ and its inverse $A^{-1} = A_r^I + jA_q^I$. We have:

$$A_r A_r^I - A_q A_q^I = 1 \text{ and } A_r A_q^I + A_q A_r^I = 0$$

Thus, if we construct a matrix $$Q = \begin{bmatrix} A_r & A_q \\ -A_q & A_r \end{bmatrix},$$

the matrix $$\begin{bmatrix} A_r^I & A_q^I \\ -A_q^I & A_r^I \end{bmatrix}$$

is its inverse matrix.

As a result, in order to find $A^{-1} = A_r^I + jA_q^I$, we may construct the matrix Q and then compute its inverse, from which we can easily obtain $A_r^I$ and $A_q^I$ of interest.

2.1.4 Multi-Channel Signal Coding Environment—Signal Coding Technology

This section describes the baseband multi-channel signal coding system of the Com2000™ UniNet delivery system and the underlying technologies that are involved in the design and development of this multi-channel high-speed data communication architecture. The Com2000™ UniNet delivery system is a universal Physical Layer manifestation that delivers a robust high performance and multi-channel high speed data delivery system, as illustrated in FIG. 03.

Capitalizing on the precision controls of signal's frequency, phase, time and amplitude, the Com2000™ UniNet multi-channel signal coding is the selecting signal or a combination of signals from any one of the following selections: (a) Precision Phase Control & Multi-Level Amplitude (Synchronous PAM-M, as illustrated in FIG. 41), (b) Precision Frequency Control & Multi-Level Amplitude signals (Synchronous FDM/PAM-M), (c) Precision Frequency & Phase Controls & Multi-Level Amplitude signals (Synchronous QAM-M), (d) Precision Frequency, Phase, Time and Multi-Level Amplitude signals (Synchronous TDM/QAM-M).

Figure 55:
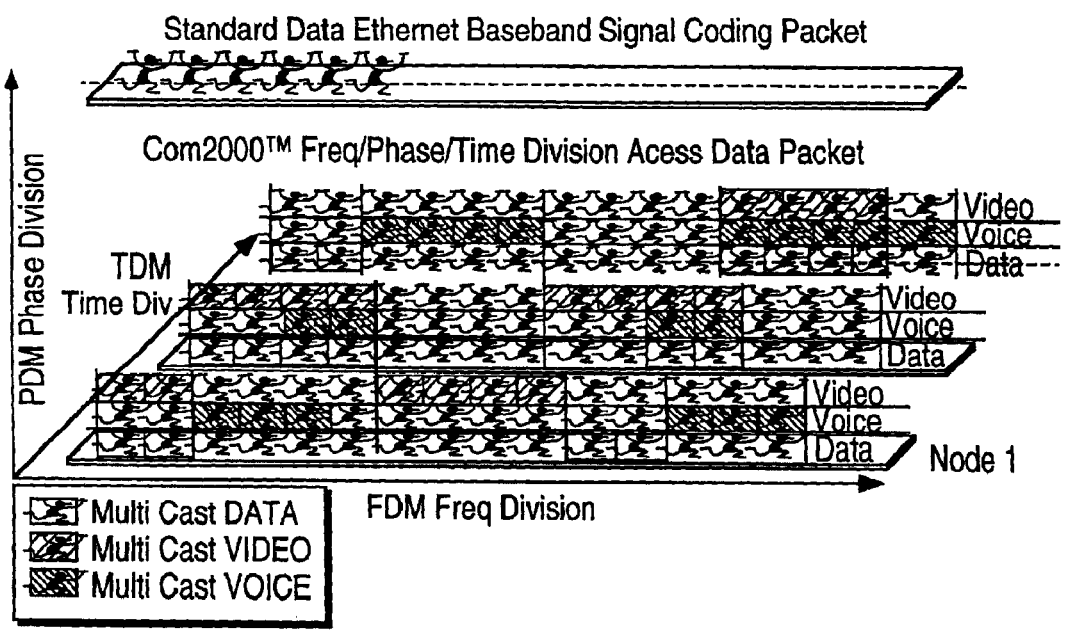
FIG. 55 is an illustration of the Time, Frequency and Phase Multiple Access Coding Scheme.

This precisely controlled communication environment is enabled through Com2000™ Signal Control Technology. This system provides precise control of signal parameters that transfer from one network node to another and propagate through the entire network. This new controlled network environment provides the baseline precision modulation and demodulation required for manipulating and controlling specific signal characteristics such as multi-carrier (FDM), multi-phase (PDM) and multi-time (TDM) signal coding, as illustrated in FIG. 55. The combination of these capabilities which are enabling factor of increasing data throughput and more efficient bandwidth utilization. In this way, Com2000™ Advanced Signal Control Technology enables a multitude of novel technologies.

Figure 54:
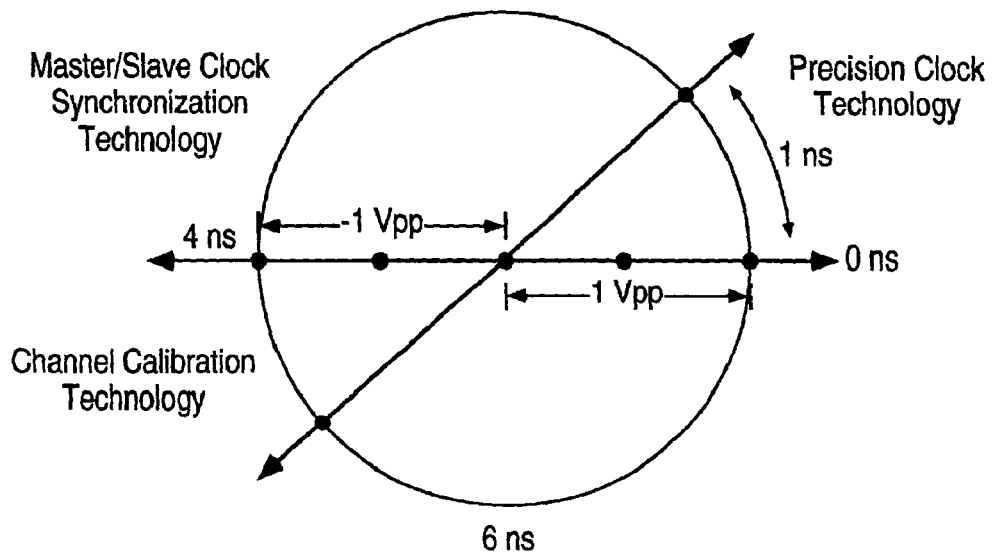
FIG. 54 is an illustration of the Precision Angle Phase Control for Precision Signal Coding.

Once cyclostationary channel noise has been suppressed by the FSFE-DPIC Advanced Equalization (as illustrated in FIG. 27), Com2000™ Signal Coding Technology provides a revolutionary approach for FDM, PDM baseband line signal coding method that increases effective data throughput by increasing the number of symbols per hertz of data transmitted. Using this technology and applied into the current Copper Gigabit 802.3ab standards, the data rates as an example for Ethernet data transmission, can go up to 2 Gigabits per second. This can only be achieved by new Com2000™'s Frequency, Phase or Time synchronous signal coding (Synchronous PAM5 or SPAM5, as illustrated in FIGS. 41, and 54). This technique applied to the multi-phase single carrier baseband Synchronous signal coding which is able to satisfy the FCC power emission requirements (as suggested in the IEEE 802.3ab standard).

For specific discussion for a particular application, let's consider the signal modulation SPAM5 case (a) with the 802.3ab Copper Gigabit Ethernet applications. In this application, we apply the Multi-Channel Signal coding technology over existing baseband signaling recommended in the standard as PAM-5 via controlling the phases and time delays. Instead of delivery 1 Gb/s over 8 wires (4 pairs) of CAT5 cable, the technology can be applied to deliver 2 Gb/s over the same CAT5 cable plant that meets the FCC requirements and we called it is the GPHY4 Ethernet System (Gigabit Speed over 4 pairs of wire).

The GPHY4 Ethernet system delivers multi gigabit data communication over the same standard 8-wire (2 Gbps over 8 wires) Unshielded Twisted Pair (UTP) CAT5 cable as 100Base-T through the insertion of the Com2000™ technology. The GPHY4 system is implemented at the media Physical Interface to deliver a revolutionary bandwidth efficient coding scheme to support Multi-Gigabit signaling over the existing CAT5 cabling infrastructure.

For the Com2000™ Multi-Gigabit signal coding system, the selected multi-channel baseband signal scheme is SPAM-5, which capitalize the precision phase and amplitude controls of the signal, uses both Synchronous and Partial Response or phase delay features of the multi level Pulse Amplitude Modulation signal scheme. The SPAM-5 and/or multi-channel (1 to 20) Synchronous Partial Response NRZ or SNRZ Code Signaling deliver multi-gigabit signaling and scalable network data transmission from 100 Mbps to 2000 Mbps data rate for Ethernet data over existing UTP Category 5 cable.

A. Brief Summary of Signal Coding problems

For specific applications, let's consider the case (a) with the 802.3ab Copper Gigabit Ethernet applications. It is a full duplex 1 Gb/s data stream over a 100 MHz category 5 channel specification. A 1000Base-T physical layer device includes four identical transceiver sections—each with its own transmitter and receiver. Each transceiver section operates at 250 Mb/s—2 bits per symbol with a symbol rate of 125 Msymbols/s. The total throughput is 250 Mb/s×4 pairs= 1000 Mb/s=1 Gb/s.

B. Multi-Channel Signal Coding and Control Techniques

The baseband signal has a symmetric spectrum around the center frequency f=0 if and only if the symbols are real. This is a well know fact from complex analysis: Only real signals have spectra that are symmetric with respect to f=0; In this case PAM 5 is the baseband signal that has this property.

The base band signal is then multiplied by a carrier, which is a high frequency sine or cosine. After this multiplication, the signal is called a passband signal. This process is called modulation and has the effect that the baseband signal is shifted up in frequency, up to the pass-band. The center frequency of the passband is the frequency of the carrier as in the case of UniNet QAM 16 that operates at the center frequency of 25 MHz. After the passband signal passes through the channel, at the receiver, the distorted passband signal is demodulated, thereby shifting it back to the baseband with the center frequency of 0 or f=0. The resulting baseband signal is however still distorted and the demodulated baseband signal spectrum is not symmetric with respect to f=0;. This means that the received baseband signal is complex even though the transmitted baseband signal before mixing is real. But then the transfer function from transmitted baseband signal to received baseband signal must be complex-valued!. The real part of this transfer function is called the In-Phase channel or I-channel, where as the imaginary part is call the Quadrature channel or Q-channel.

The fact that the spectrum symmetry is no longer true or the spectrum is not flat, which means that the received signal is not white. In the time-domain, this means that the transmitted baseband pulses will be smeared out so that the pulse corresponding to the different symbols will not be separable. This phenomenon is known as Intersymbol Interference or ISI, as illustrated in FIG. 49. If One can maintain the symmetry (f=0) and manage to deliver a precoder equalization scheme such that the non flat region of the received baseband signal turns into the flat region transfer function channel, then the baseband transmitting and receiving signal will be real. This means the transfer function is real in this case.

In the SPAM-5 can, therefore, be thought of as an baseband version of QAM(CAP-1024 signal with the precision control of DC frequency point, and a precision DPIC Precoder Equalizer on the transmitter side for maintaining the symmetry and the real value properties. With the controllable frequency shift and offsets and phase variations of the communication channel, specially on the wireline, the conjugate of the complex j component of transfer function can be measured, defined and built-in into the Precoder Equalizer at the transmitter, so that the received baseband signal will be real. This technique maximize the utilization the precision control of the synchronous environment at signal coding level.

Let us turn back into the baseband signal application, we apply the Multi-Charmel Signal coding technology for delivering multi-gigabit (2 Gb/s) over copper. The twisted pair gigabit Ethernet standard—1000Base-T—was under development by the IEEE 802.3ab task force.

The Synchronous Partial Response PAM-5 signaling is a Bandwidth efficient coding schemes and a method of increasing the bandwidth efficiency and includes:

1. Encoding multiple bits into several voltage levels on the transmit signal
2. Generating two baseband data streams and generating a partial response version in the same frequency channel
3. Pulse shaping (or filtering)
4. Combination of (1), (2) and (3)

1) Summary of Multi-Channel Signal Coding Techniques

The Com2000™ new multi-channel line coding design of the Com2000™ 10/100/1000/200Base-T (802.3ab+) achieves the fill duplex throughput of 2000 Mb/s by transporting data over four pairs from both ends of each pair simultaneously. Each pair carries a dual duplex 500 Mb/s data signal encoded as Synchronous Partial Response 5-level Pulse Amplitude Modulation (SPAM-5). See FIG. 41.

The Com2000™ Multi-Gigabit line coding design of Com2000™ 1000Base-T (802.3ab+) physical layer device includes four identical transceiver sections (same front end as 1000Base-T)—each with its own transmitter and receiver. Each transceiver section operates at 500 Mb/s—4 bits per symbol with a symbol rate of 125 Msymbols/s. The total throughput is 500 Mb/s×4 pairs 2000 Mb/s=2 Gb/s.

To reduce the complexity of the new Com2000™ line code (Partial Response PAM-5 signal), the baseband signal data will also be transported over four pairs simultaneously from both ends of each pair[2] just as the 802.3ab standards. With this approach, each pair carries a 500 Mb/s full duplex data stream and can be scaled utilizing the system clock adjustment in order to deliver scalable data transfer rates for interim non-compliance to 1000Base-T CAT5 capacity.

The 10/100/1000/2000Base-T Com2000™ Multi-Gigabit signaling is compatible with the 100Base-TX signal so as to facilitate the development of a four data rate 10/100/1000/2000Base-T transceiver. The symbol rate of 1000/2000Base-T is the same as that of 100Base-TX—125 Msymbols/s.

When implementing a 10100/1000/2000Base-T system, one advantage of having equal symbol rates for 100 and 1000/2000 Mb/s operation is that common clocking circuitry can be used with both data rates. Another advantage is that the spectra of both signals are similar with a null at 125 MHz (FIG. 7a). The null in the spectrum of a baseband signal occurs at the frequency equal to the symbol rate. 1000/2000Base-T and 100Base-TX both operating at the same symbol rate and using baseband signaling, have similar signal spectra. This reduces the complexity to match the spectrum of 1000/2000Base-T to that of 100Base-TX almost exactly through some additional filtering. The advantage of having similar spectra for 100 and 1000/2000 Mb/s signals is that common magnetic and other emission suppression circuitry can be used regardless of the data rate.

A PAM-5 eye pattern for 1000Base-T is shown in FIG. 52. An eye pattern is a trace produced by a modulated random data waveform, with each symbol period tracing from left to right and starting in the same place on the left. An eye pattern appears on an oscilloscope if the modulated random data signal is viewed while triggering the oscilloscope on the data clock. The eye pattern of the PAM-5 signal deviates somewhat from this classical 5-level eye pattern because the waveform of the PAM-5 signal has been shaped to make the spectrum of 1000Base-T match the spectrum of 100Base-TX.

A Synchronous Partial Response PAM-5 eye pattern for 2000Base-T is shown in FIGS. 24 and 27. A Synchronous Partial Response PAM-5 eye pattern appears on an oscilloscope if the modulated random data signal is also viewed while triggering the oscilloscope on the data clock. The eye pattern of the Com2000™ Partial Response PAM-5 has twice as many eyes as the PAM-5 signal. The eye's vertical noise voltage threshold is reduced in half relative to the PAM-5 eye.

The Com2000™ Partial Response PAM-5 signal is 6 dB less than the 1000Base-T signal and has been shaped to make the spectrum of the newly proposed 2000Base-T match the spectrum of 100Base-TX. (See FIG. 24). The Com2000™ Advanced Signal Equalization system, as shown in FIG. 27, improves the SNR up to 8 dB relative from current 3 dB IEEE 802.3ab suggested designs, as illustrated in FIG. 28. This enables the front end to recover the 6 dB of signal degradation and achieve an extra 2 dB for Noise margin improvement over the 1000BaseT.

Partial Response Multi-Level Coding (SPAM-5 & SNRZ)

Com2000™ partial response coding involves combining two distinct PAM-5 data signals into one channel, each operating at the same data rate as the combined signal (SPAM-5). These two PAM-5 baseband signals, with one signal staggered in time (4 ns) with respect to each other, are combined and transmitted simultaneously over the (FIG. 16). Since each data signal operates at the same data rate of the partial response signal, the combined 2-phase partial response signal (spam-5) requires the same bandwidth of the original PAM-5 signals.

In order for the receiver to recover the two data streams, the phase offset between the two original signals must be known (equal to a multiple of 90°). The 4 ns (180 degree) power sampling level and its previous level with the direction of the transitions must also be known (see FIGS. 11a, 11b).

As an example, let us consider more simple waveforms such as in FIG. 13. The received waveform is sampled at 250 MHz. For the Synchronous NRZ partial response signal or SNRZ, there are 3 amplitude levels. There will be 9 amplitude levels for synchronous partial response PAM-5 signaling. (see FIG. 21). The same rules apply for both.

Let us now recover the received SNRZ or PAM-3 signal (see FIGS. 11a,11b). This signal is the composite signal of 2 NRZ signals (NRZ and NRZ'). The signal level is sampled at a 250 MHz rate. The signal power sample is taken every 4 ns period for use in the decision base of the slicer. If the amplitude level is positive (10) then the NRZ signal is HIGH and the NRZ'signal is LOW. If amplitude level is negative (01), then the NRZ signal is LOW and the NRZ'signal is HIGH. If the amplitude level is zero (11 or 00) and if the previous signal level & direction of transition is down, then the NRZ signal is HIGH and the NRZ'signal is also HIGH. Otherwise, if the transition is up, then the NRZ signal is Zero and the NRZ'signal is also Zero. The predetermined phase offset value (4 ns) is used to regenerate the NRZ and NRZ'signal from the receiving composite signal (PAM-3).

For SPAM-5 signal recovery, the received signal will have 9 amplitude levels. Each of the sampled amplitude levels will equate to a particular combination of original PAM-5 and its 4 ns—delay version. The knowledge of the previous amplitude and its transition direction will dictate the level of the present signals.

The Partial Response signaling method is a bandwidth efficient coding scheme employing only multi-level signaling and no phase modulation and is known as a one-dimensional (1-D) coding scheme. FIG. 16 demonstrates two possible coding methods—1-D and Partial Response 1-D—of transmitting 500 MB/s over a 100 MHz channel. The 1-D method generates 2 bits per symbol with a symbol rate of 100 Mega-symbols per second. The Partial Response 1-D method generates 4 bits per symbol in order to keep its bandwidth within 100 MHz. However, the Partial Response 1-D method is capable of transmitting up to 500 Mb/s in the same channel where the 1-D method is limited to 250 Mb/s[12].

The 2000 Base-T proposed signaling methods (SPAM-5) are also a 1-D based coding scheme. The signaling method is Partial Response of the composite 1-D signal. The composite 1-D signal is the difference of a multi-level signal with a controlled phase offset by half of the 125 Mbaud period. A more detailed description of the Com2000™ signaling system is provided below. The Partial Response of the composite 1-D signal coding scheme described below is designed to generate 500 Mb/s plus control symbols. The circuitry implementing such transceivers would have to be present at both ends of each pair of the category 5 channel to achieve 500 Mb/s. 250 Mb/s would be achieved with a single Com2000™ transceiver operating with an 802.3ab compatible transceiver. See FIG. 16.

The Com2000™ Coding system codes the signals using (Synchronous PAM-5) a Partial Response of the composite 1-D signal. This 1-D coding method optimizes the multi-level encoding of the transmission signal so as to minimize Inter Symbol Interference (ISI). Partial Response of the composite 1-D signal coding at the transmitter helps to minimize the distortion caused by channel attenuation.

Synchronous PAM-5 or Partial Response PAM-5 Summary

One-dimensional 9 level coding 4 bits per symbol

125 Mbaud

See FIGS. 16–28 for the Scalable Com2000™ Signal Coding SPAM-5 is also a Partial Response of the composite 1-D signal. The scalable Com2000™ SPAM-5 coding can be scaled by either slowing down the clock or the SNRZ signal encoding or SPAM-5 signal encoding or the combination all of the above.

SNR Penalties For Com2000™ Coding Bandwidth Efficiency signaling

A bandwidth efficient data signal is typically more sensitive to channel noise and distortion than a binary signal. A good indicator of network robustness is the opening in the eye pattern of the data signal. The size of the opening indicates the signal's immunity to noise—it is proportional to the noise voltage required to cause a bit error in the receiver. The horizontal opening of the eye pattern typically indicates the signal's immunity to jitter. It is a measure of how much jitter can be added to the data signal by the channel before timing-related bit errors are likely to occur. See FIG. 7.

In the case of two-phase signaling schemes, the coupling between the two channels further compromises noise immunity. The amount of signal coupling between the two channels is related to the error in the X phase offset between these channels. Any deviation from the perfect sending phase offset (X degree relationship) between the two channels results in cross channel coupling (i.e. one channel "leaking" into the other channel).

In general, the higher the efficiency, in bits per Hz, of the data signal, the more vulnerable the signal is to the noise and distortion in the channel. This means that the higher the data rate we attempt to transmit through a category 5 channel the more work we need to do to counteract the system's vulnerability to bit errors. The Channel Equalization Section and Channel Measurement & Calibration Section address these issues.

A 4-level PAM-5 signal has voltage transitions every 2 bit periods while a binary (2 level) signal could have voltage transitions every bit period. Therefore, the rate of transitions, or symbol rate, of a 4-level signal PAM-5 is half the frequency of a binary signal. Thus, a 250 Mb/s data signal (PAM-5) can be transmitted at a rate of 125 Msymbols/sec using 125 MHz of channel bandwidth with only 4 voltage levels. A 8 level signal (SPAM-5) is a 500 Mb/s data signal, is transmitted at a rate of 125 Msymbol/s using 125 MHz of channel bandwidth with only 8 voltage levels.

The $5^{th}$ level in the PAM-5 system or $9^{th}$ level of the SPAM-5 system allows for redundant symbol states that are used for error-correction encoding. The error correction method includes Trellis coding [9] in combination with Viterbi decoding. The error correction logic further enhances the system's Signal to Noise Ratio (SNR) margin by up to 6 dB. The extra 6 dB of SNR margin gives the 5 level PAM-5 signal the noise immunity of a 3 level signal. The PAM-5 signal also incorporates error correction coding to improve the BER performance of the system. The same applies for SPAM-5 with 9 signal levels.

The spectrum of the PAM-5 and SPAM-5 transceivers closely resemble that of a 100 Base-T MLT-3 transceiver facilitating a design that would use 100 Base-T magnetic allowing the design of a scaleable 100/1000/2000 Base-T device.

Figure 56:
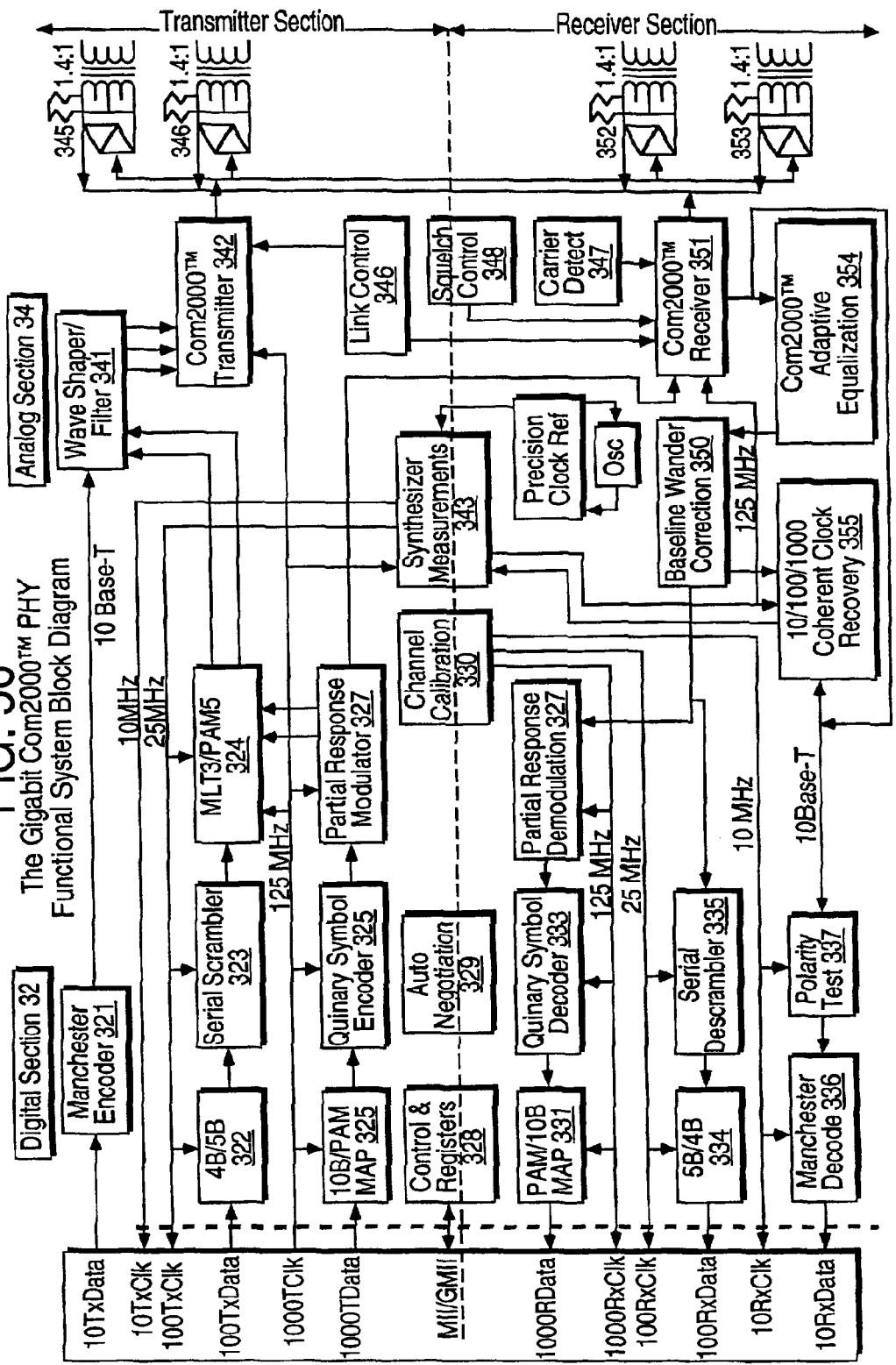
FIG. 56 is an illustration of the 2000 Mb/s Com2000™ Gigabit System Block Diagram.

Digital signal modulation, in general, transforms input digital signals into waveforms that are compatible with the nature of the communication channel medium. Through modulation, baseband communication channel signals are modified to carry the desired information. The SPAM-5 Modulator (327) and Demodulator (332), as illustrated in FIG. 56, are the methods of delivering baseband digital signal modulation that uses a variation in the amplitude and phase of the carrier to transmit information. The phase variation is accomplished with the Phase Modulation technique and the amplitude variation is performed with the Pulse Amplitude Modulation (PAM-5) technique. The SPAM-5 signal modulation is a unique and advanced baseband modulation technique that conveys multiple (4) bits of information simultaneously (at 125 Mbaud Symbol Rate) by providing multiple states in each symbol of transmitted information. Each time the number of states per symbol increases, the bandwidth efficiency also increases. This bandwidth efficiency is measured in bits per second per Hz.

2) Detailed Method Steps Partial Response Multi-Level Coding (Flow chart)

In the following paragraphs, the structure of the signal generated by the signaling system is described in detail, as illustrated in FIG. 56. The standard 1000Base-T signal operates on the same frequency band as the 100Base-T square wave digital signal with all of the above offsets and delays. However, the new 2000Base-T SPAM-5 is also an amplitude modulation coded signal that operates on a baseband signal frequency of 125 MHz. This is similar to a PAM duo-binary and partial channel response-coding scheme. 1000BaseT is in effect allows 5 bit of PAM5 (4 information and 1 error correction bits) times higher in bit rates over a 1 hertz operating frequency range with the optimal bit error rates. In effect, 2 amplitude levels for the Quinary symbol rate are decoded on each transition of the 125 Mbaud symbol rate.

The transmitting and receiving of the new 2000Base-T SPAM-5 are also baseband signals. The SPAM-5 signals (Partial Response PAM-5) modulated by a 125 MHz clock rate that is modulo-2 added to the PAM-5 modulated data A, to form the A+B composite data signal AB. This signal AB still maintains the baud rate of 125 Mbaud. The phase shift signal B is maintained via a precision source of reference and frequency/phase controls which are addressed in details by the Clock Transfer Technology section.

The SPAM-5, in general is explained as a multi-level baseband signal which is the composite signal from the two multi-level I axis and multi-level R axis baseband signals. The R axis signal is the rotated (multiple of) 90 degrees in phase with the I version signal. SPAM-5 can be thought of as an emulated baseband version of CAP-1024 signal with the precision control of DC frequency point for maintaining the symmetry properties. The SPAM-5 (Partial Response PAM-5) Modulator and Demodulator, as shown in FIG. 56, are responsible for maintaining the system within the required FCC Spectrum and Amplitude signal modulation limitations for sending and receiving data over the 4 twisted pair wires.

SPAM-5 Baseband Digital modulation transforms input digital signals into waveforms that are compatible with the nature of the baseband communications channel that are used to carry the desired information. The SPAM-5 (Partial Response PAM-5) Modulator (327) and Demodulator (332), as shown in FIG. 56, implement a method of delivering digital signal modulation that uses variations in amplitude and phase of the carrier to transport information. The phase variation is accomplished through precision control of the multiple of 90-degree phase offset and the 5 level amplitude variation is accomplished through Pulse Amplitude Modulation (PAM-5). The Com2000™ baseband SPAM-5 signaling technique is a simple yet advanced baseband modulation scheme that conveys multiple (4) bits of information in a full duplex scheme (at 125 Mbaud Symbol Rate) for each cable pair.

The nature of Synchronous Pulse Amplitude Modulation (SPAM-5) increases the number of states per symbol. Each of the SPAM-5 states are defined as a specific amplitude and phase.

This means that the generation and detection of symbols is more complex than a simple phase detection or amplitude detection device. The Com2000™ Partial Response PAM or baseband SPAM-5 Modulator (327) delivers high bandwidth efficiency through the transmission of 4 bits per second per Hz.

The Com2000™ baseband SPAM-5 Modulator (327), as shown in FIG. 56, in the Electrical Transmitter section of the transceiver adds a channel PN coding training preamble header to the data stream in such a way as to minimize the effects of noise and interference in the CAT5 communication channel. The channel PN coding training symbol adds extra bits to the input data stream and removes redundant ones. The added bits are used for error correction or to send specific system training sequences for identification or equalization. This can make synchronization (or finding the symbol clock) easier for the Com2000™ SPAM-5 Demodulator (332) of the Electrical Receiver.

The symbol clock frequency represents the exact timing of the transmission of the individual symbols. The reciprocal of this is the symbol clock frequency of 125 Mbaud. The symbol clock phase can be resolved up to ⅛ of the received carrier signal phase and is correct when the symbol clock is aligned with the optimum instant(s) (2 ns and 6 ns relative to the beginning of the baud period) to detect the symbols. This feature is uniquely impacting on the convergence of the front end filters such as Feed Forward Filter CFFE), Decision Feedback Filter (DFE), ECHO and Near End Cross Talk (NEXT) canceller filters. The important relative phase offset of the interfered and the interfering signals, that greatly effects the Channel Equalization of the receiver. Additional FSFE-DPIC filters was invented to capitalized on the crosstalk and noise that has the cyclostationary phase offset properties, to enhance the additional 6 dB signal to noise ratio (SNR) which requires for the 2 Gb/s Multi-Channel signal coding SPAM-5.

2.1.5 Multi-Channel Signal Decoding Environment—Precision Sampling Technology

The UniNet Com2000™ family of technologies provides a "Columbus Project" system with a method that measures the channel, codes a new signal by precisely controlling the signal's parameters, and then adjusts the signal to eliminate distortions arising from the increased data throughput made possible by the improved signal. In addition, the improved signal is both scaleable and secure by employing proprietary coding systems that take advantage of this more precise control as shown in FIG. 09.

The technology is responsible to produce carrier, carrier phase, symbol timing, sampling phase synchronous vector processing receiver and other derived clock signals. We propose the scheme in which the above three main signals have their frequencies derived from one source frequency of the Reference Node or RN. Therefore, during the initialization, the RN sends a clock signal to be synchronized by all nodes. Subsequently, each node derives the carrier, symbol timing, sampling signals by adjusting only the phase (or offset timing instant). UniNet uses a plesiochronous mechanism for obtaining bit synchronization, i.e., the clock is derived in the combination of the RN reference tone and the preamble training data synchronization stream for equalizers. It is in the header of each data burst.

A. Brief Summary of Precision Sampling problems

Typical Clock and Timing Recover system is used in Cable modem, xDSL or any other public referenced design information.

B. Precision Sampling (Signal Sampling & Control Techniques)

1) Summary of Precision Sampling Techniques

Before sending data, Precision synchronization for each of the multi-channel networks (FIG. 09) between sender and receiver is needed so that they are attached to the same bitstream, i.e., a sort of circuit setup.

The Com2000™ Precision Sampling System comprises a method for precisely positioning the phase and time sampling and measurement windows at the center of the Eye Diagram with minimal error for any deploying signal coding scheme, as illustrated in the FIG. 09. Under a precision synchronous controlled environment, this signal precision sampling scheme can be any or combination of TDMA, CDMA as Frequency Hop, CDMA as Direct Sequence, and FDM. This system relies on the complete frequency, phase and time synchronization of one or more network nodes, preferably accomplished using the Clock Transfer and Measurement & Calibration systems, to have the carrier, symbol timing, sampling and other timing at the receiver are fully recovered. The clock synchronization can be either relative or absolute and is used as one improvement to deliver a multitude of benefits, such as bandwidth and SNR improvements, ISI suppression and more data bits per frame. This technique is also supporting other possible measurements for Channel Jitter Suppression and Measurement Technologies.

2) Detailed Method Steps (Flow Chart)

In applying the advanced equalization algorithms, the filtered received signal must first be sampled at the proper sampling instants. When a finite impulse response filter (FIR) are used for the DFE, the decision delay must be pre-determined (This is done by FFE/DFE with DPIC and Delay circuits). The optimization of the sampling instants and DFE decision delay is refereed to as the "Precision Sampling". In the determination of Precision Sampling approach, the "Sampling Delay" and the "Sampling Phase" are need to be determined.

The "Sampling Delay" is obtained using the Propagation delay measurements (CPR) of the Com2000™ Measurement and Calibration technology and time-correlation between the sequence of the received signal samples and the transmitted training sequence for sub-carrier phase cycle or delay errors. The "Sampling Phase" is obtained from the Clock Transfer using the Error Vector Measurement or EVM method or can also be derived from FFE/DFE/DPIC filter coefficients and Delay Circuits. The sampling instant or "Precision Sampling" is the sum of the "Sampling Delay" and the "Sampling Phase". It is important to optimize both of the Precision Sampling and the Decision Delays. Optimizing the "Sampling delay" alone improves the robustness of the DFE with respect to the channel delay-spread variations. Optimizing both of the "Sampling Delay" and the "Sampling Phase" provides additional performance gain for the symbol-spaced DFE's.

Figure 57:
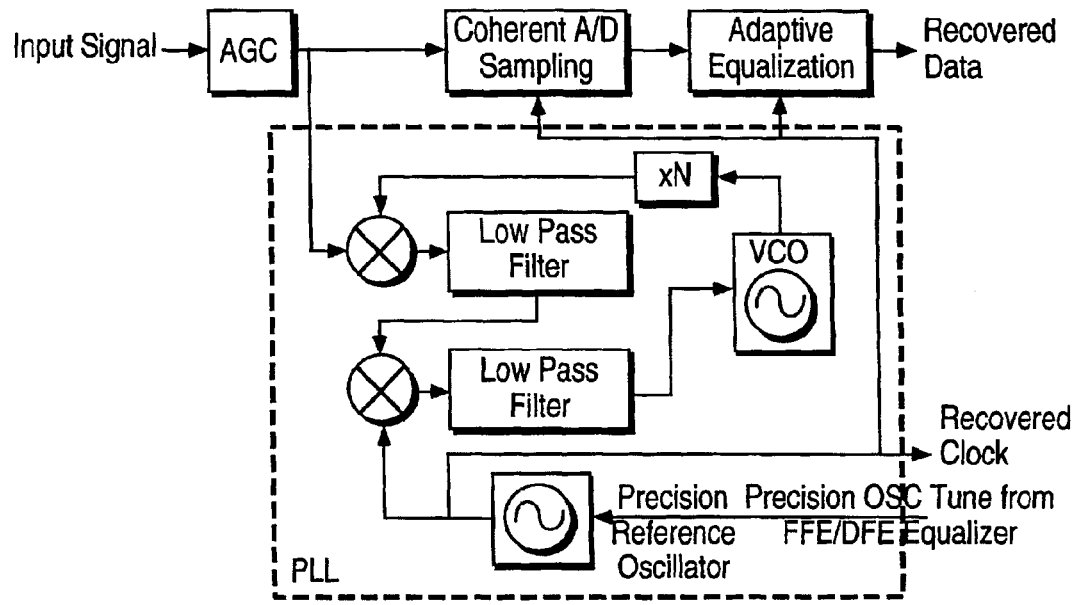
FIG. 57 is an illustration of the Coherent Carrier Recovery PLL for Com2000™ Receiver.

The Com2000™ Coherent Clock Phase and Carrier Recovery Circuits, as shown in FIG. 57, allows the Precision Sampling Technology to sample the receiving signal with a predefined phase error for a extend period of time. This is due to the fact that the crystal frequency drift and phase noise and jitter are less than the jitter caused by the VCO oscillator of the PLL circuits. This feature, therefore, also allows the increasing of the message size or number of data bits per packet load to be sent across a wireless communication channel such as TDMA packet. Through the Com2000™ Coherent Clock Phase and Carrier Recovery Circuits, the recovered carrier frequency remain a clean locked for more than 5x of the normal PLL lock.

The Com2000™ Precision Sampling Techniques provides both an SNR improvement while also providing a method and means for maintaining the receiving signal phase and frequency much longer (5x) over the conventional PLLNCO lock loops, as illustrated in FIG. 57. The precision sampling system uses the Coherent Clock Phase and Carrier Recovery Circuits to maintain the carrier signal phase and frequency. The Coherent Clock Phase and Carrier Recovery circuits (see FIG. 57) uses the quality crystal frequency and phases rather than the VCO frequency and phases. The long term drift of the crystal are bounded by the Clock Transfer Technology with reference to the extreme stable source. The short drift of the crystal are also bounded by the crystal short term drift criteria instead of the VCO short term drift. This is roughly 100 times worst than the crystal version. The carrier signal regeneration is also a much cleaner signal with less jitter.

The Com2000™ Coherent Clock Phase and Carrier Recovery Circuits allows the increasing of the message size or number of data bits per packet load to be sent across a communication channel such as Ethernet packet. Through the Com2000™ Coherent Clock Phase and Carrier Recovery Circuits, the recovered carrier frequency remain a clean locked for more than 5x of the normal PLL lock. It is therefore, as an example for Ethernet, the new packet size can be roughly 5x of the normal Ethernet size (1500 bytes), should this capability is exercised.

Static Position Error or Jitter is caused by the error associated with the signal sampling accuracy or the proximity of the timing pulse to the optimum sampling point or to the center of the eye. To suppress this jitter, the Com2000™ Precision Sampling uses a combination of technologies, such as Channel Calibration and Measurement system (and Measurements circuits 330, 343 as shown in FIG. 56) and Precision Sampling system, for placing the sampling window within a specified tolerance of the center of the eye.

Imperfectly timed sampling has the similar effect of increasing AWGN noise as far as the demodulator SNR is concerned. The Com2000™ Post Equalizer signal delivers a clean and wide-open eye diagram. With a signal demodulator precision sampling window for a Non-Linear Estimator such as a multi-level Quantiser M-PAM or M-QAM Demodulator (74) accurate to a level of 1 ns, therefore the Com2000™ can allow more symbols per baud on the existing N Mbaud symbol rate.

Figure 58:
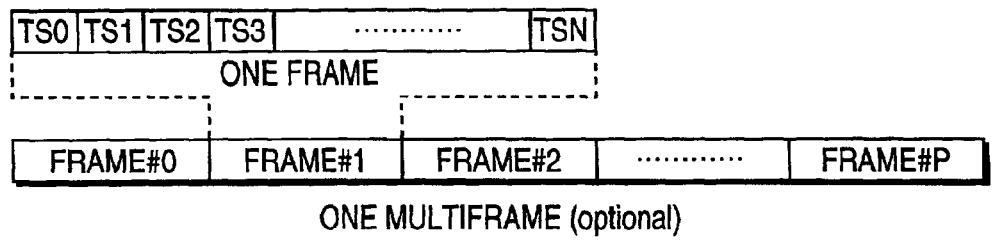
FIG. 58 is an illustration of the General UniNet Frame Structure.

UniNet Burst Switching (Fast Circuit Switching) TDD Examples:

For simplicity, it is desired to have N equal-size time-slots (TS) in one TDMA-frame as shown in FIG. 58 below.

Figure 59:
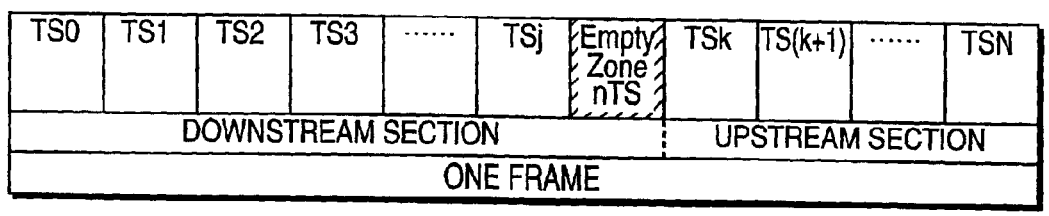
FIG. 59 is an illustration of the UniNet Downstream and Upstream Frame Structure.

The frame can be further divided into two sections: downstream (from Reference Node, RN to other regular Nodes) and Upstream (from regular Nodes to RN) as shown in FIG. 59. Note that the boundary between 2 sections is movable and can be changed from one frame to another by the RN based on the DCA. The EMPTY ZONE occupies a number of Time-Slots (nTS) sufficient to cover the twice the longest distance in time between the RN and a regular Node. The reason for this zone will be explained later in Section 5 on Ranging. The TDMA frame structure discussed in FIG. 59 is actually a TDMA/TDD (Time Division Duplexing) structure. The downstream is for point to multiple points while the upstream is for multiple points to point.

Figure 60:
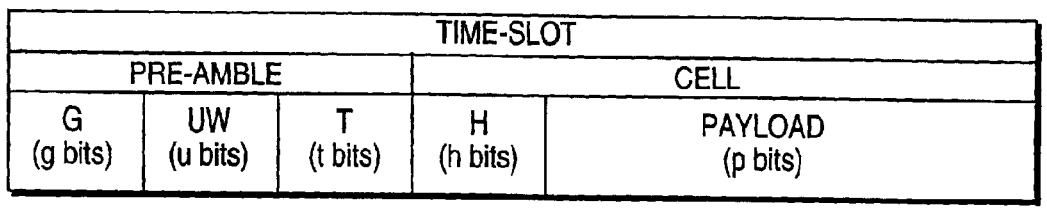
FIG. 60 is an illustration of the UniNet Simplified Burst and Cell Structure.

Each TS can accommodate one burst and a burst contains the pre-amble and cell as shown in FIG. 60 below. FIG. 60 only illustrates an example for discussions. We will need more investigations to design the detailed structures of the Burst and Cell. The pre-amble consists of:

G: guard time (i.e., no Tx, idle) to avoid overlapping of two consecutive bursts (Its length is therefore derived to cover the "quantization" error in ranging as discussed later), UW: unique word to identify the beginning of the burst. The UW of the reference node (to be discussed later) is used by the Rx Framer to identify the frame marker, and T: training pattern to adjust the frequency (if sent by the reference node) or to adjust the phase/timing (if sent by a regular node).

The cell contains a header (H) and a payload.

The N time-slots, TS#1 to TS#N, are shared by all nodes. The transmission in a particular TS is coordinated by the primary reference node (RN). For redundancy, there is also a secondary RN selected. The secondary RN becomes the active RN only when the primary RN fails.

Sampling Delay or Propagation delay measurements (CPR)

Figure 61:
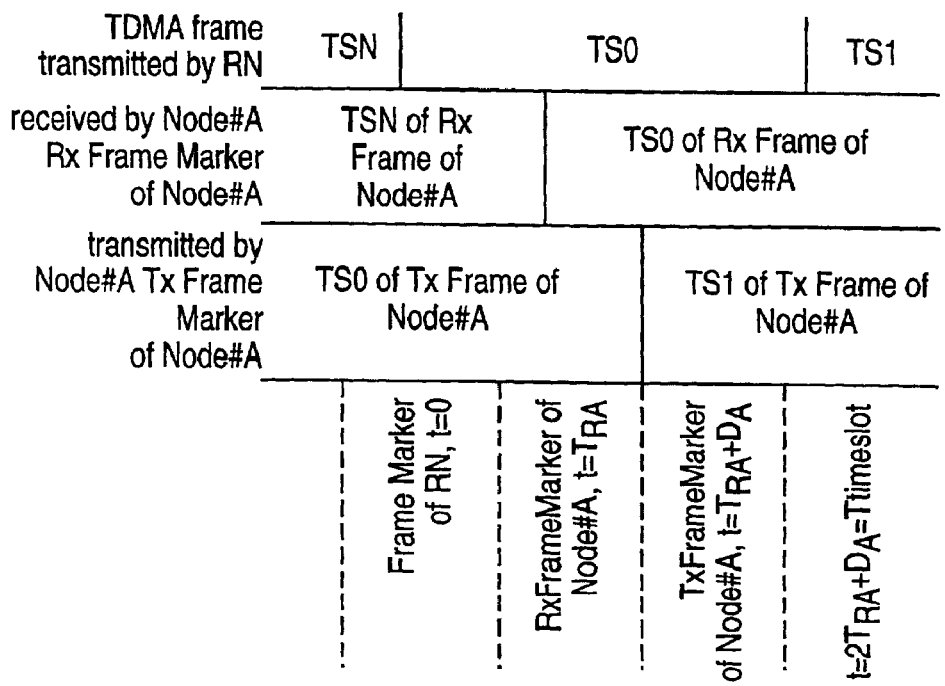
FIG. 61 is an illustration of the UniNet Time Relationship between various Frame Markers.
Figure 62:
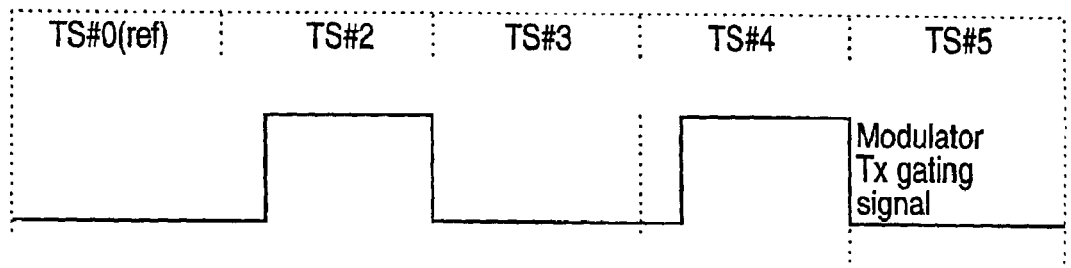
FIG. 62 is an illustration of the UniNet Transmit Frame Gating Signal.

Consider the time at which the Reference Node sends its reference burst in TS#0 of the TDMA Frame. Let denote this time reference at the beginning of the TS#0 (called Frame Marker) as t=0. With respect to this time reference, a regular Node #A will receive this Frame Marker at t=$T_{RA}$ where $T_{RA}$ denotes the time distance between the Reference Node and Node #A, including the processing time. This is the Rx Frame Marker of Node #A. Let assume $2T_{RA}<T_{timeslot}$ where $T_{timeslot}$ is the time interval of a time-slot. It becomes clear that in order for the RN receives the burst sent from Node #A at time t=$T_{timeslot}$ (i.e. right in the next time-slot), the Node #A must send its burst at time t=$T_{timeslot}-T_{RA}$. For a simple derivation, this time is also t=$T_{RA}+D_A$ where $D_A=T_{timeslot}-2T_{RA}$. In other words, the Node #A has to wait for $D_A$ after receiving the Frame Marker (i.e., "time" position of its Rx Frame Marker). Therefore, the time, t=$T_{RA}+D_A-T_{timeslot}$, denotes the Tx Frame Marker of the Node #A. The time relationship described above is shown in FIG. 61 below.

As discussed above, to establish the Tx Frame Marker, Node #A needs only one parameter $D_A$. For this the RN has to perform ranging during the initialization or re-configuration for a newly entering Node #A in the following sequence.

(a) RN sends a request in its Reference Burst to ask Node A to transmit a probing burst. Of course, the RN does not know the "time" distance between itself and Node A and we do not want that the probing burst of Node A collides an active burst of another Node or of the RN.

To avoid collision with the bursts originated from the Reference Node, as shown by FIG. 59, no Node is allowed to send its burst before completely receiving the end of the downstream section. This is the reason for the EMPTY ZONE in FIG. 59. This zone appears to be equivalent to $2T_{max}$ where $T_{max}$ is the longest "time" distance between the RN and a regular Node.

To avoid collision with the bursts from other nodes, the RN can keep the first time-slot after the EMPTY ZONE to assign it to the newly entering Node A to send its Probing burst.

(b) Node A has to establish the Rx Frame Marker in order to receive the cells. It then receives the command from the RN and prepares to send its probing burst. For this, the Node A waits for the end of the downstream section completely received and sets up the tentative Tx Frame Marker, and then sends its Probing burst.

(c) Reference Node waits for the UW of the probing burst from Node A. When the UW is detected, the RN measure the distance in time between the received UW and time-slot marker to derive $D_A$. Subsequently, the RN will send the value $D_A$ to the Node A and ask Node A to adjust and re-send the probing burst.

Normally, it must be correct in the second time. However, we need to allow for a few more times. Also note that this should be done without interruption of the network operation.

The Tx Framer receives the Rx Frame Marker and Rx Frame Sync status signals from the Rx Framer. It also receives the Tx allocated time-slot numbers from the Dynamic Capacity Allocation block. From these inputs, the Tx Framer generates the gating signals to control the transmission of the Burst-Mode Modulator. An example of the gating signals are given below. We assume a frame of 5 time-slots (i.e., N=5) and in a particular frame, time-slots #2 and #4 are assigned to this node.

Figure 63:
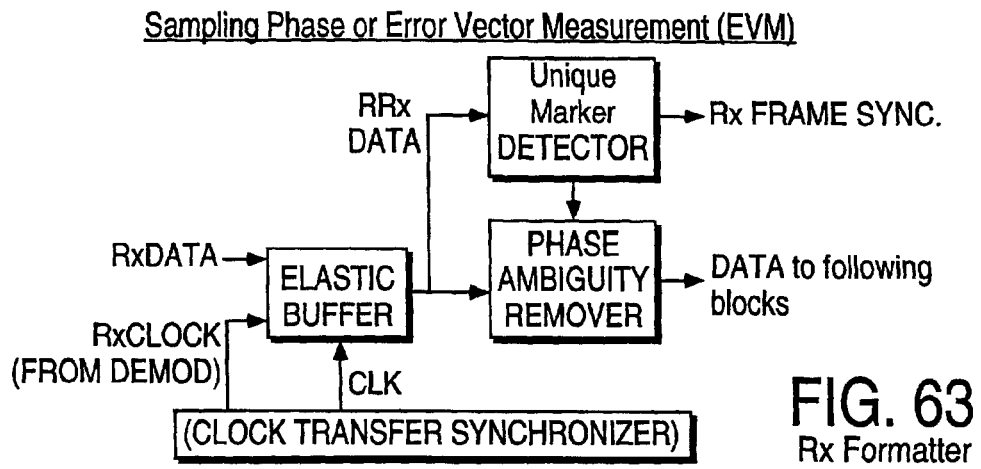
FIG. 63 is an illustration of the UniNet Receive Frame Formatter.

FIG. 63 shows the block diagram of the Rx Formatter. Its functions are:
(a) To detect and establish the received Bursts Sync via detecting Unique Word Mark.
(b) To detect and to establish the Rx Frame Sync signal. This is the timing signal indicating the frame marker (derived from the position of the detected reference Burst UW Sync) and the time-slot positions (based on the pre-determined time-slot number N and slot size). This timing signal is also indicating as well as the multiframe (based on the position of the reference Burst Sync addressed to a Node and the number of Nodes, P, given in the reference cell).
(c) To pass received cells to the following. This function includes the removal of phase ambiguity (due to multiphase modulated signal), removal of pre-amble and re-synchronization of the cell. By re-synchronization, we refer to the fact that received bursts coming from various source nodes with different phases need to be re-clocked. For this, FIG. 5 shows that bursts received from burst-demodulator pass through an elastic buffer. The input clock to this elastic buffer is the recovered clock from the demodulator (Rx Clock). Note that we assume a known and identical frequency, but the clock and carrier phases are not the same from one Rx burst to another. The synchronizer block is responsible to recover these phases for each burst (as parts of carrier and symbol timing recovery) in order to get the optimum sampling point (of the eye diagrams). For this, in the burst structure given above, we allocate segment T in the pre-amble to facilitate the phase estimation. Data read out from the elastic buffer by the system clock CLK of the same frequency. This clock signal, CLK, is continuous so that data out of the elastic buffer is re-synchronized for the remaining parts of the receiver.

The synchronized signals called RRx Data passed to the UW Detector and the Phase Ambiguity Remover.

Initially, the UW Detector is in the open search mode. It looks everywhere for the reference UW position. When a pattern recognized as the reference UW is first detected, the UW Detector changes to the tracking mode by generating the timing window signal to focus on the expected position of the reference UW. If X consecutive reference UW's are detected (within the expected window), then the UW Detector declares that Rx Frame Sync is established and maintains the tracking mode. Otherwise, it has to come back to the open search mode. This iterative process can be done for up to Y iterations. After Y times, if the Rx Frame Sync can not be established then alarm must be generated. Note that in the open search mode, all data are considered, therefore false alarm (i.e., reference UW is not there but some data pattern looks identical) may happen often. To improve the performance, we only declare a UW detected if the pattern is 100% identical.

On the other hand, in the tracking mode, the node already knew the vicinity of the UW, hence the control signal provides only a narrow window for UW detection in order to reduce the false detection probability. In the tracking mode, a pattern of L bits is declared to be a UW if there are M<L identical bits. M<L to cover the case of bits in error due to noise. We need a short analysis to determine M, L.

2.2 Transport (MAC & Upper Layer) Intelligence—QoS Transfer Technology

The UniNet™ new architecture for Per-Request Fast Circuit-switched network architecture is discussed the following subsections. UniNet™ is an effort to deliver a high capacity network with packet/circuit switched transport with an integrated service environment, as illustrated in FIG. 02.

2.2.1 Protocols Transfer Environment: Protocol Sync Circuit Switching Tech

A. Brief Summary of Services problems

Standard Internet Protocol (IP)-based networks provide "best effort" data delivery by default. Best-effort IP allows the complexity to stay in the end-hosts, so the network can remain relatively simple [e2e]. This scales well, as evidenced by the ability of the Internet to support its phenomenal growth. As more hosts are connected, network service demands eventually exceed capacity, but service is not denied. Instead it degrades gracefully. Although the resulting variability in delivery delays (jitter) and packet loss do not adversely affect typical Internet applications—email, file transfer and Web applications—other applications cannot adapt to inconsistent service levels. Delivery delays cause problems for applications with real-time requirements, such as those that deliver multimedia, the most demanding of which are two-way applications like telephony.

Increasing bandwidth is a necessary first step for accommodating these real-time applications, but it is still not enough to avoid jitter during traffic bursts. Even on a relatively unloaded IP network, delivery delays can vary enough to continue to adversely affect real-time applications. To provide adequate service—some level of quantitative or qualitative determinism—IP services must be supplemented. This requires adding some "smarts" to the net to distinguish traffic with strict timing requirements from those that can tolerate delay, jitter and loss. That is what Quality of Service (QoS) protocols are designed to do. QoS does not create bandwidth, but manages it so it is used more effectively to meet the wide range or application requirements. The goal of QoS is to provide some level of predictability and control beyond the current IP "best-effort" service.

A number of QoS protocols have evolved to satisfy the variety of application needs. We describe these protocols individually, then describe how they fit together in various architectures with the end-to-end principle in mind. The challenge of these IP QoS technologies is to provide differentiated delivery services for individual flows or aggregates without breaking the Net in the process. Adding "smarts" to the Net and improving on "best effort" service represents a fundamental change to the design that made the Internet such a success. The prospect of such a potentially drastic change makes many of the Internet's architects very nervous.

To avoid these potential problems as QoS protocols are applied to the Net, the end-to-end principle is still the primary focus of QoS architects. As a result, the fundamental principle of "Leave complexity at the 'edges' and keep the network 'core' simple" is a central theme among QoS architecture designs. This is not as much a focus for individual QoS protocols, but in how they are used together to enable end-to-end QoS. We explore these architectures later in this paper after we give a brief overview of each of the key QoS protocols.

Figure 64:
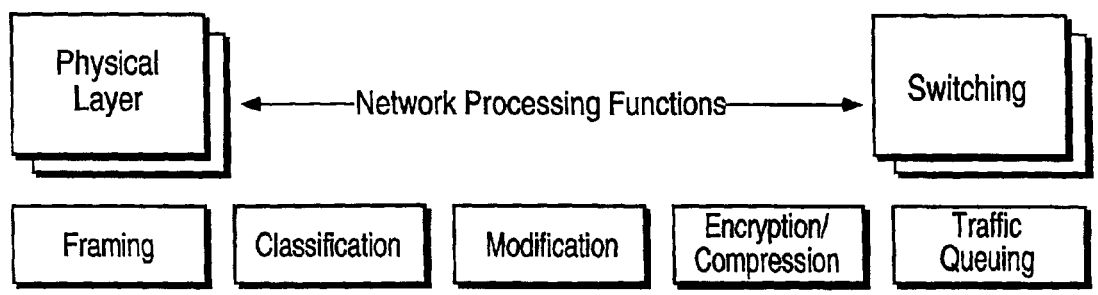
FIG. 64 is an illustration of the IP Packet Network Processing Functions.

There is more than one way to characterize Quality of Service (QoS). Generally speaking, QoS is the ability of a network element (e.g. an application, a host or a router) to provide some level of assurance for consistent network data delivery. Some applications are more stringent about their QoS requirements than others, and for this reason (among others) we have two basic types of QoS available, as illustrated in FIG. 64:

Resource reservation (integrated services): network resources are apportioned according to an application's QoS request, and subject to bandwidth management policy.

Prioritization (differentiated services): network traffic is classified and apportioned network resources according to bandwidth management policy criteria. To enable QoS, network elements give preferential treatment to classifications identified as having more demanding requirements. These types of QoS can be applied to individual application "flows" or to flow aggregates, hence there are two other ways to characterize types of QoS:

Per Flow: A "flow" is defined as an individual, unidirectional, data stream between two applications (sender and receiver), uniquely identified by a 5-tuple (transport protocol, source address, source port number, destination address, and destination port number).

Per Aggregate: An aggregate is simply two or more flows. Typically the flows will have something in common (e.g. any one or more of the 5-tuple parameters, a label or a priority number, or perhaps some authentication information).

Figure 65:
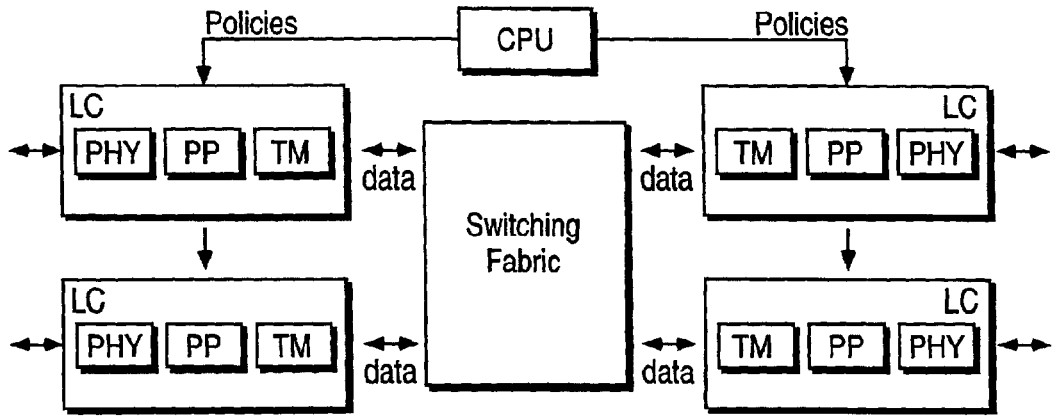
FIG. 65 is an illustration of the Distributed Packet Switching Architecture.

Unlike circuit-switched networks, a pure connection-less packet-switched network, as illustrated in FIGS. 64 and 65, cannot in itself provide real-time guarantees. This is mainly due to dynamic buffering and that nodes send data into the network at uncontrolled rates. One way to provide services with real-time guarantees is to let applications reserve network resources before they transfer their data. Applications, network topology and policy dictate which type of QoS is most appropriate for individual flows or aggregates. To accommodate the need for these different types of QoS, there are a number of different QoS protocols and algorithms:

ReSerVation Protocol (RSVP): Provides the signaling to enable network resource reservation (otherwise known as Integrated Services). Although typically used on a per-flow basis, RSVP is also used to reserve resources for aggregates (as we describe in our examination of QoS architectures). In addition to the providing of a protocol for handling resource reservation requests, routers inside the network must implement schemes to actually support resource reservation, e.g., buffer allocation and queueing/policies.

Differentiated Services (DiffServ): Provides a coarse and simple way to categorize and prioritize network traffic (flow) aggregates.

Multi Protocol Labeling Switching (MPLS): Provides bandwidth management for aggregates via network routing control according to labels in (encapsulating) packet headers.

Subnet Bandwidth Management (SBM): Enables categorization and prioritization at Layer 2 (the data-link layer in the OSI model) on shared and switched IEEE 802 networks.

In a connection-oriented packet-switched network, for instance an ATM network, as illustrated in FIGS. 07 and 02, resources are reserved when connections are created. If the network cannot allocate the requested resources, the sender is either blocked or offered a lower service quality. This admission control is based on a traffic description from the sender that describes for example the average bitrate, the peak rate, largest burst, etc. In addition, policing and shaping functions, such as leaky bucket schemes, are needed to ensure that senders do not exceed the re-sources they have reserved. In a simple leaky bucket scheme, data is put in a queue, the bucket, and at regular intervals, data is taken from the queue and put onto the medium.

This scheme, as illustrated in FIGS. 07 and 02, has the disadvantage of not handling bursts of data efficiently. This has been addressed by using a token bucket scheme 1. Tokens (the right to send data onto the medium) are put with a specified rate in a bucket. If no data is sent, tokens will gather in the token bucket. If a burst of data then arrives, data can be sent as long as there are tokens in the bucket. One problem with this scheme is that a token bucket may release all its tokens at once in one burst. If several senders do this simultaneously, there is a risk that much data will arrive simultaneously at switch points in the network, as illustrated in FIG. 65. To prevent that congestion occurs, many resources have to be reserved for each connection, which may reduce utilization.

However, this effect can be limited by using a leaky bucket that ensures smooth-ness following the token bucket. This leaky bucket mechanism is Sometimes called a spacer, since it separates packets with a space. Queuing policies can be used to provide different services. Typically, packets belonging to different traffic classes are put in separate queues in the network with priority given to the queues with real-time traffic. Instead of using simple first in first out (FIFO) schemes for these queues, other more suitable scheduling schemes for providing service guarantees can be applied, such as Earliest Due Date (EDD), Weighted Fair Queuing (WFQ), etc. It has been shown that in a network with weighted fair queuing, a flow that is controlled by a token bucket with leaky bucket rate control, has an upper bound on the delay. This delay bound is independent of other flows' characteristics, that is, the scheme provides isolation between flows.

Thus, it is possible to provide real-time performance guarantees in a packet-switched network, as shown in FIG. 64, 65. However, it should be taken into consideration that this means that these mechanisms are needed to be performed per flow, both in terms of traffic regulation at the sender and queueing policies at switch points in the network. Weighted fair queueing is therefore rather complex to implement, at least per flow, in the network. Therefore, much research is still performed to find schemes that are simple to implement but provide sufficient quality of service.

The delay bounds provided by WFQ tend to become long since they are based on the worst case. It is shown that by applying schemes that make use of statistical multiplexing, it is possible to provide statistical delay bound guarantees— the probability that all packets are delivered within a given delay bound is high. This statistical delay bound is much shorter than what is provided by WFQ.

Figure 6:
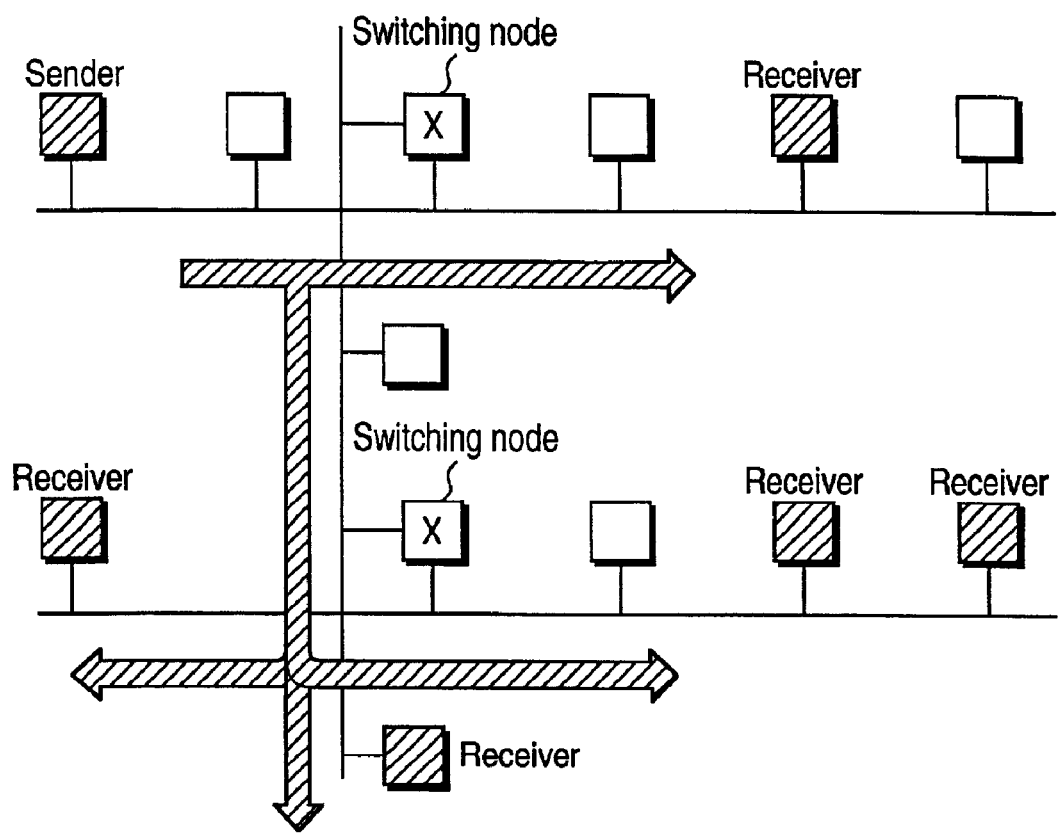
FIG. 06 is an illustration of a QoS example of the UniNet Network.

In summary, the current "Soft QoS" or Best Effort QoS standards for Ethernet such as IEEE 802.1P & 802.1Q for layer 2 and MPLS, RSVP for layer 3&4 are only the emulation of the ATM "QoS" for IP networks at the upper layers and are currently implemented in software by many network core equipment manufacturers within LAN/WAN Switching Hubs and Routers by CISCO, 3COM and Bay Networks. Com2000™ QoS is "Hard QoS" or Guaranteed QoS for UniNet networks, as shown in FIGS. 06 and 07.

B. Fast Protocol Synchronous Switching—Hard Quality of Service—General

Com2000™ QoS can fundamentally be interpreted as a universal transport QoS mechanism for integrated services, as illustrated in FIG. 02, that seamlessly maps into and out of any new or current and legacy data com and telecom protocols and QoS services. These protocols include ATM, SONET, Frame Relay, and T1/E1, etc,. from the telecom services and IP networking protocols such as TCP/UDP from data communications. In short, this universal transport Com2000™ QoS mapping or Fast Protocol Synchronous Circuit Switching, which is anything over anything transport mechanism such as IP over ATM, IP over SONET, ATM over IP, ATM over SONET, PPP over SONET, . . . etc. is applicable to all protocols from a very stringent synchronous services such as SONET, loosely isochronous services such as ATM and Frame Relay, etc, to a very loosely and best effort asynchronous data services such as Internet IP protocols.

As an example for addressing the Real time video, voice and data communication (Isochronous Services) over the existing IP (Asynchronous Services) high-speed networking system for Point-to-Point topology IP network, an ATM equivalent Quality of Service or "QoS" over existing IP networking solutions for high-speed data communications systems are needed to be devised. This is also done through Com2000™ Fast Protocol Switching Control Technology insertions to existing IP Ethernet protocols.

1) Summary of Fast Protocol Synchronous Switching Techniques

| Protocols IN/OUT Mapping Matrix | Ethernet TCP/UDP/IP (Async) | ATM (Isochronous) | SONET (Synchronous) |
|---|---|---|---|
| Ethernet (Asynchronous) TCP/UDP/IP | Asynch-To-Asynch Quality of Services Transfers | Asynch-To-Isochro Quality of Services Transfers | Asynch-To-Synch Quality of Services Transfers |
| ATM (Isochronous) | Isochro-To-Asynchro Quality of Services Transfers | Isochro-To-Isochro Quality of Services Transfers | Isochro-To-Synchro Quality of Services Transfers |
| SONET (Synchronous) | Synchro-To-Asynchr Quality of Services Transfers | Synchro-To-Isochro Quality of Services Transfers | Synchro-To-Synchro Quality of Services Transfers |

Another important aspect of Fast Protocol Synchronous Switching technology is latency and bandwidth controls at the MAC layer (which leveraged the TDM protocols of the signaling Physical layer) of the integrated environment for multimedia "video/voice/data" Internet applications. Over the Internet data communication channels, such as nodes of a Small Office or Home Office Network and Central Offices Switches, there is an unpredicted nature within packet based voice and video data (Isochronous Services) delivery mechanisms that cause errors in real time multimedia applications thereby reducing the effective use of the real time multimedia applications.

The following paragraphs describe the Com2000™ QoS Control enabling technology for seamless LAN/WAN Data Communication and Telecommunication systems integration, as shown in FIG. 02. This allows the Ethernet Signaling to have the predictable latency controls and nature as of the SONET (Synchronous Services) or ATM (Isochronous Services) networks. The Com2000™ program incorporates lessons learned in the data communications bandwidth control and efficiency requirements. The design of the Com2000™ QoS product for Internet QoS, are primarily in the area of enabling SONET/ATM like QoS over IP Ethernet Signaling, protocols, improving network throughput of existing data communication channels and its challenges of Internet, Intranet and Extranet infrastructure equipment, long haul WAN network equipment and Telecommunications equipments.

2) Detailed Method Steps of Fast Protocol Synchronous Switching (Flow Chart)

At the Physical layer of each Com2000™ Fast Protocol Synchronous Switching communication transceiver (which locates either at the Switches and Edge NIC), the WAN SONET (Synchronous Services) like synchronization capability is designed into the transceiver chip, as shown in FIGS. 01 and 02. With this capability, the IP Ethernet networks or SOHO networks can deliver a equivalent of SONET (Synchronous Services) or ATM (Isochronous Services) network Quality of Services at the physical layer such as latency controls, propagation delay controls, and predictable nature of the networks.

Centralized switches are likely to become bottlenecks in packet or circuit switching networks when the edge of the network's transmission capacity is increased. UniNet™ therefore uses a distributed switching scheme based on the shared medium to avoid the switch bottle-neck. A shared medium network, such as a UniNet™ bus, as shown in FIG.

06, does not normally use a physical switch. Instead, the shared link itself implements the switch, where a node's attachment to the link can be seen as a switch port. This reduces the amount of data that must be passed through switch nodes, but still data has to be switched when passed from one medium to another. UniNet™ implements a Per Request Burst Switching Scheme with built-in Synchronous Switching Intelligence The concept derived from the lesson learned of the packet based and circuit based switching networks and the wish of defining the most optimized way for data delivery at the edge of the network which seamlessly interoperable with the backbone, as illustrated in FIG. 02. The UniNet™ Synchronous Switching can be used as the universal transport and can be able to map in and out of legacy IP, ATM, . . . etc switching with the most optimized way. It benefits is also derived from the shared medium topology and the synchronous TDM cell message scheme of the UniNet™.

Instead of one high-capacity switch that has to handle all incoming data, as shown in FIG. 65, a cluster of UniNet™ switch elements form a high-capacity switch node, as shown in the FIG. 06. Several switch elements are then connected to the same buses and switch a portion each of the total amount of data. The internal switching capacity of one switch element can be quite modest (much less than the transmitted capacity on the copper) and designed to be cost-effective. Even though several UniNet™ switch elements form a switch cluster, the added switching delay continues to come merely from the one switching element that does the actual switching. This scheme can be used both in a single- or a multi-stream environment, and the distribution granularity of switching capacity (i.e., the number of slots to switch) among the switch elements can be set according to performance and demand. The distribution can either be set up initially, e.g., by starting with a range of slot numbers or a bitstream each, or dynamically through signaling on a per channel basis. In the case of failure of one switch element in the logical switch, traffic may also be rerouted using the other switch elements.

The UniNet™ Network deliver the IP over TDM signaling for Voice network, Voice over IP and other services in the private network environment. The distributed networking process functions and IP switching fabric, as shown in FIG. 64, is now handle by each of the UniNet™ element in the network as shown in FIG. 06. This distributed intelligence and processing on the TDM signaling enable this network to be deterministic as the Circuit Switching and as flexible as the Packet Switching.

As an example for Voice over IP applications within the private networks, the UniNet™ networks deliver the real-time voice quality as the telecom TDM backbone. When it communicate with the IP/TDM switching in the backbone, as shown in FIG. 02, it will assemble the IP Packet in the same manner as Internet Protocol requires, and tag them with appropriate IP QoS flag and send out to the IP networks. The UniNet™ also can its own QoS scheme into the ATM QoS and send it out over the xDSL access as also shown in FIG. 02.

2.2.2 Address Transfers Environment: Fast Data Synchronous Circuit Switching Tech From the "Com2000™" Intelligence Technologies, we show that the topologies independent for the shared and non-share medium access structure architecture and designs of such as mesh, bus, point-to-multi-point, point-to-point or other topologies, with distributed intelligence and data switching/routing is a optimal data delivery way of the multicasting and real-time guarantees for time sensitive data messages, as shown in the FIG. 06. It is also a flexible solution for the novel concept that the capability of a network interface should depend on the level of service assigned to a service access point, not the capacity of the total network, such as transaction services with a short bust of messages with short access delay.

A. Brief Summary of Packet/Circuit Data Path problems

Today's network architecture consists of three main elements: Hosts (H), LAN Switches (S), and Routers (R). The Hosts are a collection of computer systems that execute network applications. The LAN Switches are the network elements that provide communication between hosts within a LAN. The Routers are the network elements that provide interconnection between LANs. Routers are also used to provide interconnection between routing domains[6]. The main functionality of a switch is to forward packets among hosts and between hosts and a router.

[6] Routing Domain is a collection of several LANs that are interconnected by Routers.

The main functionality of a router is to route packets. Routing packets involves route selection (using routing protocols) and packet forwarding (using forwarding engines). Today's network architecture is designed to support the delivery of best-effort traffic. In order to support the delivery of QoS traffic, the network elements (switches and routers) must also support packet policing and shaping. This means in order to support end-to-end QoS network solutions, LAN switches must support forwarding and policing and shaping, whereas routers must support forwarding, policing and shaping, and routing.

B. Universal Data Path General

A difference between circuit-switched (Telecom) and packet-switched (Data Communications) networks is that circuit-switched networks do not have dynamic buffering inside the net-work. On the other hand, a potential connection can be blocked (also true in connection-oriented packet switching such as ATM) because resources could not be allocated in the network. The data then has to be buffered at the sender until resources can be allocated. Data may also have to be buffered at the sender if the rate of the generated data temporarily exceeds the circuit rate, for example during a data burst.

Com2000 Per Request Burst switching (Fast Data Synchronous Circuit Switching Tech) is a new form of circuit switching and also is the extension of SONET Fiber backbone Circuit Switching that applies into the Edge of the wireless and wireline networks and also seamless integrated into the existing SONET networks and interoperable with data communication and telecom legacy protocols, as shown in FIG. 02.

In Com2000 Per Request Burst switching (Fast Data Synchronous Circuit Switching), a burst (consisting of a header, an arbitrary amount of data and a termination character) is sent in a time-division (TDM) channel of fixed bit-rate and is thus interleaved with other bursts. This makes burst switching different from fast packet switching (ATM), where packets are sent one at a time with full link bandwidth. Com2000 or UniNet burst switching differs from other burst switching in that control and data are separated and it uses multicast, multi-rate, high capacity channels in order to support a variety of different traffic classes with a dynamically bandwidth allocation scheme or DCA.

A UniNet™ user generates data at many different rates depending on the end equipment and the applications. The user therefore needs a network that can handle data at multiple rates. The UniNet™ Per Request Burst switching networks, can handle TDM such as the telephone network only provide fixed bitrate service and also much more bandwidth flexible (via the Dynamic Bandwidth Allocation Scheme) to handle Packet-switched networks, as they provide an asynchronous service, where a node can send data as long as the link has free resources. This often means that the problem of networks which either the circuit provides insufficient capacity, or the capacity may be inefficiently used are overcomed with The UniNet™ Per Request Burst switching networks.

To overcome the static nature of circuit-switched networks, Com2000 UniNet™ burst switching or multi-rate circuit switching (and fast circuit switching) Technology has developed. In these networks, network capacity can be dynamically allocated in time steps of a given channel bandwidth request, that is, its capacity is dynamically quantized.

One proposal for using multi-rate services in current public telephone networks is multi-rate ISDN, that provides an n64 kbit/s service. A disadvantage with fixed quantized-capacity networks is that a user may be forced to use the next higher rate if the requested rate is not supported. The result is a higher blocking probability and a lower throughput. However, this quantization loss has been shown to be quite low [118]. Additionally, it was shown that even for networks such as ATM, which support a continuous bit rate, capacity quantization can be used for states reduction and thereby simplify network management.

Figure 66:
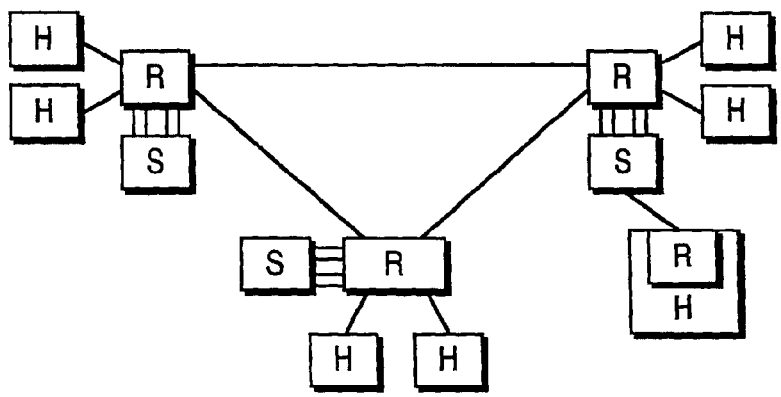
FIG. 66 is an illustration of the UniNet Application over existing Ethernet IP Networks.

In the existing Legacy IP Internet Ethernet networks and related applications, how about a new UniNet network element called a "UniNet™ Regulator (R)" that supports policing and shaping and routing!!. This means an seamless IP end-to-end-QoS Network Architecture that is composed of Hosts (H), LAN Switches (S), and Regulators (R). The question is: Where is the router?. The answer is we don't need it (Distributed Routing). The UniNet™ regulator in this case, is designed as part of the Host (H) transceiver at the Com2000™ QoS Physical Layer to provide the QoS intelligence, as shown in FIG. 42 and FIG. 66, to support police the traffic and utilizes the IP LAN switches to forward packets. The regulator is designed as a regulation system which consists of both hardware and software components.

Key Features for "UniNet™ Regulator (R)" when UniNet technology integrated into the legacy Ethernet Networking:
 1. Distributed Switching; 2. Distributed Routing
 3. Scalable; 4. True End-to-End QoS solution
 5. Low cost; 6. Interoperate with legacy router The "UniNet™ Regulator (R)", as shown in FIG. 66, is the collection of external Ethernet interface multi-port "UniNet™ Ethernet" PHY which, in turn, interconnect with each other in a high speed bus, acting as the fabric switch engine, via the UniNet™ PHY and that has all of the intelligence of the Traffic Management as shown in the FIG. 65.

To address the Real time video, voice and data communication (Isochronous Services) over either point-to-multipoint or bus topology such as Home/SOHO high-speed networking system, The regulator is designed as part of the Host (H) transceiver at the Physical Layer to police the traffic, routing and forward packets to Synchronous Bus Ethernet protocols.
(Distributed Routing & Switching)

Due to precision network synchronization (Synchronous Services) in frequency and time at the physical layer of the transceivers, the time based intelligence and operations are enabled. The ultra high speed bandwidth and network element intelligence such as the fast digital synchronous circuit switching fabric intelligence, which performs the tasks such as fragmentation/defragmentation of the received packet based into Cell based for QoS controls and other network element intelligence such as the Switching/Router Functional intelligence, which performs for tasks such as addressing, switching, routing, policing and shaping, sequencing and flow controls for each switching node, can be migrate to the edge node systems or Com2000™ PHY in this case. The network connection between the end node(s) and the core node is just the extension of the "QoS" switching fabric.

2.2.2.1 Distributed Switching/Routing: Distributed Switching/Routing Technology

Distributed Routing and switching techniques enable internet processor to regulate the data flow and controls (Distributed Switching & Routing via Advanced Synchronous Switching Transfer Techniques).

A. Brief Summary of Switching problems

In Distributed multimedia applications often use multicast distribution of data, i.e., sending the same data to several receivers. So far, multicast has been used mostly for network control and management, but multimedia applications use it for data distribution as well. This, in combination with distribution of information in the public network, such as distribution of TV, public information and advertising means that efficient multicast is important in future networks.

Efficient multicast capability in a network depends on whether a shared medium or point-to-point links are used, i.e. on the topology. A shared medium, such as a bus or a ring, has the advantage that several nodes can read the same information. In a point-to-point topology, multicast data has to be replicated in switch points. Multicast is supported both in the Internet and in ATM networks, even though a complete multicast standard has not yet been defmed in ATM.

There are three major issues to consider when providing a multicast service:
A. Router and switch support, i.e., there must be support in routers and switches to duplicate data.
B. Multicast addresses, i.e., an address that is used to address all members of a multicast group.
C. A multicast routing algorithm, including a group membership protocol that is used for routers and switches to learn the existence of new members.

Copying of data messages is often implemented in ATM switches by special copy networks that are used for the duplication of cells. A con-sequence of this is that resources have to be reserved on several links, which may complicate resource reservation. An issue with multicast in large, wide-area networks is scaling. There are three main costs associated with multicast algorithms in large networks.

Firstly, the number of table entries within routers/switches tend to become very large and should be minimized. Only the entries that are actually used must be resident within the router/switch. Second, the amount of control in-formation that is sent between nodes to update routing and membership in-formation needs to be kept low. Broadcast of information should be avoided. At the same time, it is important that new information efficiently and swiftly will be sent to concerned parties. Thirdly, multicast data should only be sent on links that lead to receivers, and it is preferable that data is replicated as close to the receivers as possible to reuse link capacity. Another major factor is the processing cost of computing delivery paths for all active multicast sources.

B. Switching/Routing Data-General

1) Summary of Switching/Routing Transfer Techniques

Centralized switches are likely to become bottlenecks in legacy networks where the transmission capacity is increased. Fast Synchronous Circuit Switching therefore uses a distributed switching scheme based on the shared medium to avoid the switch bottle-neck. A shared medium network, such as a UniNet bus, does not normally use a separate physical switch device. Instead, the shared link itself implements the switch, where a node's attachment to the link can be seen as a switch port. This reduces the amount of data that must be passed through switch nodes, but still data has to be switched when passed from one medium to another. UniNet therefore also implements a modular switching scheme based on benefits from the shared medium topology and the synchronous TDM scheme in UniNet Systems.

Instead of one high-capacity switch that has to handle all incoming data, a cluster of switch elements form a high-capacity switch node. Several switch elements are then connected to the same buses and switch a portion each of the total amount of data. The internal switching capacity of one switch element can be quite modest (much less than the transmitted capacity on the copper channel) and designed to be cost-effective. Even though several switch elements form a switch cluster, the added switching delay continues to come merely from the one switching element that does the actual switching. This scheme can be used both in a single- or a multi-stream environment, and the distribution granularity of switching capacity (i.e., the number of slots to switch) among the switch elements can be set according to performance and demand. The distribution can either be set up initially, e.g., by starting with a range of slot numbers or a bitstream each, or dynamically through signalling on a per channel basis. In the case of failure of one switch element in the logical switch, traffic may also be rerouted using the other switch elements.

New distributed applications, especially those based on video streams require high network capacity. Circuit-switched networks provide a simple data transfer without processing of the data stream, congestion control, etc. This allows large volumes of data to be transferred efficiently. The main limiting factors in packet-switched networks are traffic control mechanisms and the data manipulation capability of network components, such as routers and switches. However, current packet-switched networks can support Gbit/s bitrates The data transfer capacity in circuit-switched networks are primarily limited by the high-speed electronics in media access parts. However, one important factor in circuit-switched networks that does not directly affect the data transfer rate but determines much of the utilization of network resources is the signaling delay associated with creation and tear-down of circuits.

Increased network capacity can either be achieved by raising the bitrate of the link or by sending several bitstreams in parallel. This is independent of the choice of packet switching or circuit switching, even most parallel systems give a circuit-switched service. Increasing the number of parallel bitstreams in the network seems a promising technique to obtain high capacity in a cost-efficient way, since it makes it possible to increase transmission capacity without increasing the speed of electrical components in the network. These components will only operate at the speed of a single bitstream, while the total amount of data on the copper channel can be much larger.

Parallel bitstreams can be achieved by phase division multiplexing (PDM) techniques, or by space division multiplexing (SDM) with several virtual cables in parallel, as shown in FIG. 55. These receivers used in PDM systems are currently not available. The multiple channel receivers are rather expensive, since transmitters and receivers in PDM systems must have high precision and low tolerance on for example phase drifts. These strict requirements are needed to avoid interference between phases and to make it possible to detect and distinguish different signals at the receiver.

2) Detailed Method Steps (Flow Chart)

UniNet is designed for a shared medium topology. This facilitates distributed switching, avoiding large central capacity in a cost-efficient way, since it makes it possible to increase transmission capacity without increasing the speed of electrical components in the network. These components will only operate at the speed of a single bitstream, while the total amount of data on the copper channel can be much larger. The shared medium also has inherent multicast capability, i.e., the same data element can be read by several receivers. Furthermore, the shared medium provides a means for efficient sharing of resources.

In order to use network resources more efficiently than ordinary circuit-switched networks currently do, resources are reallocated between nodes ac-cording to their current demands. Nodes access fibers according to a Time Division Multiplexing (TDM) scheme using 125 us cycles (20*6.25 us or 10 nodes in the UniNet network), as shown in FIG. 05, i.e., the same cycle duration as in current telephone networks. These cycles are further divided in 64-bit slots. A slot does not contain any headers or control bits. On the contrary, data and control are separated, and control information is sent in control slots and data in data slots. A slot is addressed through its number in the cycle.

UniNet provides a service based on multicast channels (or channels for short). A UniNet channel is a set of slots in the cycle with a sender and an arbitrary number of receivers. Channels are synchronous, and can be seen as continuous streams of data from senders to receivers. When a host establishes a channel, it reserves resources for a data transfer with constant through-put and delay from sender to receiver.

The channel abstraction in UniNet differs from ordinary circuits in that channels are: Simplex, a channel is only set up from sender to receiver. A duplex connection consists of two channels, one in each direction. Multirate, channels may be of variable size and are increased in steps of 512 kb/s (i.e., an additional slot per cycle). Multicast, a channel can have several receivers. Channels can be both sender and receiver initiated to accommodate efficient resource reservation, especially for group communication. To provide real-time guarantees, UniNet uses a strict dynamically resource reservation scheme, where a new connection is admitted only if there is enough free bandwidth and if a suitable route can be found. Once a channel is established, the user of the channel is guaranteed the reserved bandwidth until the channel is closed, which can be done at the period rate. The UniNet network thus provides channel separation (i.e., traffic on one channel does not disturb traffic on other channels). Since resources are allocated for each hop from sender to receiver, and since UniNet uses synchronous switching, there is a constant delay (low jitter) from sender to receiver. This also means that there can be no congestion in the network. There can still be overflow in slow receivers, so UniNet does not eliminate the need for end-to-end flow control It has been shown that the signalling delay associated with creation and tear-down of communication channels determines much of the efficiency of fast circuit-switched networks. UniNet is therefore designed to create channels quickly, within a few hundred microseconds. Even though a UniNet network may have the potential to create a channel for every message, we do not believe this approach to be suitable for all traffic classes.

It has been shown that the signalling delay associated with creation and tear-down of communication channels determines much of the efficiency of fast circuit-switched networks. UniNet is therefore designed to create channels quickly, within a few hundred microseconds. Even though a UniNet network may have the potential to create a channel for every message, we do not believe this approach to be suitable for all traffic classes. Rather, it is the user's decision whether to establish a channel per information burst or to keep the channel established even during idle periods.

The UniNet network is designed for a unidirectional medium with multiple access, i.e., a medium shared by all connected nodes. The UniNet protocols and medium access technique can, in principle, be used on several different topologies, such as ring, folded bus or dual bus. We have chosen the dual bus topology since it has a lower average inter-node distance than both a bus and a ring. UniNet's synchronization scheme is also easier to implement on a bus structure than on a ring. In an access network environment, where distances are short, a single bus or ring topology may be preferred to reduce copper access costs.

A UniNet network can be expanded by interconnecting several buses with switch nodes. UniNet uses decentralized switching in the sense that any node connected to two or more buses can switch data between these. One advantage of this is that the switching capacity can be increased gradually by adding more switch nodes. Switching is synchronous, which means that the switching delay is constant for a channel. This means that a multi-hop channel has roughly the same properties as a channel on a single bus. The only difference is that a switched channel has a slightly longer de-lay (at most 125 microseconds for each hop=20*6.25 us or 10 nodes in the UniNet network as shown in FIG. 05). Provided that a switch node can buffer one cycle of data for each of its buses, there cannot be any congestion or overflow in the node. Since the cycle time and the slot length is constant throughout the UniNet network, buses running at different bit rates can be connected to the same node and switching can be done between these buses. This makes it possible to update and increase the speed of parts of the network without forcing all nodes to be updated.

Multi-Hop Channels

To create a channel, slots must be allocated at the sender and at each switch node along the channel's route. Thus, switch nodes allocate slots for a channel on behalf of the sender. The switch nodes then start switching the channel, by copying the channel's slots from the incoming to the outgoing bus.

An attempt to establish a multi-hop channel fails if any of the switch nodes involved is unable to allocate the required amount of slots. In this case an-other route has to be tried. There are three main routing algorithms in circuit-switched networks. In the first, referred to as original office control routing, the sender is always responsible for deciding what path to try.

When a call is rejected, a message is sent back to the sender, which decides what path to try next. In the second algorithm, called sequential office control routing, an intermediate node that discovers that the connection is blocked tries to set up the connection on an-other path. If these alternative paths are blocked as well, the connection is rejected.

The third algorithm, that is an extension of the second algorithm, is called crankback routing. If an intermediate node cannot find an alternative path, a message is sent upstream in the routing tree and nodes upstream are then responsible for trying other paths. This provides an exhaustive trial of all possible routes. Which path a node should try first can either be decided statically, i.e., paths are always tried in a certain order, or dynamically, i.e., the decision is made depending on the current status, for example the load on different links, which decides what path to try next.

Within the UniNet prototype network, dynamic routing decisions are made based on a simple load-balancing scheme for two hops. This is achieved by letting switch nodes use status messages to send information about the amount of free slots on their outgoing buses. For example, as shown in the FIG. 06, there are two possible routes between node 1 and node 4, so if node 1 wants to set up a connection to node 4 it can choose between using switch node 2 and switch node 3. Node 1 receives status information from node 2 and 3, and can make its routing decision based on this information. This algorithm works well for dense grid networks, where most routes use only two hops. In this case, the sender has decision is made depending on the current status, for example the load on different links.

The drawback with these algorithms is that each connection set-up may lead to an exhausted path search. This may result in increased signaling and, if resources are reserved without being used, decreased network utilization. The UniNet protocol supports two address schemes, one with arbitrary ad-dresses and one where addresses (and nodes) are structured in geometric (x,y,z) coordinates. The latter address scheme can, if the network is structured in a corresponding way, simplify routing. Similarities can be seen with the Manhattan Street Network that all full information of possible paths to the receiver and is responsible for finding the path. For more arbitrary topologies, variants of the sequential office control or the crankback algorithms are possible. The routing algorithm does not use any routing tables, since the route can be determined from the address coordinates. In case a link is blocked, the packet is deflected.

A traditional circuit is a point-to-point connection between a sender and a receiver. UniNet uses a shared medium which uses a structured network topology to simplify routing. A Manhattan Street Network is based on a fully connected two-dimensional grid. The routing algorithm does not use any routing tables, since the route can be determined from the address coordinates. In case a link is blocked, the packet is deflected. Nodes may then have a cache of paths to different receivers. If a connection request arrives for an unknown receiver, a request is sent to the address consultant that returns a path to use.

A multicast channel can easily be extended to span over several hops, since the switch operation is actually a multicast operation, in the sense that it duplicates data onto another bus. Broadcast in the network, i.e. for distribution of TV, is an important feature. The problem with broadcast is to reach all nodes in the network and still avoid flooding the network with messages. A node should get one and only one copy of each message.

2.2.3 Transport Transfer Environment: Fast Transport Synchro Circuit Switching Tech A. Brief Summary of TCP/UDP/IP Transport problems B. TCP/UDP/IP Transport—General 1) Summary of Fast Transport Synchronous Circuit Switching Techniques Advanced TCP/UDP/IP Latency Reduction and TDM Scheduling Software Techniques to further improves the bandwidth or capacity at the upper layer; Specially when the layers deal with the information that are transferring over the data line for a convergence data/video/voice related applications and host.

2) Detailed Method Steps (Flow Chart)

Each application such as in Video (Video Conference—TCP/IP) or Data (Email—UDP/IP) or Voice (Tele-Conference RTP/UDP/IP) has the dedicated network connection such as IP addresses for different host nodes (Case 1) or/and at different TCP ports addresses for the same host node that is hosting all of the 3 related applications (Case 2). DOCCIS 1.1 for cable modem of most home with digital cable internet access will be installed with this single IP address scenario (Case 2). xDSL for Telephone Digital Services allow more than one IP address for each of the access node (Case 1).

Figure 67C:
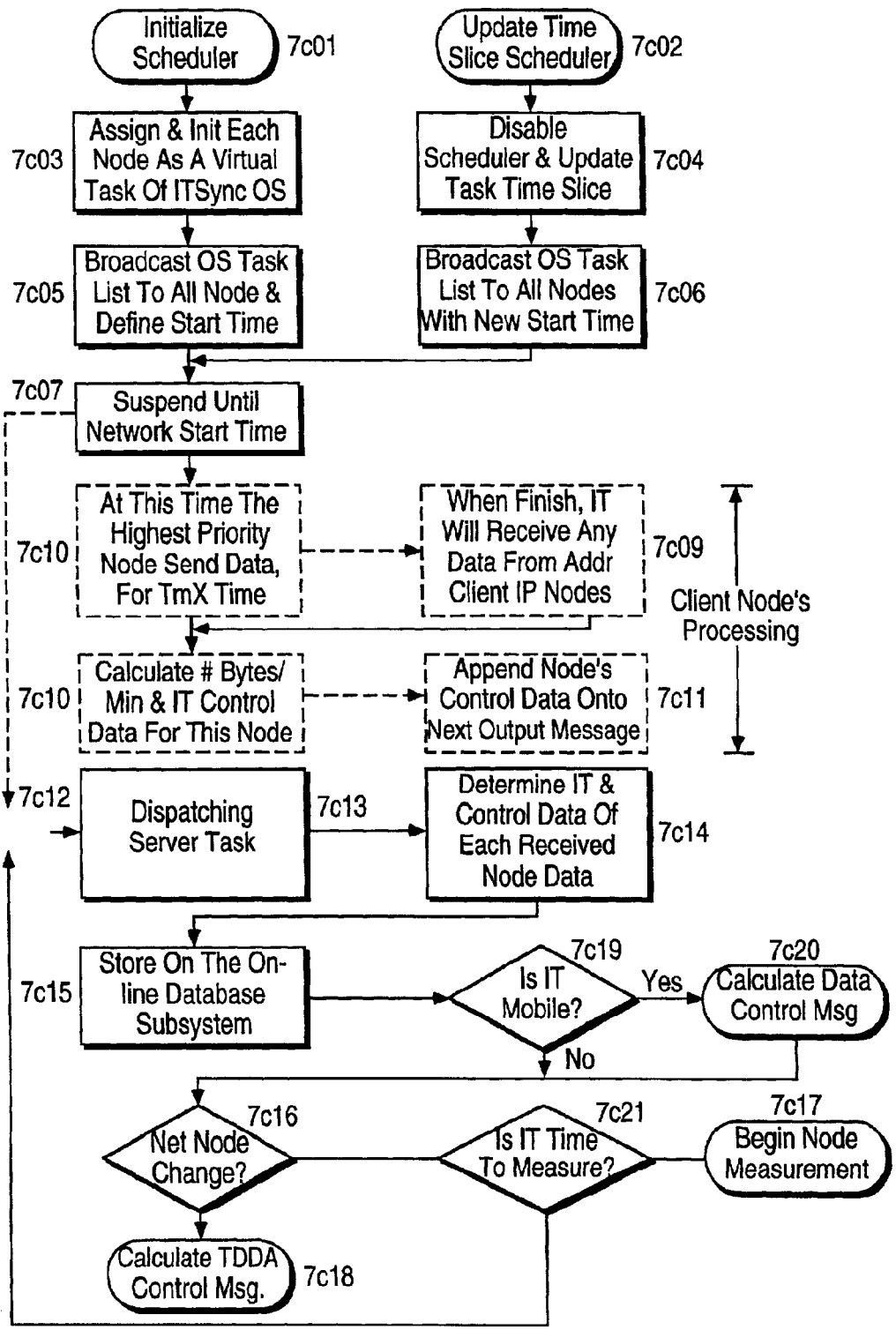
FIG. 67c is an illustration of the UniNet Variable IP Address Multiplexing and Controls.
Figure 67E:
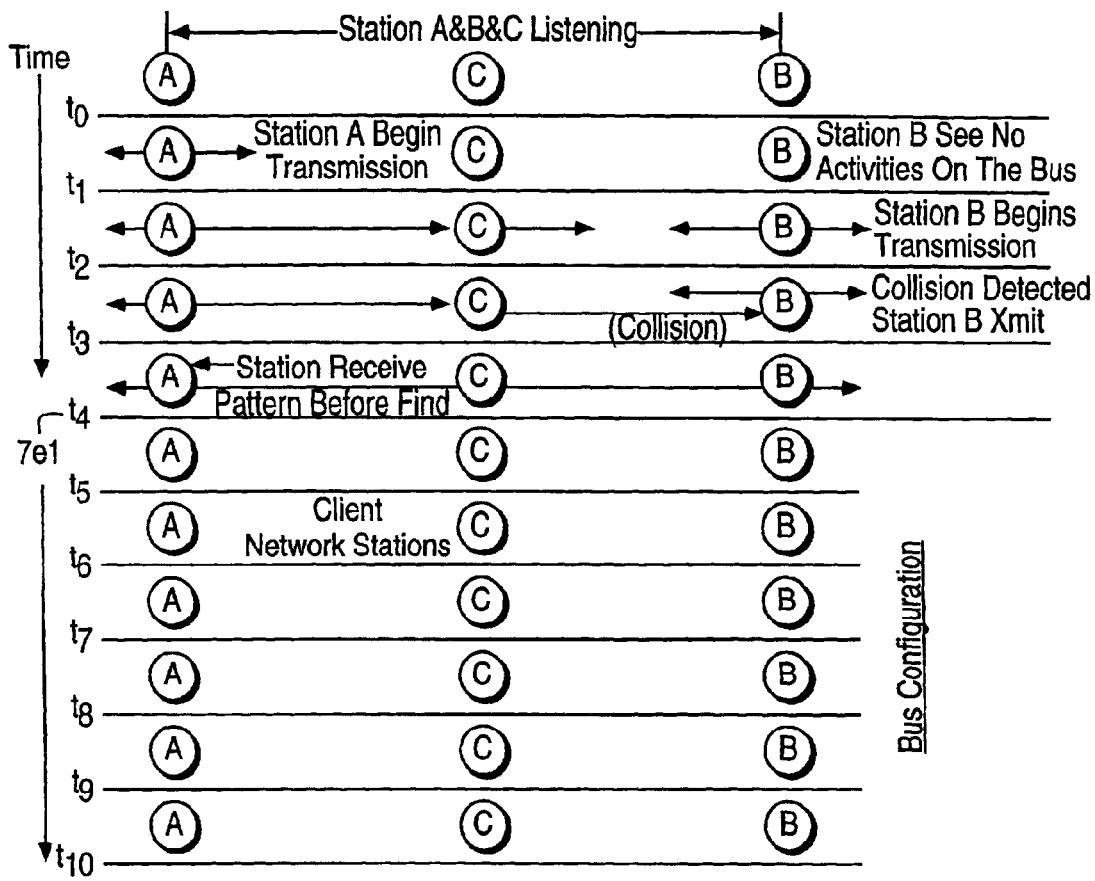
FIG. 67e is an illustration of the UniNet Variable TCP & IP Access Window Controls.
Figure 67E:
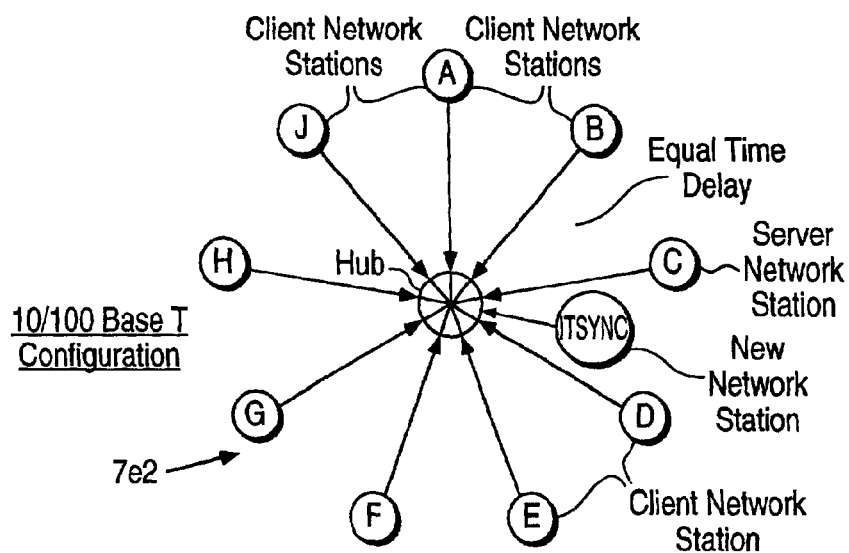

Case 2 Techniques: The synchronous environment between the sender and receiver allow new IP Time Slice related scheduling technique that improves the capacity at the upper layer along with the QoS that is needed to deliver a multimedia over the same best effort channel. The IP TDM technique allows the application time share (TDM) the IP address in the most optimal manners. This can be interpreted as a IP virtual channels, as shown in FIG. 67c, for each of the applications. This will differentiate the real-time and non-real-time time sensitive data messages. The sending and receiving applications will call new TCP/UDP/IP driver software or services with the IP TDM technique built in to deliver TDM multiplexing and demultiplexing in an optimal way.

Case 1 Techniques: The synchronous environment between the sender and receiver allow new TCP Time Slice, as shown in FIG. 67b, related scheduling technique that improves the capacity at the upper layer along with the QoS that is needed to deliver a multimedia over the same best effort channel. The TCP&UDP TDM technique allows the application time share (TDM) the TCP port address in the most optimal manners without hitting the TCP time out window. This can be interpreted as a TCP&UDP virtual channel for each of the applications. This will differentiate the real-time and non-real-time time sensitive data messages. The sending and receiving applications will call new TCP/UDP/IP driver software or services with the IP TDM technique built in to deliver TDM multiplexing and demultiplexing in an optimal way, as shown in FIG. 67d.

3. Universal Privacy—Wireline: Universal Wireline Security Technology

The following paragraphs provide a quick summary of the algorithms that are used in this application and will provide further clarity to this description by reference to E-DNA (Electronic—Deterrence Network Address) Technology section.

E-DNA is a keyless secured data communication system. One unique E-DNA solution is that the Share Key between the sender and receiver are derived from the universal key and are not transferred over the public network. E-DNA provide secure communication of data at a very low impact on processing delay and signal bandwidth. The computers utilizing the E-DNA will freely exchange data with the assurance that the transmission is secured. The Key is derived of the combination of World UTC time in the precision of 100 ns, The frequency in the precision of 100 ns/n and the phase is in the precision of 10 ns. Once the key is defined between the sender and receiver, the encryption and decryption are transparent to the user. Typical secure data communication system needs the Secured Key to be loaded. E-DNA is a keyless secured data communication system and therefore does not require support cryptographic circuits and logic such as FLASH memory, a battery-backed RAM and other various support circuits for Tamper Detection, Power monitoring, Zeroization and Key Fill. Since the encryption and decryption happens at the lowest physical signaling layer, there will be no delays associated with the cryptographic process.

The Three security features provided by E-DNA are Authentication (Time Division Password Access algorithm—TDPA), Secrecy (Carrier Signal Offset Algorithm—CSOA) and Access Controls (Connection Awareness Algorithm—CAA). CSOA algorithm is done in the Physical Layer Chip. The TDPA and CAA are inserted between the Medium Access Layer (MAC) Chip and Physical Layer Chip (PHY). A cryptographic system can only be as strong as the encryption algorithms (E-DNA CSOA), digital signature algorithms (E-DNA CAA & Pseudo Random Sequence), one-way hash functions (E-DNA RIPEMD-160), and message authentication codes (E-DNA TDPA) it relies on.

Authentication (TDPA) enable an user to verify that an incoming data or command is from a authorized user and that the contents of the data or commands have not been altered. To accomplish this, each authorized users that wish communicate must share a secret key. The system's first algorithm is the Time Division Password Access algorithm or TDPA. It handles the connection integrity at the time that initial connection is requesting to be established.

The secrecy features (CSOA) enable authorized users to encrypt and decrypt message to prevent eavesdropping by the third parties. Again the Authorized users shares the secret key, which are not transferred over the public network. In this case, when the authorized users are configured to use the secrecy features, all traffic between them is encrypted and decrypted using the CSOA algorithms.

The Access (CAA) feature make it possible to configure the authorized remote users to provide different level of access to different local users in the group. Access (CAA) can be limited in term of data and commands that the remote user will accept from a given local user and also in term of portion of remote user's data that a given local user may access. The access control policy to be used by a remote user for each local user must be pre-configured of the various authorized local users.

In General, the TDPA, CAA and CSOA algorithms provide system security by preventing Terminal-Modification Attacks and eliminating network data encroachment by non-valid users. These security algorithms are embedded within the mobile or stationary system and do not require high cost Fast Encryption-Decryption circuitry.

3.1 Data (Physical Layer) Security

At the Physical Layer, the derived Key ( the CSOA Key) utilize the combination of World UTC time in the precision of 100 ns, The frequency in the precision of 100 ns/n and the phase is in the precision of 10 ns. Once the key is defined between the sender and receiver, the encryption and decryption are transparent to the user without any delays. This is done at the signaling and coding level of the signals.

The system's third algorithm is the Carrier Signal Offset Algorithm or CSOA, as illustrated in the FIG. 76g. It handles the connection integrity at the time for which the connection is already made. This is the third pass of the connection-filtering algorithm. It utilizes the onboard relative time, phase and frequency reference to determine the network station's encrypt and decryption share key.

1) Detailed Method Steps for Securing Transmission

The secrecy features (CSOA) enable authorized users to encrypt and decrypt message to prevent eavesdropping by the third parties. Again the Authorized users shares the secret key, which are not transferred over the public network. In this case, when the authorized users are configured to use the secrecy features, all traffic between them is encrypted and decrypted using the CSOA algorithms.

Upon the power up, each node has the default frequency and time offset. Once the system is trained and calibrated, each of the user in the secured network will have the appropriate phase offset, frequency offsets and UTC time reference via the precision synchronization. The Preprogram Universal Master Key, which are in each of the secured network node, will then uses the UTC time reference to derive the new Key. The new CSOA DES Key are short lifetime relative with UTC timeline related behavior changes. This can be associated with a unbreakable random generator that changes with universal time.

The CSOA algorithm capitalizes on both the relative time, phase and frequency feature of the network nodes in concert with a new secured CSOA DES Key, as shown in FIG. 67H, and the precision synchronization between the data scrambler and descrambler of the sending and receiving nodes, to encrypt the data. Data Scrambling and Descrambling are commonly used in the Physical layer for improve signal quality. The scrambling process tends to make data appear more random and spectral efficient and also helps the clock recovery process. The Scrambling process, as shown in FIG. 67H, consists of a feedback shift register, and the matching descrambler consists of a feed forward shift registers. The simple data polynomial such as $(1+X^{}(-3)+X^{}(-5))$ that used to spread the signal, will then be encrypted or XOR with a CSOA DES Key before transmitting.

The sending authorized user uses this new CSOA DES key ( as shown in FIG. 67H) to encrypt a data message to be transmitted and appends that time code (phase offset, frequency offsets and UTC time reference) to the message. When the receiving authorized users receives the messages, it uses the same Preprogram Universal Master Key and calculates the message time code once again.

The new time code can be derived as=(UTC time reference+phase offset*(travel time)+Frequency offset*(travel time)**2);

The receiving user will generate the Key via using the Universal Master Key, as illustrated in the FIG. 67K, and this new time code. The receiving authorized user's version of the Key code should match the Key value that sending authorized user used to encrypt the incoming data message. The derived Key is then be used to decrypt the data in the opposite order as the encryption process. The receiving authorized user recover the encrypted message that the message can only have originated from the sending authorized user and that the encrypted message was not altered in transit.

3.2 Transport (MAC & Upper Layer) Security

Due to the reason that the source and destination addresses of the networks are contain in the MAC & IP header, one feature of E-DNA encryption and decryption process will provide network security to any medium by encrypting these address either at the local network level (MAC) or at the National networking level (IP). The encrypted MAC header or IP will be able to decrypt the received packets and determine the ultimate source and destination of each packet. The E-DNA's algorithm that handles this function is the TDPA and CAA. Since these algorithm are inserted between the MAC and PHY, there will be a very small delay associated with the cryptographic process and the crypto initialization which must be transmitted to the receiving E-DNA card to enable proper TDPA decryption's.

The system's first algorithm is the Time Division Password Access algorithm or TDPA. It handles the connection integrity at the time that initial connection is requesting to be established. This is the first pass of the connection-filtering algorithm. It utilizes the onboard relative time of the client, server and peer stations as well as password memory as the Key. The Key can be changed which enables the user to program separate passwords for each access validation.

The system's second algorithm is the Connection Awareness Algorithm or CAA, as illustrated in FIG. 76e. This algorithm handles connection integrity at the time which the connection is already established. This is the second pass of the connection-filtering algorithm. It utilizes the onboard relative time offset, as the Key to determine whether the network connection location and time offset is valid.

A. Brief Summary of Security Problem

Magazine articles like to describe cryptography products in terms of algorithms and key length. Algorithms make good sound bites: they can be explained in a few words and they're easy to compare with one another. "128-bit keys mean good security." "Triple-DES means good security." "40-bit keys mean weak security." "2048-bit RSA is better than 1024-bit RSA." But reality isn't that simple. Longer keys don't always mean more security. Compare the cryptographic algorithm to the lock on your front door. Most door locks have four metal pins, each of which can be in one of ten positions. A key sets the pins in a particular configuration. If the key aligns them all correctly, then the lock opens. So there are only 10,000 possible keys, and a burglar willing to try all 10,000 is guaranteed to break into your house.

But an improved lock with ten pins, making 10 billion possible keys, probably won't make your house more secure. Burglars don't try every possible key (a brute-force attack); most aren't even clever enough to pick the lock (a cryptographic attack against the algorithm). They smash windows, kick in doors, disguise themselves as policemen, or rob key holders at gunpoint. One ring of art thieves in California defeated home security systems by taking a chainsaw to the house walls. Better locks don't help against these attacks. Strong cryptography is very powerful when it is done right, but it is not a panacea. Focusing on the cryptographic algorithms while ignoring other aspects of security is like defending your house not by building a fence around it, but by putting an immense stake into the ground and hoping that the adversary runs right into it. Smart attackers will just go around the algorithms.

Figure 67F:
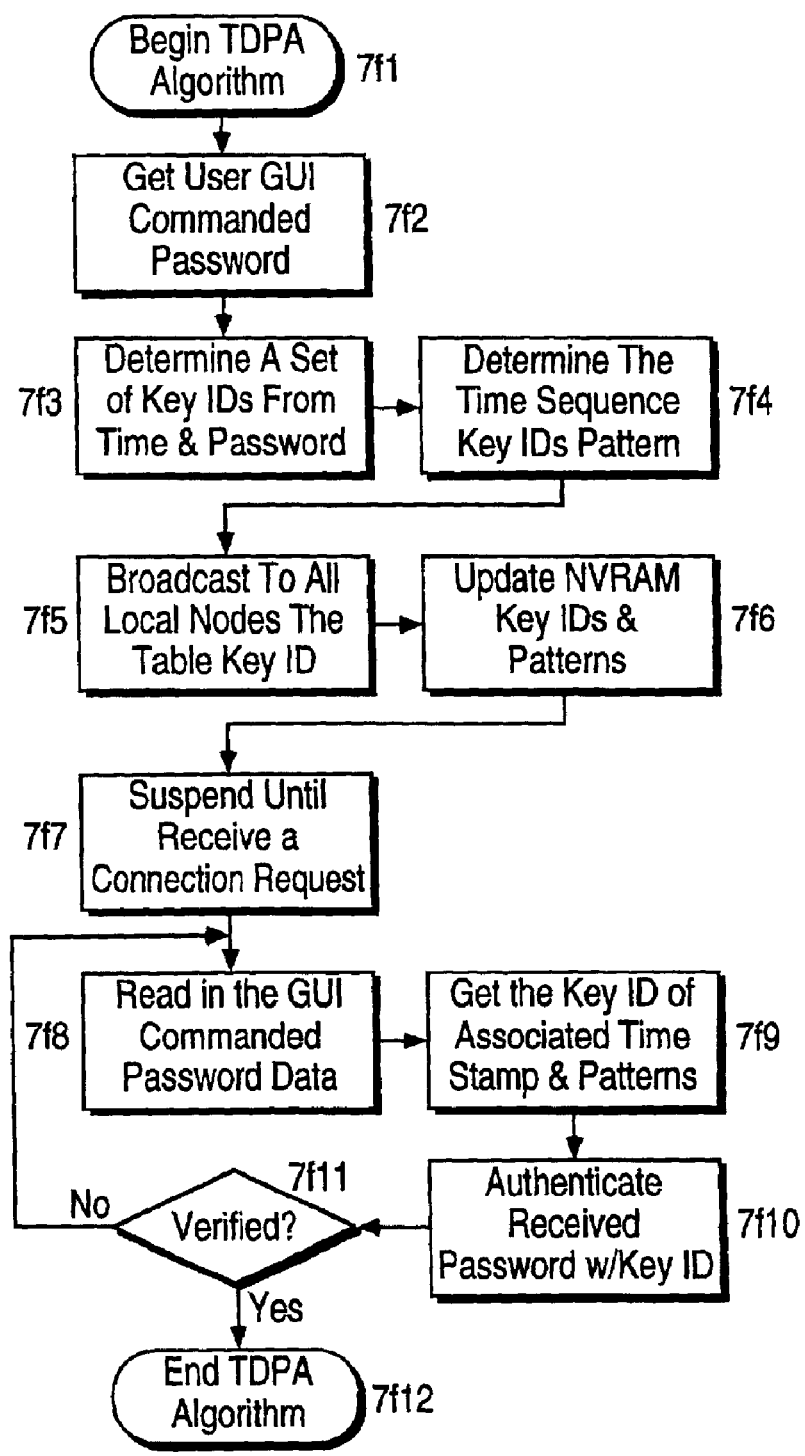
FIG. 67f is an illustration of the UniNet Variable Password Access Window Controls.
Figure 67G:
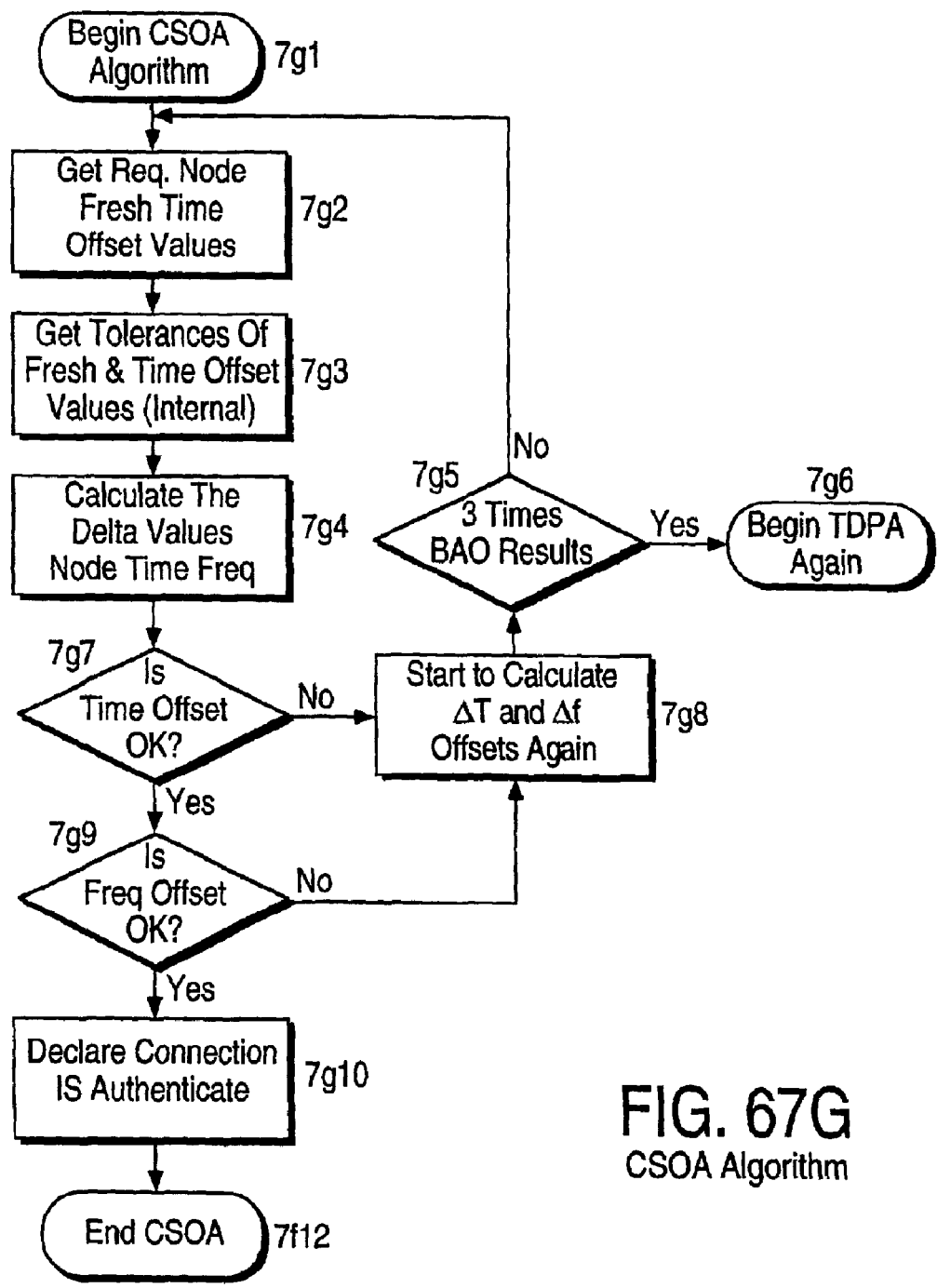
FIG. 67g is an illustration of the UniNet CSOA Control algorithms.
Figure 67L:
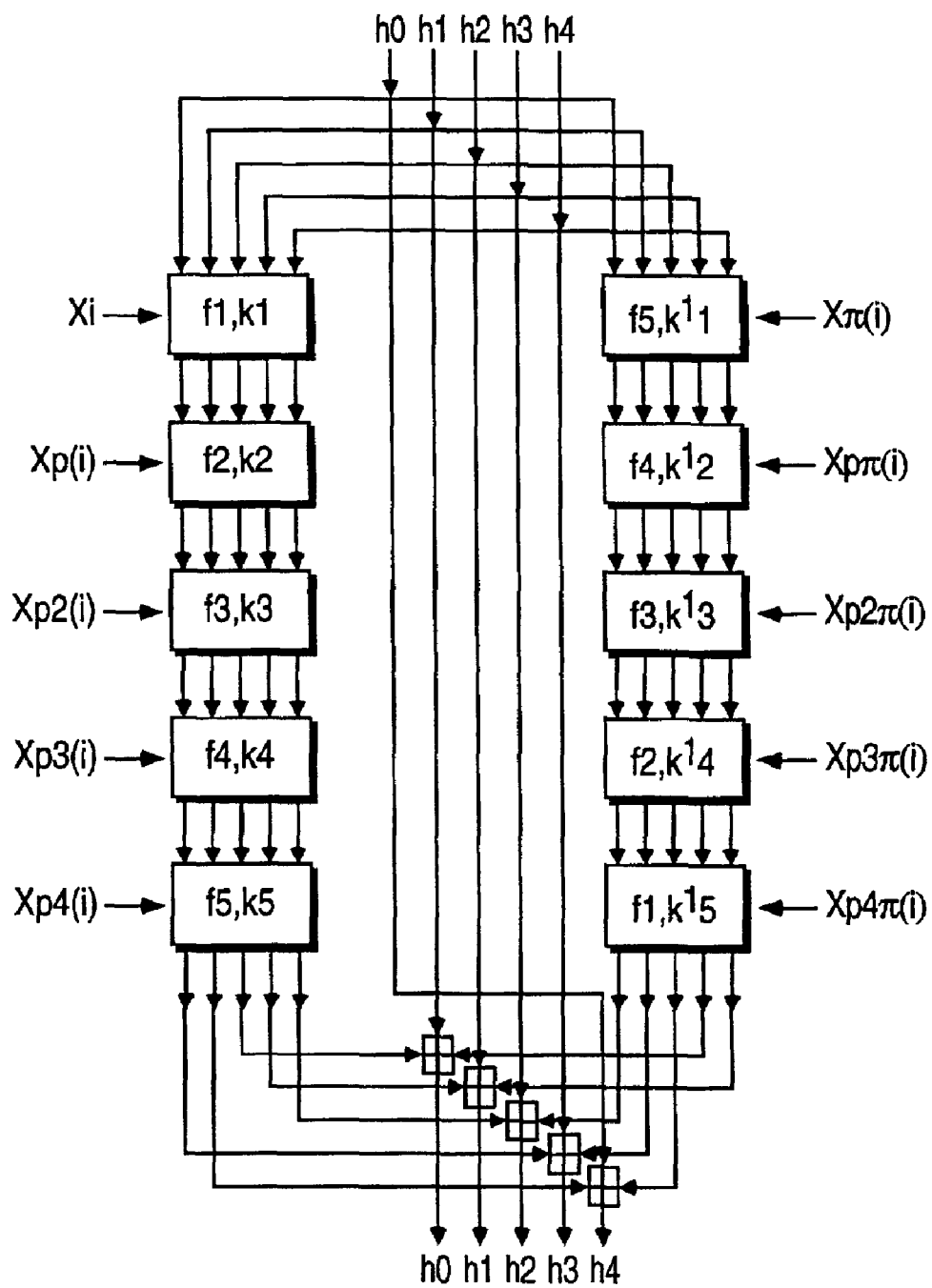
FIG. 67L is an illustration of the RIPEMD-160 Hash Control algorithms.
Figure 68:
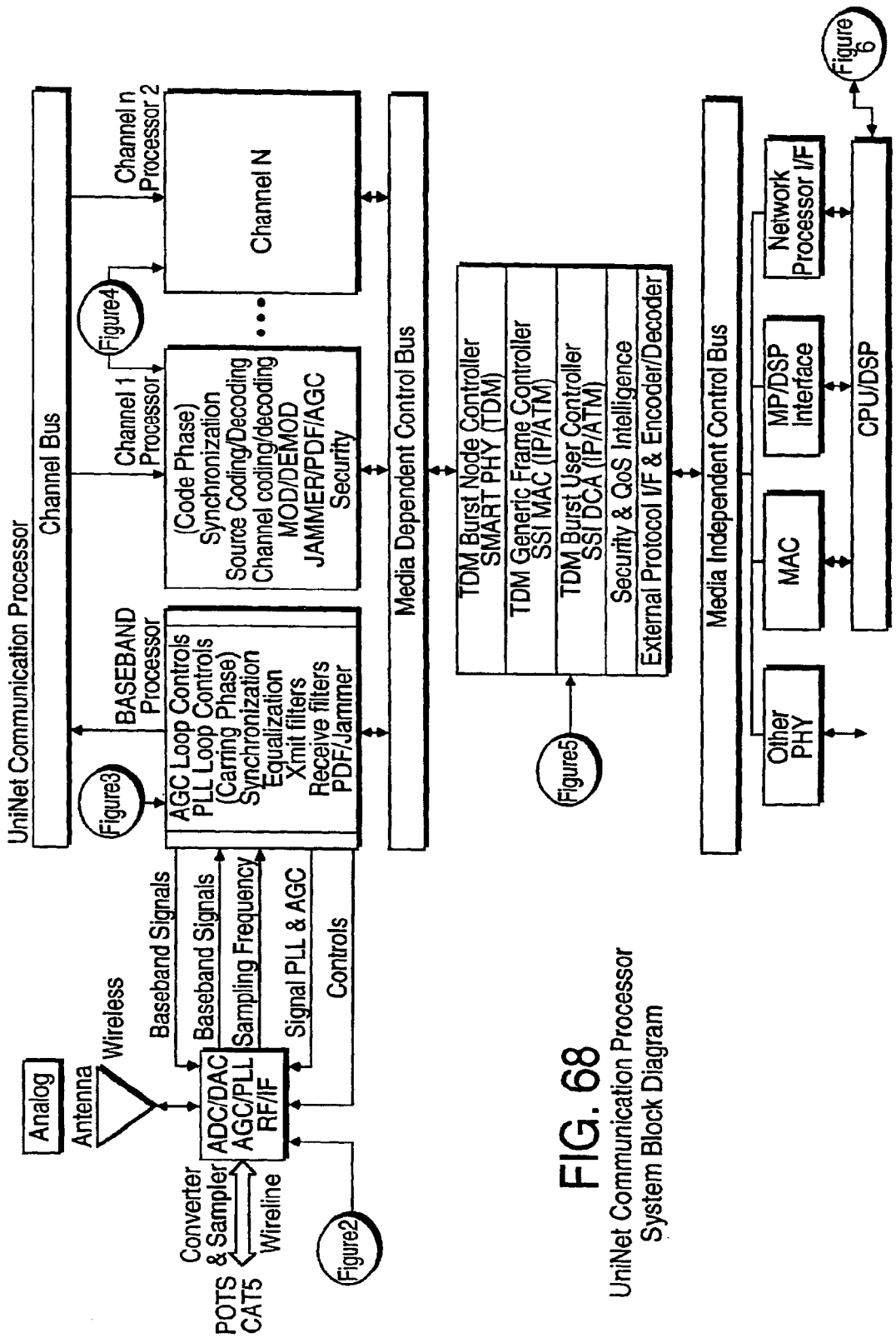
FIG. 68 is an illustration of the UniNet Communication Processor System Block Diagram.

A cryptographic system can only be as strong as the encryption algorithms, digital signature algorithms, one-way hash functions, as illustrated in FIG. 67L, and message authentication codes it relies on. Break any of them, and you've broken the system. And just as it's possible to build a weak structure using strong materials, it's possible to build a weak cryptographic system using strong algorithms and protocols. Industries as often find systems that "void the warranty" of their cryptography by not using it properly: failing to check the size of values, reusing random parameters that should never be reused, and so on. Encryption algorithms don't necessarily provide data integrity. Key exchange protocols don't necessarily ensure that both parties receive the same key. In a recent research project, we found that some—not all—systems using related cryptographic keys could be broken, even though each individual key was secure. Security is a lot more than plugging in an algorithm and expecting the system to work.

Even good engineers, well-known companies, and lots of effort are no guarantee of robust implementation; our work on the U.S. digital cellular encryption algorithm illustrated that. Random-number generators are another place where cryptographic systems often break. Good random-number generators are hard to design, because their security often depends on the particulars of the hardware and software.

Many security products use bad ones. The cryptography may be strong, but if the random-number generator produces weak keys, the system is much easier to break. Other products use secure random-number generators, but they don't use enough randomness to make the cryptography secure. Recently there are new classes of attacks against random-number generators, based on our work with commercial designs. One of the most surprising things we've found is that specific random-number generators may be secure for one purpose but insecure for another; generalizing security analyses is dangerous.

In another research result, we looked at interactions between individually secure cryptographic protocols. Given a secure protocol, we show how to build another secure protocol that will break the first if both are used with the same keys on the same device. Any systems fail because of mistakes in implementation. Some systems don't ensure that plain text is destroyed after it's encrypted. Other systems use temporary files to protect against data loss during a system crash, or virtual memory to increase the available memory; these features can accidentally leave plain text lying around on the hard drive. In extreme cases, the operating system can leave the keys on the hard drive. One product we've seen used a special window for password input. The password remained in the window's memory.

B. Electronic DNA Security—General

Authentication (TDPA) enable an user to verify that an incoming data or command is from a authorized user and that the contents of the data or commands have not been altered. To accomplish this, each authorized users that wish communicate must share a secret key. The system's first algorithm is the Time Division Password Access algorithm or TDPA. It handles the connection integrity at the time that initial connection is requesting to be established. This is the first pass of the connection-filtering algorithm.

The Access (CAA) feature make it possible to configure the authorized remote users to provide different level of access to different local users in the group. Access (CAA) can be limited in term of data and commands that the remote user will accept from a given local user and also in term of portion of remote user's data that a given local user may access. The access control policy to be used by a remote user for each local user must be pre-configured of the various authorized local users.

1) Detailed Method Steps for Securing Transmission

The following paragraphs provide a detail description of the algorithms that are used in this application and will provide further clarity to this description by reference to E-DNA Technology section.

Since the source and destination addresses are contain in the MAC header, one feature of E-DNA encryption and decryption process will provide network security to any medium by encrypting these address. Only the device that has the E-DNA will be able to decrypt the received packets and determine the ultimate source and destination of each packet. The E-DNA's algorithm that handles this function is the TDPA and CAA. Since these algorithm are inserted between the MAC and PHY, there will be a very small delay associated with the cryptographic process and the crypto initialization which must be transmitted to the receiving E-DNA card to enable proper TDPA decryption's.

The system's first algorithm is the Time Division Password Access algorithm or TDPA. It handles the connection integrity at the time that initial connection is requesting to be established. This is the first pass of the connection-filtering algorithm. It utilizes the onboard relative time of the client, server and peer stations as well as password memory as the Key. The Key can be changed which enables the user to program separate passwords for each access validation.

Authentication (TDPA) enable an user to verify that an incoming data or command is from a authorized user and that the contents of the data or commands have not been altered. To accomplish this, each authorized users that wish communicate must share a secret key. The system's first algorithm is the Time Division Password Access algorithm or TDPA. It handles the connection integrity at the time that initial connection is requesting to be established. This is the first pass of the connection-filtering algorithm. It utilizes the onboard relative time of the client, server and peer stations as well as password memory as the Key. The Key can be changed which enables the user to program separate passwords for each access validation. Specific UTC time dependent password as the key which changes as a predefined patterns without have to transfer over public network. The sending authorized user uses this key to calculate a message authentication code that is a function of the message to be transmitted and appends that code to the message. When the receiving authorized users receives the messages, it uses the same key and calculates the message authentication code once again. Of the receiving authorized user's version of the code matches the value appended to the incoming message, the receiving authorized user knows that the message can only have originated from the sending authorized user and that the message was not altered in transit.

The system's second algorithm is the Connection Awareness Algorithm or CAA. This algorithm handles connection integrity at the time which the connection is already established. This is the second pass of the connection-filtering algorithm. It utilizes the onboard relative time offset, as the Key to determine whether the network connection location and time offset is valid.

In General, the TDPA, CAA and CSOA algorithms provide system security by preventing Terminal-Modification Attacks and eliminating network data encroachment by non-valid users. These security algorithms are embedded within the mobile or stationary system and do not require high cost Fast Encryption-Decryption circuitry.

As an example, referring now to (FIGS. 67F and 67G), the Network Data Security for the Wireless Network Information Data Communication portion of the Com2000™ System is shown. More specifically, a software flow chart of the Time Division Password Access or TDPA and Carrier Signal Offset or CSOA Algorithms is provided. The TDPA and CSOA algorithms serve to deter the Terminal Connection intrusions of Wireline or Wireless Networking Communications. Both algorithms will also be used to prevent the Terminal-Modification Attacks. The Com2000™ Wireless Secured Networking System determines the propagation delay for each of nodes with respect to the wireless Com2000™ "virtual" hub (base station) using the relative clock synchronization of the sending and receiving stations. This provides details about the time the transmitting stations are activated and when data will be received.

The TDPA algorithm (7f1), as shown in FIG. 67*f*, capitalizes on this relative time synchronization feature of the network nodes and the user defined password, provides a secured password scheme that relies on the knowledge of the relative time between communication nodes. The software on each node has the default password or table set upon power up. The contents of the table are correlated with each other in relative time. The previous table contents arid its associated relative time in the day or week or month in milliseconds will determine the key ID of the encrypted sending data (7f3). The key ID can also be derived from the modulated (7f4) password indexing pattern of the table such as a staircase, triangle, sawtooth, or clipped triangle pattern. The default pattern is provided upon power up. In case the pattern is modified, the pattern selection code will always be sent to the receiving node for every encrypted message sent (7f5) and the selected pattern will then be stored in the Non-Volatile RAM of the receiving node for next power up default password determination (7f6).

Each of the Com2000™ Wireless system nodes can operate as either the client or the server base station. In a wireless network configuration, one of the Com2000™ System will be the base station and behave as the manager or the Server of the network. Each of the Com2000™ system nodes in the network establish initial communication with each other by transmitting out an "Establishing Communication Message " with the unique node specific code sequence. The encrypted message for the cryptographic process is continuously transmitted during this period so all stations can initialize the network configuration map. All of the encryption and decryption schemes, code and tables are exchanged in this initial phase of communications. When this is complete the receiver of each station receives the message, tags the receiving time, and decodes key ID pattern. This process is repeated every communication time frame due to the new comer and mobile nature of the systems on the network. The derived Key ID is used for decrypting received messages (7f10) from authenticated system nodes. If a received message cannot be authenticated, the server from the non-authenticated client node may request the "Establishing Communication Message" again.

Upon determination of the propagation time delay (7a111), the network relative time and frequency offset and Propagation Delay maps are updated (7a112). The dynamically allocated transmit and receive time for each of the system nodes that reside in the Connection Awareness Algorithm (CAA) with the appropriate mapping are also updated (7a113). The maximum transmission time for each node will be determined (7a114) for dynamically establishing the TCP/IP collision window adjustment range (7a115). When all of the node's timing related data is calculated, the server will calculate the optimal transmit time and receive time (7a116) for each based on the priority level of the transmission data of each type of node (manager, server, "virtual switch", etc.).

The Connection Awareness (CAA) Maps and its timing related data is broadcast to all of the client nodes during every frame time. This allows the Com2000™ wireless system to provide adaptive bandwidth allocation and communication times for based on the needs of each system node. The extensive wireless transmission node will be allocated large blocks of transmitting time as opposed to the idle nodes that will be allocated minimal bandwidth for data transmission. The adaptive bandwidth cycle is the frame time. The sending node therefore parses its transmitted message into the appropriate Maximum Transmit Unit (MTU) (7a117). The frame time is a function of how fast the mobile IP client or server can travel in time or how long the optimum MTU transmit time can contain the moving propagation time delay time with respect to the server node. By updating the control parameter of the client every sending and receiving node will know the adjacent nodes and servers as well as when it is time to transmit and time to receive., This information can be used with an overlay of the other parameter maps to provide the server or the user with the capability of networking or information technology situation awareness.

3.2 Build a Secure Cryptographic System with E-DNA

A good security system must defend against every possible attack, even attacks that haven't been invented yet. Attackers, on the other hand, only need to find one security flaw in order to defeat the system. And they can cheat. They can collude, conspire, and wait for technology to give them additional tools. They can attack the system in ways the system designer never thought of. Building a secure cryptographic system is easy to do badly, and very difficult to do well. Unfortunately, most people can't tell the difference. In other areas of computer science, functionality serves to differentiate the good from the bad: a good compression algorithm will work better than a bad one; a bad compression program will look worse in feature-comparison charts. Cryptography is different. Just because an encryption program works doesn't mean it is secure. What happens with most secured system is that someone reads Applied Cryptography, chooses an algorithm and protocol, tests it to make sure it works, and thinks he's done. He's not. Functionality does not equal quality, and no amount of beta testing will ever reveal a security flaw. Too many products are merely "buzzword compliant"; they use secure cryptography, but they are not secure.

3.2.1 Attacks Against Cryptographic Designs

A. Electronic DNA Cryptographic Designs -General

A cryptographic system can only be as strong as the encryption algorithms (E-DNA CSOA), digital signature algorithms (E-DNA CAA & Pseudo Random Sequence), one-way hash functions (E-DNA RIPEMD-160, as illustrated in FIG. 67L), and message authentication codes (E-DNA TDPA) it relies on. Break any of them, and you've broken the system. And just as it's possible to build a weak structure using strong materials, it's possible to build a weak cryptographic system using strong algorithms and protocols. In a recent research project, we found that some not all systems using related cryptographic keys could be broken, even though each individual key was secure. Random-number generators are another place where cryptographic systems often break. Good random-number generators are hard to design, because their security often depends on the particulars of the hardware and software. Many products we examine use bad ones. The cryptography may be strong, but if the random-number generator produces weak keys, the system is much easier to break. One of the most surprising things is that specific random-number generators may be secure for one purpose but insecure for another; generalizing security analyses is dangerous. In another research result, we looked at interactions between individually secure cryptographic protocols.

1) Detailed Method Steps for E-DNA Cryptographic Designs a. Problem: Failing to check the size of values, reusing random parameters that should never be reused. Other products use secure random-number generators, but they don't use enough randomness to make the cryptography secure Solution: The E-DNA Random Generator is uniquely relied on the marching order of ever ticking Universal time which has a very large size in combination with the random generator bit patterns. The Universal time or UTC time are transferred via the Clock Transfer Technology, throughout the networking node.

b. Problem: Encryption algorithms don't necessarily provide data integrity

Solution: The E-DNA Secure System is a collection of comprehensive security methods that covers all level of attacks which also includes the E-DNA Encryption Algorithm.

c. Problem: Key exchange protocols don't necessarily ensure that both parties receive the same key Solution: The E-DNA Key Generator does not need the distribution scheme as in other conventional method.

E-DNA Key Generator is uniquely relied on the precision synchronization parameters such as phase, frequency and the marching order of ever ticking Universal time as references for generating or derive the session key from the master key. This new derived session key has a very large size in combination with the random generator bit patterns.

d. Problem: Given a secure protocol, we show how to build another secure protocol that will break the first if both are used with the same keys on the same device.

Solution: The E-DNA Secure System does not have a protocol or a means of distribute the share keys over the network. The key is internally derived for a predetermined changing pattern of the session period. It is therefore impossible to model the behavioral changes of the secure system due the dynamic nature of the key generation and the application of the key.

3.2.2 Attacks Against Implementations

A. Electronic DNA Implementations—General

Many systems fail because of mistakes in implementation. Electronic commerce systems often make implementation trade-offs to enhance usability. We've found subtle vulnerabilities here, when designers don't think through the security implications of their trade-offs. Doing account reconciliation only once per day might be easier, but what kind of damage can an attacker do in a few hours? Can audit mechanisms be flooded to hide the identity of an attacker? Some systems record compromised keys on "hotlists"; attacks against these hotlists can be very fruitful. Other systems can be broken through replay attacks: reusing old messages, or parts of old messages, to fool various parties.

2) Detailed Method Steps for E-DNA Implementations a. Problem: Some systems don't ensure that plaintext is destroyed after it's encrypted. Some systems use temporary files to protect against data loss during a system crash, or virtual memory to increase the available memory; these features can accidentally leave plaintext lying around on the hard drive.

Solution: The E-DNA Secure System consume the plaintext and does not have a protocol or the means of maintaining, store or distributing unencrypted plaintext at all levels (PHY, MAC, OS Software levels). The originating plaintext is destroyed as the information entering the E-DNA Secure system. The E-DNA Secure System does not have a protocol or a means of distribute the key over the network. The key built-in and is dynamically derived for every sessions of the secured data transfers and destroyed once the key is used.

b. Problem: Operator used a special window for password input. The password remained in the window's memory even after it was closed. It didn't matter how good that product's cryptography was; it was broken by the user interface.

Solution: The E-DNA Secure System works on the model of changing password and keys. The user password will vary with unique patterns of UTC time dependent changes. The password-changing pattern is simple so that the user can insert into the password as he or she interface with the computer. This pattern can be uniquely for each user.

c. Problem: Sometimes the same data is encrypted with two different keys, one strong and one weak. Other systems use master keys and then one-time session keys. Partial information about the different keys can be used to break into the system.

Solution: The E-DNA Secure System uses two key system, one master key and one self generated one-time session key. The key and its partial information are however not to be distributed or transferred over the public networks. The non-published or internal partial information about the two key are dynamically changed based on the synchronization parameters such as phase, frequency and UTC reference time, and it is used to generated new session key. Upon the session key are defined, the partial information is destroyed.

d. Problem: We've also seen systems that use inadequate protection mechanisms for the master keys, mistakenly relying on the security of the session keys. It's vital to secure all possible ways to learn a key, not just the most obvious ones.

Solution: The E-DNA Secure System master keys are built into the chip as it ship to the end users. The complete list of end users are tracked and maintained as the secured network connection. The encrypted modified Master key is broadcast to all of end user on the list periodically. The broadcast rate is a function of security alerts, security policing and security preventive or external events. The key exchange protocol will not be required once the master key is updated.

e. Problem: Systems that allow old keys to be recovered in an emergency provide another area to attack. Good cryptographic systems are designed so that the keys exist for as short a period of time as possible; key recovery often negates any security benefit by forcing keys to exist long after they are useful.

Solution: The E-DNA Secure System does not have means of key recovery, since it is exclusive dependent on the precision synchronization of UTC time. Its key lifetime expectancy is very short, in the order of minutes.

f. Problem: Furthermore, key recovery databases become sources of vulnerability in themselves, and have to be designed and implemented securely. In some case, flaws in the key recovery database allowed criminals to commit fraud and then frame legitimate users.

Solution: The E-DNA Secure System does not have means of key recovery.

3.2.3 Attacks Against Passwords

B. Electronic DNA Passwords Model—General

Many systems break because they rely on user-generated passwords. If they're forced to use strong passwords, they can't remember them. Some user interfaces make the problem even worse: limiting the passwords to eight characters, converting everything to lower case, etc. Even pass phrases can be weak: searching through 40-character phrases is often much easier than searching through 64-bit random keys.

3) Detailed Method Steps for E-DNA Password Model a. Problem: People don't choose strong passwords. If they're forced to use strong passwords, they can't remember them.

Solution: The E-DNA Secure System does not need to select a strong password. The password does, however, changing with time in a easy comprehending pattern.

b. Problem: If the password becomes a key, it's usually much easier and faster to guess the password than it is to brute-force the key; we've seen elaborate security systems fail in this way c. Solution: An elaborate security systems can fail easily in this way. The E-DNA Secure System does not need to select a strong password, since it is exclusive dependent on the precision synchronization of UTC time. Its password lifetime expectancy is very short, in the order of minutes.

d. Problem: We've also seen key-recovery systems that circumvent strong session keys by using weak passwords for key-recovery.

Solution: The E-DNA Secure System does not have means of key recovery, since it is exclusive dependent on the precision synchronization of UTC time. Its key lifetime expectancy is very short, in the order of minutes.

3.2.4 Attacks Against Hardware Model

A. Electronic DNA Hardware Model—General

Some systems, particularly commerce systems, rely on tamper-resistant hardware for security: smart cards, electronic wallets, dongles, etc. When we design systems that use tamper resistance, we always build in complementary security mechanisms just in case the tamper resistance fails.

4) Detailed Method Steps for E-DNA Hardware Model a. Problem: Tamper-resistant hardware for security systems may assume public terminals never fall into the wrong hands, or that those "wrong hands" lack the expertise and equipment to attack the hardware Solution: The E-DNA Secure System is a tamper-resistant hardware. The "Wrong hands" is resolved via periodically (predefined rate) ask the user for identifications. Should the answer was incorrect for many times, it lock up, reports back to the secure net with the proper indication and location and then disable all functions of the chip, until it is reprogrammed.

b. Problem: While hardware security is an important component in many secure systems, the industries distrust systems whose security rests solely on assumptions about tamper resistance. The industries rarely seen tamper resistance techniques that work, and tools for defeating tamper resistance are getting better all the time Solution: The E-DNA Secure System does not only have the tamper-proof hardware, but it is also have tamper-proof software, since it is exclusive dependent on the precision synchronization of UTC time password verifications.

c. Problem: The "timing attack" made a big press splash in 1995: RSA private keys could be recovered by measuring the relative times cryptographic operations took.

Solution: The E-DNA Secure dependent exclusively on the precision synchronization of UTC time. Its derived key lifetime is very short. Once the intruder can detect the key, the key already changes to a new one at a unknown interval. An intruder that tries to follow this, is merely a playing catch up game that would never win.

d. Problem: Methods to include attacks on a system by measuring power consumption, radiation emissions, and other "side channels," and have implemented them against a variety of public-key and symmetric algorithms in "secure" tokens.

Solution: The E-DNA Secure dependent exclusively on the precision synchronization of UTC time and it is non-symmetric. It derived key for sending and receiving node are non-symmetric process and lifetime is very short.

e. Problem: Industries experts yet to find a token that we can't pull the secret keys out of by looking at side channels.

Solution: The E-DNA Secure System key lifetime is too short for intruder to pulling out the key by looking the side channels.

f. Problem: Intruders is deliberately introducing faults into cryptographic processors in order to determine the secret keys. The effects of this attack can be devastating.

Solution: The E-DNA Secure System is a self contain and undistributed secure key system. Provide false stimulus to the system will not have the chip distribute the share key. Should even the intruder can do this, the key is extremely short in lifetime (in minutes) relative to the time of determination of the key (in days).

3.2.5 Attacks Against Trust Model

A. Brief Summary of Trust Model

B. Electronic DNA Trust Model—General

Many of our more interesting attacks are against the underlying trust model of the system: who or what in the system is trusted, in what way, and to what extent. Other systems make implicit assumptions about security infrastructures, but don't bother to check that those assumptions are actually true. If the trust model isn't documented, then an engineer can unknowingly change it in product development, and compromise security. Again, the cryptography may be irrelevant if it can be circumvented through network insecurity. And no software is secure against reverse engineering. Often, a system will be designed with one trust model in mind, and implemented with another. Decisions made in the design process might be completely ignored when it comes time to sell it to customers. Good trust models work even if some of the trust assumptions turn out to be wrong.

5) Detailed Method Steps for E-DNA Trust Model a. Problem: Simple systems, like hard-drive encryption programs or telephone privacy products, have simple trust models Solution: The E-DNA Secure System is a fail safe trust model such as the key and password lifetime are too short for intruder to tamper with once the trust model is no longer true.

b. Problem: In Complex systems, like electronic commerce systems or multi-user e-mail security programs, have complex (and subtle) trust models.

Solution: The E-DNA Secure System is a fail safe trust networking model which are independent of the complexity of the systems as it grows in number of user spaces. The local secured networking nodes and larger networking space are obey the same rule, which are the UTC time reference and precision synchronization parameters for access controls.

c. Problem: An e-mail program might use uncrackable cryptography for the messages, but unless the keys are certified by a trusted source (and unless that certification can be verified), the system is still vulnerable Solution: The E-DNA Secure System dynamic password is the key of the trusted sources.

d. Problem: Some commerce systems can be broken by a merchant and a customer colluding, or by two different customers colluding Solution: The E-DNA Secure System key lifetime is too short for intruder to pulling out the key by looking the side channels.

e. Problem: Many software systems make poor trust assumptions about the computers they run on; they assume the desktop is secure. These programs can often be broken by software that sniffs passwords, reads plaintext, or otherwise circumvents security measures Solution: The E-DNA Secure System plaintext, password and any other input means are destroyed once it is used.

f. Problem: Systems working across computer networks have to worry about security flaws resulting from the network protocols. Computers that are attached to the Internet can also be vulnerable.

Solution: The E-DNA Secure System can be tied into the policy based system such that the privacy policy is enforced by the server. The key is at the E-DNA Secure System enforced the security at the signal level of the data communication for the authorized user only.

g. Problem: A system that is secure when the operators are trusted and the computers are completely under the control of the company using the system may not be secure when the operators are temps hired at just over minimum wage and the computers are untrusted Solution: The E-DNA Secure System can be tied into the policy based system such that the privacy policy is enforced by the server for every user transaction as to assure that the user profile is properly enforced. On top of this LDAP secured directory service by the server, the key is at the E-DNA Secure System enforced the security at the signal level of the data communication for the authorized user only.

3.2.6 Attacks On Users Model

A. Brief Summary of User Attacks

Even when a system is secure if used properly, its users can subvert its security by accident—especially if the system isn't designed very well. The classic example of this is the user who gives his password to his co-workers so they can fix some problem when he's out of the office. Users may not report missing smart cards for a few days, in case they are just misplaced. They may not carefully check the name on a digital certificate. They may reuse their secure passwords on other, insecure systems. They may not change their software's default weak security settings. Good system design can't fix all these social problems, but it can help avoid many of them.

B. Electronic DNA Users Model—General

6) Detailed Method Steps for E-DNA Users Model h. Problem: Users can subvert its security by accident Solution: The E-DNA Secure System has the dynamic changes on the user password. In all cases, the user has to enter a predefined combination based on his or her last activity for password verification process. User who gives his password to his co-worker, the password may only be good in a predetermined period of time.

3.2.7 Attacks Against Failure Recover Model

A. Brief Summary of Failure Recover

Strong systems are designed to keep small security breaks from becoming big ones. Recovering the key to one file should not allow the attacker to read every file on the hard drive. A hacker who reverse-engineers a smart card should only learn the secrets in that smart card, not information that will help him break other smart cards in the system. In a multi-user system, knowing one person's secrets shouldn't compromise everyone else's. Many systems have a "default to insecure mode." If the security feature doesn't work, most people just turn it off and finish their business. If the on-line credit card verification system is down, merchants will default to the less-secure paper system. Similarly, it is sometimes possible to mount a "version rollback attack" against a system after it has been revised to fix a security problem: the need for backwards compatibility allows an attacker to force the protocol into an older, insecure, version. Other systems have no ability to recover from disaster. If the security breaks, there's no way to fix it. For electronic commerce systems, which could have millions of users, this can be particularly damaging. Such systems should plan to respond to attacks, and to upgrade security without having to shut the sys-tem down. The phrase "and then the company is screwed" is never something you want to put in your business plan. Good system design considers what will happen when an attack occurs, and works out ways to contain the damage and recover from the attack.

B. Electronic DNA Failure Recover—General

7) Detailed Method Steps for E-DNA Failure Recover i. Problem: users can subvert its security by accident Solution: The E-DNA Secure System has the dynamic changes on the user password. In all cases, the user has to enter a predefined combination based on his or her last activity for password verification process. User who gives his password to his co-worker, the password may only be good in a predetermined period of time.

3.2.8 Attacks Against Cryptography

A. Brief Summary of Cryptography

Sometimes, products even get the cryptography wrong. Some rely on proprietary encryption algorithms. Invariably, these are very weak. Counter-pane Systems has had considerable success breaking published encryption algorithms; our track record against proprietary ones is even better. Keeping the algorithm secret isn't much of an impediment to analysis, anyway—it only takes a couple of days to reverse-engineer the cryptographic algorithm from executable code. One system we analyzed, the S/MIME 2 electronic-mail standard, took a relatively strong design and implemented it with a weak cryptographic algorithm. The system for DVD encryption took a weak algorithm and made it weaker. We've seen many other cryptographic mistakes: implementations that repeat "unique" random values, digital signature algorithms that don't properly verify parameters, hash functions altered to defeat the very properties they're being used for. We've seen cryptographic protocols used in ways that were not intended by the protocols'designers, and protocols "optimized" in seemingly trivial ways that completely break their security.

B. Electronic DNA Cryptography—General

8) Detailed Method Steps for E-DNA Cryptography j. Problem: Implementations that repeat "unique" random values, digital signature algorithms that don't properly verify parameters, hash functions altered to defeat the very properties they're being used for. cryptographic protocols used in ways that were not intended by the protocols'designers, and protocols "optimized" in seemingly trivial ways that completely break their security Solution: The E-DNA Secure System has the dynamic Security system without have to exchanges the key information on the public domain. The password are time sensitive, the key is self derived with a time dependent randomness and the hash function, as shown in FIG. 67L, for scramble the data that also change in time.

4.0. Universal Transport—Wireless: Universal Wireless Intelligence Technology

A. Brief Summary of Integrated Services problems

Increasing use of wireless access points to the network can be foreseen. Future high-speed networks must therefore provide services suitable for mobile hosts. When providing high definition video and audio to mobile users, high capacity data streams have to be moved across the network. The current centralized cellular network architectures are likely to be inappropriate for management of the anticipated personal communication service demand. This includes the associated signalling arising, e.g. from the increase in handoff processing associated with microcells. Instead, a more distributed solution using a shared medium network architecture is presented. When performing handoff between two base stations connected to a shared medium, the new base station may use the same resources that were re-served for the connection to the old base station. A handoff therefore does not significantly change the resource utilization of the network.

Another aspect of making soft handoffs in mobile TDMA systems is that data that belong to the same user need to be synchronized at different bases-tations. This is also true if simulcast is used, i.e., two or more base stations transmit the same data simultaneously. This puts rather hard real-time requirements on the network.

Another problem with mobile networks is the increased signaling, especially to central databases, for example for address look-ups. It has been estimated that signaling in a personal communication system network due to mobility will be four to eleven times higher than in current mobile telephony. Much of this signaling will be directed towards these databases, which makes the processing capacity and the links attached to the databases bottlenecks in the system. It is therefore important to provide a high signaling Capacity with short delays. To relieve the databases, it is possible to use the capacity and services of the network. Currently, most backbone networks in cellular networks are circuit-switched. The application most commonly used in these networks is speech, which is an application that is well supported by circuit-switched networks. In the Internet, support for moving terminals, for example portable computers, in the network is being developed.

B. Wireless-General

1) Brief Summary of UniNet Wireless Techniques

This section describes an application of the present invention that uses time and frequency to provide encryption and decryption methods and network connection algorithms that enable a secured communication means on wireless networks. This application further provides IP management for mobile computing systems and dynamic IP transfer algorithms that uniquely apply to the mobile network communication. The application described, present the invention of wireless switch hub via relies on the reduction or elimination of wireless network data collisions through the development and invention of the Time Division Duplex Access (TDDA) and Dynamic Internet Protocol Access (DIPA) algorithms at the node level. The TDDA algorithm provides specific time-sliced data sending and receiving periods for each wireless network node. This enables the nodes of the network to have their own dedicated transmit period to ensure network access. The DIPA algorithm operates similar to the Ethernet wireline CSMA/CD collision avoidance method. The DIPA method is utilized in those wireless systems where precision time and frequency parameters are not available.

2) Detailed Method Steps for UniNet Wireless Environment

The Wireless System described hereafter, utilizes methods that improve wireless data communications, such as wireless information technology (IT) communication electronics and software systems, are relatively complex. Sub-systems have to be integrated so that they perform cohesively to implement sophisticated system functions with minimal data transfer errors. In wireless applications, data transfer errors occur due to the level of data collisions and data drop-out caused by peer-to-peer communication that do not dynamically provide access to multiple nodes. Through the invention of the Wireless switching-hub, these problems are alleviated by providing multiple node access and broadcast capability through a common "virtual switch". In combination with the TDDA and DIPA time multiplexing and collision avoidance algorithms, respectively, the "virtual switch" provides a high wireless channel data rate of multi-node simultaneous access. As this is a "virtual switch", any node within a specified network has the capability to perform the switching and broadcast function. This greatly enhances the wireless network throughput and aggregate transmission time.

Another problem in wireless networking that is solved by this application involves the network IP connection of the mobile node. The determination of the IP address that will be used as the address for the mobile node and the effects of the propagation window on the maximum transmit time for the data collision detection process are important issues in mobile computing. This application provides a Network Mobile IP that makes mobile node access easy while preventing unauthorized intruders from reaching the host or server. The Network Mobile IP Access functions of the Network & Web IT Server Subsystem of this embodiment utilizes an IP assignment method that dynamically changes the IP as a function of time and relative position of the node from a server. This application also includes embedded security algorithms that prevent message modification attacks and terminal modification attacks on both the In combination with the TDDA time multiplexing and collision avoidance algorithm, the "virtual switch" provides a optimal wireless access channel data rate of multi-node simultaneous access. As this is a "virtual switch", any node within a specified network has the capability to perform the switching and broadcast function. This greatly enhances the wireless network throughput and aggregate transmission time.

The Dynamic IP Access or DIPA algorithm begins with the calculation of the initial wireless networking control message. Each of the Com2000™ Systems can operate in as either the client or the server. In a network configuration, one of the Com2000™ Systems will be assigned as the Manager or the Server of the network. Each of the Com2000™ systems in the network will establish communication with each other by transmitting an "Establishing Communication Message " with their unique code sequence. This message continuously transmitted during this period so all network stations can initialize their internal network configuration map. During this period, the receiver of each station decodes the data for relative time and frequency determination of all the transmitting stations. The stations then determine the relative frequency and time offset values for each of the network station.

In addition to the timing information included in the "Establishing Communication Message" the position information of each of the transmitting nodes. The algorithm then decodes the position information of the received code sequence and determines the geometric distance for the initial estimation of propagation delay map. This message can be used as an indication of a new mobile connection was established. The Connection Awareness Logic of the wireless networks requires connection and disconnection broadcast messages so that the propagation delay maps and the network configuration maps are updated accordingly. This process will eventually establish all of the node-to-node maps, node-to-server maps, server-to-server maps and server-to-node maps.

Based on the calculated geometric distance between system nodes and the respective server, if a node is in the "Soft Handoff Zone", the server node will try to establish a "Soft IP Handoff" with the next nearest server. This ensures that mid-stream data transmission is not interrupted as the mobile IP station seamlessly transition over to the new IP server node. The Soft IP Handoff algorithm is similar to the current digital CDMA cellular phone handoff scheme. The two server stations will track the incoming mobile station's code sequence simultaneously until one of the server stations terminates the tracking when the correlated signal strength drops below a certain carrier to signal noise ratio. This hand-off method will ensure that data dropouts will not occur.

Upon determination of the propagation time delay, the network relative time and frequency offset and Propagation Delay maps are updated. The dynamically allocated transmit and receive time for each of the system nodes that reside in the Connection Awareness Maps are also updated. The maximum transmission time for each node will be determined for dynamically establishing the TCP/IP collision window adjustment range. When all of the node's timing related data is calculated, the server will calculate the optimal transmit time and receive time for each based on the priority level of the transmission data of each type of node (manager, server, "virtual switch", etc.).

The Connection Awareness Maps and its timing related data is broadcast to all of the client nodes during every frame time. This allows the Com2000™ wireless system to provide adaptive bandwidth allocation and communication times for based on the needs of each system node. The extensive wireless transmission node will be allocated large blocks of transmitting time as opposed to the idle nodes that will be allocated minimal bandwidth for data transmission. The adaptive bandwidth cycle is the frame time. The sending node therefore defragment its transmitted message into the appropriate Maximum Transmit Unit (MTU). The frame time is a function of how fast the mobile IP client or server can travel in time or how long the optimum MTU transmit time can contain the moving propagation time delay time with respect to the server node. By updating the control parameter of the client every sending and receiving node will know the adjacent nodes and servers as well as when it is time to transmit and time to receive. This information can be used with an overlay of the other parameter maps to provide the server or the user with the capability of networking or information technology situation awareness.

This section describes an application of the present invention that uses time/phase and frequency to provide a wireless precision relative positioning and navigation methods and algorithms that is not only enable a alternative and new technology for precision positioning and navigation the mobile devices. It also allow a new unique and enabling a secured and IP Management and Handoff communication means on wireless networks.

The device location can also be achieved via the precision time synchronization method. The mobile device wants to broadcast a unique identification code in the positioning request message of its networking node to the base station. By measuring the exact time of the signal was received at each remote client stations and base station, along with the transferring the ranging and line of sight direction (Az,E1) or positioning information to the base station, the base station could determine the precise location of the requested mobile device. This method repeat periodically and provide a cost-effective method of local area wireless networking tracking management, since the mobile device would need only an unique positioning request message instead of a GPS receiver. The Universal Wireless transmitter's signal are in MHz range so that it can penetrate the foliage such as building and other structures.

In addition to the timing information included in the "Establishing Communication Message" during the setup time, the position information of each of the transmitting nodes is also included. This message can be used as an indication of a new mobile connection was established. The algorithm then decodes the position information of the received code sequence and determines the geometric distance for the initial estimation of propagation delay map.

5.0. Universal Synchronous Network Processor & Communication System

A. Brief Summary of Universal Synchronous System Problem

The explosive growth of the Internet and e-business requires faster deployment of high-bandwidth equipment and greater flexibility to support emerging Internet technologies and new services within the network. Two revolutionary shifts we are now beginning to see are: 1) a movement toward a more open development environment in the networking equipment industry based on a new generation of packet/circuit processors; 2) the emergence of a wide variety of post-PC info-appliances. This trend growing WebOS to include graphical user interfaces (GUIs), fault tolerance, distributed objects and Java based intelligence.

This patent has described an innovative breakthrough Universal Information Communication or Internet Processor technology that enables seamless Web Operating Systems with the integration for fast packet and circuit switching data rates with intelligent over existing copper wire line or wireless infrastructure. SSI's technology will also be used to enhance any data communications technology where any data types such as video/voice/data convergence.

This patent also presents a technology break through for bandwidth improvement and bandwidth control from the "QoS" standpoint. The Com2000™ solution is a fundamental shift in data communication relative to "Hard QoS" and Noise Suppression and Cancellation Techniques for enabling ultra high-speed data transfers and IT Control and Management. The Com2000™ technology enables high-speed data communication at the desktop that was previously only available on network backbone infrastructures.

A. Universal Synchronous System General

In general, the potential applications are broadband communications to support the growing demands of multimedia services. In a closer look, we can see two main inter-related sectors: access and area-network.

By "access" we refer to the services connecting subscribers to public or backbone networks. The infrastructure for backbone network has been continuously improved with fibers and others. It is now strong enough to handle large volumes of traffic and it comes to the question is how to get to subscribers (ideally via the existing copper infrastructure).

Wireline access using the existing cabling/wiring infrastructure has been started by "big player" Bell and this have pushed xDSL (Digital Subscriber Loop) and recently Ether loop. The "name" of the game is: while providing new high-capacity services the "old" previous services must be maintained and co-exist on the same copper media. This creates a lot of both political and technical constraints. And many big players have been on the scene. Wireless access has also been proposed and discussed. The main activities includes LMCS/LMDS, wireless loop and broadband wireless access (BWA), . . . .

By "area-network" we refer to the services connecting users within an area. The area can be home, factory or moving unit (plane, train, boat, vessel, . . . ). Such an area may or may not need to connect to backbone network. Local Area Networks (LAN), Metropolitan Networks (MAN) have been developed for a long time for business applications. Recently, with the ever increasing popularity of Internet (as Internet becomes somehow synonymous to multimedia services), we have seen a strong and fast movement to home area network with big-player Bell behind the scene, e.g., HomePNA. This reflects clearly the logical "road map" of "telephone" operation for new multimedia services:

first, build solid infrastructure backbone network, second, build high-capacity loops to support multimedia access to home (over existing copper media)

third, build home area network using the existing copper media and integrated with pico-cell Bluetooth wireless networks.

Of course, Internet and Ethernet are the main components. Why do they start with home? This can be easily understood as home represents the largest sector and it is directly related to loop as shown in the above "road map". Of course, as time is going, they will continue to get in other areas too.

We also have seen demands of high-capacity area networks in other areas. Moving units are military airplanes C17 bus, . . . trains, . . . Factories include factories (of course !), hospitals, hotels (someone may classify "hotels" in the home category too)

1) Summary of Universal Synchronous Networking System Techniques

Technically, access systems uses a general star or point-to-multipoint topology, in which there is a base communicates with a number of remotes.

In wireline access, the base is part of the public switch and remotes are customer premises. The point-to-multipoint connections are made as a group of separate point-to-point links. From the transmission viewpoint, this point-to-point link is the simplest topology. For wireless access, in order to maximize the utility of radio bandwidth, point-to-multipoint communications using demand-assignment is required. Radio bandwidth is shared by the remotes on a demand basis and the issue of multiple-access arises.

In area networks, the typically used topology is bus. A medium (cable or wireless channel) is shared by a number of nodes and each node can communicate to any other nodes. This is also called a mesh topology for multipoint-to-multipoint communications. From transmission viewpoint, this is the most complicated possibility and inherently covers both the point-to-point and point-to-multipoint topologies. Furthermore, medium-access control (MAC) as well as multiple-access are the important issues.

Ethernet has been widely used for local area networking to support Internet services. Both were originally based on packet data services with variable-length packets and best-effort delivery approaches. Hence, for the currently demanded multimedia services, including both real-time and non-realtime traffic of different QoS requirements, strictly speaking, they do not provide optimum solutions. For this, at the higher level, various efforts have been spent to improve the Internet such as IPv6. However, at the lower level, not much has been done to make Ethernet more suitable to transport both realtime and non-realtime services. Moreover, there are demands for robust, and deterministic transport schemes to support important, time-, security- and precision-sensitive commands such as in control applications. Such control applications exist in home, factory and military sectors.

For example, in home applications, the home network can be used for computer data interconnection, intercom, distribution of digital audio/video entertainment, control and alarm/monitoring services. The distribution of digital audio/video entertainment definitely needs certain guaranteed bandwidth for hi-fi quality. The commands for alarm/control are short messages but are highly important. This demonstrates the necessity of robust protocol even at home, which is currently not satisfied by both Ethernet and HPA standards. Needless to say, for area networks in factory, SOHO and other applications, the robustness is the "must" as illustrated in FIG. 02.

Furthermore, it is desired to have a flexible/reconfigurable physical layer, which can be adapted to the transmission medium, for both wireline and wireless environment. There is no strong reason, except simplicity, to support why the speed has to be 1, or 10, or 100, or 1000 Mb/s for Ethernet Why not have a physical layer that can operate over a wide range of speeds and the actual speed is automatically and optimally selected for a given medium. In this way, various media can be easily integrated in a universal communications system and compatible with the upper layers of the same protocol. Such protocol can be selected as the Internet for its in-reversible and ever-increasing popularity.

SmartPHY™: Our Unique Solution

With the advances in digital signal processing techniques coupled with FPGA/VLSI technologies, we have researched and developed a number of innovative schemes to be put together as the SmartPHY™. Our introduced SmartPHY™ provides a unique solution to address all the above discussed issues and challenges. In other words, the SmartPHY™ will offer:

automatic selection of operating spectrum and bandwidth for a given medium.

Tx rate and modulation adaptivity to given environment to select the optimum capacity versatility in topology: bus (mesh), star (point-to-muitlipoint), linear (point-to-point)

robustness in transmission, synchronization and capacity allocation to support different QoS requirements for multimedia services compatibility with higher Internet layers interchangeability with existing Ethernet PHY.

Theoretically, there is no limitation on the Tx rate. However, with the currently available VLSI technologies, we aim to design the SmartPHY™ for Tx rates ranging from 1 Mb/s to 1 Gb/s.

From the technical and technological viewpoints, the SmartPHY™ represents the collection of state-of-the-art schemes in modulation/coding, equalization, synchronization, reconfigurable DSP structures and multiple-access. The word "Smart" reflects the concept of reconfigurable computing applied to communications and is in line with the currently so-called software radio or software transceiver. The SmartPHY™ protocol can certainly be a new IEEE 802.3 standard (if we want).

Figure 69A:
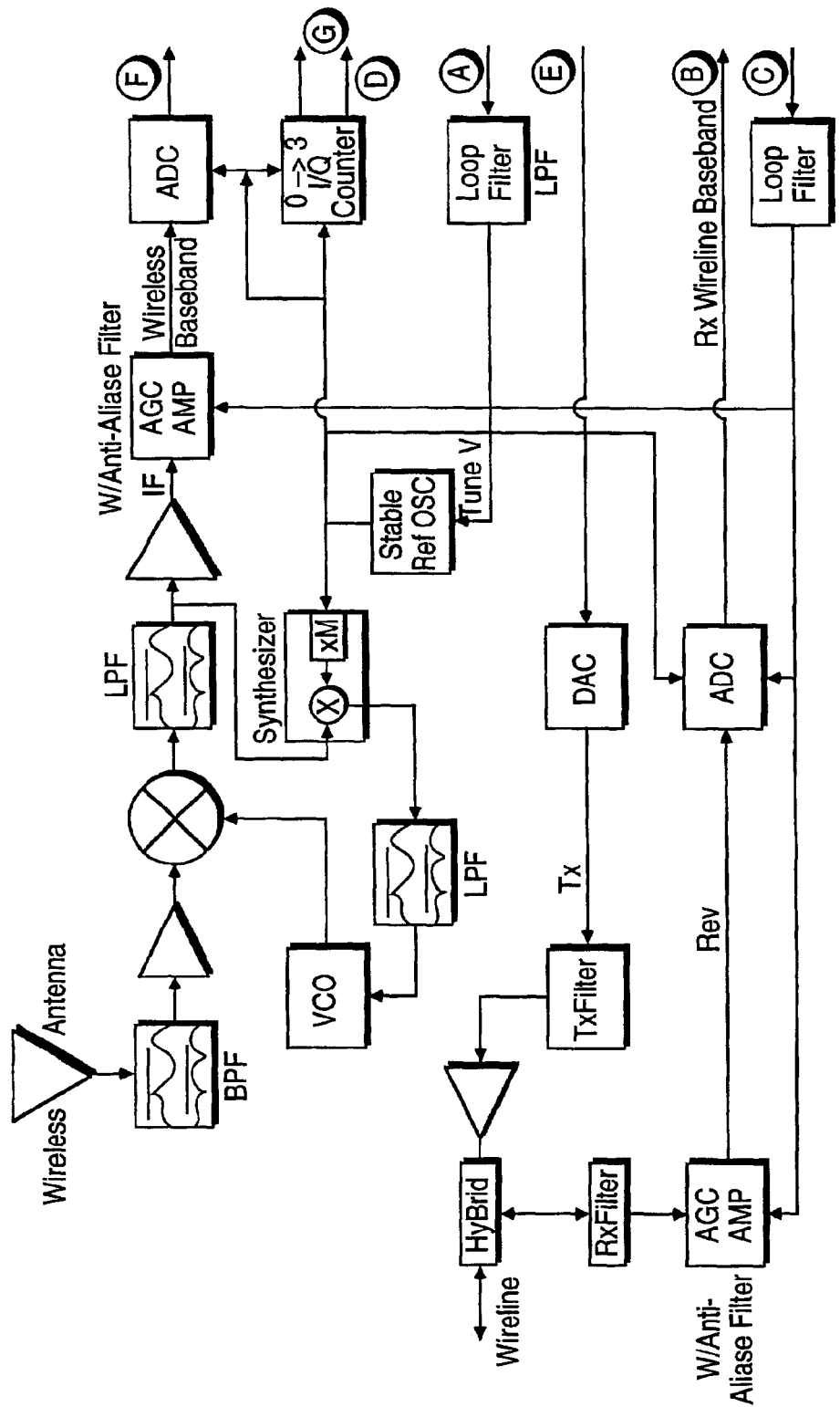
FIG. 69a is an illustration of the UniNet Baseband Converter and Sampler Block Diagram.
Figure 69B:
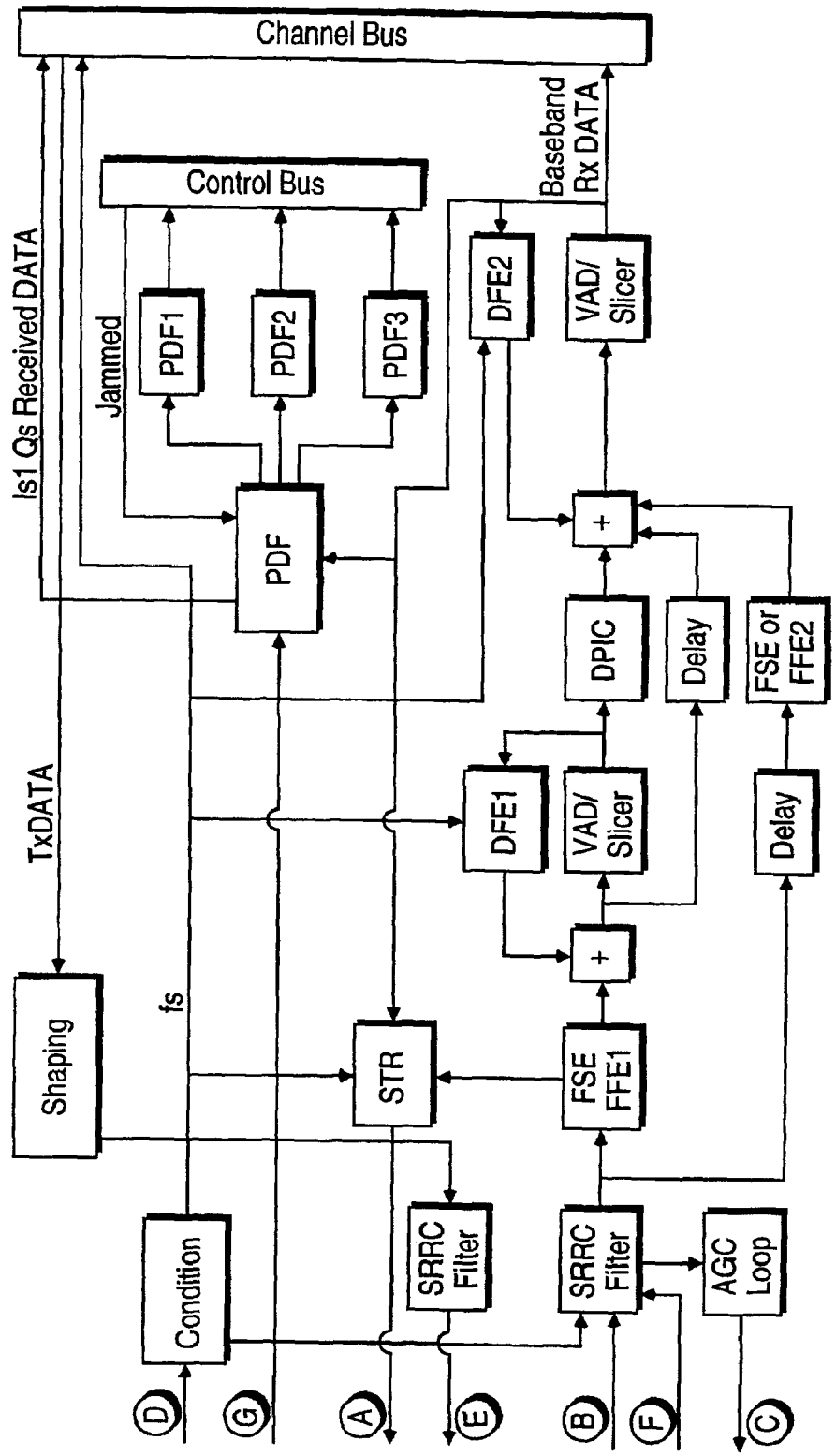
FIG. 69b is an illustration of the UniNet Proposed Baseband Processor Block Diagram.

From the practical, business and application viewpoints, the SmartPHY™ marks the new era of universal communications. Clearly, the SmartPHY™ provides the wanted transceiver technology and protocol for both wireline and wireless communications systems to work in an integrated Internet environment by using the existing infrastructures as illustrated in FIGS. 69, 69a, 69b.

Universal Network Overall System Applications

Unique Application and services may be offered using described system and method. Web Operating Environment for Internet is the virtual Web Operating System which execute on the Internet Processor that utilize the Internet as the virtual mother board.

The growth of the Internet, intranet, and Extranet, migration to rich, natural data types, and the emergence of Tele-presence, video conferencing, and Citrix-like are some of the software and hardware applications that are benefit from the inherent Com2000™ Intelligent "SmartPHY" technology and new protocols, as an example, include: Distributed Switching and Regulation; Distributed Network Operating System on PC platforms; Secured E-Commerce and E-mail Transaction Secured Timestamp/Fingerprint; remote distributed and centralized client/server network computing; Video, Voice and Data synchronization; and Multi-media and Interactive TV.

By utilizing the Com2000™ Intelligent "SmartPHY" technology as a the Internet Real Time Clock chip of the network, the new generation operating system such as Distributed Internet Networking Operating Systems is possible. As an example of how future distributed Web OS can function as one operating system via an Web Operating Environment are described in the following paragraph.

With today OS technology, the multi-processor operating system which links multi-OS together and operate under the same heart beat as a single processor in a multi-processor platform is a common architecture. The Internet OS or Web Operating Environment (WOE) will be enabled as long as the local bus and/or channel (such as PCI) heart beat are synchronized throughout the network. The Networking Processor "SmartPHY" enable this heart beat synchronization globally. The Precision Time & Frequency of the Clock Synchronization from any device, PC or workstation to any other networking device, PC or workstation platform will be then built-in to the internet networking system via the any wireline and wireless selected communication channels. It is, hence, enabling a new era of web remote computing which is an important issue in supporting real-time application and services such as multimedia conferencing and wide area experiment control and monitoring. Another benefit comes to the Internet Distributed and Remote Computing is the concept of Virtual Mainframe Distributed Applications and processing.

2) Detailed Method Steps for Universal Synchronous Networking Communication

The following paragraphs describe the functional requirements and that enables 10/100 M-bits/sec networking over telephone wires.

Definitions, Acronyms, and Abbreviations

The abbreviations and terms listed in the table below are used in the following paragraphs:

| | |
|---|---|
| SmartPHY | Self-Medium-Adaptive-Real-Time PHYsical Interface |
| SPCS | Smart Physical Coding Sub layer |
| SPMA | Smart Physical Medium Attachment |
| SPMD | Smart Physical Medium Dependence |
| SAN | Smart Auto-Negotiation |
| SMDI | Smart Media Dependent Interface |
| Standard or Std | IEEE Std 802.3, 1988 Edition |
| Host | Host Processing Unit for which IP data are transferred |
| MAC | Media Access Controller |
| MII | Media Independent Interface |
| SmartNET | Name adopted in this document for media bus similar to Ethernet |
| OAM | Operation, Administration & Management block |
| DCA | Dynamic Capacity Allocation |
| Tx | Transmit |
| Rx | Receive |
| RN | Reference Node |
| PN | Plain Node |

References

This specification incorporates by reference herein in their entirety the following sources:

Local and Metropolitan Area Network, ANSI/IEEE Std 802.3, 1998 Edition

Media Access Control, services & frame structures: clause 2,3,4, 31

Physical Layer Signaling: clause 6, 7

Medium Attachment Unit: clause 8,14

Reconciliation Sub layer and MII: clause 22

PCS/PMA of 100Base-T2/100Base-X: clause 24, 32

PMD of 100Base-TX: clause 25

Auto-negotiation: clause 28

Repeater for 100 Mb/s: clause 27

Introduction

This following information comprises the detailed design of the Columbus project. It describes the design of a network interface system that operates over telephone wires (POTS) to interconnect PCs or host computers at speed of 10/100 M-bits/sec under typical home phone wiring environment. The format of the design document shall conform to IEEE 802.3 standard as much as possible with differences in the physical layers (PHY) to describe innovations that can enhance system performance to enable 10/100 M-bits/sec operations over POTS. There are two design versions planned for this project. The first prototype includes all functions from the telephone RJ11 interface to the RJ45 interface of a standard 10/100 M-bits/sec 802.3 NIC. The second version includes all functions of the NIC so it will be a "new" NIC that connects PCs via phone wires. We start with defining system functions of the first prototype.

Figure 70:
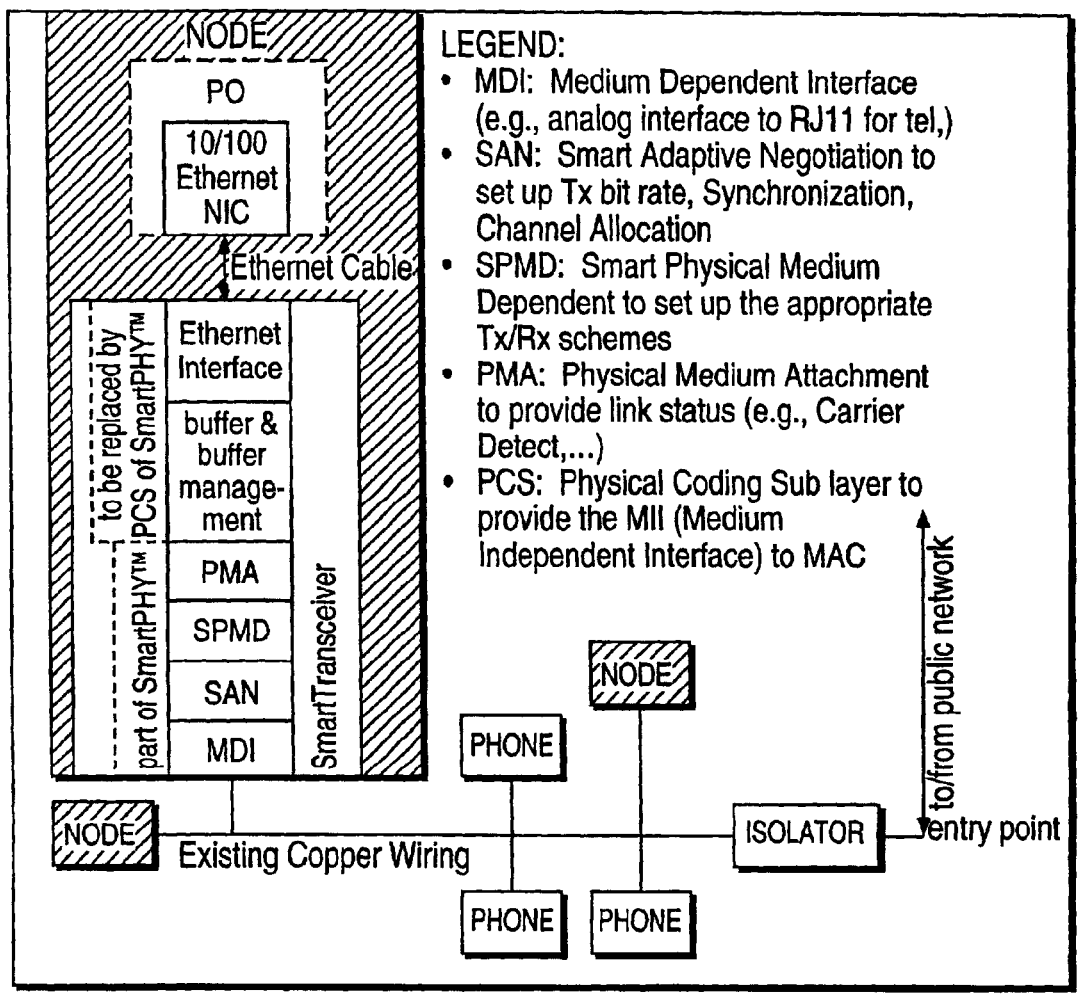
FIG. 70 is an illustration of the Prototype System for Applications using POTS as the Communications Media.

FIG. 70 depicts the system diagram showing its interface with a PC-NIC card within a network node and interconnection with other similar nodes in the network connected over POTS.

For the first prototype, we connect at the host side via a NIC card to alleviate the burden of having to design a host interface such as PCI bus interface. The NIC card is further bridged by an Ethernet (RJ45) to MII interface converter module manufactured by Level One Communications which shall be referred to as Level One in subsequence discussions. Our system shall connect to the Level One module via a MII type interface. This is a unique hardware configuration with two "heads". The Level One connects to the host NIC card via a RJ45 connector at one side, which is customarily considered to be the Ethernet bus. We shall refer this end as the Ethernet side. The medium dependent interface of our PHY connects to the phone line via a RJ11 connector. We would like to refer to this medium bus as SmartNET to reflect our SmartPHY architecture.

Brief System Modules Description

Figure 71:
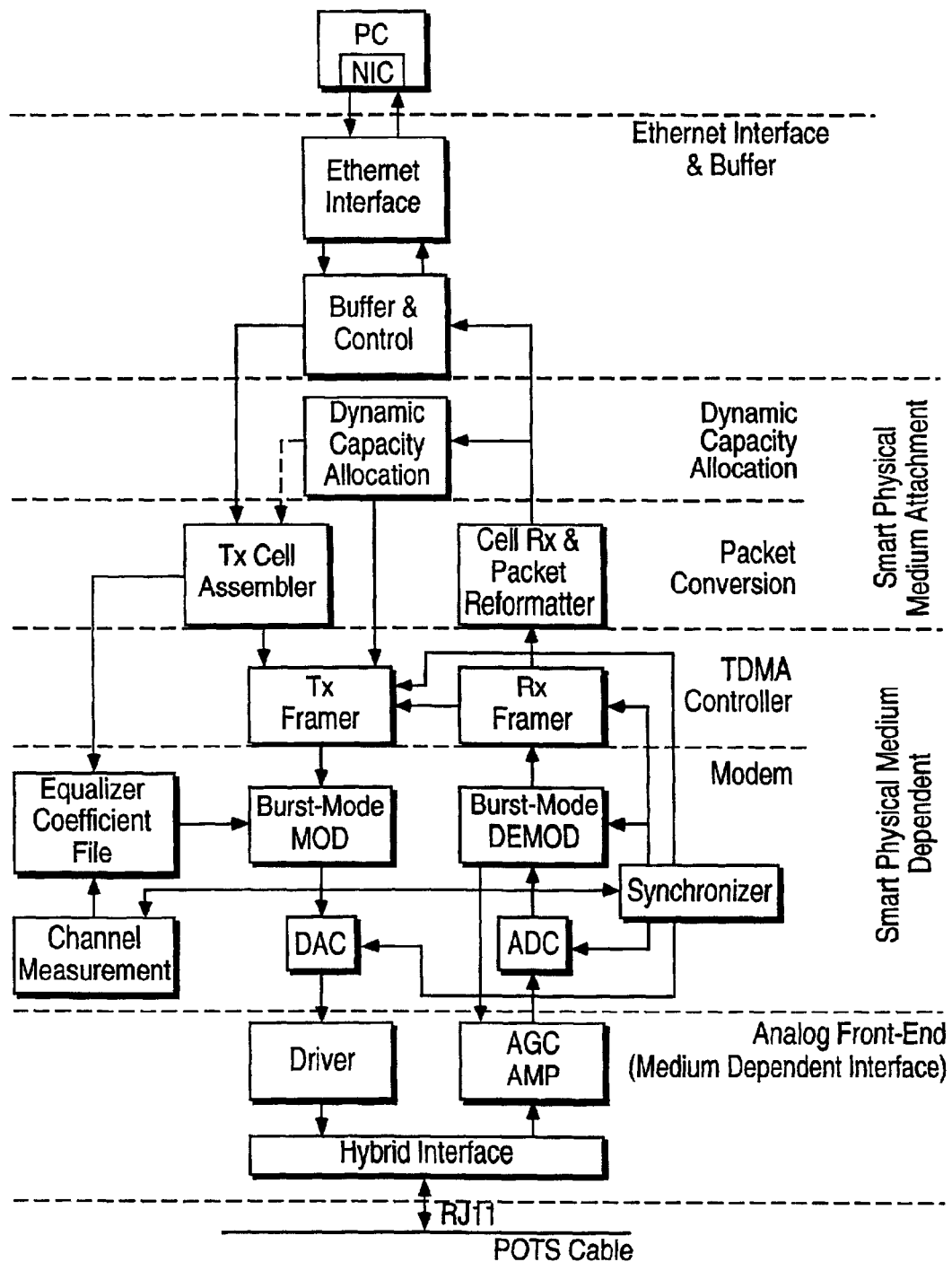
FIG. 71 is an illustration of the Block Diagram of the Prototype.

FIG. 71 depicts the prototype system with functions broken down into sub-functions as shown. The brief descriptions of each block are discussed in the following.

A. Ethernet Interface and Buffer

This block provide the interface to the standard 10/100 NIC and internal buffering to regulate Tx and Rx flows between the Ethernet and the internal Smart Transceiver. Note that this block is specific to the prototype since in reality the internal Smart Transceiver is interfaced to the MAC via the MII (Medium Independent Interface). In this case, the buffer and buffer control parts can be kept unchanged. However, the Ethernet interface part will be replaced by the equivalent PCS (Physical Coding Sub layer) with standard MII defined by the IEEE802.3.

B. Packet Conversion

As part of the Smart PMA (Physical Medium Attachment), this block deals with the conversion from the IP packet to the internal cell and vice versa. IP packets have variable lengths while the internal cells have a fixed length. It is also noted that users can define this fixed length in order to achieve an efficient utility for a particular case. The concept is similar to that of ATM. In general, the packet conversion includes: packet assembly, segmentation and encapsulation. On the Tx side, the Tx Assembler receives IP packets and recognizes their destination addresses. Subsequently, it performs segmentation, encapsulation to convert IP packets into the internal cells. The Tx Assembler will determine the internal address (of the Rx node in the network). It then sends the internal cells to the Tx Framer and their corresponding internal node addresses to the modulator so that the modulator can select the right coefficients to transmit the cells to the destination nodes. This function is unique to support the protocol we introduced. The loading of the equalization coefficients corresponding to the cell has to be synchronized with the transmission of the corresponding cell. This is done by the Tx Framer to be discussed later.

The Cell Rx and Packet Formatter receives Rx cells from the Rx Framer. It then examines the destination addresses of the Rx cells and selects only cells destined to the Node. Finally, it converts cells to IP packets to be passed to the buffer. In addition to traffic cells, there are signaling cells containing information for control in the network. One type of control information is for dynamic capacity allocation. Corresponding cells will be passed to the dynamic capacity allocation block.

The Packet Conversion block may include block code such as RS code as an option.

C. Dynamic Capacity Allocation

One node of the network will be assigned as the Reference Node. This node takes care of the capacity (slot) allocation. Demand-assignment scheme can be used. In this scheme, any node that needs transmission will send a request to the reference node, asking for capacity allocation. There are various dynamic capacity allocation (DCA) schemes/algorithms. The choice of a DCA scheme depends on its complexity and efficiency in supporting various traffic types (real-time, non-real-time) of different Quality Of Service (QoS), latency, robustness requirements. We can keep DCA schemes reconfigurable so that in the future we can apply different DCA schemes depending on the applications.

In general, each node can be a Reference Node (RN). However, there is only one RN operating in a network. For redundancy, we can also select a secondary RN. This secondary RN is on stand-by, and replace the RN only when the primary RN fails.

The RN has other functions too. Here we focus on the DCA. The RN coordinates the transmission of all nodes over the bus. Therefore, other nodes wait for the signaling messages to schedule their transmission. As shown in FIG. 71, the DCA block of the regular node receives signaling messages from the Cell Rx and Packet Reformatter, recovers the channel assignment, and prepares the Tx scheduling for the Tx Framer and Tx Cell Assembler blocks.

In addition to the above functions, the DCA block for the RN includes the DCA algorithm and the preparation of allocation signaling messages to be sent to other nodes. These additional functions are more complicated. It is also noted that these functions have to be included since any node can be voted to be a RN but they are in operation only for the voted RN.

D. TDMA Controller

It includes the Tx and Rx Framers. The RN also defines the reference clock signals and frames. Over the bus, there is only one frame for all nodes defined by the RN. At the network initialization, the synchronizer block of the RN generates the reference clock to be synchronized in frequency by all other nodes. Subsequently, all other nodes have to be synchronized at the frame level to the frame generated by the RN. This is the function of the Rx Framer block. It recognizes the start of the frame, synchronizes to the frame in order to receive the cells. After the Rx framer established the synchronization, the Tx framer sets up the Tx schedule received from the DCA block and generates the Tx Frame timing. Now the Tx framer can control the Tx of its cells (received from the Tx Cell Assembler).

E. Modem

M-QAM with equalization is used. TCM with soft-decision Viterbi is an option. In addition to the basic burst-mode modulator and demodulator, this block also includes the synchronizer and channel measurement.

The Synchronizer is responsible to produce carrier, symbol timing, sampling and other derived clock signals. We propose the scheme in which the above three main signals have their frequencies derived from one source frequency of the RN. Therefore, during the initialization, the RN sends a clock signal to be synchronized by all nodes. Subsequently, each node derives the carrier, symbol timing, sampling signals by adjusting only the phase (or offset timing instant).

The Channel Measurement block performs channel measurement at the initialization to set up the file containing all equalization coefficient sets.

F. Analog Front End

This includes the driver and AGC amplifier for certain medium. In the prototype they are for the RJ11 phone jack.

Detailed Design Description

The following is the Detailed Design Description (DDD), which specifies the interface between blocks, functional description, design implementation, test and diagnostics of each major and sub-blocks in the prototype. It also includes the overall system verification requirements and design.

Ethernet Interface and Buffer Management

A. Overview

Figure 72:
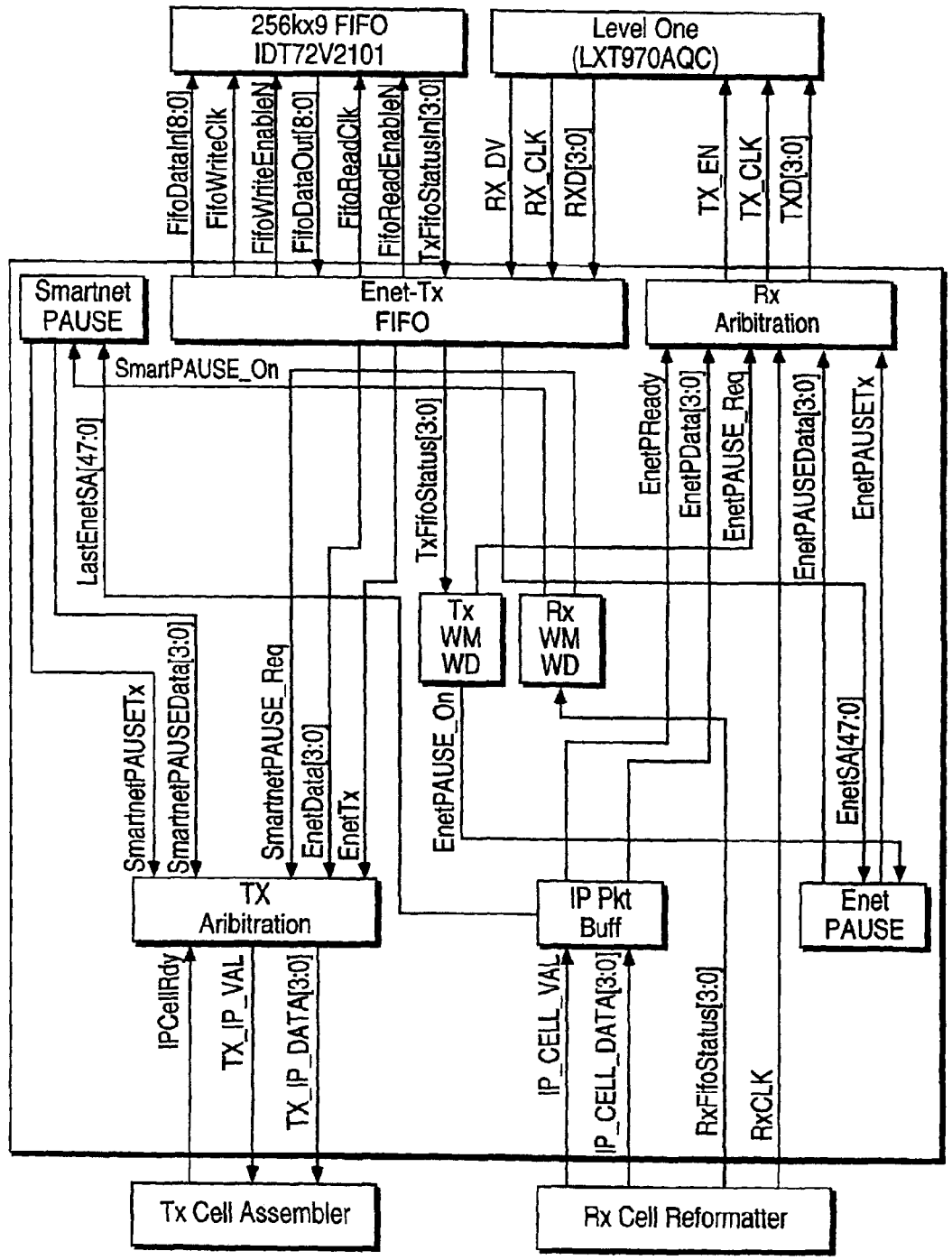
FIG. 72 is an illustration of the Ethernet Interface and Buffer Management Function.

As previously mentioned, the prototype system shall interface with a standard NIC card at the host side through an Ethernet (RJ45) to MII interface converter module referred to as Level One. At the transmit side, this functional module shall receive IP packages in nibble format via the Level One MII interface. It shall buffer and forward them to the Tx Cell Assembler module for further processing. At the receive side, it shall receive and store IP packages data from the SmartNET through the Rx Cell Reformatter and send them to the Level One MII interface. In both directions, it regulates the IP data transfer by implementing the Pause function according to 802.3 Annex 31A/B. FIG. 72 is a block diagram of the Ethernet Interface and Buffer Management design.

B. Enet-Tx FIFO

Functional Description

This function receives Ethernet packets from the Level One (LXT970AQC) in nibble format and transmits them to the SmartNET. An external 256K×9 FIFO (IDT72V2101) is used to accommodate different speeds of the Ethernet packets received from the Level One and sent to the SmartNET.

The prototype shall interface with the PC through the PC's NIC in Full-Duplex operation. The reason for Full-Duplex operation is our SmartNET does not implement collision sense/detection medium access but carry out the transmission using time domain multiplexing (TDM) scheme to be elaborated in other sections of this document. Therefore, the CRS, COL, and RX_ER signals of the Level One are not used.

Enet-Tx FIFO is a functional module which synchronizes to 25 MHz RX_CLK from the Level One and captures its MAC frames through RXD [3:0] while monitoring RX_DV as a condition of valid data.

In our implementation, Enet-Tx FIFO uses an external FIFO for actual data buffer and storage. Data will be written into and read out the external FIFO one byte at a time. All the interface signals between Enet-Tx FIFO and the external FIFO will be defined. Specifically, Enet-Tx FIFO will use RX_CLK from the Level One as a Write Clock for the external FIFO.

Enet-Tx FIFO will send the Ethernet packets in nibble format to the Tx Cell Assembler. It also preserves the MAC Source Address of the transferred Ethernet packet to be used as the Destination Address for the Enet PAUSE frame. This MAC Source Address should be the same for all transferred Ethernet packets in the Transmit side that originate from the PC. This address is used by the Enet PAUSE to temporarily stop the current PC from sending data to this module when the Tx Water Mark Watchdog indicates a data full state.

I/O Interface Signals

RXD [3:0]: Input, nibble data from the Level One
RX_DV: Input, data valid signal from the Level One
RX_CLK: Input, 25MHz clock from the Level One
FifoDataOut [8:0]: Input, data from the external FIFO
TxFifoStatusIn [3:0]: Input, status signal from external FIFO to indicate the thresholds of it (i.e., Full Flag, Almost Full Flag, Empty Flag, Almost Empty Flag)
FifoWriteClk: Output, write clock to the external FIFO
FifoWriteEnableN: Output, write enable to the external FIFO (active low)
FifoDataIn [8:0]: Output, data to the external FIFO
FifoReadClk: Output, read clock to the external FIFO
FifoReadEnableN: Output, read enable to the external FIFO (active low)
TxFifoStatus [3:0]: Output, external FIFO status indicator (i.e., Full Flag, Almost Full Flag, Empty Flag, Almost Empty Flag). The signal is active low.
EnetTx: Output, asserted for a duration of transferring an Ethernet packet
EnetData [3:0]: Output, nibble data to the SmartNET domain or SmartNET Network
EnetSA [47:0]: Output, DA for the Enet PAUSE frame C. SmartNET-PAUSE Generator Functional Description Its function is to generate the MAC PAUSE frame (SmartNET PAUSE) according to 802.3 standard Annex 31A/B to be sent to the SmartNET network when the external FIFO used by Rx Cell Reformatter gets to the almost full threshold. It will use the MAC Source Address of the last transferred Ethernet packet recorded from IP Pkt Buff as the Destination Address for the SmartNET PAUSE. The assumption is the node that most recently sends a packet to this prototype is most likely the one that causes the Rx FIFO full and the one we want to temporarily stop sending data.

I/O Interface Signals

LastEnetSA [47:0]: Input, DA for SmartNET PAUSE frame
SmartNETPAUSE_On: Input, signal from Rx Watermark Watch-dog to indicate the external FIFO used by SmartNET-Rx FIFO gets to the almost full threshold
SmarNETPAUSETx: Output, asserted for duration of transferring a SmartNET PAUSE frame
SmartNETPAUSEData [3:0]: Output, nibble data output D. Tx Arbitration Functional Description Its function is to arbitrate between transferring Ethernet packets from Enet-Tx FIFO and the SmartNET PAUSE frame from SmartNET PAUSE to Tx Cell Assembler. This multiplexing algorithm will be designed and defined in more detail later. Basically, it is signaled by Tx Cell Assembler whether it is ready to send out Ethernet data in the FIFO. It will also be signaled by Rx Water-mark Watch-dog when to send the SmarLNET PAUSE frame.

I/O Interface Signals

IPCellRdy: Input, signal from Tx Cell Assembler indicating it is ready to accept Ethernet packets
SmartNETPAUSE_Req: Input, signal from Rx Watermark Watch-dog
SmartNETPAUSETx: Input, signal from SmartNET PAUSE, asserted for duration of transferring a SmartNET PAUSE frame.
SmartNETPAUSEData [3:0]: Input, signal from SmartNET PAUSE, nibble data input.
EnetTx: Input, signal from Enet-Tx FIFO, asserted for duration of transferring an Ethernet packet.
EnetData [3:0]: Input, signal from Enet-Tx FIFO, nibble data input.
TX_IP_VAL: Output, asserted for duration of transferring either a SmartNET PAUSE or Ethernet packets.
TX_IP_DATA [3:0]: Output, nibble data output to Tx Cell Assembler.

E. Rx Arbitration

Functional Description

Its function is to arbitrate between transferring the Ethernet packets from IP Pkt Buff and the Enet PAUSE frame from Enet PAUSE to the Level One. This multiplexing algorithm will be designed and defined in more detail later. Basically, it is signaled by IP Pkt Buff when an Ethernet packet is ready for sending to the Level One. It will also be signaled by Tx Water-mark Watch-dog when it is time for sending an Enet PAUSE frame to the Level One. The Level One shall receive data in nibble format controlled by TX_EN and synchronized by TX_CLK.

I/O Interface Signals

EnetIPReady: Input, signal from IP Pkt Buff indicating a ready Ethernet packet
EnetIPData [3:0]: Input, nibble data from IP Pkt Buff
EnetPAUSE_Req: Input, signal from Tx Water-mark Watch-dog
EnetPAUSETx: Input, signal from Enet PAUSE, asserted for duration of transferring an Enet PAUSE frame
EnetPAUSEData [3:0]: Input, signal from Enet PAUSE, nibble data input
RXCLK: Input, 25 MHz clock from Rx Cell Reformatter
TX_CLK: Output, 25 MHz clock to the Level One
TXD [3:0]: Output, nibble data to the Level One
TX_EN: Output, data valid signal to the Level One F. Enet-PAUSE Generator Functional Description Its function is to generate the MAC PAUSE frame (Enet PAUSE) according to 802.3 standard Annex 31A/B to be sent to the Level One (Ethernet network) when the external FIFO used by Enet-Tx FIFO gets to the almost full threshold. It will use the MAC Source Address of the transferred Ethernet packet preserved from Enet-Tx FIFO as the Destination Address for the Enet PAUSE frame. This address is used by the Enet PAUSE to temporarily stop the current host from sending data to this module when the Tx Water Mark Watchdog indicates a data fall state.

I/O Interface Signals

EnetSA [47:0]: Input, DA for Enet PAUSE frame
EnetPAUSE_On: Input, signal from Tx Water-mark Watch-dog to indicate the external FIFO used by Enet-Tx FIFO gets to the almost full threshold
EnetPAUSETx: Output, asserted for duration of transferring an Enet PAUSE frame
EnetPAUSEData [3:01]: Output, nibble data output G. IP Packet Buffer Functional Description Its function is to buffer one Ethernet packet transferred from Rx Cell Reformnatter and get ready for transferring the packet to Rx Arbitration. It is clear that the buffer need to have enough size to fulfill the maximum size of an Ethernet packet that is 1518 bytes. The buffer will be implemented using library RAM embedded inside an FPGA. In addition, IP Packet Buffer also preserves the Source Address of the last transferred Ethernet packet to be used as a Destination Address for the SmartNET PAUSE frame by SmartNET PAUSE.

I/O Interface Signals

IP_CELL_VAL: Input, signal from Rx Cell Reformatter indicating the single cell of Ethernet packet is ready for transferring IP_CELL_DATA [3:0]: Input, signal from Rx Cell Reformatter, nibble data input EnetIPReady: Output, asserted when an Ethernet packet is ready to be transferred EnetIPData [3:0]: Output, nibble data output LastEnetSA [47:0]: Output, DA for SmartNET PAUSE frame H. Tx Water-mark Watch-dog Functional Description Its function is to monitor the threshold indicators (i.e., Full Flag, Almost Full Flag, Empty Flag, Almost Empty Flag) of the external FIFO used by Enet-Tx FIFO. Based on the threshold indicators from Enet-Tx FIFO, it generates controlled signals to control a partial functionality of Enet PAUSE and Rx Arbitration.

I/O Interface Signals

TxFifoStatus [3:0]: Input, from Enet-Tx FIFO, external FIFO status indicator (i.e., Full Flag, Almost Full Flag, Empty Flag, Almost Empty Flag). The signal is active low EnetPAUSE_On: Output, signal to Enet PAUSE to tell it to generate the Enet PAUSE frame EnetPAUSE_Req: Output, signal to Rx Arbitration to tell it to transfer the Enet PAUSE frame to the Level One I. Rx Water-mark Watch-dog Functional Description Its function is to monitor the threshold indicators (i.e., Full Flag, Almost Full Flag, Empty Flag, Almost Empty Flag) of the external FIFO used by Rx Cell Reformatter. Based on the threshold indicators from Rx Cell Reformatter, it will generate signals to control part of the functionality of SmartNET PAUSE and Tx Arbitration.

I/O Interface Signals

Figure 73:
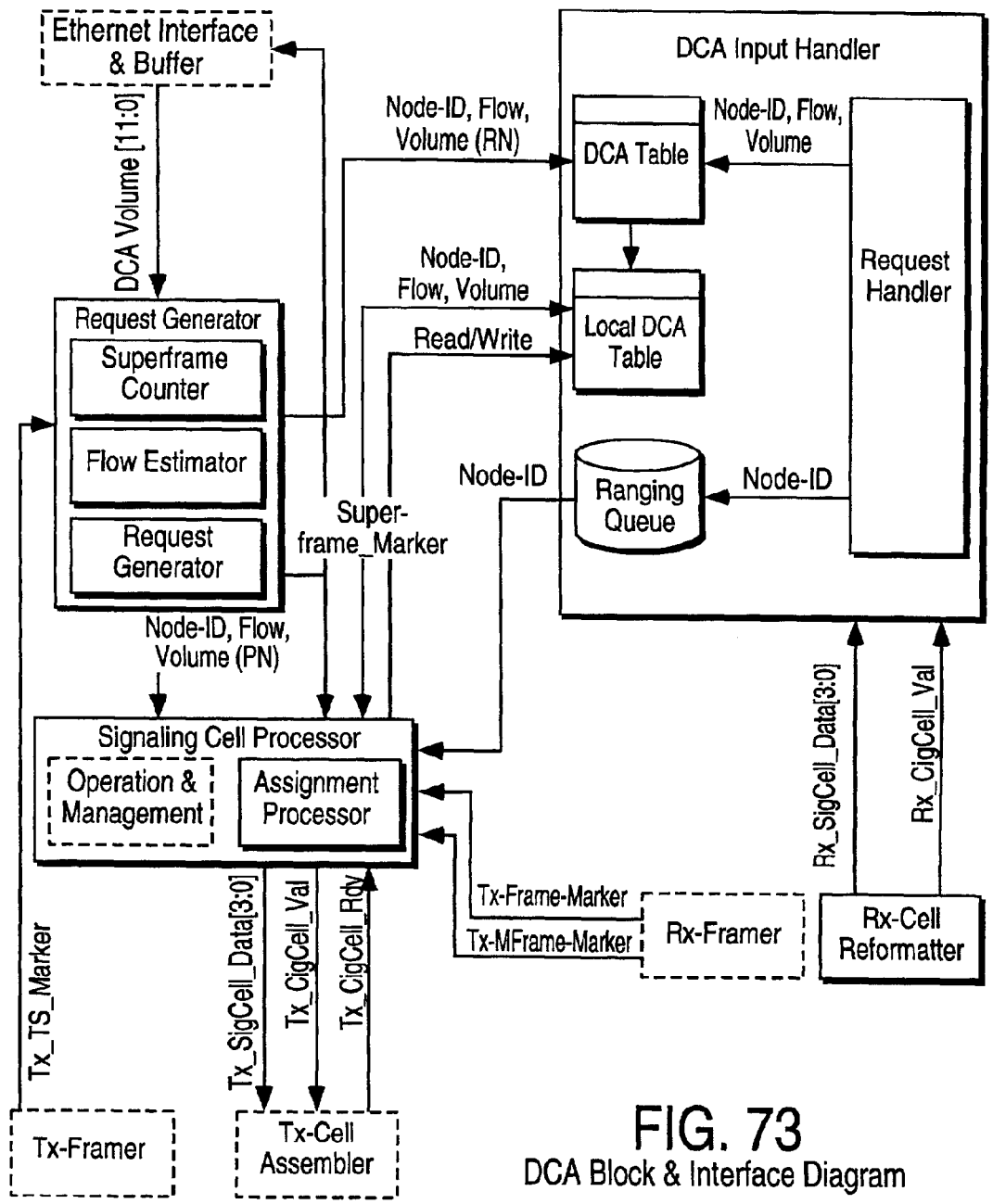
FIG. 73 is an illustration of the DCA Block & Interface Diagram.

RxFifoStatus [3:0]: Input, signal from SmartNET-Rx FIFO to indicate the thresholds of the external FIFO used by it (i.e., Full Flag, Almost Full Flag, Empty Flag, Almost Empty Flag). The signal is active low SmartNETPAUSE_On: Output, signal to SmartNET PAUSE to tell it to generate the SmartNET PAUSE frame SmartNETPAUSE_Req: Output, signal to Tx Arbitration to tell it to transfer the SmartNET PAUSE frame to Tx Cell Assembler Dynamic Capacity Allocation J. Overview Dynamic Capacity Allocation (DCA) is used in the TDMA/TDD frame and access scheme to assign timeslots to nodes in the network. In general, a node (PN or RN) can send signaling bursts once per multi-frame to RN. It will be shown that it is only necessary to send capacity request once per superframe. This is the time interval used to do flow and volume measurements. The RN is responsible for determining and allocating time slots. The slot allocations are issued in a frame-by-frame basis. The allocation is granted based on volume and flow. Volume is defined as the amount of data received over a superframe period. Flow is the average volume in the same period. Allocation is given first to flow and then volume. If after all nodes' flows have been met, allocation is given to nodes that have volume exceeding flow. FIG. 73 depicts the block diagram and interface between DCA and other blocks in the system. DCA is partitioned into two sections, DCA Input Handler and DCA Assignment Processor. DCA Assignment is part of the Signaling Cell Processor function.

K. Functional Description

The following sections describe the concept and functional modules associated with Dynamic Capacity Allocation for the TDMA/TDD transmission and access scheme.

Superframe & Ultraframe

A superframe is defined to facilitate volume and flow estimation for DCA. A superframe length is chosen to be approximately equal to 20 ms to accommodate digital voice traffic (VoIP). 20 ms is the time period of a VoIP package and is chosen to be the period to measure data volume. Ultraframe is 8 times superframe and is chosen to be the time period to estimate flow.

Since each node can only send signaling burst every multiframe, it is necessary to select a superframe to be a multiple of multiframe. For instance, if the number of nodes is 16, a multiframe period is approximately (16*34*5.56 $\mu$s=3.0246 ms). A superframe should be ~6.6 multiframe. It can be rounded to 7 multiframes for 21.17 ms which is 112 slots. The ultraframe would be 169.38 ms. The selection of superframe and ultraframe lengths are based on the number of nodes in the network that can be determined during system initialization and/or updating by OAM (Operation and Management).

Volume and Flow

Volume

Volume is defined as the number of timeslots of data received from the host within a superframe.

Flow

Flow is defined as the average number of timeslots of data received from the host within a superframe.

DCA Request Generator (PN, RN)

DCA Request Generator consists of the following sub-modules or functions.

Superframe Counter

This is a modulo counter to delimit time for a superframe. It counts the number of timeslots in a superframe and generates the superframe marker. The superframe marker is generated in the Request Generator module based on signal Tx_TS_Marker from Tx Framer as clock signal.

Ultraframe Counter

This is a modulo counter to delimit time for a ultraframe. It counts the number of superframes in an ultraframe. It uses supeframe marker as clock signal.

Volume Estimator

This module calculates the volume in a superframe. Its accumulates the number of timeslots of data received within a superframe period. Volume estimator is implemented in the Ethernet Interface and Buffer Management where it counts data in unit size of timeslots for each period delimited by superframe marker.

Flow Estimator

This module calculates the flow in a superframe. Its accumulates the volume within an ultraframe period and divide by the number of superframes in an ultraframe. The value is updated every ultraframe. Flow estimator is implemented in DCA Request Generator using DCA_Volume [11:0] input from Ethernet Interface and Buffer Management.

Request Generator

Every superframe period, this module will send a capacity request to the RN. If this node is a PN, it will send this request to the Tx-Cell Assembler. If it is a RN, it will send the request to the DCA table inside the DCA Input Handler module. The request will consist of node-ID, volume and flow.

DCA Input Handler (RN)
Request Handler

The DCA will check if the request is of type ranging or capacity request and will handle them accordingly. A capacity request is expected to arrive once per superframe for each node. The requests can occur in any one the signaling slots of each node, which occurs once every multiframe. A ranging request only occurs when a node is added to the network. The OAM may need to reset the frame structure after new node(s) have been added to accommodate changes in multiframe and superframe sizes. Ranging requests are given higher priority than other requests.

In general, slot assignments are issued to nodes on a frame-by-frame basis. Since requests come in at superframe intervals, they need to be processed once every superframe for each node. In order to reduce implementation complexity, the RN can use the same superframe reference for all nodes. This time reference can be based on the same superframe marker used by the volume and flow estimators.

DCA Request

This module will extract the request information consisting of request node ID, volume, and flow, and save them. Let's denote the number of timeslots in a superframe as S, volume as V, and flow as F. The obtained data will be saved into a table with each entry containing the following data and order, F, (V-F), and (node-ID). This table will be referred to as DCA table.

Ranging Request

The DCA will extract the request information consisting of the request node ID and save it into a ranging request buffer.

DCA Assignment Processor (RN)
Superframe Process

For each node, the process keeps a set of counters; flow counter CF, volume counter CV, and load CF with F and CV with V at superframe period. The process also uses a counter CS to keep track of the accumulated number of timeslots allocated in a superframe.

It is desired to allocate capacity in limited length consecutive slots to minimize data overhead in the DCA assignment message. Once every superframe, the process makes a local copy of the DCA table (We may later consider sorting this table in ascending order of flow to enable servicing flow in increasing sizes) for the upcoming superframe allocations so that new requests coming in would not affect the ongoing allocation process.

Frame Process
Capacity Allocation for Upstream

Figure 74:
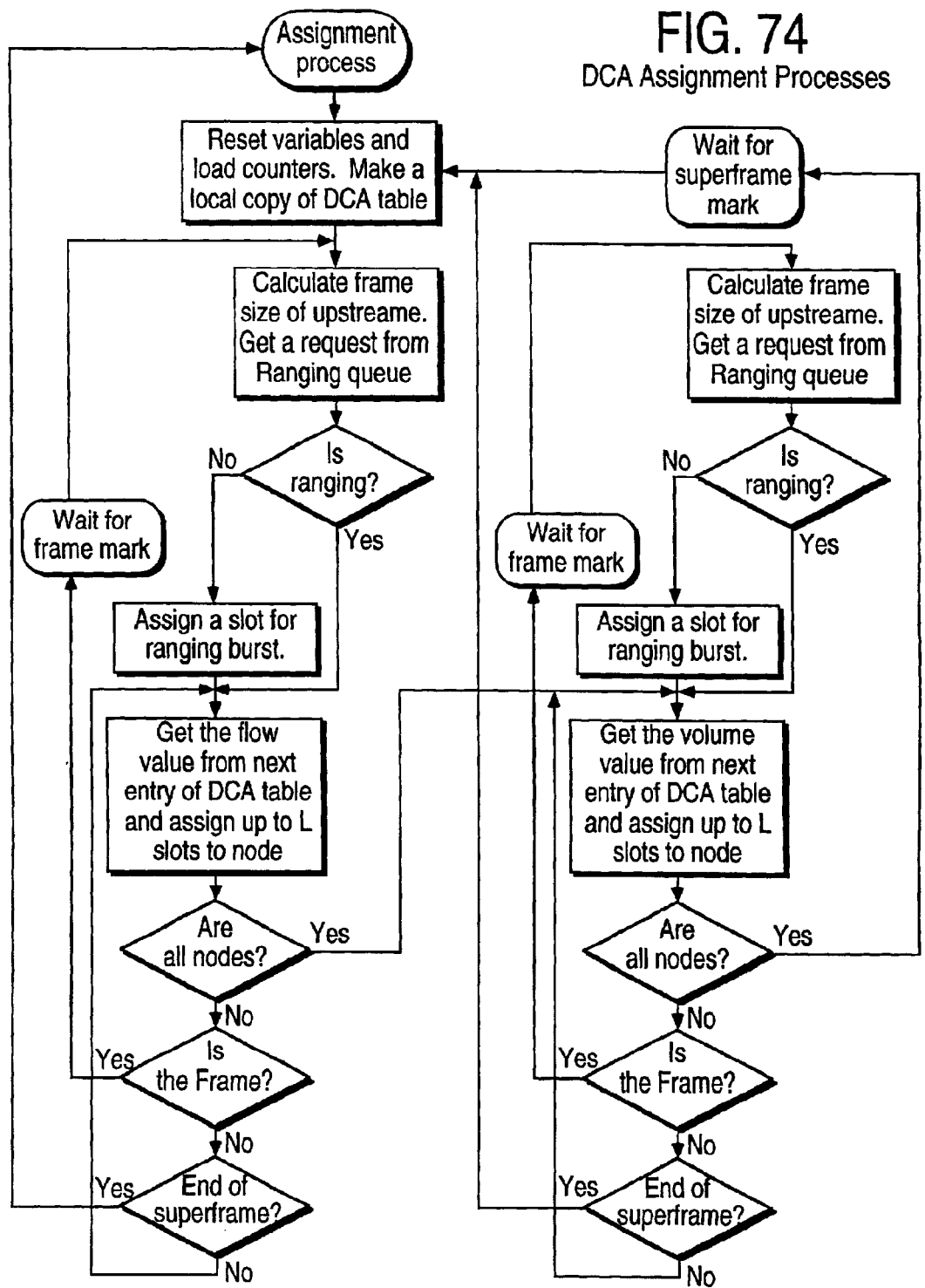
FIG. 74 is an illustration of the DCA Assignment Process.
Figure 75:
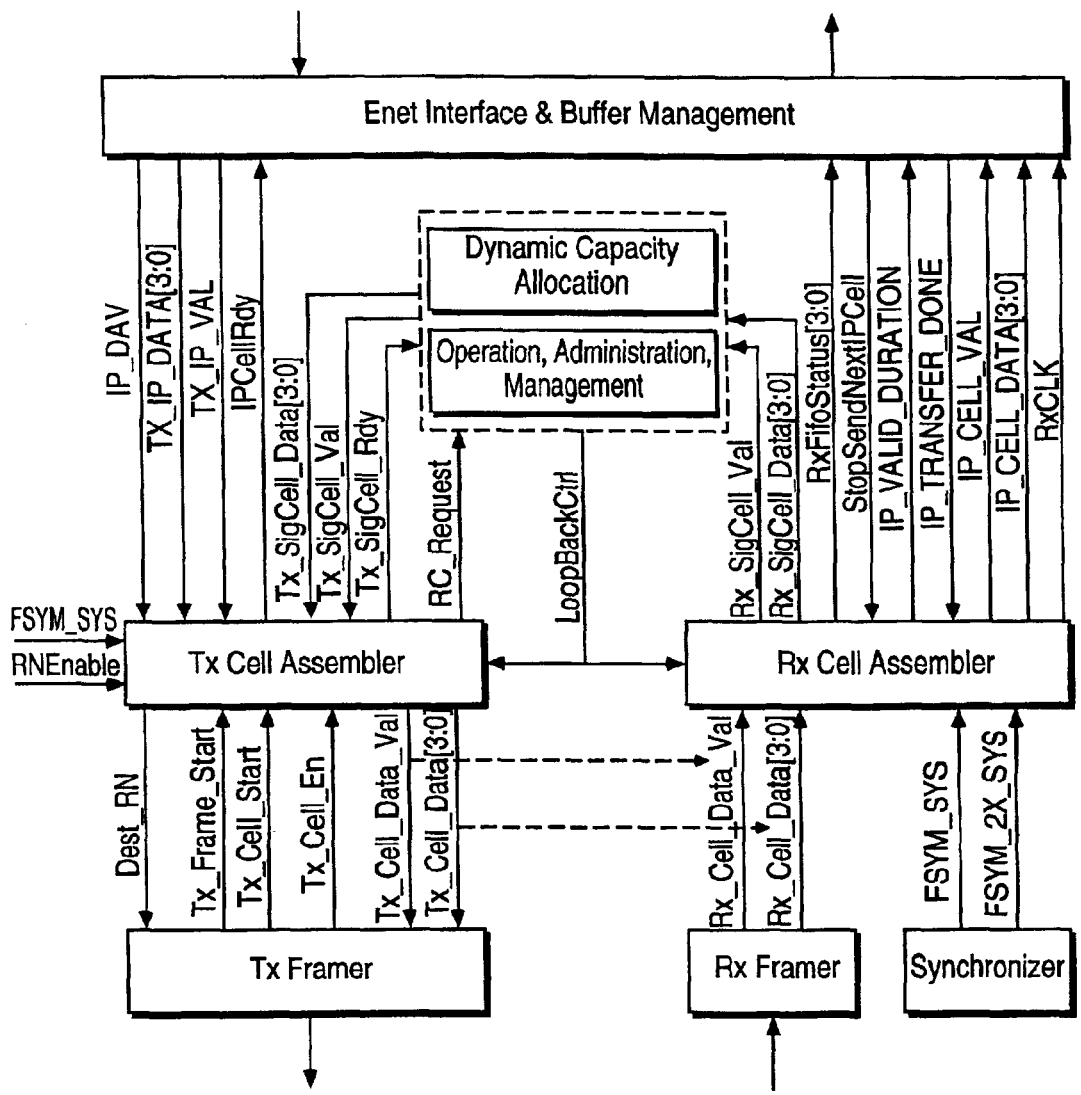
FIG. 75 is an illustration of the Packetizer Block Diagram.

FIG. 74 depicts the flow diagram for the capacity allocation processes. For each downstream frame transmission, the RN has to obtain the number of relay cells plus the number of RN to PN cells for the downstream. This number minus the total timeslots in a frame (both up and downstream timeslots and overhead cell slots such as empty zone and RB) will be the frame size to use for allocation.

The process will first allocate slots for ranging requests in the ranging buffer. For each request, the RN will assign the ranging burst to be the first timeslot immediately following the empty zone. Only one ranging request is serviced per frame.

For each frame the process assigns time slots to nodes based on flow requests in the DCA table. It limits the number of slot assignments (L) to each node and rotates from one node to the next when one of the following two conditions is met, the flow is completely allocated or the rotation limit L is reached. L is a programmable parameter and could be set to be a fraction of the number of timeslots in frame (from now on, the number of timeslots in a frame is meant to include only the upstream slots) such as ½. For this it is necessary to use another counter to keep track of the number of allocated slots for a particular node. When starting with a node, this counter is loaded with L and decremented one for each allocated slot until zero or flow counter CV (CV is also decremented) is zero. The process will attempt to fill all slots in each frame and construct a RB containing DCA assignments to send to Tx-Cell Assembler. The process will loop around the DCA table servicing flow for each node, crossing frame boundaries until the flow of all nodes have been allocated or the end of superframe is reached. If the flow of all nodes has been allocated and there is still timeslots left in a superframe, it will begin assign capacity to volume. Recall, the table entry contains F, (V-F), and (node-ID). For each node it will start allocating slots to nodes with (V-F)>0 in a manner similar to flow allocation (We may later consider sorting this table in ascending order of (V-F) to enable servicing volume in increasing sizes). This process can proceed until all volume has been allocated or the superframe is over.

Note that the above upstream allocations only apply to all PNs but not the RN. However, the process of getting the number of timeslot for a node in a frame should be carried out for the RN together with the PN's. The obtained number can be used by downstream allocation of timeslots for the RN.

RN Downstream Traffic Allocation

Besides having to allocate timeslots for upstream transmission by PN's, the RN also has to allocate slots for itself in the downstream transmission for cells that originate from the RN to PN's. This number is obtained in the process of calculating upstream allocation for the previous frame. This number is used by both the next upstream frame size calculation as well as current frame's downstream allocation for the RN traffic.

DCA Assignment RB-Cell Format

DCA assignments are done in consecutive timeslots to minimize the overhead in the reference cell. Table 1, Table 2, and Table 3 illustrate the RB payload format for DCA. Each RB is assumed to start with a node address intended to be this node's multiframe marker.

The second byte of the payload if equal to 0b0000,0000 signifies the occurrence of ranging assignment in the following byte. So if this is true, the next byte contains the address of the node being granted ranging slot. Table 1 illustrates the RB payload format with ranging and DCA assignments. If there is no ranging assignment message, the second byte in the payload will contain DCA assignment pairs as illustrated in Table 2. DCA assignments are given in pairs of node address and allocated size in units of timeslots. The address/size pair will continue until either all capacity in a frame has been filled or the RB cell payload runs out of space. If there is space left after DCA assignments, the next byte in the cell is filled with value 0b1111,1111 to mark the end of DCA and followed by other downstream signaling cells with formats TBD. Table 3 illustrates the RB payload format with DCA assignments, no ranging, and with end of DCA marker.

Notice the assignments are given in consecutive slots with a number of timeslots for each node. All PN's have to monitor each RB to detect if, what, where, and how many timeslots have been allocated to them for each upstream frame.

TABLE 1

Payload Format of DCA Assignments with Ranging

Polled Node ID
0000 0000
Ranging Node Address
DCA Node Address 0
Size 0
DCA Node Address 1
Size 1
.
.
DCA Node Address N
Size N

TABLE 2

Payload Format of DCA Assignments with No Ranging

Polled Node ID
0000 0000
DCA Address 0
Size 0
DCA Address 1
Size 1
.
.
DCA Node Address N
Size N

TABLE 3

Payload Format of DCA Assignments with No Ranging and End of DCA Marker

Polled Node ID
0000 0000
DCA Address 0
Size 0
DCA Address 1
Size 1
.
.
DCA Node Address M
Size M
1111 1111
TDB
TDB L. Interface Signal Description
DCA—Ethernet Interface & Buffer
DCA_Volume [11:0]: Input. This signal is the DCA volume computed by Ether Interface & Buffer once every superframe. It is constant for the duration of superframe interval and changes at SuperFrame_Marker positive edge transition.
SuperFrame_Marker: Output. This signal indicates the start of a superframe. It is active high for duration of one FSA_SYS clock cycle.
DCA—Tx Framer
Tx_TS_Marker: Input. This signal indicates the start of a Tx timeslot. (reference TDMA Controller DDD)
DCA—Rx Framer
Tx_Frame_Marker: Input. This signal indicates the start of a Tx frame. (reference TDMA Controller DDD)
Tx_Mframe_Marker: Input. This signal indicates the start of a Tx multiframe. (reference TDMA Controller DDD)
DCA—Rx-Cell Reformatter Rx_SigCell_Data [3:0]: Input. This signal is the cell data destined for DCA and OAM blocks for signaling. (reference Packet Conversion DDD)
Rx_SigCell_Val: Input. This signal indicates there is valid cell data on Rx_SigCell_Data [3:0]. (reference Packet Conversion DDD)
DCA—Tx-Cell Assembler
Tx_SigCell_Data [3:0]: Input. This signal is the output data from Signaling Cell Processor. (reference Packet Conversion DDD)
Tx_SigCell_Val: Input. This signal indicates there is valid data on Tx_SigCell_Data [3:0]. (reference Packet Conversion DDD)
Packet Conversion
M. Overview
The Packet Conversion consists of Tx Cell Assembler and Rx Cell Reformatter. These two units responsible for converting the incoming IP messages to the internal frame/cell format and vice versa. They also handle the assembling of signals and management messages as requested from the DCA and OAM blocks. FIG. 1 provides the Packetizer Block Diagram.

N. Interface Signals Description

| Signals | Type | Description |
|---|---|---|
| Tx Cell Assembler - Buffer Management | | |
| TX_IP_VAL | I | Interlocked handshakes between Tx Cell Assembler & |
| IPCellRdy | O | Buffer Management for data transfer on TX_IP_DAT[3..0]. |
| TX_IP_DATA[3..0] | I | IP data |
| IP_DAV | I | Bufer version of MII's RX DAV |
| Tx Cell Assembler - DCA/OAM | | |
| Tx_SigCell_Val | I | Inter-locked handshakes of Tx Cell Assembler & DCA/OAM unit for signal cell transfer on Tx_SigCell_Data[3..0] |
| Tx_SigCell_Rdy | O | |
| Tx_SigCell_Data[3..0] | I | Signal cell data (DCA/OAM) follows the format {TBD} |
| LoopBackCtrl | I | OAM to Assembler. This signal enable the local loopback path from Assembler output to Reformater input to bypass the framers |
| RC_Request | O | Request a RC cell, active during $TS_0$ if the node id RN |
| RNEnable | I | Indicate the enabling of RN |
| Tx Cell Assembler - Synchronizer | | |
| FSYM_SYS | I | From Synchronizer to Cell Reformatter. Symbol recovery clock |
| FSYM_2X_SYS | I | Twice frequency symbol recovery clock |
| Tx Cell Assembler - Tx Framer | | |
| Tx_Cell_Data_Val | O | From Tx Cell Assembler to Tx Framer. RN and PN. This signal indicates the start (+ve edge) and the end (−ve edge) of the valid data on the Tx_Cell_Data and Dest_RN signals. Tx_Cell_Data_Val signal is expected to be a delayed (by one FSYM_SYS clock cycle) version of Tx_Cell_En signal. When Tx_Cell_Data_Val signal is high, then data from Tx_Cell_Data and Dest_RN is registered to Tx Framer at every +ve edge of FSYM_SYS clock signal. Note, when the PN sends the ranging probe the duration of Tx_Cell_Data Dest_RN and Tx_Cell_Data_Val might |

N. Interface Signals Description

| Signals | Type | Description |
|---|---|---|
| Tx_Cell_Data[3..0] | O | be much shorter than Tx_Cell_En. RN and PN. This signal bus passes the cell data (containing the header and payload sections) in chunks of a nibble (4 bits) per time period of FSYM_SYS clock signal. |
| Dest_RN | O | PN only. This active high signal indicates that the final destination of the cell data is a reference node. The Tx Framer uses this signal to attach the upstream unique word (UUW) if Dest_RN=1, otherwise, the relay unique word (RYUW) is used in the preamble. Its transition will be within 8 FSYM_SYS clocks from Tx_Cell_Start |
| Tx_Cell_En | I | RN and PN. This signal indicates that the current time slot is available for transmission, it is active high for the cell duration (CD bytes) in the available time slot. This signal should be used to generate Tx_Cell_Val signal. |
| Tx_Frame_Start | I | RN and PN. This signal indicates the start of each frame, it is active high for the cell duration (CD bytes + pre-amble) only in the time slot number zero. This signal ANDed with Tx_Cell_En should be used to generate Tx_Cell_Data_Val signal for the purpose of reference cell data transmission. Note that Tx_Frame_Start and Tx_Cell_En will be simultaneously high in the time slot number zero, only if the node is a RN. |
| Tx_Cell_Start | I | RN and PN. This signal indicates the start of each TS this node own. Its active time cover the TS preamble as a minimum and is use to trigger cell preparation & arbitration |
| Rx Cell Reformatter - Rx Framer | | |
| Rx_Cell_Data_Val | I | RN and PN. This signal bus passes the cell data (containing the header and payload sections), recovered from the received burst. The data over the Rx_Cell_Data interface is transferred in chunks of a nibble (4 bits) per time period of FSYM_SYS clock signal. |
| Rx_Cell_Data[3..0] | I | RN and PN. This signal indicates the start (+ve edge) and the end (−ve edge) of the valid data on the Rx_Cell_Data signal bus. This signal is generated every time a regular unique word is detected in the received burst. When Rx_Cell_Data_Val signal is high, then data from Rx_Cell_Data signal bus should be registered to Rx Cell Formatter at every +ve edge of FSYM_SYS clock signal. |
| Rx Cell Reformatter - Synchronizer | | |
| FSYM_SYS | I | From Synchronizer to Cell Reformatter. Symbol recovery clock |
| FSYM_2X_SYS | I | Two time symbol clock |
| Rx Cell Reformatter - DCA/OAM | | |
| Rx_SigCell_Val | O | From Reformatter to DCA/OAM. This signal indicates there is valid signal cell data on Rx_SigCell_Data[3..0]. It's asserted for whole duration of cell transfer |
| Rx_SigCell_Data[3..0] | O | Signal cell data: DCA/OAM control, status. Data will include SI, cell type & payload |
| LoopBackCtrl | I | DCA/OAM to Reformatter. This signal enable the local loopback path from Assembler output to Reformater input to bypass the framers |

N. Interface Signals Description

| Signals | Type | Description |
|---|---|---|
| Rx Cell Reformatter - Buffer Handler | | |
| IP_CELL_VAL | O | From Reformatter to output buffer. This signal indicates there is valid cell data on IP_CELL_DATA[3..0]. It's asserted for whole duration of cell transfer |
| IP_CELL_DATA[3..0] | O | Cell data |
| RxFifoStatus[3..0] | O | Status of Rx FIFO: Full, AF, AE, Empty respectively |
| RxCLK | O | Recovery clock, 25Mhz |
| IP_TRANSFER_DONE | I | Required signal from Buffer Management unit. See its description in Buffer Management section |
| IP_VALID_DURATION | O | Required signal from Buffer Management unit. See its description in Buffer Management section |
| StopSend-NextCell | I | Required signal from Buffer Management unit. See its description in Buffer Management section |

O. Functional Description

Tx Cell Assembler

The Tx Cell Assembler is responsible for assembling & encapsulating the ethernet IP, DCA command or OAM command into SmartNET transmission cell format then pass to the TDMA controller. If the node operates as RN node (RNEnable asserted), it will generate the reference-cell for the first time slot in every transmission frame. It also handles the generation of Idle cell incase the node is fully idle.

Transmission Cell Format

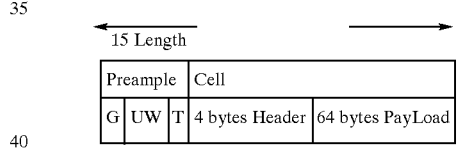

15 Length

| Preamble | Cell |
|---|---|
| G | UW | T | 4 bytes Header | 64 bytes PayLoad |

Cell Header

Is 4 bytes field with following format

| |
|---|
| DI |
| SI |
| TYPE |
| HCS |

| DI: | Destination node ID | 1–254 | Normal addressing |
| | | 0 | Multicast |
| | | 255 | Broadcast |
| SI: | Source node ID, 1–254 | | |
| TYPE: | Cell type, | | |
| | Bits 7-6 | 10 | DCA cells: reference-cell, DCA command & status, etc. |
| | | 01 | All operation management control, status & signal/alarm other than DCA related cells |
| | | 00 | IP data cell |
| | | 11 | Idle cell |
| | Bits 5-2 | | Reserved |
| | Bits 1-0 | 01 | First cell of message |
| | | 00 | Continued cell |
| | | 10 | Last cell message |
| | | 11 | Single cell message |

-continued

| HCS: | Cell header check sequence. To be defined. It may take one of following form:<br>• An 8-bit CRC bases on the polynomial $X^8 + X^2 + X + 1$ of SCD, DI, SI and TYPE<br>• A LRC (Longitudinal Redundancy Check) that is computed by exclusive-ORing the SCD, DI, SI and TYPE |
|---|---|

Cell Payload

Carries cell data or extra information for DCA, OAM cells. Its length, will be 64 bytes to cover the shortest IP packet.

Transmission Order

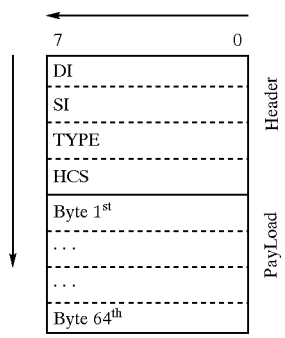

Besides above order, the transmission on SmartNET also observes these rules:

1. The order of multi-frame, frame, or cell is increasing base on time
2. For the width-transfer (multiple cells), the data follow cell order
3. For the depth-transfer (multiple frames), the data follow frame order Rx Reformatter The Reformatter receives transmission cells from RxFramer, determines the cells type then sends to appropriate unit. The DCA commands/responses are passed to DCA unit. The OAM commands/ responses are passed to OAM and the IP data are passed to output buffer. It also output to the Buffer Handler the recovery clock and FIFO status for network PAUSE generation TDMA Controller P. Overall Description The TDMA Controller includes the Tx Framer and Rx Framer. The main function of the Tx Framer is to encapsulate the cell packet with the preamble (necessary for burst detection and synchronization recovery at the receiver), and to transmit these encapsulated cell packets during the time slots allocated for a given node by the DCA. The main function of the Rx Framer is to detect the received burst, remove the preamble, and pass the recovered cell packet to the upper layer blocks. Another important function of the Rx Framer is to establish Rx and Tx frame level synchronization on the network.

Q. TDMA-TDD Frame Structure

The system TDMA-TDD frame structure is described in the following sections.

Multi-Frame Format

Figure 76:
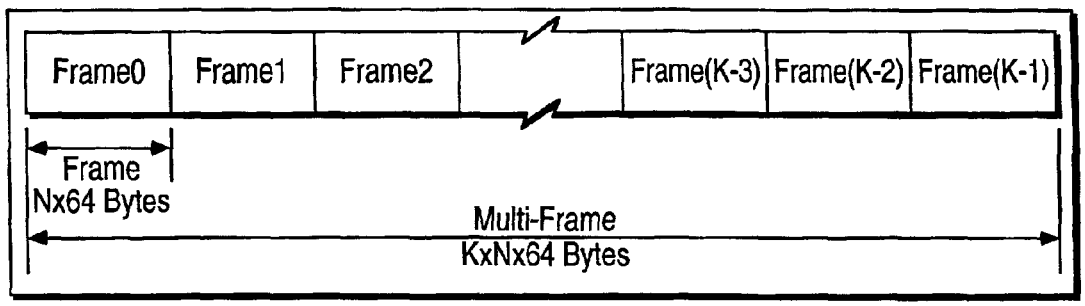
FIG. 76 is an illustration of the Multi-Frame Format of the Communication Protocol.

The multi-frame is made of K frames, where the number K is equal to the maximum number of supported nodes in the system. This number can be set during the hardware reconfiguration based on a given system needs. The multi-frame structure is shown in FIG. 76.

Frame Format

Figure 77:
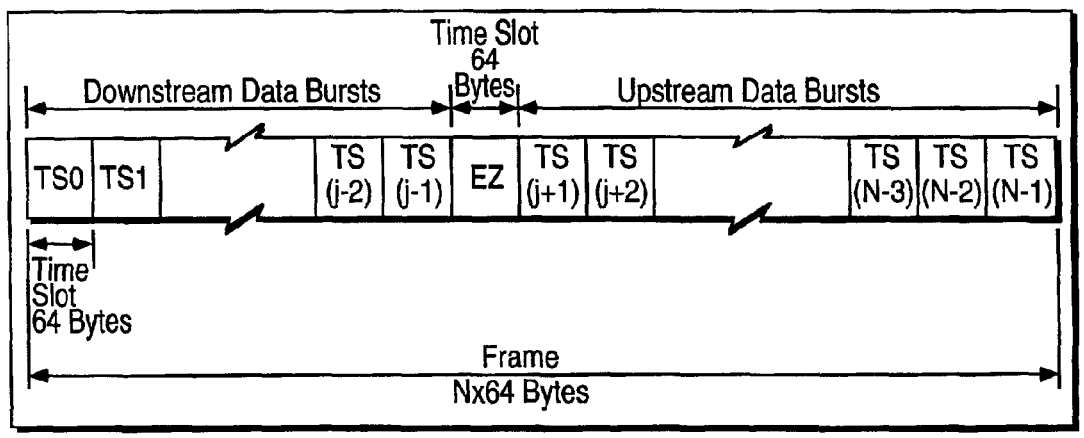
FIG. 77 is an illustration of the Standard Frame Format of the Communication Protocol.

The frame is made of N time slots, where the number N can be set during hardware configuration based on a given system needs. The frame structure is shown in FIG. 77. The frame is divided into two sections separated by Empty Zone, the first section is used for RN to PNs burst (downstream) transmissions and the second section is used for PNs to RN burst (upstream) transmissions. This is a Time Division Duplex (TDD) transmission scheme, and the position of the dividing Empty Zone can be dynamically set during the system operation by the appropriate allocation of available time slots to the nodes by the reference node DCA block. The size of the empty zone is the same as the time slot, since this is more than the required time of twice the longest propagation time between any two nodes in the system. The maximum assumed distance between any two nodes is 1250 feet and the propagation delay time is 150 ns per 100 feet of the quad station wire. Thus, the minimum required time is 3.75 us, and the duration of time slot is 5.12 us.

Time Slot/Burst Format

Figure 78:
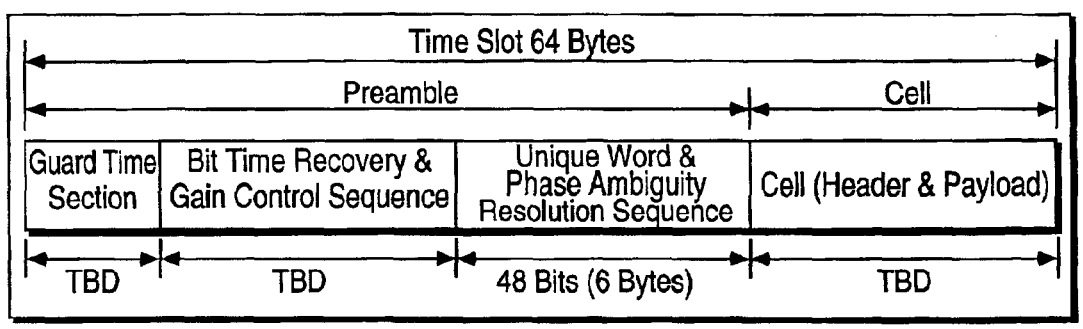
FIG. 78 is an illustration of the Burst Format of the Communication Protocol.

The burst comprises 4 contiguous parts: guard time section, bit timing recovery and gain control sequence, the unique word and phase ambiguity resolution sequence, and the cell data. The format is shown in FIG. 78.

Guard Time Section

The guard time section is a no transmission section, and is utilized to prevent bursts overlap and to make it easier for the receiver to detect the start of the new burst. The size of guard time TBD.

Bit Time Recovery & Gain Control Sequence

This training sequence is used for carrier and symbol timing recovery as well as for automatic gain control of the receiver's amplifier. The pattern and size of this sequence TBD.

Unique Word & Phase Ambiguity Resolution Sequence

Four different unique word & phase ambiguity resolution sequences are used to designate the reference burst (RB), upstream burst (UTB), downstream burst (DB) and relay burst (RYB). Each unique word sequence has a length of 24 bits (per channel) consisting of two consecutive 12 bits (per channel) patterns, which are used to resolve phase ambiguity and to identify the type of unique word sequences. The first 12 bits (per channel) in each unique word sequence are the same, the last 12 bits are defined as described in the following subsections.

Note: The chosen unique word detection and phase ambiguity resolution algorithm requires that 16 QAM mapping be a natural mapping (i.e. not gray coded). The algorithm is based on the QPSK Intelsat TDMA/DSI System (BG42-65E Rev. 2.)

RUW Sequence

The reference unique word sequence (RUW) is generated by the reference node transmitter for the purpose of establishing the multiframe structure on the network. In reference unique word sequence (RUW) the last 12 bits (per channel) are obtained by repeating the first 12 bits (per channel) of the unique word sequence. The patter of RUW is the following 24 bits (per channel):

| I: | 011110001001011110001001 |
|---|---|
| Q: | 011110001001011110001001 |

UUW Sequence

The upstream unique word sequence (UUW) is used by regular nodes (i.e. not reference node) to transmit data burst destined for a reference node. In upstream unique word sequence (UUW) the last 12 bits of I channel shall be obtained by repeating the first 12 bits of I channel and the last 12 bits of Q channel shall be obtained by complementing the first 12 bits of Q channel. The pattern of UUW is the following 24 bits (per channel):

| I: | 0 1 1 1 1 0 0 0 1 0 0 1 0 1 1 1 1 0 0 0 1 0 0 1 |
| Q: | 0 1 1 1 1 0 0 0 1 0 0 1 1 0 0 0 0 1 1 1 0 1 1 0 |

DUW Sequence

The downstream unique word sequence (DUW) is used by reference node only to transmit data burst destined for regular nodes. In downstream unique word sequence (DUW) the last 12 bits of I channel shall be obtained by complementing the first 12 bits of I channel and the last 12 bits of Q channel shall be obtained by repeating the first 12 bits of Q channel. The pattern of QUW is the following 24 bits (per channel):

| I: | 0 1 1 1 1 0 0 0 1 0 0 1 1 0 0 0 0 1 1 1 0 1 1 0 |
| Q: | 0 1 1 1 1 0 0 0 1 0 0 1 0 1 1 1 1 0 0 0 1 0 0 1 |

RYUW Sequence

The relay unique word sequence (RYUW) is used by regular nodes (i.e. not reference node) to transmit data burst destined for another regular node (i.e. not reference node). In relay unique word sequence (RYUW) the last 12 bits (per channel) shall be obtained by complementing the first 12 bits (per channel) of the unique word sequence. The pattern of RYUW is the following 24 bits (per channel):

| I: | 0 1 1 1 1 0 0 0 1 0 0 1 1 0 0 0 0 1 1 1 0 1 1 0 |
| Q: | 0 1 1 1 1 0 0 0 1 0 0 1 1 0 0 0 0 1 1 1 0 1 1 0 |

R. TDMA Controller Input/Output Ports

Figure 79:
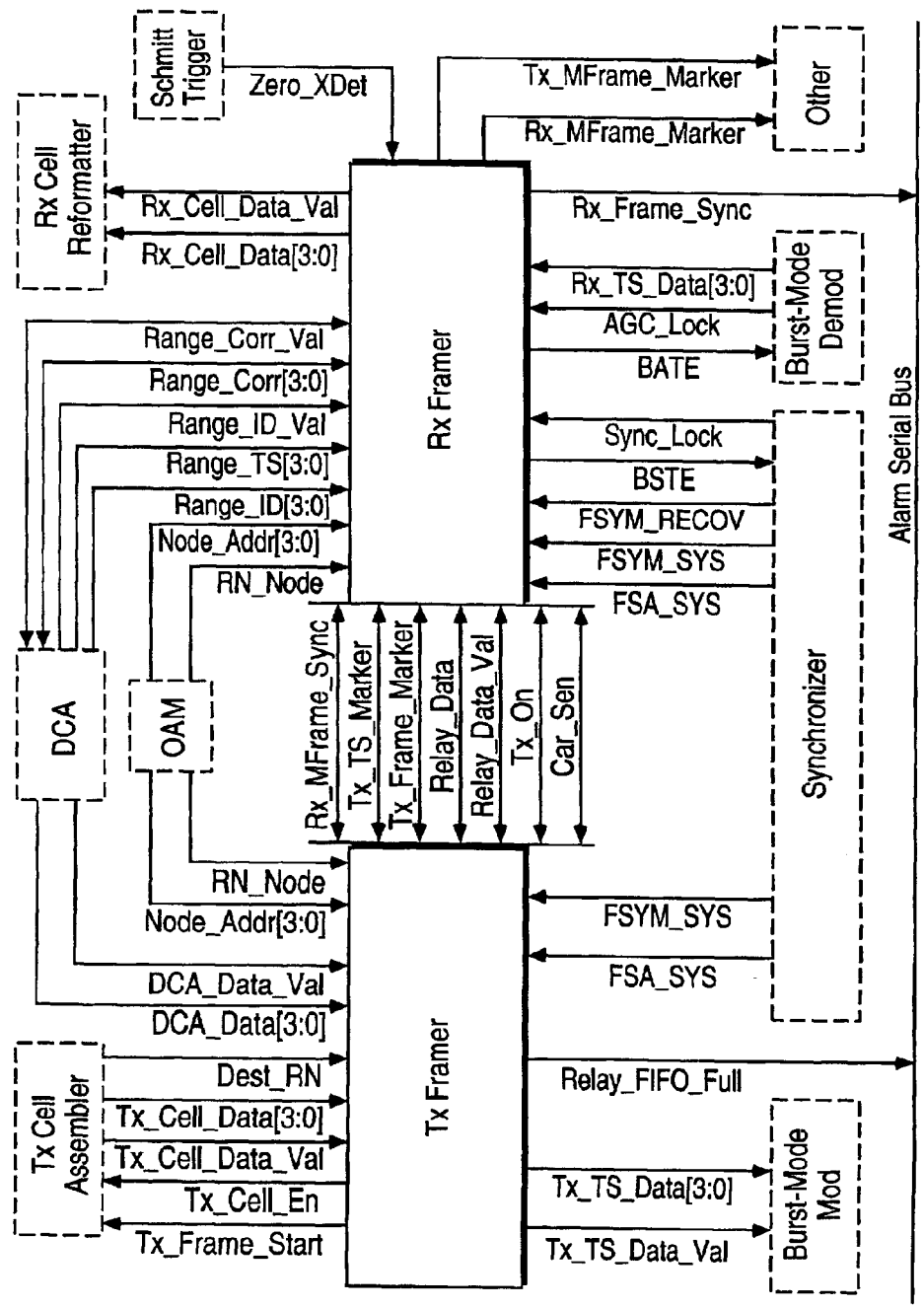
FIG. 79 is an illustration of the TDMA Controller Interface Block Diagram.
Figure 80:
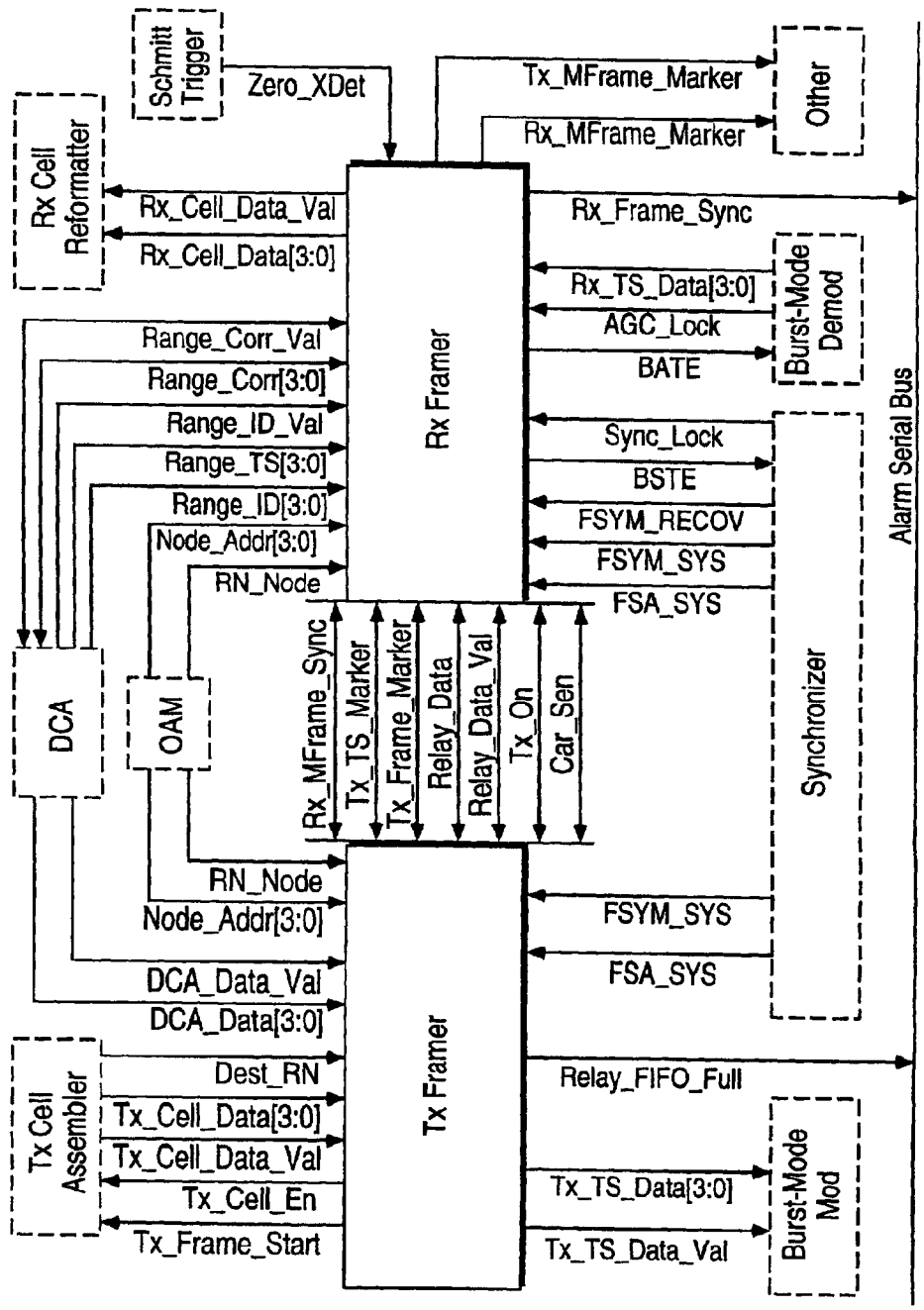
FIG. 80 is an illustration of the TDMA Rx Framer Block Diagram.

The following subsections list and describe the interface signals between the TDMA Controller and other blocks. The general block diagram with the interconnections is shown in FIG. 79.

Tx Framer—Tx Cell Assembler

Tx_Cell_Data[3:0] Input. RN and PN. This signal bus passes the cell data (containing the header and payload sections) in chunks of a nibble (4 bits) per time period of FSYM_SYS clock signal.

Dest_RN Input. PN only. This active high signal indicates that the final destination of the cell data is a reference node. The Tx Framer uses this signal to attach the upstream unique word (UUW) if Dest_RN=1, otherwise, the relay unique word (RYUW) is used in the preamble.

Tx_Cell_Data_Val Input. RN and PN. This signal indicates the start (+ve edge) and the end (−ve edge) of the valid data on the Tx_Cell_Data and Dest_RN signals. Tx_Cell_Data_Val signal is expected to be a delayed (by one FSYM_SYS clock cycle) version of Tx_Cell_En signal. When Tx_Cell_Data_Val signal is high, then data from Tx_Cell_Data and Dest_RN is registered to Tx Framer at every +ve edge of FSYM_SYS clock signal. Note, when the PN sends the ranging probe the duration of Tx_Cell_Data, Dest_RN and Tx_Cell_Data_Val might be much shorter than Tx_Cell_En.

Tx_Cell_En Output. RN and PN. This signal indicates that the current time slot is available for transmission, it is active high for the cell duration (CD bytes) in the available time slot. This signal should be used to generate Tx_Cell_Data_Val signal.

Tx_Frame_Start Output. RN and PN. This signal indicates the start of each frame, it is active high for the cell duration (CD bytes) only in time slot number zero. This signal ANDed with Tx_Cell_En should be used to generate Tx_Cell_Data_Val signal for the purpose of reference cell data transmission. Note that Tx_Frame_Start and Tx_Cell_En will be simultaneously high in the time slot number zero, only if the node is a RN.

Tx Framer—DCA

DCA_Data[3:0] Input. RN and PN. This signal bus passes the transmission time slot (TS) allocation information for this particular node. The TS allocation information is transferred in chunks of a nibble (4 bits) per time period of FSYM_SYS clock signal. The number of transmitted bits is equal to the number N of time slots in the frame. The first transferred MSB bit corresponds to TS #1, with bit "0" means TS available for transmitting and bit "1" means this TS is occupied.

Note that if the node is a reference node then this information comes directly from the DCA block, which operates in the master mode, otherwise, the DCA operates in the slave mode, and it only recovers the TS allocation information from the received packet and forwards this information on the DCA_Data bus.

DCA_Data_Val Input. RN and PN. The +ve edge of this signal indicates that there is a new data on DCA_Data bus for the Tx Framer time slot allocation update. When DCA_Data_Val signal is high, then data from DCA_Data bus is registered to Tx Framer at every +ve edge of FSYM_SYS clock signal, thus DCA_Data_Val should remain active high for the whole duration of DCA_Data transfer.

Tx Framer—Burst Mode Mod

Tx_TS_Data[3:0] Output. RN and PN. This signal bus passes the data burst (preamble +cell) in chunks of a nibble (4 bits) per time period of FSYM_SYS clock signal, during the available Tx frame time slot.

Tx_TS_Data_Val Output. RN and PN. The +ve edge of this signal indicates that there is a new data on Tx_TS_Data bus. When high, the Burst Mode Mod should register the Tx_TS_Data on the +ve edges of FSYM_SYS clock signal.

Tx Framer-OAM

Node_Addr[3:0] Input. RN and PN. This signal is a static, manually presetable, address of the node.

RN_Node Input. RN and PN. This signal is a static, manually presetable, type of the node indicator ('1'=node is a reference node, '0'=node is a regular node).

Tx Framer—Alarm Bus

Relay_FIFO_Full Output. RN only. This signal indicates that the Relay FIFO is full, and not all the bursts have been relayed.

Tx Framer—Synchronizer

FSA_SYS Input. RN and PN. This clock signal is the system sampling clock of the node; the frequency of this clock is 100 MHz.

FSYM_SYS Input. RN and PN. This clock signal is the symbol rate clock of the node; the frequency of this clock is 25 MHz.

Rx Framer—Rx Cell Reformatter

Rx_Cell_Data[3:0] Output. RN and PN. This signal bus passes the cell data (containing the header and payload sections), recovered from the received burst. The data over the Rx_Cell_Data interface is transferred in chunks of a nibble (4 bits) per time period of FSYM_SYS clock signal.

Rx_Cell_Data_Val Output. RN and PN. This signal indicates the start (+ve edge) and the end (−ve edge) of the valid data on the Rx_Cell_Data signal bus. This signal is generated every time a regular unique word is detected in the received burst. When Rx_Cell_Data_Val signal is high, then data from Rx_Cell_Data signal bus should be registered to Rx Cell Formatter at every +ve edge of FSYM_SYS clock signal.

Rx Framer—DCA

Range_ID[3:0] Input. RN only. This signal bus transfers the ID of the remote station, which is due to send the ranging probe in the next assigned time slot. This information is transferred in chunks of a nibble (4 bits) per time period of FSYM_SYS clock signal, and the total size is 2 nibbles (8 bits).

Range_TS[3:0] Input. RN only. This signal bus transfers the slot number of the first (out of two consecutive) time slots, during which a ranging probe is expected. Based on this signal, the Rx Framer will be in the ranging mode during the assigned time slots, but only for the current frame.

Range_ID_Val Input. RN only. The +ve edge of this signal indicates that there is a new data on Range_ID and Range_TS buses. When high, the Rx Framer will register the Range_ID and Range_TS on the +ve edges of FSYM_SYS clock signal.

Range_Corr[3:0] Output if RN. This signal bus transfers the information on how much delay there is between the RN master frame and the PN recovered Tx frame. This information is transferred in chunks of a nibble (4 bits) per time period of FSYM_SYS clock signal, and the total size is 5 nibbles (20 bits). This information should be encapsulated and transmitted back to the PN for Tx frame adjustment.

The format of RN Range_Corr is:
  Bits (19:12)—probe ID (1–254)
  Bit (11)—active high 'not detected' alarm
  Bits (10:1)—how many FSA_SYS clock period delays (0–1023)
  Bits (0)—unused Input if PN. This signal is used to advance the Tx frame accordingly to the measured propagation delay. This information is transferred in chunks of a nibble (4 bits) per time period of FSYM_SYS clock signal, and the total size is 3 nibbles (12 bits).

The format of PN Range_Corr is:
  Bits (11:2)—how many FSA_SYS clock period advancements (0–1023)
  Bits (1:0)—unused Range_Corr_Val Output if RN. The +ve edge of this signal indicates that there is a new data on Range_Corr bus. When high, DCA should register the Range_Corr on the +ve edges of FSYM_SYS clock signal.

Input if PN. The +ve edge of this signal indicates that there is a new data on Range_Corr bus.

Rx Framer—Burst Mode Demod

Rx_TS_Data[3:0] Input. RN and PN. This signal bus passes demodulated received data. This data is continuously transferred in chunks of a nibble (4 bits) per time period of FSYM_RECOV clock signal.

BATE Output. RN and PN. This Burst AGC Training Enable signal indicates the start (+ve edge) and the end (−ve edge) of the AGC Training section in the received burst. It should be used by the Burst Mode Demod as a gating signal to enable the AGC circuit.

AGC_Lock Input. RN and PN. This signal is used during node initialization. When AGC achieves initial lock (i.e. AGC is in steady state), then AGC_Lock='1'.

Rx Framer—OAM

Node_Addr[3:0] Input. RN and PN. This signal is a static, manually presetable, address of the node.

RN_Node Input. RN and PN. This signal is a static, manually presetable, type of the node indicator ('1'=node is a reference node, '0'=node is a regular node).

Rx Framer—Schmitt Trigger

Zero_XDet Output. RN and PN. The edges of the signal indicate the zero crossings of the passband signal. The Rx Framer uses this signal to detect the start of the burst.

Rx Framer—Alarm Bus

Rx_Frame_Sync Output. RN and PN. This alarm signals that the TDMA Controller is out of frame sync (not synchronized). Active Low.

Rx Framer—Synchronizer

FSA_SYS Input. RN and PN. This clock signal is the system sampling clock of the node; the frequency of this clock is 100 MHz.

FSYM_SYS Input. RN and PN. This clock signal is the system symbol rate clock of the node; the frequency of this clock is 25 MHz.

FSYM_RECOV Input. RN and PN. This clock signal is the recovered symbol rate clock of the node; the frequency of this clock is 25 MHz. The phase of this clock signal generally changes for every burst (in order to sample the received signal at the maximum eye opening). The Rx Framer uses this clock to latch the Rx_TS_Data to its internal elastic FIFO buffer.

BSTE Output. RN and PN. This Burst Synchronization Training Enable signal indicates the start (+ve edge) and the end (−ve edge) of the Carrier and Symbol Synchronization Training section in the received burst. It should be used as a gating signal to enable the Synchronizer circuit.

Sync_Lock Input. RN and PN. This signal is used during node initialization.

When Synchronizer achieves initial lock (i.e. Synchronizer is in steady state), then Sync_Lock='1'.

Rx Framer—Other

Rx_MFrame_Marker Output. RN and PN. This signal indicates the start of the Rx multi-frame, it is active high for the duration of one FSA_SYS clock cycle, at the first FSA_SYS clock cycle of the Rx multi-frame.

Tx_MFrame_Marker Output. RN and PN. This signal indicates the start of the Tx multi-frame, it is active high for the duration of one FSA_SYS clock cycle, at the first FSA_SYS clock cycle of the Tx multi-frame.

Rx Framer—Tx Framer

Tx_On Input. RN and PN. When this signal is high, Tx Framer is transmitting. The Rx Framer uses this signal to disable UW detection during transmission.

Tx_Frame_Marker Output. RN and PN. This signal indicates the start of the Tx frame, it is active high for duration of one FSA_SYS clock cycle, at the first FSA_SYS clock cycle of the Tx frame.

Tx_TS_Marker Output. RN and PN. This signal indicates the start of the Tx time slot, it is active high for the duration of one FSA_SYS clock cycle, at the first FSA_SYS clock cycle of each Tx time slot.

Rx_Frame_Sync Output. RN and PN. This active high signal indicates that the Rx Framer is synchronized with the multi-frame of the RN, and that the Tx_Frame_Marker and Tx_TS_Marker signal is valid.

Relay_Data[3:0] Output. RN only. This signal bus transfers all received data cells, marked as 'relay', to the Tx Framer relay FIFO buffer.

Relay_Data_Val Output. RN only. The +ve edge of this signal indicates that there is a new data on Relay_Data bus. When high, Tx Framer should register the Relay_Data on the +ve edges of FSYM_SYS clock signal.

Car_Sen Output. RN and PN. When this signal is high, Rx Framer is sensing present burst transmission on the line. The new transmission from Tx Framer should not start unless the Car_Sen is zero just before the scheduled transmission. This signal is used to avoid collisions in the upstream direction.

S. Rx Framer

As mentioned in the beginning of the TDMA Controller section the two main function of the Rx Framer are:

1. to establish Rx and Tx frame level synchronization on the network, and
2. to recover the cell packet from the received burst.

The other important sub-functions of the Rx Framer include:

Resynchronization (in terms of phase) of the demodulated data with the system clock Detection of the Unique Word (UW) of the received bursts.

Detection of the type of the Unique Word, note that there are 4 types of UW's as mentioned in previous sections.

Phase ambiguity removal from the demodulated data, based on the detected Unique Word information.

Detection of the actual burst start, note that before the Unique Word there is a training section in the burst, which has to be used by carrier and symbol timing recovery, and automatic gain control modules.

Detection of the delay between the reference node and all the other regular nodes.

Figure 81:
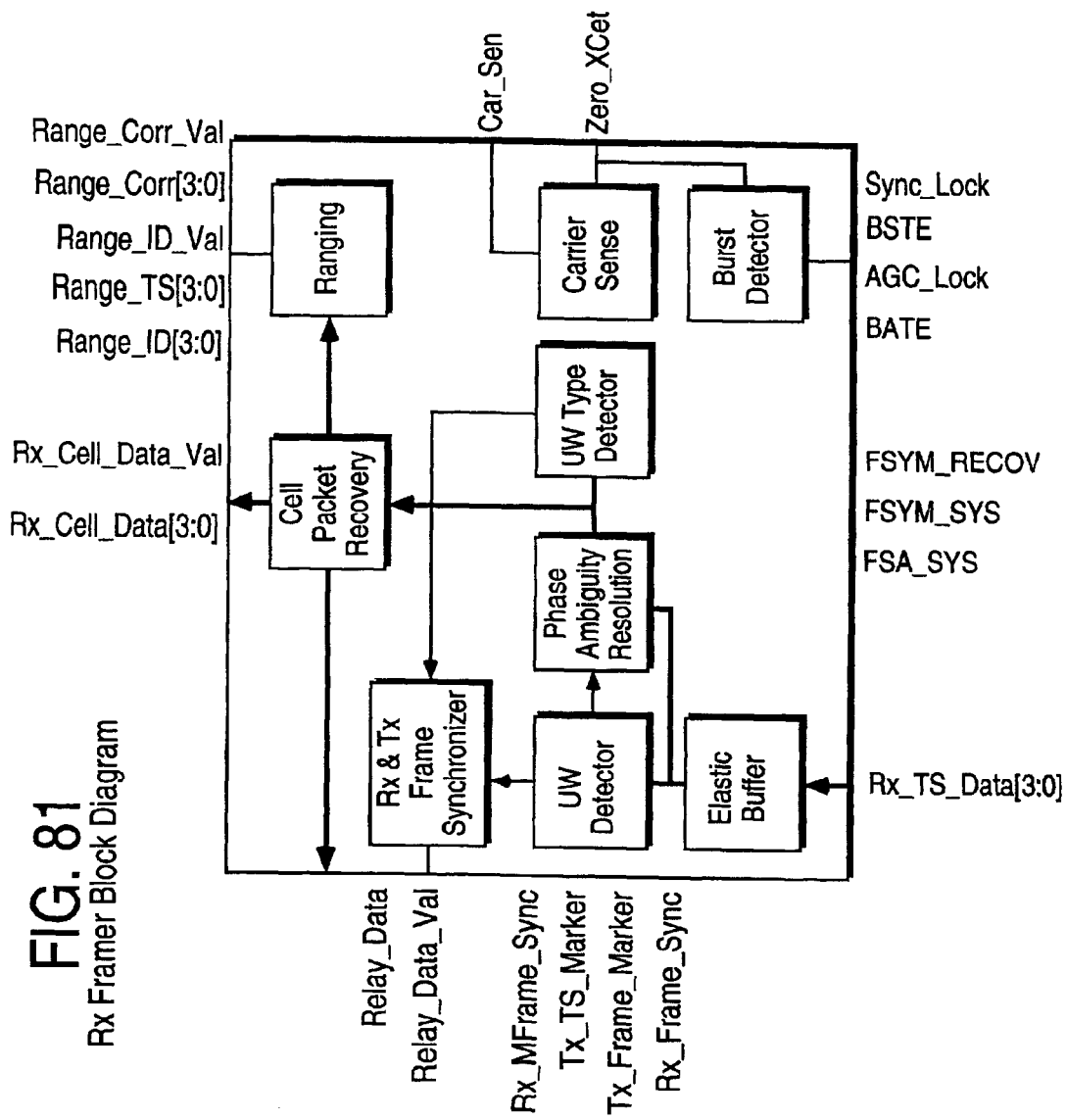
FIG. 81 is an illustration of the Receive Framer Block Diagram.

Based on the above listed functions that Rx Framer has to perform the Rx Framer can be sub-divided into the modules described below. The block diagram of the Rx Framer is shown in FIG. 81.

Elastic Buffer

This block is the interface with the Burst Demod section, and it is used for re-synchronization of the demodulated data. By re-synchronization, it is referred to the fact, that demodulated data is sampled (in the demod) with FSYM_RECOV, but all the processing above the demod is synchronous with FSYM_SYS clock, thus before further processing, the demodulated data has to be re-synchronized (re-sampled) with FSYM_SYS clock.

Main Input/Output Ports

Rx_TS_Data[3.0] Input. PN and RN. The data signal from Burst Demod.

Rx_TS_Data_Sync[3.0] Output. PN and RN. The synchronized data signal.

Functional Description

The elastic buffer operates on the FIFO (first in-first out) principle and is initialized by first clocking in bits with the FSYM_RECOV clock until the buffer reaches a half-full condition, after which the stored data is clocked out with the FSYM_SYS clock. After initialization, data is simultaneously clocked into and out of the buffer with its respective clocks. The size of the buffer should be very small (probably three locations), since both input and output clocks are different only in phase (they have identical frequency), thus no "overfill" condition is expected.

UW Detector

This block is a Unique Word Detector and is used to detect the occurrence of any of the four different Unique Word Sequences.

Main Input/Output Ports

Rx_TS_Data_Sync[3.0] Input. PN and RN. The data signal from Elastic Buffer.

PUWDet Output. PN and RN. The signal (one bit long) indicating the perfect (all bits matching) unique word detection.

TUWDet Output. PN and RN. The signal (one bit long) indicating the threshold (more than T bits were matching) unique word detection.

Functional Description

Overall unique word detection consist of detecting two consecutive patterns of 12 bits (per channel). Detection of each of the 12 bit patterns is be based upon the total Hamming distance between an expected and received pattern (i.e. the number of bit disagreements), d2.

The total Hamming distance, d2 is the sum of dI2 and dQ2, which are related to dI1 and dQ1 as shown in Table 4.

dI1 and dQ1 are the Hamming distances between each of the synchronized demodulator output streams I_dem_sync and Q_dem_sync (demultiplexed from Rx_TS_Demod_Sync) and the following 12 bit pattern: 0 1 1 1 1 0 0 0 1 0 0 1

TABLE 4

| | Values to be assumed by d12 and dQ2 | |
|---|---|---|
| | $dI1 \leq 6$ | $dI1 > 6$ |
| d12 | dI1 | 12-dI1 |
| | $dQ1 \leq 6$ | $dIQ > 6$ |
| dQ2 | dQ1 | 12-dQ1 |

Valid perfect detection of a unique word is declared (PUWDet='1'), if d2 is zero, and if, 12 bits before, d2 was also zero.

Valid threshold detection of a unique word is declared (TUWDet='1'), if d2 is less than or equal to threshold E, and if, 12 bits before, d2 was also less than or equal to threshold E.

Phase Ambiguity Resolution

The phase ambiguity resolution module is used to make the QAM signal constellation (which has 90° rotation symmetry) resistant to 90° phase jumps.

Main Input/Output Ports

| Rx_TS_Demod_Sync | Input. PN and RN. | The data signal from Elastic Buffer. |
|---|---|---|
| PUWDet | Input. PN and RN. | The signal from UW Detector module. |
| TUWDet | Input. PN and RN. | The signal from UW Detector module. |
| I_par & Q_par | Output. PN and RN. | The phase corrected data signal. |

Functional Description

When the unique word is detected, the phase ambiguity is resolved by using the Hamming distance dI1 and dQ1 of the first 12 bit pattern of the 24 bit unique word sequence. The decision logic for phase ambiguity resolution shall be as shown in Table 5 below

TABLE 5

| Decision Table for Phase Ambiguity Resolution. | | |
|---|---|---|
| Decision | $dQ1 \leq 6$ | $dQ1 > 6$ |
| $dI1 \leq 6$ | I_par = I_dem<br>Q_par = Q_dem | I_par = not(Q_dem)<br>Q_par = I_dem |
| $dI1 > 6$ | I_par = Q_dem<br>Q_par = not(I_dem) | I_par = not(I_dem)<br>Q_par = not(Q_dem) |

Where, I_par and Q_par are the bit streams after ambiguity resolution corresponding to the transmitted bit streams I and Q respectively.

UW Type Detector

The unique word type detector is used to identify, which of the four unique word sequences was received.

Main Input/Output Ports

| | | |
|---|---|---|
| PUWDet | Input. PN and RN. | The signal from UW Detector module. |
| TUWDet | Input. PN and RN. | The signal from UW Detector module. |
| I_par & Q_par | Input. PN and RN. | The signal from Phase Ambiguity Resolution module. |
| UWType | Output. PN and RN. | The 2 bit signal indicating the type of detected UW. |

Functional Description

The UW identification is derived from the phase rotation of the second 12 bit pattern of the unique word relative to the first 12 bit pattern, in accordance with Table 6 below.

TABLE 6

Decision Table for Identification of the type of UW

| | XQ = 0 | XQ = 1 |
|---|---|---|
| XI = 0 | RUW, UWType=0 | UUW, UWType=2 |
| XI = 1 | DUW, UWType=1 | RYUW, UWType=3 |

Where XI and XQ are defined in Table 7, based on dI3 and dQ3, which are the Hamming distances between each of the streams I_par and Q_par (after phase ambiguity resolution logic) and the 12 bit pattern 011110001001 for the second 12 symbol pattern of the unique word.

TABLE 7

Definition of the logical variables XI and XQ.

| | dI3 ≦ 6 | dI3 > 6 | dQ3 ≦ 6 | dQ3 > 6 |
|---|---|---|---|---|
| XI | 0 | 1 | — | — |
| XQ | — | — | 0 | 1 |

Rx & Tx Frame Synchronizer

The Rx & Tx Frame Synchronizer module is used to establish the multi-frame, frame, and time slot level synchronization on the network.

Main Input/Output Ports

PUWDet Input. PN only. The signal from UW Detector.
TUWDet Input. PN only. The signal from UW Detector.
UWType Input. PN only. The signal from UW Type Detector.
Rx_MFrame_Sync Output. RN and PN. This is active high signal indicating that the node is synchronized with the multi-frame.
Rx_MFrame_Marker Output. RN and PN. This is the timing signal indicating the Rx multi-frame marker derived from the position of the detected RUW. This signal is active high for one FSA_SYS clock pulse at the beginning of the Rx multi-frame.
Rx_Frame_Marker Output. RN and PN. This is the timing signal indicating the Rx frame marker derived from Rx_MFrame_Marker and the number of frames (K) in the multi-frame. This signal is active high for one FSA_SYS clock pulse at the beginning of the Rx frame.
RX_TS_Marker Output. RN and PN. This is the timing signal indicating the Rx time slot marker derived from Rx_Frame_Marker and the number of time slots (N) in the frame. This signal is active high for one FSA_SYS clock pulse at the beginning of the Rx time slot.
Tx_MFrame_Marker Output. RN and PN. This is the timing signal indicating the Tx multi-frame marker derived from Rx_MFrame_Marker and the Range_Corr number (from DCA). This signal is active high for one FSA_SYS clock pulse at the beginning of the Tx multi-frame.
Tx_Frame_Marker Output. RN and PN. This is the timing signal indicating the Tx frame marker derived from Tx_MFrame_Marker and the number of frames (K) in the multi-frame. This signal is active high for one FSA_SYS clock pulse at the beginning of the Tx frame.
TX_TS_Marker Output. RN and PN. This is the timing signal indicating the Rx time slot marker derived from Tx_Frame_Marker and the number of time slots (N) in the frame. This signal is active high for one FSA_SYS clock pulse at the beginning of the Tx time slot.

Functional Description

If the node is a reference node RN, then during the system initialization (after reset) this module arbitrarily (in terms of absolute time reference) sets-up (based on decided number of time slots N, and frames K) the Rx and Tx frame by generating signals Rx_MFrame_Marker, Rx_Frame_Marker, Rx_TS_Marker, and Tx equivalents.

If the node is not a reference node (i.e. regular node PN), then the Rx and Tx frame recovery is based on the received reference burst, in the following fashion:

1. An "open (continuous) search" is performed for the received exact reference unique word RUW.
2. When the exact pattern recognized as RUW is first detected, the synchronizer changes to the "initial tracking" mode by generating the timing window signal to focus the search for the following RUW in the expected position of the RUW. Note that in the "open search" mode, all data are considered, therefore false alarm (i.e., RUW is not there but some data pattern looks identical) may happen often. To improve the performance, the RUW is only declared detected if the pattern is 100% identical, thus PUWDet signal is used.
3. In the "initial tracking" mode, if X consecutive RUW's are detected (within the expected timing windows), then the synchronizer declares that Rx_Mframe_Sync is established, and changes to the "in sync tracking" mode. Otherwise, it has to come back to the "open search" mode. This iterative process (step 1,2,3,1, 2,3 . . . ) can be done for up to Y iterations. After Y times, if the Rx_Mframe_Sync can not be established, then an alarm must be generated. In the tracking modes, the narrow gating window for RUW detection is used in order to reduce the false detection probability. Also, in order to cover the case of bits in error due to noise, and to reduce the probability of RUW detection miss, in the tracking mode, the RUW is declared detected based on TUWDet signal.
4. In the "in sync tracking" mode, the loss of Rx_Mframe_Sync is declared only when X consecutive RUW's are not detected within the expected timing windows, if this happens the synchronizer changes to the "open search" mode.
5. The Tx_Mframe_Marker signal, and all its derivatives are derived based on the Rx_Mframe_Marker and Range_Corr (from DCA) signals. The Range_Corr signal is used to advance a given node's Tx Frame, wrt Rx Frame, in order to account for different signal propagation delays between regular (plain) nodes (PN) and reference node (RN).

Note: The signal Range_Corr should specify the number of FSA_SYS clock cycles a given node's Tx frame has to be advanced.

Figure 82:
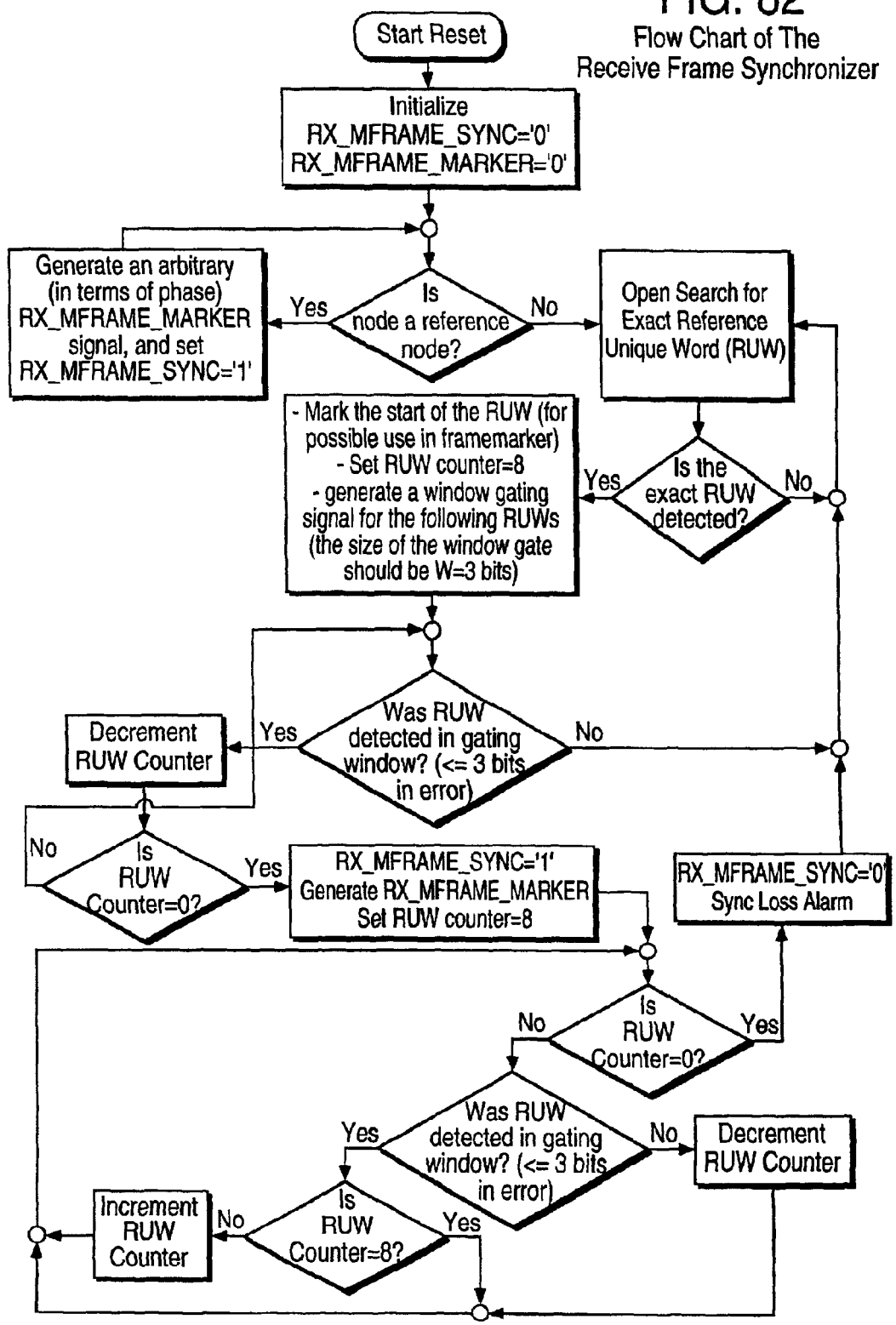
FIG. 82 is an illustration of the Receive Frame Synchronizer Flow Chart.

The simplified flow chart of the Rx & Tx Frame Synchronizer is shown in FIG. 82.

Cell Packet Recovery

This block recovers the cell packet data from the received burst and passes the data to the Cell Reformatter, Tx Framer, or Ranging block.

Main Input/Output Ports

| | | |
|---|---|---|
| I_par & Q_par | Input. PN and RN. | The signal from Phase Ambiguity Resolution block. |
| Rx_TS_Marker | Input. PN and RN. | The signal from Rx & Tx Frame Synchronizer. |
| UWType | Input. PN and RN. | The signal from UW Type Detector. |
| TUWDet | Input. PN and RN. | The signal from UW Detector. |
| Tx_On | Input. PN and RN. | The signal from Tx Framer. |
| Range_On | Input. RN only. | The signal from Ranging Block. |
| Rx_Cell_Data | Output. PN and RN. | The cell packet signal for RN. |
| Relay_Data | Output. RN only. | The cell packet signal for Tx Framer relay. |
| Probe_ID | Output. RN only. | The cell packet signal for Ranging block. |

Functional Description

The cell data is recovered by gating the I_par & Q_par signals with the cell data enable control. The cell data enable is derived as follows: if during the expected time window (marked by Rx_TS_Marker) the TUWDet is high, or Range_On is high and TUWDet is high, and Tx_On is low, and UWType indicates a valid type for a given node (PN or RN), then set enable high for duration of cell packet.

In the RN, if the UWType indicates that the burst is for RN then the recovered cell packet is passed to the Rx_Cell_Data port, else if the UWType indicates that the burst is for Relay then the recovered cell packet is passed to the Relay_Data port, else if the UWType indicates that the burst is for RN and the Range_On is high then the recovered cell packet is passed to Probe_ID port, otherwise, do not process.

In the PN, if the UWType indicates that the burst is for PNs then the recovered cell packet is passed to the Rx_Cell_Data port, otherwise, do not process.

Ranging

The ranging module is used only in the RN, and its function is to measure the signal propagation delay between the reference node and the plain nodes.

Main Input/Output Ports

| | | |
|---|---|---|
| Range_ID | Input. RN only. | The signal from DCA. |
| Range_TS | Input. RN only. | The signal from DCA. |
| Range_ID_Val | Input. RN only. | The signal from DCA. |
| Probe_ID | Input. RN only. | The signal from Cell Packet Recovery Block. |
| Range_Corr | Output. RN only. | The signal to DCA. |
| Range_On | Output. RN only. | The signal indicating that receiver is expecting reception of the Ranging Probe in current time slot. |

Functional Description

The ranging module operates only in the reference node, and its operation is as follows.

1. When the positive edge on the Range_ID_Val signal is detected, then the new Range_ID and Range_TS signals from DCA are loaded to the internal FIFO.
2. During the current frame only, the range counter is reset at the beginning of the time slot indicated by Range_TS, and the Range_On signal is asserted for the duration of two time slots.
3. If during Range_On=1 the detected Probe_ID=Range_ID then
   The range counter is stopped
   The counter value is sent to DCA by Range_Corr signal
   One FIFO location is cleaned
4. If during Range_On=1 the Probe_ID=Range_ID is not detected then
   The alarm is sent to DCA by Range_Corr signal
   One FIFO location is cleaned Note: DCA has total control when the ranging is initiated. DCA initiates ranging measurement by sending the appropriate time slot allocations to the probed nodes, then it sends the probe request to the node, and then signals the ranging block about the Range_ID expected in Range_TS time slot. DCA should signal the ranging block before the actual time slot=Range_TS.

Carrier Sense

The carrier sense block is used to detect if there are any unwanted overlapping (due to propagation delay) bursts on the line at the time when Tx Framer is scheduled to transmit.

Main Input/Output Ports

| | | |
|---|---|---|
| Zero_Xdet | Input. RN and PN. | The signal from Schmitt Trigger block. |
| Car_Sen | Output. RN and PN. | The signal indicating that the line (channel) is occupied. |

Functional Description

If zero crossing transitions are detected at the input to ADC, then set Car_Sen=1, otherwise Car_Sen=0.

Burst Detector

The Burst Detector block generates the gating window signals for symbol timing recovery and AGC modules during the training sections in the burst.

Main Input/Output Ports

| | | |
|---|---|---|
| Zero_Xdet | Input. RN and PN. | The signal From Schmitt Trigger Detector. |
| Range_On | Input. RN only. | The signal from Ranging module. |
| BATE | Output. RN and PN. | The signal for AGC block control. |
| BSTE | Output. RN and PN. | The signal for Synchronizer block control. |

Functional Description

In the reference node, if ranging is in progress, then generate the BSTE and the BATE signals as soon as the first zero crossing transitions occur in a given time slot.

In the plain node, generate the BSTE and the BATE signals as soon as the first zero crossing transitions occur in a given time slot and the expected burst arrival time.

During node initialization set BSTE and BATE to continuous 1, until the Synchronizer and AGC block have successfully locked. Note: after the successful lock, the Synchronizer and AGC should not change their values until the frame synchronization is established and the regular BSTE and BATE signals are generated.

T. Tx Framer

As mentioned in the beginning of the TDMA Controller section the two main functions of the Tx Framer are:

1. To encapsulate the cell packet with preamble, thus forming a burst
2. To transmit a burst during the DCA allocated time slot If the node is a reference node, then the Tx Framer also has to transmit the cell packets accumulated in the reference node relay FIFO buffer.

In order to perform the above listed functions the Tx Framer needs the following basic modules:

Preamble ROM

Relay FIFO (used in RN only)

Tx time slot allocation RAM and control

Tx Framer Controller

Figure 83:
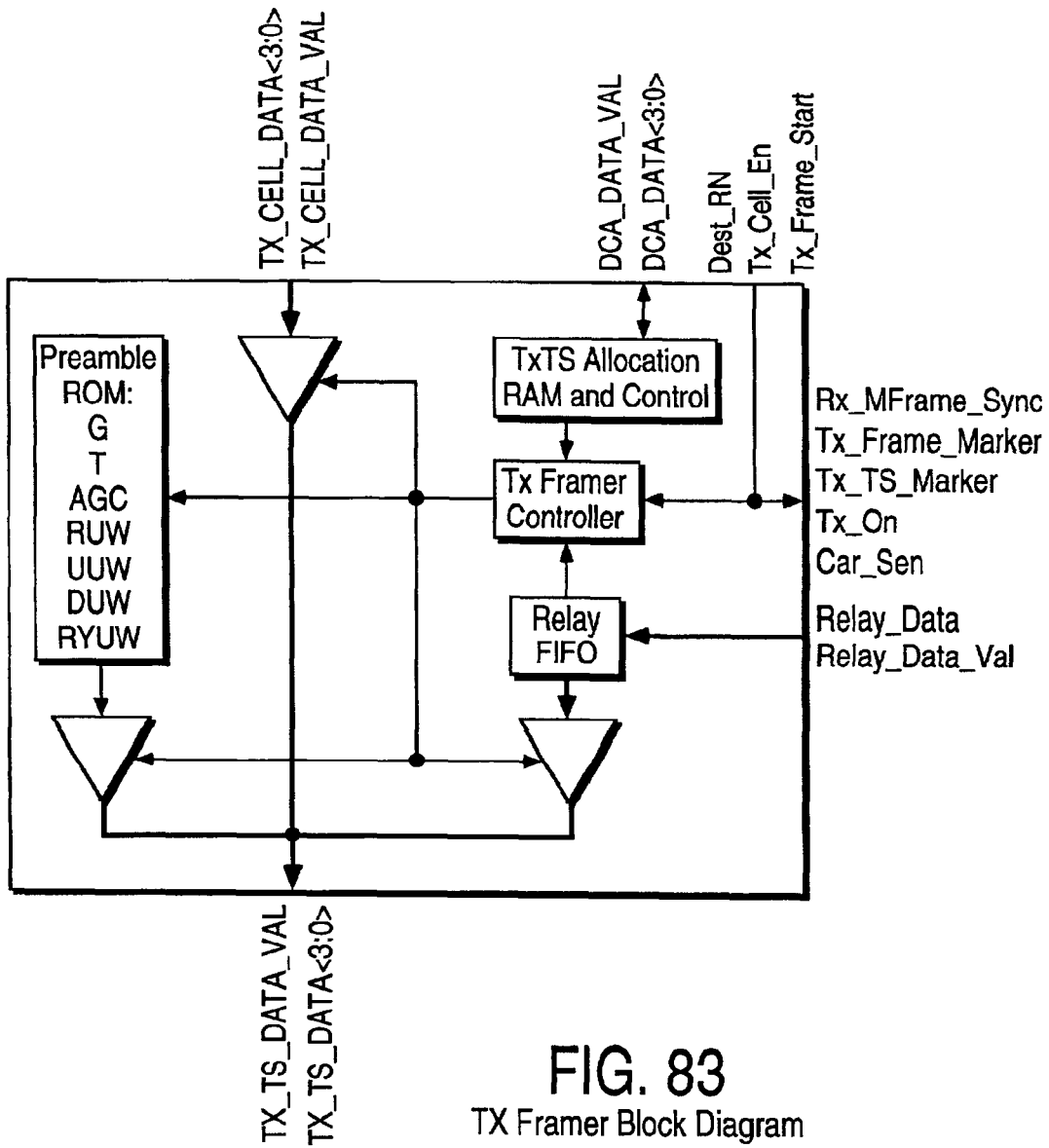
FIG. 83 is an illustration of the Transmit Framer Block Diagram.

The block diagram of the Tx Framer is shown in FIG. 83, and the general functional description is given in the following sections.

Preamble ROM

The Preamble ROM holds the pattern of the guard time, training and unique word sequences.

Relay FIFO (used in RN only)

If the node is a reference node, then the relay FIFO of 16 cell packets size (based on HW resources) is used to store the relayed cell packets until the next downstream transmission.Tx Time Slot Allocation RAM and Control This block is responsible for setting up and updating the node's transmit time slot allocation based on information from DCA block. IF DCA_Data_Val='1' then the parameters from DCA_Data are loaded to DCA RAM. The new DCA parameters will be effective during the next frame.

Tx Framer Controller

Figure 84:
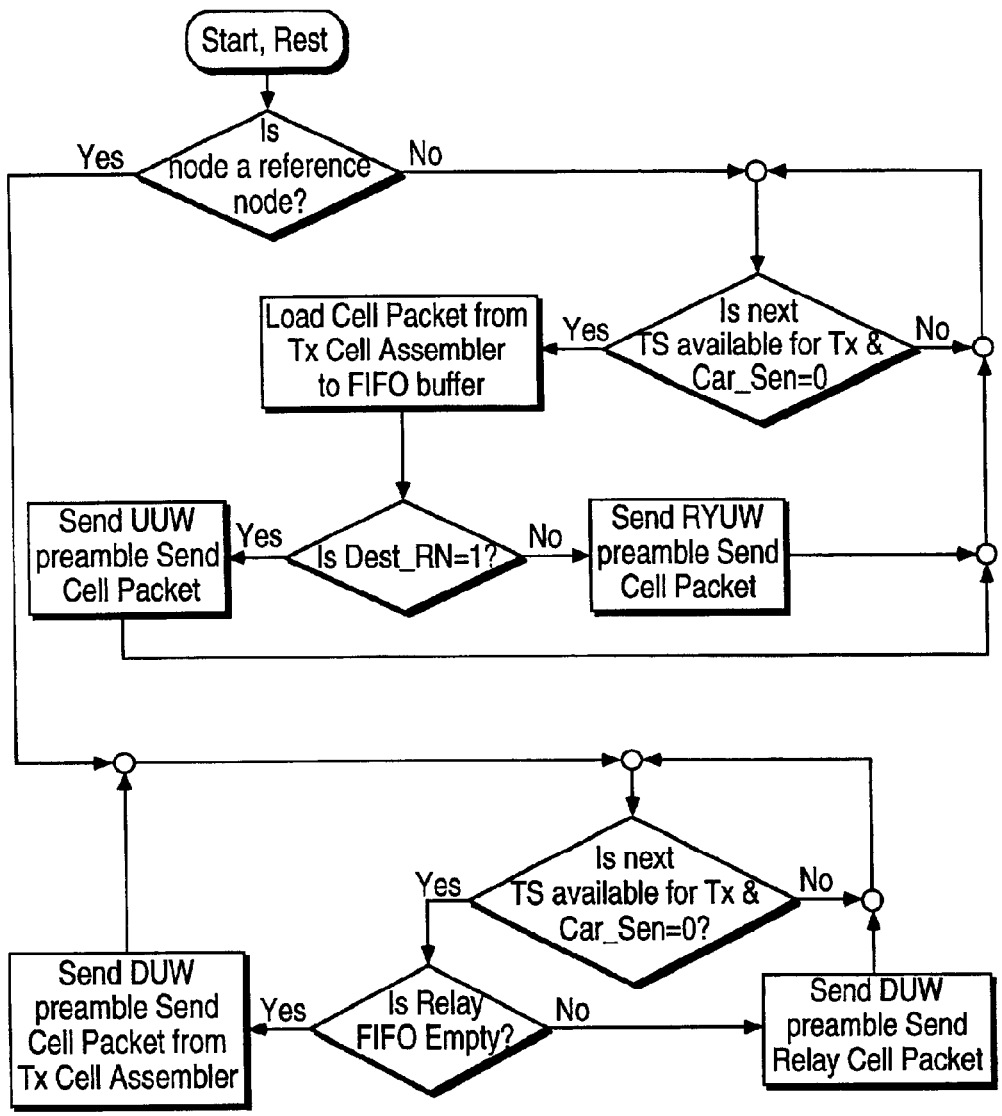
FIG. 84 is an illustration of the Tx Framer Control Flow Chart.

The Tx Framer Controller, based on the information from external control signals and the internal status of the modules, generates gating signals to transmit the properly formed data burst. The flowchart describing the controller operation is shown in FIG. 84.

Modem

U. Overview

This section discusses the functional requirements of the Burst-Mode Modem. Tomlinson-Harashima Precoding and FFE pre-distortion are used to equalize channel distortion. Forward Error Correction (FEC) coding is (TBD). The same equalizer and Tx filters are used in the I and Q channels.

The Modem shall include the following functions and parameters:

Modulation Technique: 16QAM

Equalization Technique: Pre-equalization

The carrier frequency ($f_c$) is selected to be equal to symbol frequency ($f_{sym}$)

$f_c = f_{sym} = 25$ MHz

Figure 85:
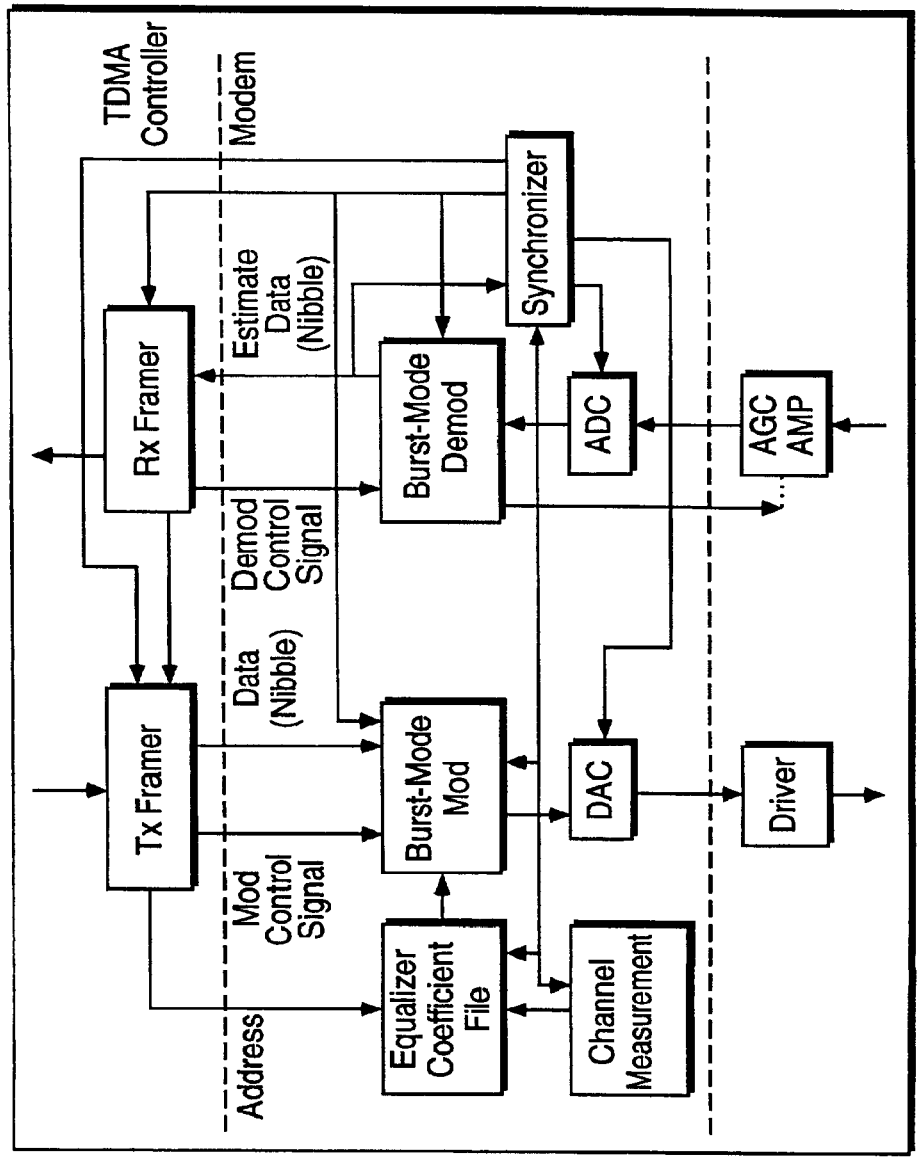
FIG. 85 is an illustration of the Burst-Mode Modem Block Diagram.

The sampling frequency ($f_{sa}$) is selected to be 4 times $f_{sym}$ $f_{sa} = 4 f_{sym}$ FIG. 85 shows the block diagram of the Burst-Mode Modem. The shaded blocks belong to modules that are discussed in other sections of this document.

At the transmit side, Burst-Mode MOD receives data from Tx Framer in the form of nibble (TX_TS_DATA [3:0]) together with an internal address (TX_INT_ADD_SYNC [3:0]) of the destination node and a data valid signal (TX_TS_DATA_VAL). When MOD receives TX_TS_DATA_VAL asserted from Tx Framer, it has to start processing and transmit the data TX_TS_DATA[3:0] from Tx Framer using a set of equalizer coefficients corresponding to the channel matching the destination address TX_INT_ADD_SYNC [3:0]. MOD maps input nibble to I (in phase) and Q (quadrature) PAM4 signals (assuming QAM16), encodes these signals by TCM Encoder if required (TBD). These signals are pre-distorted (to compensate for channel distortion) using a pre-equalizer. Tomlinson-coding and Feed Forward Equalizer (FFE) are used in the pre-equalizer. These pre-distorted signals are interpolated and passed through a band-limited shaping filter (square-root raised cosine filter) and then through a modulator. The modulated I and Q signals are combined and filtered with a X/SIN(X) FIR filter to pre-distort the signal before performing digital to analog conversion. This pre-distortion is introduced to compensate the distortion introduced by D/A conversion.

At the receive side, the AGC amplifier receives data from the bus with the gain of the amplifier controlled by DEMOD. This amplified analog signal is converted to digital format with maximum DC offset less than TBD. The recovered I and Q data are passed through matched filters. These filters are matched to the Tx shaping filters. If the transmit filter S coefficients are denoted by $h_k$, k=0, 1, 2, ..., N-1, then the corresponding receive matched filter coefficients are given by $h_k$, k=N-1, ..., 2, 1, 0. Outputs of matched I and Q filters are decimated and estimated. The estimated data are decoded and transmitted to Rx framer in the form of nibble.

Burst-Mode DEMOD runs algorithm at the beginning of each time slot to control the AGC amplifier's gain. To activate these algorithms at the beginning of each time slot, DEMOD needs to know the beginning of each time slot that has been achieved by Rx Framer given by signal RX_TS_BURST_SYNC (TBD?).

V. Interface to other Blocks

TDMA Controller

Interface between Burst-Mode MOD and Tx Framer

MOD receives the following signals from Tx Framer:

TX_INT_ADD_SYNC [3:0]: Tx Framer sends the address of the destination terminal node to the MOD. MOD needs this address in order to download a set of coefficients corresponding to the destination terminal node. For the prototype, 16 terminals are assumed on the bus so this address is 4-bit wide TX_TS_DATA [3:0]: Tx framer sends 4-bit wide (nibble) data to MOD TX_TS_DATA_VAL: Tx framer sends a one-bit wide control signal to MOD in order to control the transmission of valid data Interface between Burst-Mode DEMOD and Rx Framer RX_TS_DATA [3:0]: DEMOD sends a 4-bit wide (nibble) data signal to Rx framer RX_TS_BURST_SYNC: DEMOD receives a one-bit wide control signal from the Rx framer. Rx framer sends this control signal at the beginning of each time slot.

DEMOD requires this control signal to run AGC control algorithms at the beginning of each time slot Analog Front-End Interface between Burst-Mode MOD and DAC MOD sends data to DAC at sampling rate. Bit-width of this interface is TBD NOTE: Bit-width of this interface will be chosen after performing software Interface between Burst-Mode DEMOD and ADC DEMOD receives data from ADC at sampling rate. Bit-width of this interface is TBD NOTE: Bit-width of this interface will be chosen after performing software W. Internal Interface between all Sub-blocks Interface between Burst-Mode DEMOD and Synchronizer The following are interface signals between the DEMOD and Synchronizer blocks:

FSA_RECOV: DEMOD receives recovered sampling clock from Synchronizer for the operation of demodulation.

FSYM_RECOV: DEMOD receives recovered symbol clock from synchronizer for the operation of decimation and estimation of the signal at the output of the matched filter.

FSYM_2X_RECOV: DEMOD receives clock with half the frequency of symbol clock.

I, Q: DEMOD sends N (TBD?)-bit wide I and Q data symbols to the synchronizer for clock recovery operation.

Interface between Burst-Mode MOD and Synchronizer:

MOD receives the following clock signals from the Synchronizer:

FSYM_SYS: MOD receives symbol clock from synchronizer. Symbol clock is used for TCM encoding (optional) and Tx filtering (the designed Tx filter operates at symbol clock).

FB_SYS: MOD receives sampling clock from Synchronizer. Sampling clock is used for the multiplexing of I and Q signals.

FSYM_2X_SYS: Half of symbol clock for equalizer

Interface between Burst-Mode MOD and Equalizer Coefficient File

Equalizer Coefficient File block receives symbol clock from Synchronizer, in order to store and download coefficients of the equalizer.

Interface between Equalizer Coefficient File and Channel Measurement

Equalizer Coefficient File receives sets of coefficients from Channel Measurement. Sets of coefficients are transferred in serial fashion, one coefficient per clock cycle. Bit-width of this interface depends on the coefficients and is TBD.

NOTE: Bit-width of this interface will be chosen after performing software

X. Burst-Mode Mod

Figure 86:
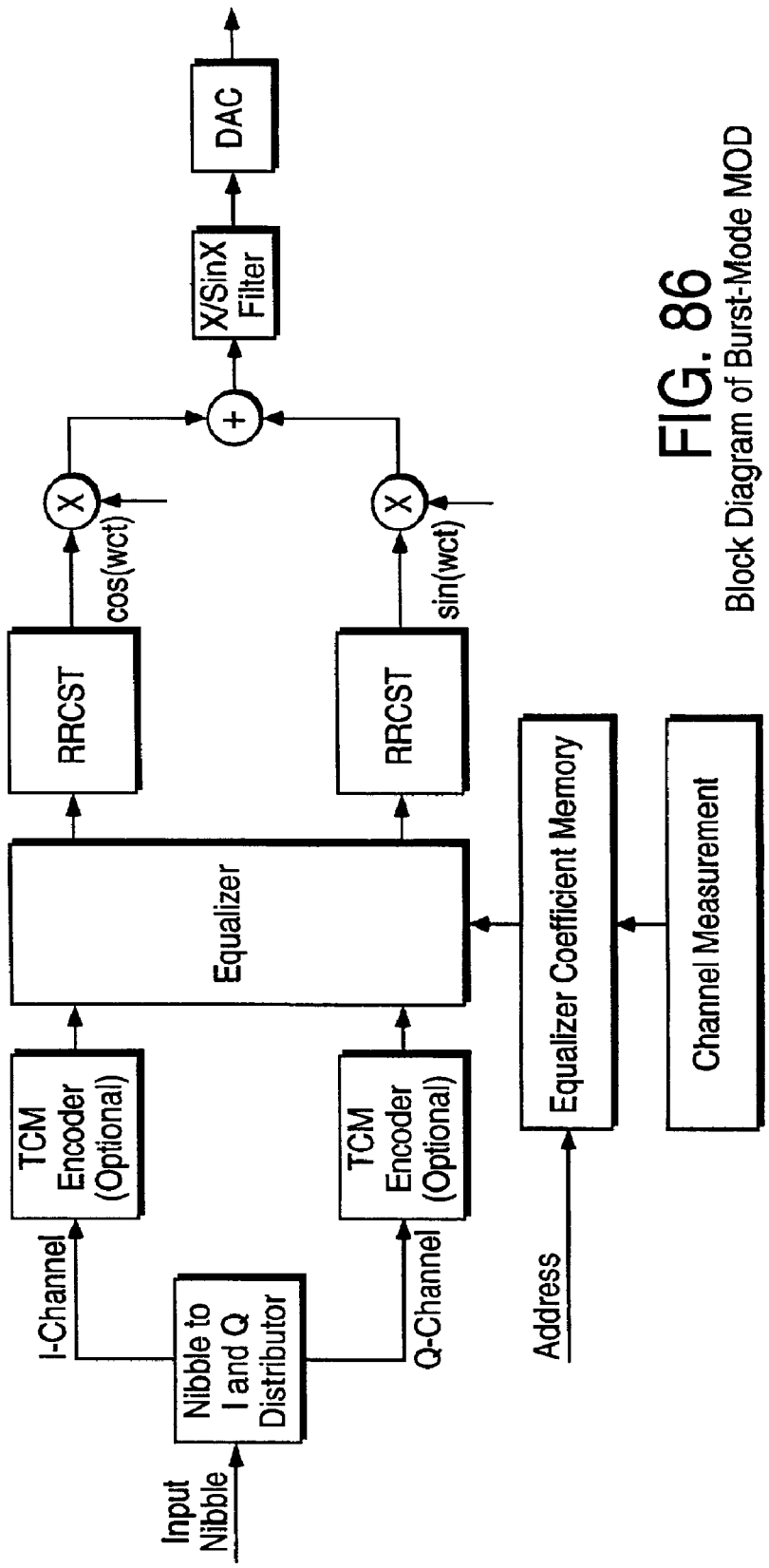
FIG. 86 is an illustration of the Block Diagram of Burst-Mode Modulator.

FIG. 86 depicts the processing modules within the MOD function. The following sub-sections describe the details functions of each module.

Modulation Format

The modulator shall provide 16QAM modulation format.

Carrier Frequency

The nominal carrier frequency shall be 25 MHz. The exact carrier frequency tolerance is given by the Synchronizer section.

Symbol Rate

The modulator shall provide 16QAM at nominal 25 M-sym/s. The exact symbol frequency tolerance is given by the Synchronizer section.

Symbol Mapping

The input data from Tx Framer to MOD is in nibble format to be modulated into a QAM signal modulator with separate I and Q components at the input. Two least significant bits are assigned to the I-channel and two most significant bits are assigned to the Q-channel (This is only true for 16QAM).

Input I and Q data are mapped to Pam4 using natural mapping. This mapping helps to reduce implementation complexity of the AGC control algorithm in the DEMOD. Table 8 and Table 9 specify the actual mapping.

TABLE 8

Input to I-Channel Mapping (QAM16)

| TX_TS_DATA [1]: | TX_TS_DATA [0]: | I-Channel |
|---|---|---|
| 1 | 1 | 3 |
| 1 | 0 | 1 |
| 0 | 1 | −1 |
| 0 | 0 | −3 |

TABLE 9

Input to Q-Channel Mapping (16QAM)

| TX_TS_DATA [3]: | TX_TS_DATA [2]: | Q-Channel |
|---|---|---|
| 1 | 1 | 3 |
| 1 | 0 | 1 |
| 0 | 1 | −1 |
| 0 | 0 | −3 |

Forward Error Correction (FEC) Coding

Data symbols may be coded using TCM encoder (TBD).

Pre-Equalization

Figure 87:
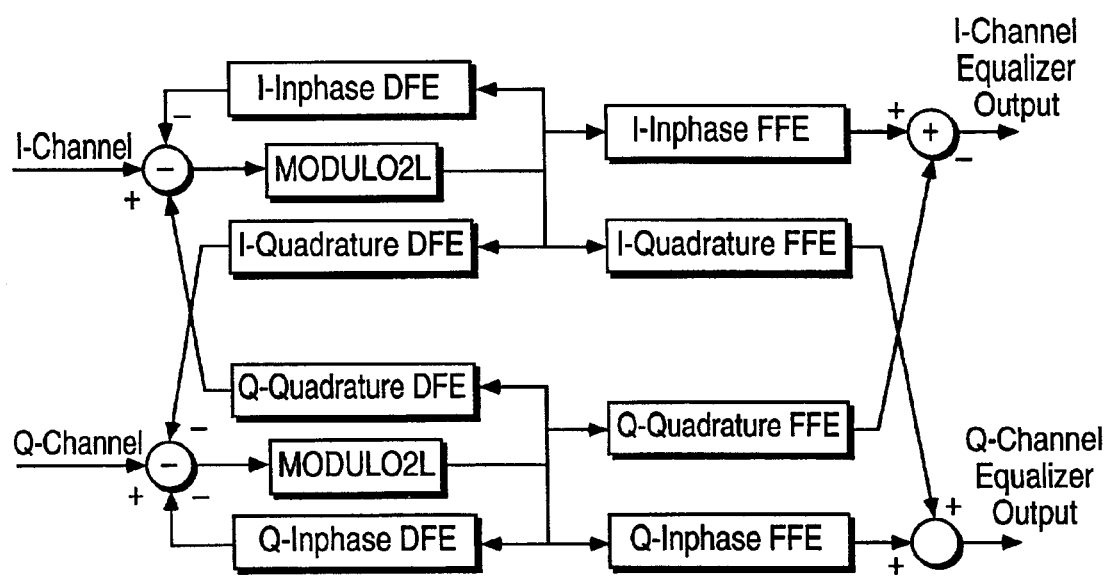
FIG. 87 is an illustration of the Block Diagram of the Equalizer.

FIG. 87 depicts the Pre-Equalizer. Tomlinson-Harashima pre-coding and Feed Forward Equalizer (FFE) are used to pre-distort the signal in order to compensate the distortion of the channel. Tomlinson-Harashima pre-coding prevents error propagation through DFE at the receiver side. Quadrature FFE equalizes the distortion of the channel introduced by orthogonal signals. The equalizer coefficients need to be periodically computed based on measurements of channel responses gathered through channel probing pulses. This is discussed in the other sections of the document.

DFE

TBD: we need to provide detailed structure of the DFE block

FFE

TBD: we need to provide more detailed structure of the FFE block

MODULO2L

MODULO2L limits the signal power. For QAM16, assuming threshold amplitude levels of signals are {3, 1, −1, −3}, MODULO2L can be described as Step1: If signal level is greater than zero, go to step 2 else go to step 4

Step2: If signal level is greater than 4, subtract 8. Repeat this step until signal level is less than or equal to 4.

Step3: Exit the loop

Srep4: If signal level is less than or equal to −4, add 8. Repeat this step until signal level is greater than −4.

Step5: Exit the loop

Transmit Filter

I and Q signals are passed through shaping filters. Each shaping filter is a square-root raised cosine filter with the following function and parameters:

$X(t) = [(\sin(\pi t/T))/(\pi t/T) * \cos(\beta \pi t/T)/(1-4\beta^2 t^2/T^2)]^{1/2}$ $\beta = 0.3$ (TBD)

Channel width at −30 dB bandwidth is 25 MHz*1.3=32.5 MHz (TBD) where T is the symbol period and β is the roll-off factor.

Quadrature Modulation

The carrier frequency is selected to be equal to symbol rate and ¼ of sampling frequency ($f_c = f_{sym} = ¼ f_{sa}$). The relationship between these frequencies is selected with an intention to simplify circuit design as shown below. Let $\tau$ be the sampling period and k is the discrete time variable, $$z(k\tau)=I(k\tau)\cos(w_c k\tau)+Q(k\tau)\sin(w_c k\tau)=I(k\tau)\cos(2\pi f_c k\tau)+Q(k\tau)\sin(2\pi f_c k\tau)=I(kt)\cos(2\pi/4f_{sa}k\tau)+Q(kt)\sin(2\pi/4f_{sa}k\tau)$$

Since $f_{sa}*\tau=1$, $$\Rightarrow z(k\tau)=I(k\tau)\cos(2\pi/4k)+Q(k\tau)\sin(2\pi/4k)$$

TABLE 10

Modulator Output vs. Time (k$\tau$)

| k | z(k$\tau$) |
|---|---|
| 0 | I |
| 1 | Q |
| 2 | −I |
| 3 | −Q |

With this selection of carrier frequency ($f_c$), the multiplication of Cosine and Sine becomes simple. From Table 10 above, one can see that at any given time the output is either ±I or ±Q but never a combination of both. So, the combiner block can now be realized as a simple multiplexer of the I or Q channel inputs or their negated values.

X/SIN(X) Pre-Distortion

Digital to analog converter (DAC) introduces an inherent SIN(X)/X distortion into the spectrum of signals being converted that can cause performance degradation. A X/SIN (X) compensation filter is needed to cancel the effect of SIN(X)/X distortion. This filter shall be designed to meet the following characteristics:

Compensation bandwidth of the X/SIN(X) filter is limited to less than $0.45f_{sa}$ (sampling frequency).

Filter length is restricted to be odd since even length linear phase FIR filters have the property that $H(e^{j\pi})=0$ which is not acceptable for the SIN(X)/X compensation filter.

DAC

This is covered in the Analog Front End section.

Y. Burst-Mode Demod

Figure 88:
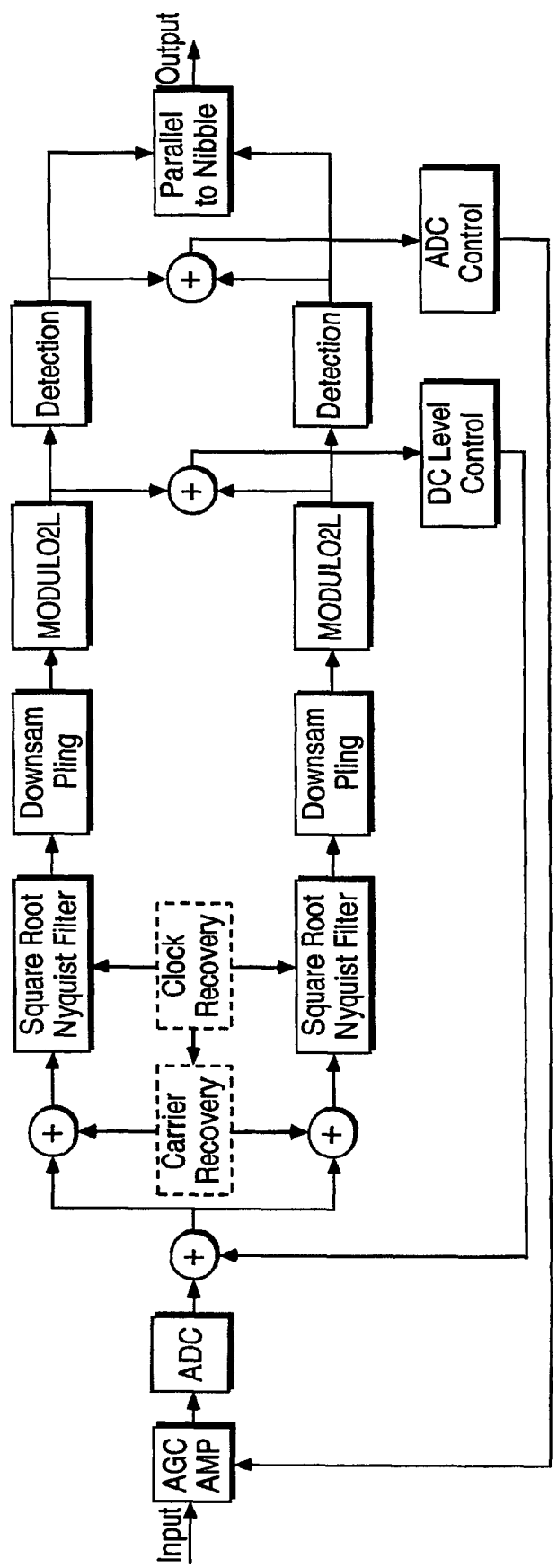
FIG. 88 is an illustration of the Block Diagram of Burst-Mode Demodulator.
Figure 89:
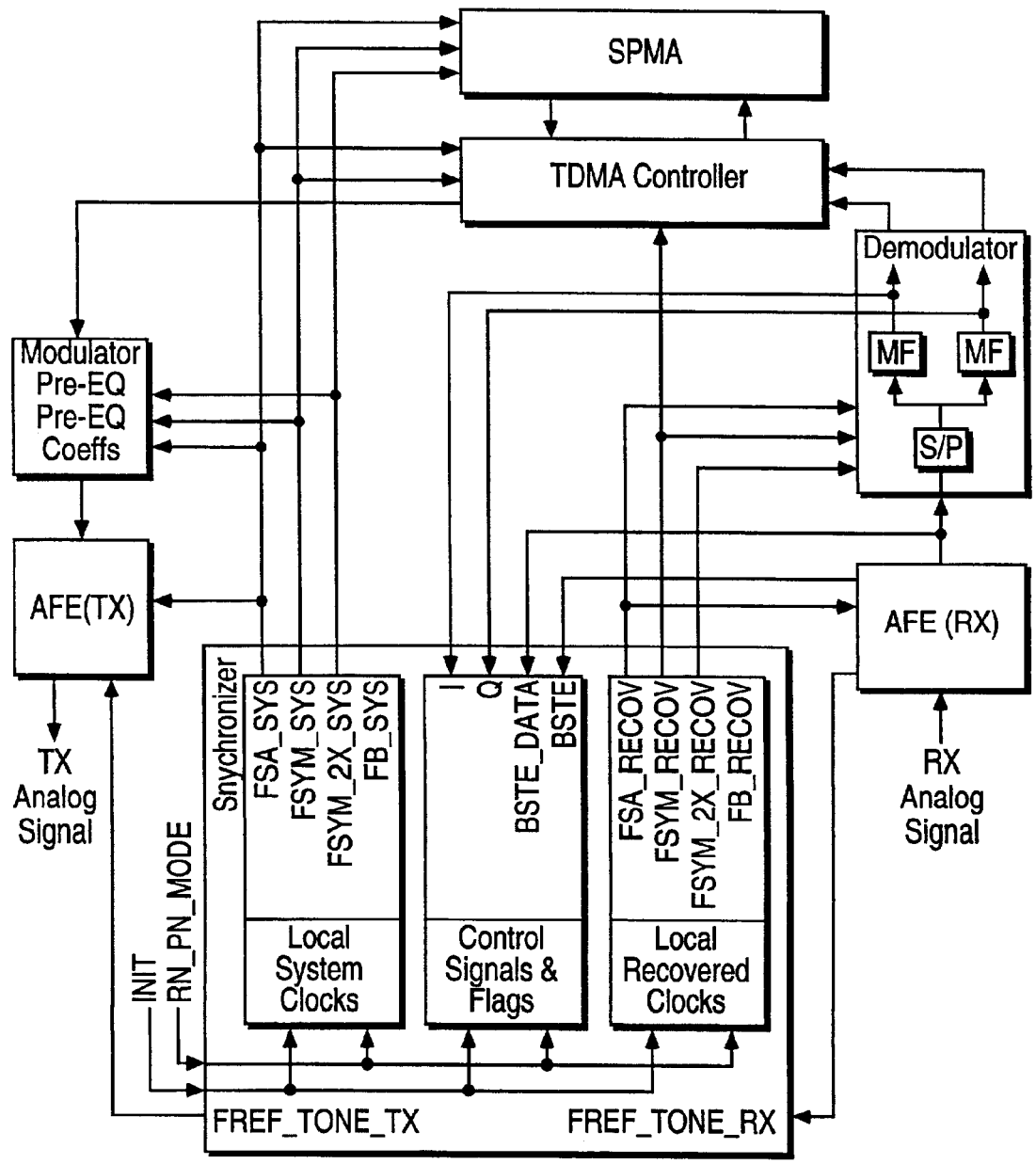
FIG. 89 is an illustration of the Synchronizer Block & Interface Diagram.
Figure 90:
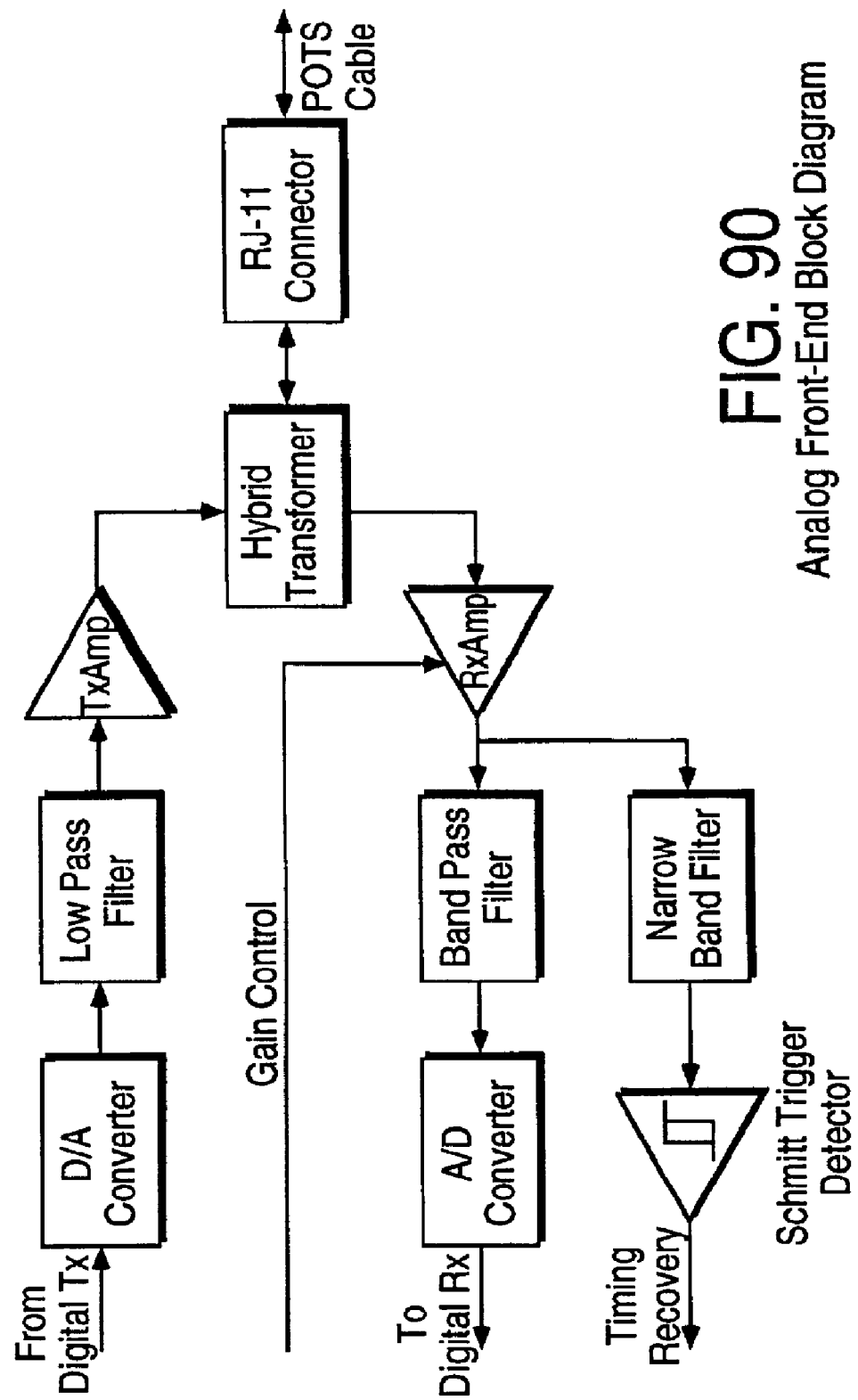
FIG. 90 is an illustration of the Analog Front End Block Diagram of the System.

FIG. 88 depicts the modules within the Burst-Mode Demod. The following sub-sections provide functional details of each module.

AGC

AGC is required to allow the system to operate over a wide input dynamic range while maintaining the output signal at a constant level. AGC is needed because the slicer within the receiver uses amplitude thresholds to make its decision. These thresholds level must remain constant over the entire dynamic range of the input signals. When the telephone is picked up or when the bell rings, the amplitude level of the signal varies. The AGC amplifier compensates for these variations.

DC shift of the signal may cause wrong estimations at the slicer. This shift has to be controlled by DC level control algorithm/circuit to limit the DC offset to less than TBD.

ADC

This is covered in the Analog Front End section

Quadrature Demodulation

Assuming phase alignment between the received signal and receiver sampling, the Cosine function has values (1, 0, −1, 0) and Sine function has values (0, 1, 0, −1). The task of multiplication with Cosine and Sine is very simple. The $1^{st}$ sample is kept the same and denoted as I sample, $2^{nd}$ sample is kept the same and denoted as Q sample, $3^{rd}$ sample is negated and denoted as I sample, $4^{th}$ sample is negated and denoted as Q sample, and so on.

Matched Filter

The filters used in the I and Q channels of DEMOD are matched filters of the shaping filters used in the I and Q channels of MOD. Since 33 coefficients long square root raised Cosine shaping filters are used in MOD, the matched filters here have 33 coefficients. Because of using special carrier frequency (4 times sampling rate), the local carrier Cosine has values of (1, 0, −1, 0) and Sine have values (0, 1, 0, −1) at sampled points. This makes half of the samples entering I and Q channels of the demodulator to have values of zeros. This enables us to shorten the filter length by half without affecting the performance of demodulation.

MODULO2L

DEMOD receives the symbol clock from Synchronizer. This clock picks one correct sample (at maximum eye opening) out of four samples. This selected sample is passed to the MODULO2L block. Output of MODULO2 is passed to Slicer.

The function of MODULO2L is described in a previous section

Slicer

Slicer compares the amplitude of input signal with threshold amplitudes and makes quantized levels decision. 2-bit outputs of I and Q channels form Estimated Data Nibble. 2 least significant bits of the nibble are output of the I-slicer and 2 most significant bits of nibble are output of the Q-slicer.

Synchronizer

Z. Overview

The Reference Node (RN) synchronizer is responsible for generating and distributing clocks locally at the RN. The Plain Node (PN) synchronizer is responsible for recovering, regenerating and distributing clocks locally at the PN. All nodes must be able to synchronize in phase and frequency between themselves by using the synchronizer. FIG. 2 is the Synchronizer Block & Interface Diagram AA. Interface to SPMD and SPMA Signal Definitions FSA_SYS: is a continuous clock that provides the local node with a system sampling clock. It is equal to 4 times FSYM_SYS and phase aligned with it. It is sourced by the PHY.

FSYM_SYS is a continuous clock that provides the local node with a system symbol-rate clock. It is sourced by the PHY.

The FSYM_SYS frequency shall be equal to 25 Mbaud ±100 ppm. The duty cycle shall be between 35% to 65% inclusive.

Jitter on this clock shall not exceed _____ ps.

Note: The carrier frequency will be selected equal to or 3 times the value of FSYM_SYS.

FSYM_2X_SYS: is a continuous clock that provides the local node with a clock equal to 2 times FSYM_SYS. It is sourced by the PHY. It is phase aligned with FSYM_SYS.

FB_SYS: is a continuous clock that provides the local node with a clock equal to the data rate. It is sourced by the PHY.

It is phase aligned with FSYM_SYS. It is equal to 4 times FSYM_SYS in the case of 16QAM, and 2 times FSYM_SYS in the case of QPSK.

Note: FB_SYS is temporarily available here for modulation schemes up to QPSK and 16QAM, but provisions should be made if modulation formats higher than 16QAM are anticipated.

FSA_RECOV: is a continuous clock that provides the sampling clock reference recovered locally. It is sourced by the PHY.

It is phase aligned with FSYM_RECOV. It may be in phase or inverted with respect to FSA_SYS to account for phase variations between the communicating nodes (this phase will generally vary from burst to burst).

FSYM_RECOV: is a continuous clock providing the symbol-rate clock recovered locally from the received burst's synchronization preamble. It is continuous for the burst being processed. FSYM_RECOV is sourced by the PHY. FSYM_RECOV samples the received symbols at the optimum points.

It is not assumed to be phase synchronized with FSA_SYS or other *_SYS clocks. It is phase synchronized to FSA_RECOV.

The minimum high and low times of FSYM_RECOV shall be 35% of the nominal symbol-rate clock period under all conditions.

Jitter on this clock shall not exceed ____ ps.

FSYM_2X_RECOV: a continuous clock providing the symbol-rate clock recovered. It is sourced by the PHY. It is phase synchronized with FSYM_RECOV.

FB_RECOV: is a continuous clock providing the data-rate clock recovered locally. It is continuous for the burst being processed. FSYM_RECOV is sourced by the PHY.

It is not assumed to be phase synchronized with FSA_SYS or other *_SYS clocks. It is phase synchronized to FSYM_RECOV.

Note: FB_SYS is temporarily available here for modulation schemes up to QPSK and 16QAM, but provisions should be made if modulation formats higher than 16QAM are anticipated.

BSTE: the Burst Synchronization Training Enable (BSTE) is an active-HIGH control signal providing the synchronizer with the start of the synchronization preamble for the current burst.

BSTE_DATA: is the data sequence used for burst synchronization. It is used for clock phase synchronization. It may optionally be employed for carrier phase synchronization (when required by system).

RN_PN_MODE: is an active-HIGH control signal causing the node to operate as and RN (HIGH) or a PN (LOW). This signal is determined prior to system startup for a manual configuration, or during system startup for a reconfigurable design.

INIT: is an active-HIGH signal triggering the node synchronizer to enter its initialization mode (HIGH) or remain in its normal operating mode (LOW).

FREF_TONE_TX: is a reference clock signal generated by the RN during initialization mode (INIT=HIGH). It may take any value derived from the symbol-rate frequency (see Table 11). It must not interfere with existing systems on the lines, e.g., POTS (DC to 3.4 kHz), ADSL (25 kHz to 1.1 MHz), etc.

TABLE 11

Acceptable FREF_TONE_TX Clock Frequencies

| FSYM_SYS (Mbaud) | Power-of-2 Divider | FREF_TONE (MHz) |
|---|---|---|
| 25 | 8 | 3.1250 |
| 25 | 4 | 6.2500 |
| 25 | 2 | 12.5000 |
| 25 | 1 | 25.0000 |

FREF_TONE_TX is transmitted to all other nodes so that they may synchronize their carrier frequency and phase to the RN system frequency.

FREF_TONE_TX is sourced by the PHY. It is phase-aligned locally with FSA_SYS.

FREF_TONE_RX: is the received reference clock signal at the PN, i.e., the received version of FREF_TONE_TX transmitted by the RN, to which the PN synchronize must lock during its initialization mode (INIT=HIGH).

I: are the in-phase demodulated samples used during carrier phase synchronization. The arrival rate of these samples is FSA_RECOV/2.

Q: are the quadrature demodulated samples used during carrier phase synchronization. The arrival rate of these samples is FSA_RECOV/2.

RN Synchronizer Mode—Initialization (TX)

RN_PN_MODE is asserted (HIGH).

INIT is enabled (HIGH).

FREF_TONE_TX is active (TX mode).

FREF_TONE_RX is inactive.

Nominal *_SYS clock are used locally.

*_RECOV clocks default to *_SYS clocks.

BSTE is not used.

BSTh_DATA is not used.

I, Q are not used.

The sampling clock (FSA_SYS) at which the RN synchronizer runs during node initialization will equal the nominal sampling frequency of the local oscillator.

Note: RN should receive acknowledgements from PNs in order to indicate that they have frequency and phase-locked to FREF_TONE_TX transmitted by RN.

BB. PN Synchronizer Mode—Initialization (RX)

RN_PN_MODE: is de-asserted (LOW).

INIT is enabled (HIGH).

FREF_TONE_TX is inactive.

FREF_TONE_RX is active (RX mode).

Nominal *_SYS clock are used locally.

*_RECOV clocks default to *_SYS clocks.

BSTE is not used.

BSTE_DATA is not used.

I, Q are not used.

The sampling clock (FSA_SYS) at which the PN synchronizer runs during node initialization will equal the nominal sampling frequency of the local oscillator, until frequency lock to FREF_TONE_RX is achieved.

Note: PNs should generate acknowledgements to RN in order to indicate that they have frequency and phase-locked to FREF_TONE_TX transmitted by RN.

CC. Normal Operation of Synchronizer (TX)—All Nodes

The transmitting side of the synchronizer will supply the following clocks to the local SPMD and SPMA layers:

FSYM_SYS

FSYM_2X_SYS

FSA_SYS

FB_SYS

DD. Normal Operation of Synchronizer (RX)—All Nodes

The receiving side of the synchronizer will be supplied with the following clocks:

FSYM_SYS

FSYM_2X_SYS

FSA_SYS

FB_SYS

The receiving side of the synchronizer will process the synchronization preamble included with each received burst and recover the following signals:

The clock phase of the current burst relative to its local system clock reference (*_SYS);

The clock frequency refresh if the burst is a reference burst (RB) originating from the RN (see section _____ on frame formatting);

The carrier phase of the received burst (optional if pre-EQ accounts for this).

EE. Normal Operation of Synchronizer (TX)—Additional Requirements for RN Synchronizer The following additional tasks need to be performed by the RN:

The RN must periodically refresh the carrier frequency or the symbol frequency at all the PN.

The RN must periodically refresh the carrier phase at all the PN.

FF. Normal Operation of Synchronizer (RX)—Additional Requirements for PN Synchronizer The following additional tasks need to be performed by the RN:

The PN must operate using its nominal system frequencies in case it fails to lock to the signal present at FREF_TONE_RX. An alarm will be generated.

GG. Preamble Sequence Design

During normal operation, the RN and PN synchronizer will synchronize to the received bursts via a T-bit preamble sequence composed of maximally distant alternating QPSK symbols, or an equivalent transition-rich UW sequence:

The length of this preamble shall be _____ symbols (bits). (TBD by simulation)

The pattern is 0x _____.

Analog Front End

HH. Functional Description

The Analog Front End is an interface between digital transceiver and the physical POTS cable network. The transmitter and receiver use the same frequency spectrum, however, they operate in different times (TDD mode). The general block diagram of the analog front end is shown in Fibure 90, and Table 12 presents its characteristic parameters. The Digital to Analog Converter is sampled at 100 Mhz rate with the FSA_SYS signal. The Low Pass Filter removes the replicas of the pass-band signal above the Nyquist frequency and interpolates between the samples. The TxAmp amplifies the signal to the desired level, and the hybrid transformer passes the Tx signal through RJ-11 connector to the POTS cable network. The hybrid transformer prevents the transmitted signal from entering the receiver section of the same transceiver. The received signal passes through the RJ-11, and the hybrid transformer to the RxAmp. The amplitude of the RxAmp is controlled by the digital Demod circuit, and the amplified received signal is passed through band pass filter to the analog to digital converter of the Demod. The AID converter is sampled by the recovered clock signal FSA_RECOV at the rate of 100 MHz. The narrow band filter and the Schmitt trigger detector are used for timing recovery and start-of-burst detection purposes.

TABLE 12

Parameters of the Analog Front End

| Parameter | Value |
| --- | --- |
| Tx Low Pass Filter Characteristics | TBD |
| Rx Band Pass Filter Characteristics | TBD |
| Narrow Band Filter Characteristics | TBD |

TABLE 12-continued

Parameters of the Analog Front End

| Parameter | Value |
| --- | --- |
| Transmission Levels | 7.4 Vpp |
| Minimum Received Signal-to-Noise Ratio | TBD |
| Design Bandwidth | 32.5 MHz |
| Amplitude Ripple | 3 dB within the design bandwidth |
| Analog Input/Output Impedance | 100 Ohms |
| Output Return Loss/Hybrid Isolation | TBD |

Equalizer Coefficient File

II. Overview

The equalizer coefficient file is a key block for realizing equalization over the channel. It can be derived and utilized based on the following assumption:

Using the measured channel data, the optimum weight coefficients for both Tomlinson Harashima Precoding (THP) and feed-forward equalizer (FFE) can be evaluated and saved somewhere as files The power of the weight coefficients for the FFE will be normalized so that the FFE has unit power (the square sum of the weight coefficients is one)

Note: Such arrangement is based on the assumption that the adaptive gain control (AGC) at the receiver can enhance the power of a slicer to make decision properly. (To be confirmed).

For each pair of nodes, a set of optimum weight coefficients is needed

During transmission, the corresponding coefficient file for the current destination can be loaded to THP and FFE JJ. Functional Description Optimum Weight Coefficients Here, we consider the evaluation of optimum weight coefficients in a channel for one pair of nodes. The evaluation over other channels is exactly the same.

Case 1: PAM Signal

Suppose that the measured channel plus background noise for the i-th trial is:

$$C(i) = H + N(i)$$

where $C(i) = [c_1(i), c_2(i), \ldots, c_L(i)]^T$, $H = [h_1, h_2, \ldots, h_L]^T$ is the sampled (in symbol rate) vector of the channel impulse response, and $[.]^T$ denotes the transpose of $[.]$. Here, we assume perfect time synchronization so that H appears the same regardless of the trial index i. $N(i) = [n_1(i), n_2(i), \ldots, n_L(i)]^T$ is the noise vector.

Assuming that the numbers of taps in THP and FFE are $N_{THP}$ and $N_{FFE}$, respectively, we construct two $N_{FFE} \times (L + N_{FFE} - 1)$ matrices, $\Phi_c(i)$ and $\Phi_H$, as:

$$\Phi_C(i) = \begin{bmatrix} c_1(i), & c_2(i), & \ldots, & c_L(i), & 0, & 0, & \ldots, & 0 \\ 0, & c_1(i), & c_2(i), & \ldots, & c_L(i), & 0, & \ldots, & 0 \\ \ldots & \ldots & \ldots & \ldots & \ldots & \ldots & \ldots & \ldots \\ 0, & 0, & \ldots, & 0, & c_1(i), & c_2(i), & \ldots, & c_L(i) \end{bmatrix}$$

$$\Phi_H = \begin{bmatrix} h_1, & h_2, & \ldots, & h_L, & 0, & 0, & \ldots, & 0 \\ 0, & h_1, & h_2, & \ldots, & h_L, & 0, & \ldots, & 0 \\ \ldots & \ldots & \ldots & \ldots & \ldots & \ldots & \ldots & \ldots \\ 0, & 0, & \ldots, & 0, & h_1, & h_2, & \ldots, & h_L \end{bmatrix}$$

To evaluate the optimum weight coefficients, the correlation matrix of the received samples in the conventional FFE and the correlation vector of the desired symbol with the received samples are required. They can be written as:

$$A = \Phi_H \Phi_H^T - \Phi_{THP} \Phi_{THP}^T + R$$

$$V = \Phi_H(D)$$

where R is the noise correlation matrix, $\Phi_H(D)$ is the D-th column vector of $\Phi_H$, D is the decision delay, and $\Phi_{THP}$ is the sub-matrix generated from $\Phi_H$ by selecting the column vectors from (D+1) to (D+$N_{THP}$). In Matlab expression, we have:

$$\Phi_{THP} = \Phi_H(D+1:D+N_{THP}).$$

Note: By using the above expressions for A and V, we have already assumed that the signal power and noise variance have been absorbed into $\Phi_H \Phi_H^T - \Phi_{THP} \Phi_{THP}^T$ and R, respectively. It suggests that in practical systems, the power used to measure the channel should be equal to the power used to transmit the information bearing data.

If we conduct the channel measurement many times and use the time-averaged data to approximate the statistical mean, we have:

$$\Phi_{THP} \cong \frac{1}{t} \sum_{i=1}^{t} \Phi_C(i, D+1: D+N_{THP})$$

$$A \cong \frac{1}{t} \sum_{i=1}^{t} \Phi_C(i) \Phi_C^T(i) - \Phi_{THP} \Phi_{THP}^T$$

$$V \cong \frac{1}{t} \sum_{i=1}^{t} \Phi_C(i, D)$$

where t is the number of trials, $\Phi_c(i,D+1:D+N_{THP})$ denotes the sub-matrix of $\Phi_c(i)$ by selecting the column vectors from (D+1) to (D+$N_{THP}$), and $\Phi_c(i,D)$ denotes the D-th column vector of $\Phi_c(i)$.

The optimum weight coefficients for FFE and THP (same as in the conventional DFE) are:

$$W_{FFE} = A^{-1} V$$

$$W_{THP} = \Phi_{THP}^T W_{FFE}$$

Case 2: QAM Signal

The following calculation follows a note "Notes on Calculation of QAM DFE" (J. F. Weng, July 1999) which is a little bit different from that used in "DSL Simulation Techniques and Standards Development for Digital Subscriber Line Systems" (W. Y. Chen, 1998) for calculating the optimum weight coefficients in QAM. (Comparison will be done later to see the difference and the effect on performance)

The calculation can be shown similar to that for PAM signal discussed above while bearing in mind that the signals discussed below for QAM signals are all complex-valued signals.

Suppose that the measured channel plus background noise for the i-th trial is:

$$C(i) = H + N(i)$$

where $C(i) = [c_1(i), c_2(i), \ldots, c_L(i)]^T$, $H = [h_1, h_2, \ldots, h_L]^T$ is the sampled (in symbol rate) vector of the channel impulse response, and $[.]^T$ denotes the transpose of $[.]$. Here, we assume perfect time synchronization so that H appears the same regardless of t. $N(i) = [n_1(i), n_2(i), \ldots, n_L(i)]^T$ is the noise vector.

Assuming that the numbers of taps in THP and FFE are $N_{THP}$ and $N_{FFE}$, respectively, we again construct two $N_{FFE} \times (L+N_{FFE}-1)$ matrices, $\Phi_c(i)$ and $\Phi_H$, as in the case for PAM signal.

To evaluate the optimum weight coefficients, the correlation matrix of the received samples in the conventional FFE and the correlation vector of the desired symbol with the received samples are required. They can be written as:

$$A = \Phi^*_H \Phi_H^T - \Phi^*_{THP} \Phi_{THP}^T + R$$

$$V = \Phi^*_H(D)$$

where $(.)^*$ denotes the conjugate of $(.)$, R is the noise correlation matrix, $\Phi_H(D)$ is the D-th column vector of $\Phi_H$, D is the decision delay, and $\Phi_{THP}$ is the sub-matrix generated from $\Phi_H$ by selecting the column vectors from (D+1) to (D+$N_{THP}$), i.e., $$\Phi_{THP} = \Phi_H(D+1:D+N_{THP}).$$

Note: Again, by using the above expressions for A and V, we have already assumed that the signal power and noise variance have been absorbed into $\Phi^*_H \Phi_H^T - \Phi^*_{THP} \Phi_{THP}^T$ and R, respectively. In other words, it suggests that in practical systems, the power used to measure the channel should be equal to the power used to transmit the information bearing data.

If we conduct the channel measurement many times and use the time-averaged data to approximate the statistical mean, we have:

$$\Phi_{THP} \cong \frac{1}{t} \sum_{i=1}^{t} \Phi_C(i, D+1: D+N_{THP})$$

$$A \cong \frac{1}{t} \sum_{i=1}^{t} \Phi^*_C(i) \Phi_C^T(i) - \Phi^*_{THP} \Phi_{THP}^T$$

$$V \cong \frac{1}{t} \sum_{i=1}^{t} \Phi^*_C(i, D)$$

where t is the number of trials, $\Phi_c(i,D+1:D+N_{THP})$ denotes the sub-matrix of $\Phi_c(i)$ by selecting the column vectors from (D+1) to (D+$N_{THP}$), and $\Phi_c(i,D)$ denotes the D-th column vector of $\Phi_c(i)$.

The optimum weight coefficients for FFE and THP (same as in the conventional DFE) are:

$$W_{FFE} = A^{-1} V$$

$$W_{THP} = \Phi_{THP}^T W_{FFE}$$

Here, A is a complex-valued matrix and its inverse matrix can be practically evaluated as follows.

Suppose that $A = A_r + j A_q$ and its inverse $A^{-1} = A_r^I + j A_q^I$. We have:

$$A_r A_r^I - A_q A_q^I = I \text{ and } A_r A_q^I + A_q A_r^I = 0$$

Thus, if we construct a matrix $$Q = \begin{bmatrix} A_r & A_q \\ -A_q & A_r \end{bmatrix},$$

the matrix $$\begin{bmatrix} A_r^I & A_q^I \\ -A_q^I & A_r^I \end{bmatrix}$$

is its inverse matrix.

As a result, in order to find $A^{-1} = A_r^I + jA_q^I$, we may construct the matrix Q and then compute its inverse, from which we can easily obtain $A_r^I$ and $A_q^I$ of interest.

B. Web OS-General

By integrating the Com2000™ QoS Bandwidth Control Technology into the Real Time Clock chip of the PC motherboard, the new generation operating system such as Distributed Networking Operating Systems is possible. PCI Clock Synchronization from any PC to any other networked PC platform is then built-in to the system via the PCI/ENET Communication synchronization and controls. It is an important issue in supporting real-time services such as multimedia conferencing and wide area experiment control and monitoring. Another benefit comes to the Distributed and Remote Computing is the concept of Virtual Mainframe Distributed Applications and processing (Web OS)

1) Brief Summary of Web Operating System Techniques

The communications and security algorithms can now be used to enable a distributed web computing model software algorithm that will be used for Wireless Web Remote Computing and Data Delivery. The Com2000™ Wireless Common Web Information Environment (WOE) is a distributed internet operating environment. It is the "middleware" between the Com2000™ System and the host. As illustrated in FIG. 1e, the host can either be a Client (Tier 1), an application server (Tier 2), a Database Server (Tier 3) or the General Purpose Data acquisition system.

2) Detailed Method Steps for Web Operating Environment

The WOE is built around the Com2000™ System Web Operating Environment (OE) software and is used to allow the IT technology software to be integrated very easily into the internet processor environment and transition easily into the next generation Com2000™ information technology applications. The WOE also accommodates virtual internet interfaces from a variety of mobile hand-held communicator platforms, web software environments, and other web application software on multi-vendor platforms. The WOE will compatible with several commercial Internet Exchange Architecture communication standards.

The WOE is a virtual Wireless Web Operating Environment layer which can resides on any of the Operating Systems. It operates as a internet multiprocessing version of an OS kernel. It extends many OS calls to operate seamlessly across internet's multiple processing nodes. The WOE is designed so that tasks that form applications can reside on several internet processors and internet platform nodes and still exchange data, communicate, and synchronize as if they are running on a single computer.

When the WOE receives a system call whose target Java object ID indicates that the object does not resides on the node from which the call is made, the WOE will process the system call as a Web Remote Service Call (RSC). In general, an Web RSC involves two nodes. The source internet node is the node from which the system call is made. The destination internet node is the node on which the object of the system call resides. To complete an Web RSC, the WOE on both source and destination internet nodes must carry out a sequence of well-coordinated actions and exchange a number of inter-node packet processor. Java Object ID creation and deletion calls are supported. As illustrated in, the WOE's web distributed and remote computing functions comprised of Tier I Web interface, Online Database Server/Agent, Application Server/Agent and Remote Computing Agent.

The Tier 1 interface or Embedded Java Object Server/Agent handles the WEB Computing and Web GUI interface and updates the display parameters. The Internet Online Database Server/Agent handles the interface with external Internet online database systems. The web agent of Application Target System allows the server of Web GUI and Application's executable to be downloaded and uploaded to and from the Application Target Internet System. This is merely the interface conduit between the Internet sender node(Client) and the Internet receiver node (Application Server).

Tier 2 interface or Internet Application Server/Agent 8a3 handles the interface of the Application Target Internet System's Operating system node for web spawning and terminating a client task requests. Tier 3 interface or Internet Online Database Server/Agent handles the interface of Remote Internet Database system for up and downloading the results of the remote web executions or the distributed web running tasks.

The Network & Web Server/Client Subsystem is also responsible for handling the Wireless Web Network Information Data Communication portion of the Com2000™ System. Please refer to the summary of the invention and software flow chart of the Dynamic IP Access or DIPA Algorithm for information.

Each level of the internet three tier computing model are interfaced with each other by the Com2000™ System, which acts as an internet agent. The clients are low-powered desktop networking computers, which are simply used to web display information to the user and to return user feedback to the application server system. The internet application server system is a combination of a powerful remote web computing system and Com2000™ system that are executing core algorithms of the internet application through a Com2000™ WOE agent. The system is simply a low-powered handheld embedded Web communicator/computer. The Client, Application, and Data Base agents all reside in the Com2000™ WOE System software.

The wireless internet system's agent is comprised of Internet Online Database Server/Agent, embedded Web Server/Agent and Internet Application Server/Agent. The Internet application agent allows the internet executable file to be uploaded or downloaded to or from the internet application server. It is part of Com2000™ ITSync internet system software and is behaved as the interface conduit between the internet & intranet client and the internet application server. The Remote WOE Computing Agent for Com2000™ ITSync has two functions: one for the internet client and one for the internet server host and it is transparent to the user. All phases of operation for Client and Server Remote WOE Computing Agent software will be activated when the Com2000™ ITSync Web system is housed inside a either client or Server communicator or computers.

While the invention has been shown and described with respect to a preferred embodiment and several alternate embodiments, it will be understood by persons skilled in the relevant art that various changes in form and details can be made therein without departing from the spirit and scope of the invention.

What is claimed is:

1. A system for reducing interference in a communication system, the interference occurring on a data sample signal having a precursor inter-symbol interference (ISI) portion and a post-cursor ISI portion, the system comprising:
- a first precursor equalizer, for receiving the data sample signal and for performing an equalization operation on said data sample signal to reduce the precursor ISI and to generate an ISI equalized sample signal;
- a summer, coupled to said first precursor equalizer, for combining said ISI equalized sample signal and a post-cursor cancellation signal to generate an equalized estimated sample signal;
- a slicer, coupled to said summer to receive said equalized estimated sample signal, for generating a detected symbol signal representing a preliminary symbol value of said equalized estimated sample signal;
- a precursor canceller, for receiving said equalized estimated sample signal and said detected symbol signal, for further reducing the precursor interference, said precursor canceller having:
  - a finite impulse response filter, for receiving said detected symbol signal and for determining the pre-cursor ISI on said detected symbol signal to generate a precursor cancellation signal,
  - a first delay component to receive said equalized estimated sample signal, for delaying said equalized estimated sample signal by a first amount and to output a delayed equalized estimated sample signal, said first amount corresponding to a delay caused by said slicer and finite impulse response filter,
  - a DPIC summer to combine said precursor cancellation signal and said delayed equalized estimated sample signal to generate a second output signal representing said data sample signal having a reduced pre-cursor interference portion; and
- a first post-cursor canceller, for receiving said detected symbol signal, and for reducing the post-cursor interference on said detected symbol signal to generate said post-cursor cancellation signal.

2. The system of claim 1, wherein said post-cursor canceller includes a plurality of taps having input coefficients.

3. The system of claim 2, wherein said coefficients automatically adjust in response to the post-cursor interference on the data sample signal.

4. The system of claim 1, wherein said first precursor equalizer includes a plurality of taps having input coefficients to reduce the pre-cursor interference.

5. The system of claim 1, wherein said finite response filter includes a plurality of taps having input coefficients to reduce the pre-cursor interference.

6. The system of claim 1, wherein said first delay component aligns said equalized estimated sample signal and said slicer output signal.

7. The system of claim 1, further comprising:
- a second delay component, coupled to receive said data sample signal, for delaying said data sample signal by a second amount and for outputting a delayed data sample signal; and
- a second precursor equalizer, for receiving said delayed data sample signal and for performing an equalization operation on said delayed data sample signal to reduce precursor interference and to generate a delayed equalized signal;
- wherein said DPIC summer receives said delayed precursor equalized output wherein said delayed equalized estimated sample signal represents said data sample signal having a reduced precursor interference portion.

8. The system of claim 7, wherein said second amount corresponds to a delay caused by said first precursor equalizer, said summer, and said first delay component reduced by the delay caused by said second precursor equalizer.

9. The system of claim 7, wherein said second precursor equalizer includes a plurality of taps having input coefficients to reduce the pre-cursor interference.

10. The system of claim 7, further comprising:
- a DPIC slicer, coupled to said DPIC summer to receive said second output signal, for generating a DPIC slicer output signal representing a preliminary value of said second output signal; and
- a second post-cursor canceller, for receiving said DPIC slicer output signal, and for reducing the post-cursor interference of said DPIC slicer output signal to generate a DPIC post-cursor cancellation signal;
- wherein said DPIC summer combines said DPIC post-cursor cancellation signal with said precursor cancellation signal, said delayed equalized estimated sample signal and said delayed equalized signal to generate said second output.

11. The system of claim 10, wherein said second post-cursor canceller includes a plurality of taps having input coefficients.

12. The system of claim 11, wherein said coefficients automatically adjust in response to the post-cursor interference on the data sample signal.

* * * * *